(12) United States Patent
Asaka et al.

(10) Patent No.: US 8,316,299 B2
(45) Date of Patent: Nov. 20, 2012

(54) INFORMATION PROCESSING APPARATUS, METHOD AND PROGRAM

(75) Inventors: Kotaro Asaka, Tokyo (JP); Takashi Kinouchi, Tokyo (JP); Susumu Takatsuka, Tokyo (JP); Junichiro Sakata, Tokyo (JP); Hideo Tsukazaki, Tokyo (JP); Takeshi Ozawa, Chiba (JP)

(73) Assignees: Sony Corporation, Tokyo (JP); Sony Music Entertainment (Japan) Inc., Tokyo (JP)

( * ) Notice: Subject to any disclaimer, the term of this patent is extended or adjusted under 35 U.S.C. 154(b) by 978 days.

(21) Appl. No.: 11/543,946

(22) Filed: Oct. 6, 2006

(65) Prior Publication Data
US 2007/0085840 A1 Apr. 19, 2007

(30) Foreign Application Priority Data

Oct. 7, 2005 (JP) ................................ 2005-294483

(51) Int. Cl.
*G06F 3/00* (2006.01)
*G06F 17/00* (2006.01)
*G06F 17/30* (2006.01)
*G06F 3/048* (2006.01)

(52) U.S. Cl. ......... 715/716; 715/727; 715/738; 715/739

(58) Field of Classification Search .................. 715/716, 715/727, 738, 739
See application file for complete search history.

(56) References Cited

U.S. PATENT DOCUMENTS

| | | | |
|---|---|---|---|
| 6,938,209 B2 * | 8/2005 | Ogawa et al. | 715/727 |
| 7,133,531 B2 * | 11/2006 | Karpenstein | 381/119 |
| 7,512,273 B2 * | 3/2009 | Szummer | 382/187 |
| 7,542,814 B2 * | 6/2009 | Barr | 700/94 |
| 2003/0043206 A1 | 3/2003 | Duarte | |
| 2003/0095096 A1 | 5/2003 | Robbin et al. | |
| 2004/0055446 A1 | 3/2004 | Robbin et al. | |
| 2004/0100479 A1 | 5/2004 | Nakano et al. | |
| 2005/0144190 A1 | 6/2005 | Wada | |
| 2006/0026521 A1 * | 2/2006 | Hotelling et al. | 715/702 |

(Continued)

FOREIGN PATENT DOCUMENTS

JP 60205722 A * 10/1985
(Continued)

OTHER PUBLICATIONS

Interactive Design Gide for Touchscreen Application Jan. 22, 2003 87 pages.*

(Continued)

*Primary Examiner* — Jordany Nunez
(74) *Attorney, Agent, or Firm* — Finnegan, Henderson, Farabow, Garrett & Dunner, L.L.P.

(57) ABSTRACT

An information processing apparatus performing a predetermined process in accordance with an operation of a touch panel on a display, includes: display control means for displaying, on the display, an item associated with predetermined content; detection means for detecting a contact of a user with the touch panel; determination means for determining whether or not the contact of the user is released, the contact being detected by the detection means; selection means for completing, when the determination means determines that the contact of the user is released, a selection of the item displayed by the display control means on a position where the contact of the user was detected by the detection means until just before; and playback means for playing back content associated with the item whose selection is completed by the selection means.

6 Claims, 59 Drawing Sheets

U.S. PATENT DOCUMENTS

| | | | |
|---|---|---|---|
| 2006/0077183 A1* | 4/2006 | Studt | 345/173 |
| 2006/0112335 A1* | 5/2006 | Hofmeister et al. | 715/701 |
| 2007/0024594 A1* | 2/2007 | Sakata et al. | 345/173 |
| 2007/0060099 A1* | 3/2007 | Ramer et al. | 455/405 |
| 2008/0104020 A1* | 5/2008 | Kato | 707/3 |
| 2009/0164429 A1* | 6/2009 | Svendsen et al. | 707/3 |
| 2010/0057235 A1* | 3/2010 | Wang et al. | 700/94 |

FOREIGN PATENT DOCUMENTS

| | | |
|---|---|---|
| JP | 08-137902 | 5/1996 |
| JP | 2003-330613 | 11/2003 |
| JP | 2004-145388 | 5/2004 |
| JP | 2004-153551 | 5/2004 |
| JP | 2004-171096 | 6/2004 |
| JP | 2004-252654 | 9/2004 |
| WO | WO 2004/107742 | 12/2004 |

OTHER PUBLICATIONS

Chinese Office Action in counterpart Chinese Application No. 200610064103.X dated Sep. 6, 2010.

Foreign Office Action issued in corresponding Japanese Patent Application No. 2005-294483, dated Aug. 4, 2011.

\* cited by examiner

181

| CONTENT ID | Tempo | Major | RhythmRatio | HiMid | GENRE | DATE | Ranking | ARTIST ID |
|---|---|---|---|---|---|---|---|---|
| ID OF CONTENT A | 115 | -13 | 40 | 25 | ROCK | 1983 | 130 | ID OF ARTIST A |
| ID OF CONTENT B | 150 | 32 | 42 | 62 | POPS | 1999 | 5 | ID OF ARTIST A |
| ID OF CONTENT C | 131 | 36 | 5 | -11 | ROCK | 2002 | 20 | ID OF ARTIST A |
| ID OF CONTENT D | 84 | 25 | 9 | 31 | ROCK | 1983 | 53 | ID OF ARTIST B |
| ID OF CONTENT E | 161 | 36 | 4 | 6 | POPS | 1994 | 256 | ID OF ARTIST B |
| ID OF CONTENT F | 178 | 51 | 16 | 11 | JAZZ | 1935 | 83 | ID OF ARTIST C |
| ID OF CONTENT G | 184 | 32 | 13 | 46 | POPS | 2004 | 122 | ID OF ARTIST D |

182

| CONTENT ID | ARTIST NAME |
|---|---|
| ID OF CONTENT A | ARTIST A |
| ID OF CONTENT B | ARTIST B |
| ID OF CONTENT C | ARTIST C |
| ID OF CONTENT D | ARTIST D |
| ID OF CONTENT E | ARTIST E |

183

| ARTIST ID | RELATED ARTIST ID |
|---|---|
| ID OF ARTIST A | ID OF ARTIST B |
| ID OF ARTIST B | ID OF ARTIST C |
| ID OF ARTIST C | ID OF ARTIST D |
| ID OF ARTIST D | ID OF ARTIST G |
| ID OF ARTIST D | ID OF ARTIST A |
| ID OF ARTIST E | ID OF ARTIST C |

| CONTENT ID | GENRE ID | SUB GENRE ID | ARTIST NAME | MUSIC NAME |
|---|---|---|---|---|
| 1 | 1 | 11 | ARTIST A | MUSIC NAME 1 |
| 2 | 1 | 11 | ARTIST A | MUSIC NAME 2 |
| 3 | 1 | 11 | ARTIST B | MUSIC NAME 3 |
| 4 | 1 | 11 | ARTIST B | MUSIC NAME 4 |
| 5 | 1 | 12 | ARTIST C | MUSIC NAME 5 |
| 6 | 1 | 12 | ARTIST C | MUSIC NAME 6 |
| 7 | 1 | 12 | ARTIST D | MUSIC NAME 7 |
| 8 | 1 | 13 | ARTIST D | MUSIC NAME 8 |
| 9 | 1 | 13 | ARTIST E | MUSIC NAME 9 |
| 10 | 1 | 14 | ARTIST B | MUSIC NAME 10 |
| 11 | 2 | 21 | ARTIST F | MUSIC NAME 11 |
| 12 | 2 | 21 | ARTIST F | MUSIC NAME 12 |
| 13 | 2 | 21 | ARTIST F | MUSIC NAME 13 |
| 14 | 2 | 21 | ARTIST G | MUSIC NAME 14 |
| 15 | 2 | 21 | ARTIST G | MUSIC NAME 15 |
| 16 | 2 | 21 | ARTIST G | MUSIC NAME 16 |
| 17 | 3 | 31 | ARTIST H | MUSIC NAME 17 |
| 18 | 3 | 31 | ARTIST H | MUSIC NAME 18 |

| CONTENT ID | TEMPO | USAGE RATE OF PERCUSSION | USAGE RATE OF MAJOR CODE |
|---|---|---|---|
| 1 | 118 | 32 | 15 |
| 2 | 129 | 5 | 58 |
| 3 | 55 | 55 | 63 |
| 4 | 124 | 62 | 38 |
| 5 | 156 | 56 | 93 |
| 6 | 160 | 67 | 97 |
| 7 | 64 | 11 | 31 |
| 8 | 42 | 18 | 94 |
| 9 | 115 | 44 | 57 |
| 10 | 158 | 58 | 39 |
| 11 | 101 | 53 | 18 |
| 12 | 126 | 67 | 97 |
| 13 | 128 | 15 | 64 |
| 14 | 133 | 82 | 99 |
| 15 | 41 | 27 | 71 |
| 16 | 157 | 5 | 7 |
| 17 | 53 | 81 | 97 |
| 18 | 109 | 17 | 10 |

FIG.52

INFORMATION PROCESSING APPARATUS, METHOD AND PROGRAM

CROSS REFERENCES TO RELATED APPLICATIONS

The present invention contains subject matter related to Japanese Patent Application JP2005-294483 filed in the Japanese Patent Office on Oct. 7, 2005, the entire contents of which being incorporated herein by reference.

BACKGROUND OF THE INVENTION

1. Field of the Invention

The present invention relates to an information processing apparatus, method and program, and particularly relates to an information processing apparatus, method and program in which content can be easily selected in line with user's intention or feeling out of various contents by displaying a content selection screen on which a user can operate intuitively.

2. Description of the Related Art

There are methods to acquire music data and store the music data in a Personal Computer (PC): for example, a method of ripping music data from a Compact Disc (CD) and a method of using music delivery service in which one can download desired music from a music delivery server. In recent years, those methods are here to stay, and therefore users are enjoying the content, such as music data stored in the PC, through their Portable Device (PD).

Portability is an important factor for that kind of PD. This limits the size of a display screen of PD physically. Therefore, there are lots of ideas in order to retrieve and select desired content or application from those stored in the PD through the limited-size display screen.

For example, Jpn. Pat. Laid-open Publication No. 2003-330613 discloses a method in which a portable terminal device scrolls, in response to a drag operation on a touch panel, the names of applications in list format on a display screen, and determines the one displayed on a selection nomination area of the display screen as a selection candidate.

In addition, U.S. Pat. Publication No. 2003/0095096 discloses a method in which a portable terminal device (portable multimedia device) scrolls content names in linear list format on a display, and allows a user to retrieve his/her desired content easily through a rotatable input device.

Furthermore, U.S. Pat. Publication No. 2004/0055446 discloses a method in which a portable terminal device (portable multimedia device) displays genres, artists, album names and music hierarchically, and allows a user to retrieve his/her desired content easily.

The above methods are effective in retrieving music that a user already knows, especially in a case in which the PD stores several contents all of which he/she has recognized, or in a case in which most of contents stored in the PD are those ripped or downloaded by him/her.

That is to say, in a case in which the PD stores several contents all of which he/she has recognized, scrolling all the contents is easy for the user when retrieving his/her desired content out of them, like Jpn. Pat. Laid-open Publication No. 2003-330613 and U.S. Pat. Publication No. 2003/0095096. In addition, in a case in which most of contents stored in the PD are those ripped or downloaded by him/her, it is easy for the user to retrieve his/her desired content out of them through hierarchically-displayed information like U.S. Pat. Publication No. 2004/0055446, because he/she already knows the names of stored contents and words associated with those contents (such as album names, genres and artist names, if the content is music).

SUMMARY OF THE INVENTION

However, for example, there is a case in which the PD stores various contents, everything a user likes and dislikes. In this case, it is troublesome for the user to retrieve his/her desired content out of those various contents by using the above method, because he/she only knows a little about the content.

That is to say, the above content selection screen is designed for a user who has already obtained information associated with all the contents stored in the PD. Accordingly, it is troublesome for a user to intuitively retrieve content out of various unknown contents in line with his/her hobby, intention or feeling.

The present invention has been made in view of the above points and allows a user to intuitively select content out of various contents in line with his/her intention.

A first information processing apparatus according to an embodiment of the present invention includes: display control means for displaying, on the display, an item associated with predetermined content; detection means for detecting a contact of a user with the touch panel; determination means for determining whether or not the contact of the user is released, the contact being detected by the detection means; selection means for completing, when the determination means determines that the contact of the user is released, a selection of the item displayed by the display control means on a position where the contact of the user was detected by the detection means until just before; and playback means for playing back content associated with the item whose selection is completed by the selection means, wherein the playback means plays back predetermined content during a period from when the contact of the user is detected by the detection means until the determination means determines that the contact of the user is released.

The predetermined content is part or all of the content associated with the item, the item being displayed, during the period from when the contact of the user is detected by the detection means until the determination means determines that the contact of the user is released, by the display control means on the position where the contact of the user was detected by the detection means.

The predetermined content is sound effects.

A first information processing method according to an embodiment of the present invention includes: a display control step of displaying, on the display, an item associated with predetermined content; a detection step of detecting a contact of a user with the touch panel; a determination step of determining whether or not the contact of the user is released, the contact being detected by the process of the detection step; a selection step of completing, when the process of the determination step determines that the contact of the user is released, a selection of the item displayed by the process of the display control step on a position where the contact of the user was detected by the process of the detection step until just before; and a playback step of playing back content associated with the item whose selection is completed by the process of the selection step, wherein the process of the playback step plays back predetermined content during a period from when the contact of the user is detected by the process of the detection step until the process of the determination step determines that the contact of the user is released.

A first program according to an embodiment of the present invention includes: a display control step of displaying, on the display, an item associated with predetermined content; a detection step of detecting a contact of a user with the touch panel; a determination step of determining whether or not the contact of the user is released, the contact being detected by the process of the detection step; a selection step of completing, when the process of the determination step determines that the contact of the user is released, a selection of the item displayed by the process of the display control step on a position where the contact of the user was detected by the process of the detection step until just before; and a playback step of playing back content associated with the item whose selection is completed by the process of the selection step, wherein the process of the playback step plays back predetermined content during a period from when the contact of the user is detected by the process of the detection step until the process of the determination step determines that the contact of the user is released.

A second information processing apparatus according to an embodiment of the present invention includes: display control means for displaying, on the display, an item associated with predetermined content; detection means for detecting a contact of a user with the touch panel; determination means for determining whether or not the contact of the user is released, the contact being detected by the detection means; selection means for completing, when the determination means determines that the contact of the user is released, a selection of the item displayed by the display control means on a position where the contact of the user was detected by the detection means until just before, or a selection of all the items displayed by the display control means in an area specified by positions where the contact of the user was detected by the detection means during a period from when the contact of the user is detected by the detection means until the determination means determines that the contact of the user is released; and playback means for playing back content associated with the item whose selection is completed by the selection means.

The second information processing apparatus further includes switching means for switching a target whose selection is to be completed by the selection-means from the item corresponding to the position where the contact of the user was detected by the detection means until just before to the item corresponding to the area specified by positions where the contact of the user was detected by the detection means during a period from when the contact of the user is detected by the detection means until the determination means determines that the contact of the user is released.

A second information processing method according to an embodiment of the present invention includes: a display control step of displaying, on the display, an item associated with predetermined content; a detection step of detecting a contact of a user with the touch panel; a determination step of determining whether or not the contact of the user is released, the contact being detected by the process of the detection step; a selection step of completing, when the process of the determination step determines that the contact of the user is released, a selection of the item displayed by the process of the display control step on a position where the contact of the user was detected by the process of the detection step until just before, or a selection of all the items displayed by the process of the display control step in an area specified by positions where the contact of the user was detected by the process of the detection step during a period from when the contact of the user is detected by the process of the detection step until the process of the determination step determines that the contact of the user is released; and a playback step of playing back content associated with the item whose selection is completed by the process of the selection step.

A second program according to an embodiment of the present invention includes: a display control step of displaying, on the display, an item associated with predetermined content; a detection step of detecting a contact of a user with the touch panel; a determination step of determining whether or not the contact of the user is released, the contact being detected by the process of the detection step; a selection step of completing, when the process of the determination step determines that the contact of the user is released, a selection of the item displayed by the process of the display control step on a position where the contact of the user was detected by the process of the detection step until just before, or a selection of all the items displayed by the process of the display control step in an area specified by positions where the contact of the user was detected by the process of the detection step during a period from when the contact of the user is detected by the process of the detection step until the process of the determination step determines that the contact of the user is released; and a playback step of playing back content associated with the item whose selection is completed by the process of the selection step.

A third information processing apparatus according to an embodiment of the present invention includes: display control means for displaying, on the display, an item associated with predetermined content; selection means for selecting the item displayed by the display control means in accordance with a user's operation; and acquisition means for acquiring related content that has a certain relationship to the content associated with the item selected by the selection means, wherein the display control means displays the item selected by the selection means on a center of a circle or polygon, and a first related item associated with the related content acquired by the acquisition means on a part or all of a circumference of the circle or polygon.

The third information processing apparatus further includes detection means for detecting a contact of a user with a touch panel on the display, wherein the selection means selects, in accordance with the contact of the user detected by the detection means, the item associated with the content, the item being displayed on the display.

In the third information processing apparatus, the display control means displays a line between the item and the first related item; and the line to be displayed is at least a line with an arrow according to the relationship, a line with a pattern according to the relationship, or a line with a color according to the relationship.

In the third information processing apparatus, when the first related item on the part or all of the circumference of the circle or polygon is selected, the display control means displays an image where the first related item selected by the selection means moves from the part or all of the circumference of the circle or polygon to the center, and also displays an image where a second related item associated with related content that is acquired by the acquisition means and has a certain relationship to the first related item moves from the center where the first related item is displayed to a predetermined position on a part or all of the circumference of the circle or polygon.

In the third information processing apparatus, the content is playback history information of other users.

A third information processing method according to an embodiment of the present invention includes: a display control step of displaying, on the display, an item associated with predetermined content; a selection step of selecting the item displayed by the process of the display control step in accordance with a user's operation; and an acquisition step of acquiring related content that has a certain relationship to the content associated with the item selected by the process of the selection step, wherein the process of the display control step displays the item selected by the process of the selection step on a center of a circle or polygon, and a first related item associated with the related content acquired by the process of the acquisition step on a part or all of a circumference of the circle or polygon.

A third program according to an embodiment of the present invention includes: a display control step of displaying, on the display, an item associated with predetermined content; a selection step of selecting the item displayed by the process of the display control step in accordance with a user's operation; and an acquisition step of acquiring related content that has a certain relationship to the content associated with the item selected by the process of the selection step, wherein the process of the display control step displays the item selected by the process of the selection step on a center of a circle or polygon, and a first related item associated with the related content acquired by the process of the acquisition step on a part or all of a circumference of the circle or polygon.

A fourth information processing apparatus according to an embodiment of the present invention includes: extraction means for extracting content whose at least one of metadata has a value within a predetermined range; display control means for displaying an item associated with the content extracted by the extraction means on a predetermined position of the display based on an axis of the one of the metadata; selection means for selecting the item displayed by the display control means in accordance with a user's operation; and playback means for playing back content associated with the item selected by the selection means.

The fourth information processing apparatus further includes detection means for detecting a contact of a user with a touch panel on the display, wherein the selection means selects, in accordance with the contact of the user detected by the detection means, the item associated with the content, the item being displayed on the display.

In the fourth information processing apparatus, the extraction means extracts content whose at least two of metadata have a value within a predetermined range; and the display control means displays an item associated with the content extracted by the extraction means on a predetermined position of the display based on axes of the two of the metadata.

In the fourth information processing apparatus, if the extraction means extracts a plurality of pieces of content each of which is associated with the items, priorities of the plurality of pieces of content are set in accordance with values of predetermined metadata of the plurality of pieces of content; and the playback means plays back the plurality of pieces of content associated with the items selected by the selection means in accordance with the priorities.

In the fourth information processing apparatus, the display control means displays the item associated with the content having a certain relationship in a different manner from other items.

In the fourth information processing apparatus, the different manner of display is done by adding at least a blink, color, shape, brilliance or numeric character.

In the fourth information processing apparatus, the display control means displays a line between the items associated with the content having the certain relationship; and the line to be displayed is at least a line with an arrow according to the relationship, a line with a pattern according to the relationship, or a line with a color according to the relationship.

A fourth information processing method according to an embodiment of the present invention includes: a extraction step of extracting content whose at least one of metadata has a value within a predetermined range; a display control step of displaying an item associated with the content extracted by the process of the extraction step on a predetermined position of the display based on an axis of the one of the metadata; a selection step of selecting the item displayed by the process of the display control step in accordance with a user's operation; and a playback step of playing back content associated with the item selected by the process of the selection step.

A fourth program according to an embodiment of the present invention includes: a extraction step of extracting content whose at least one of metadata has a value within a predetermined range; a display control step of displaying an item associated with the content extracted by the process of the extraction step on a predetermined position of the display based on an axis of the one of the metadata; a selection step of selecting the item displayed by the process of the display control step in accordance with a user's operation; and a playback step of playing back content associated with the item selected by the process of the selection step.

A fifth information processing apparatus according to an embodiment of the present invention includes: selection means for selecting an item associated with content in accordance with a user's operation, the item being displayed on the display; acquisition means for acquiring related content having a certain relationship to the content associated with the item selected by the selection means; first display control means for displaying the item selected by the selection means on a center of a circle or polygon, and a related item associated with the related content acquired by the acquisition means on a part or all of circumference of the circle or polygon; extraction means for extracting content whose at least one of metadata has a value within a predetermined range; second display control means for displaying an item associated with the content extracted by the extraction means on a predetermined position of the display based on an axis of the one of the metadata; and display switching means for switching what is to be displayed between a screen displayed by the first display control means and a screen displayed by the second display control means, wherein when the display switching means switches what is to be displayed from one screen to another screen, the first or second display control means displays an image showing transition from the one screen to the another screen.

The fifth information processing apparatus further includes detection means for detecting a contact of a user with a touch panel on the display, wherein the selection means selects, in accordance with the contact of the user detected by the detection means, the item associated with the content, the item being displayed on the display.

In the fifth information processing apparatus, the extraction means extracts content whose at least two of metadata have a value within a predetermined range; and the second display control means displays an item associated with the content extracted by the extraction means on a predetermined position of the display based on axes of the two of the metadata.

In the fifth information processing apparatus, when the display switching means switches what is to be displayed from one screen to another screen, the first or second display control means displays the another screen reflected by information of the content selected by the selection section on the one screen.

A fifth information processing method according to an embodiment of the present invention includes: a selection step of selecting an item associated with content in accordance with a user's operation, the item being displayed on the display; an acquisition step of acquiring related content having a certain relationship to the content associated with the item selected by the process of the selection step; a first display control step of displaying the item selected by the process of the selection step on a center of a circle or polygon, and a related item associated with the related content acquired by the process of the acquisition step on a part or all of circumference of the circle or polygon; an extraction step of extracting content whose at least one of metadata has a value within a predetermined range; a second display control step of displaying an item associated with the content extracted by the process of the extraction step on a predetermined position of the display based on an axis of the one of the metadata; and a display switching step of switching what is to be displayed between a screen displayed by the process of the first display control step and a screen displayed by the process of the second display control step, wherein when the process of the display switching step switches what is to be displayed from one screen to another screen, the process of the first or second display control step displays an image showing transition from the one screen to the another screen.

A fifth program according to an embodiment of the present invention includes: a selection step of selecting an item associated with content in accordance with a user's operation, the item being displayed on the display; an acquisition step of acquiring related content having a certain relationship to the content associated with the item selected by the process of the selection step; a first display control step of displaying the item selected by the process of the selection step on a center of a circle or polygon, and a related item associated with the related content acquired by the process of the acquisition step on a part or all of circumference of the circle or polygon; an extraction step of extracting content whose at least one of metadata has a value within a predetermined range; a second display control step of displaying an item associated with the content extracted by the process of the extraction step on a predetermined position of the display based on an axis of the one of the metadata; and a display switching step of switching what is to be displayed between a screen displayed by the process of the first display control step and a screen displayed by the process of the second display control step, wherein when the process of the display switching step switches what is to be displayed from one screen to another screen, the process of the first or second display control step displays an image showing transition from the one screen to the another screen.

A sixth information processing apparatus according to an embodiment of the present invention includes: extraction means for extracting content whose at least one of metadata has a value within a predetermined range; first display control means for displaying an item associated with the content extracted by the extraction means on a predetermined position of the display based on an axis of the one of the metadata; selection means for selecting the item displayed on the display in accordance with a user's operation; playback means for playing back content associated with the item selected by the selection means; second display control means for displaying content associated with the item selected by the selection means in list format; and display switching means for switching what is to be displayed between a first screen displayed by the first display control means and a second screen displayed by the second display control means, wherein when the display switching means switches what is to be displayed from the first screen to the second screen, the first display control means displays an image showing transition from the first screen to the second screen.

The sixth information processing apparatus further includes detection means for detecting a contact of a user with a touch panel on the display, wherein the selection means selects, in accordance with the contact of the user detected by the detection means, the item associated with the content, the item being displayed on the display.

In the sixth information processing apparatus, the extraction means extracts content whose at least two of metadata have a value within a predetermined range; and the first display control means displays an item associated with the content extracted by the extraction means on a predetermined position of the display based on axes of the two of the metadata.

In the sixth information processing apparatus, when the display switching means switches what is to be displayed from the first screen to the second screen, the second display control means displays a list where the content are listed in order of predetermined metadata of the content.

In the sixth information processing apparatus, the predetermined metadata is ranking information.

A sixth information processing method according to an embodiment of the present invention includes: an extraction step of extracting content whose at least one of metadata has a value within a predetermined range; a first display control step of displaying an item associated with the content extracted by the process of the extraction step on a predetermined position of the display based on an axis of the one of the metadata; a selection step of selecting the item displayed on the display in accordance with a user's operation; a playback step of playing back content associated with the item selected by the process of the selection step; a second display control step of displaying content associated with the item selected by the process of the selection step in list format; and display switching step of switching what is to be displayed between a first screen displayed by the process of the first display control step and a second screen displayed by the process of the second display control step, wherein when the process of the display switching step switches what is to be displayed from the first screen to the second screen, the process of the first display control step displays an image showing transition from the first screen to the second screen.

A sixth program according to an embodiment of the present invention includes: an extraction step of extracting content whose at least one of metadata has a value within a predetermined range; a first display control step of displaying an item associated with the content extracted by the process of the extraction step on a predetermined position of the display based on an axis of the one of the metadata; a selection step of selecting the item displayed on the display in accordance with a user's operation; a playback step of playing back content associated with the item selected by the process of the selection step; a second display control step of displaying content associated with the item selected by the process of the selection step in list format; and display switching step of switching what is to be displayed between a first screen displayed by the process of the first display control step and a second screen displayed by the process of the second display control step, wherein when the process of the display switching step switches what is to be displayed from the first screen to the second screen, the process of the first display control step displays an image showing transition from the first screen to the second screen.

A seventh information processing apparatus according to an embodiment of the present invention includes: display control means for displaying, on the display, an item associated with predetermined content; selection means for selecting the item displayed by the display control means in accordance with a user's operation; content extraction means for extracting, based on metadata of the content, content having the same attribute as the content associated with the item selected by the selection means; and list generation means for generating, by using the content extracted by the content extraction means, a related content list where related content having a certain relationship to the content associated with the item selected by the selection means are listed, wherein the display control means displays the item selected by the selection means on a center of a circle or polygon, and related items associated with the related content on a part or all of a circumference of the circle or polygon in order of the related content list generated by the list generation means.

A seventh information processing method according to an embodiment of the present invention includes: a display control step of displaying, on the display, an item associated with predetermined content; a selection step of selecting the item displayed by the process of the display control step in accordance with a user's operation; a content extraction step of extracting, based on metadata of the content, content having the same attribute as the content associated with the item selected by the process of the selection step; and a list generation step of generating, by using the content extracted by the process of the content extraction step, a related content list where related content having a certain relationship to the content associated with the item selected by the process of the selection step are listed, wherein the process of the display control step displays the item selected by the selection step on a center of a circle or polygon, and related items associated with the related content on a part or all of a circumference of the circle or polygon in order of the related content list generated by the process of the list generation step.

A seventh program according to an embodiment of the present invention includes: a display control step of displaying, on the display, an item associated with predetermined content; a selection step of selecting the item displayed by the process of the display control step in accordance with a user's operation; a content extraction step of extracting, based on metadata of the content, content having the same attribute as the content associated with the item selected by the process of the selection step; and a list generation step of generating, by using the content extracted by the process of the content extraction step, a related content list where related content having a certain relationship to the content associated with the item selected by the process of the selection step are listed, wherein the process of the display control step displays the item selected by the selection step on a center of a circle or polygon, and related items associated with the related content on a part or all of a circumference of the circle or polygon in order of the related content list generated by the process of the list generation step.

An eighth information processing apparatus according to an embodiment of the present invention includes: display control means for displaying, on the display, an item associated with predetermined content; selection means for selecting the item displayed by the display control means in accordance with a user's operation; content extraction means for extracting, based on analytical data generated by analyzing the content, content having an analytical data value whose degree of similarity to an analytical data value of the content associated with the item selected by the selection means is greater than a predetermined value; and list generation means for generating, by using the content extracted by the content extraction means, a related content list where related content having a certain relationship to the content associated with the item selected by the selection means are listed, wherein the display control means displays the item selected by the selection means on a center of a circle or polygon, and related items associated with the related content on a part or all of a circumference of the circle or polygon in order of the related content list generated by the list generation means.

An eighth information processing method according to an embodiment of the present invention includes: a display control step of displaying, on the display, an item associated with predetermined content; a selection step of selecting the item displayed by the process of the display control step in accordance with a user's operation; a content extraction step of extracting, based on analytical data generated by analyzing the content, content having an analytical data value whose degree of similarity to an analytical data value of the content associated with the item selected by the process of the selection step is greater than a predetermined value; and a list generation step of generating, by using the content extracted by the process of the content extraction step, a related content list where related content having a certain relationship to the content associated with the item selected by the process of the selection step are listed, wherein the process of the display control step displays the item selected by the process of the selection step on a center of a circle or polygon, and related items associated with the related content on a part or all of a circumference of the circle or polygon in order of the related content list generated by the process of the list generation step.

An eighth program according to an embodiment of the present invention includes: a display control step of displaying, on the display, an item associated with predetermined content; a selection step of selecting the item displayed by the process of the display control step in accordance with a user's operation; a content extraction step of extracting, based on analytical data generated by analyzing the content, content having an analytical data value whose degree of similarity to an analytical data value of the content associated with the item selected by the process of the selection step is greater than a predetermined value; and a list generation step of generating, by using the content extracted by the process of the content extraction step, a related content list where related content having a certain relationship to the content associated with the item selected by the process of the selection step are listed, wherein the process of the display control step displays the item selected by the process of the selection step on a center of a circle or polygon, and related items associated with the related content on a part or all of a circumference of the circle or polygon in order of the related content list generated by the process of the list generation step.

The first information processing apparatus (method and program) according to an embodiment of present invention displays an item associated with predetermined content on the display, detects a contact of a user with the touch panel, and determines whether or not the contact of the user is released. And then, it completes, when determining that the contact of the user is released, a selection of the item displayed on a position where the contact of the user was detected until just before, plays back content associated with the item whose selection is completed, and plays back predetermined content during a period from when the contact of the user is detected until it determines that the contact of the user is released.

The second information processing apparatus (method and program) according to an embodiment of present invention displays, on the display, an item associated with predetermined content, detects a contact of a user with the touch panel, and determines whether or not the contact of the user is released. And then it completes, when determining that the contact of the user is released, a selection of the item displayed on a position where the contact of the user was detected until just before, or a selection of all the items displayed in an area specified by positions where the contact of the user was detected during a period from when the contact of the user is detected until it determines that the contact of the user is released, and plays back content associated with the item whose selection is completed.

The third information processing apparatus (method and program) according to an embodiment of present invention displays, on the display, an item associated with predetermined content, selects the item displayed in accordance with a user's operation, and acquires related content that has a certain relationship to the content associated with the item selected. And then it displays the item selected on a center of a circle or polygon, and a related item associated with the related content acquired on a part or all of a circumference of the circle or polygon.

The fourth information processing apparatus (method and program) according to an embodiment of present invention extracts content whose at least one of metadata has a value within a predetermined range, displays an item associated with the content extracted on a predetermined position of the display based on an axis of the one of the metadata. And then it selects the item displayed in accordance with a user's operation, and plays back content associated with the item selected.

The fifth information processing apparatus (method and program) according to an embodiment of present invention selects an item associated with content in accordance with a user's operation, acquires related content having a certain relationship to the content associated with the item selected, and displays the item selected on a center of a circle or polygon and a related item associated with the related content acquired on a part or all of circumference of the circle or polygon. And then it extracts content whose at least one of metadata has a value within a predetermined range, displays an item associated with the content extracted on a predetermined position of the display based on an axis of the one of the metadata, and switches what is to be displayed between a screen displayed by the first display control means and a screen displayed by the second display control means. And then when it switches what is to be displayed from one screen to another screen, it displays an image showing transition from the one screen to the another screen.

The sixth information processing apparatus (method and program) according to an embodiment of present invention extracts content whose at least one of metadata has a value within a predetermined range, displays an item associated with the content extracted on a predetermined position of the display based on an axis of the one of the metadata. It also selects the item displayed on the display in accordance with a user's operation, plays back content associated with the item selected, and displays content associated with the item selected in list format. And then it switches what is to be displayed between a first screen displayed by the first display control means and a second screen displayed by the second display control means. And when it switches what is to be displayed from the first screen to the second screen, it displays an image showing transition from the first screen to the second screen.

The seventh information processing apparatus (method and program) according to an embodiment of present invention displays, on the display, an item associated with predetermined content, selects the item displayed in accordance with a user's operation, extracts, based on metadata of the content, content having the same attribute as the content associated with the item selected, and generates, by using the content extracted, a related content list where related content having a certain relationship to the content associated with the item selected are listed. And then it displays the item selected on a center of a circle or polygon and related items associated with the related content on a part or all of a circumference of the circle or polygon in order of the related content list generated.

The eighth information processing apparatus (method and program) according to an embodiment of present invention displays, on the display, an item associated with predetermined content, and selects the item displayed in accordance with a user's operation. And then it extracts, based on analytical data generated by analyzing the content, content having an analytical data value whose degree of similarity to an analytical data value of the content associated with the item selected is greater than a predetermined value, and generates, by using the content extracted, a related content list where related content having a certain relationship to the content associated with the item selected are listed. And then it displays the item selected on a center of a circle or polygon, and related items associated with the related contention a part or all of a circumference of the circle or polygon in order of the related content list generated.

The apparatus, method and program according to an embodiment of the present invention provide a content selection screen where a user can intuitively select one from among various unknown contents. In addition, the apparatus, method and program according to an embodiment of the present invention provide an easy-to-understand content selection screen. Therefore a user can intuitively select content out of various contents in line with his/her intention. In addition, the apparatus, method and program according to an embodiment of the present invention promote the content.

The nature, principle and utility of the invention will become more apparent from the following detailed description when read in conjunction with the accompanying drawings in which like parts are designate by like reference numerals or characters.

BRIEF DESCRIPTION OF THE DRAWINGS

In the accompanying drawings:

FIG. 7 is a diagram showing an example of the detailed configuration of the metadata database illustrated by FIG. 5;

FIG. 19 is a diagram showing another example of the configuration of a play list display section shown in FIG. 17;

FIG. 51 is a diagram showing an example of the configuration of a content detailed metadata table shown in FIG. 50;

FIG. 52 is a diagram showing an example of the configuration of a content analytical data table shown in FIG. 50;

DETAILED DESCRIPTION OF PREFERRED EMBODIMENTS

Figure 1:
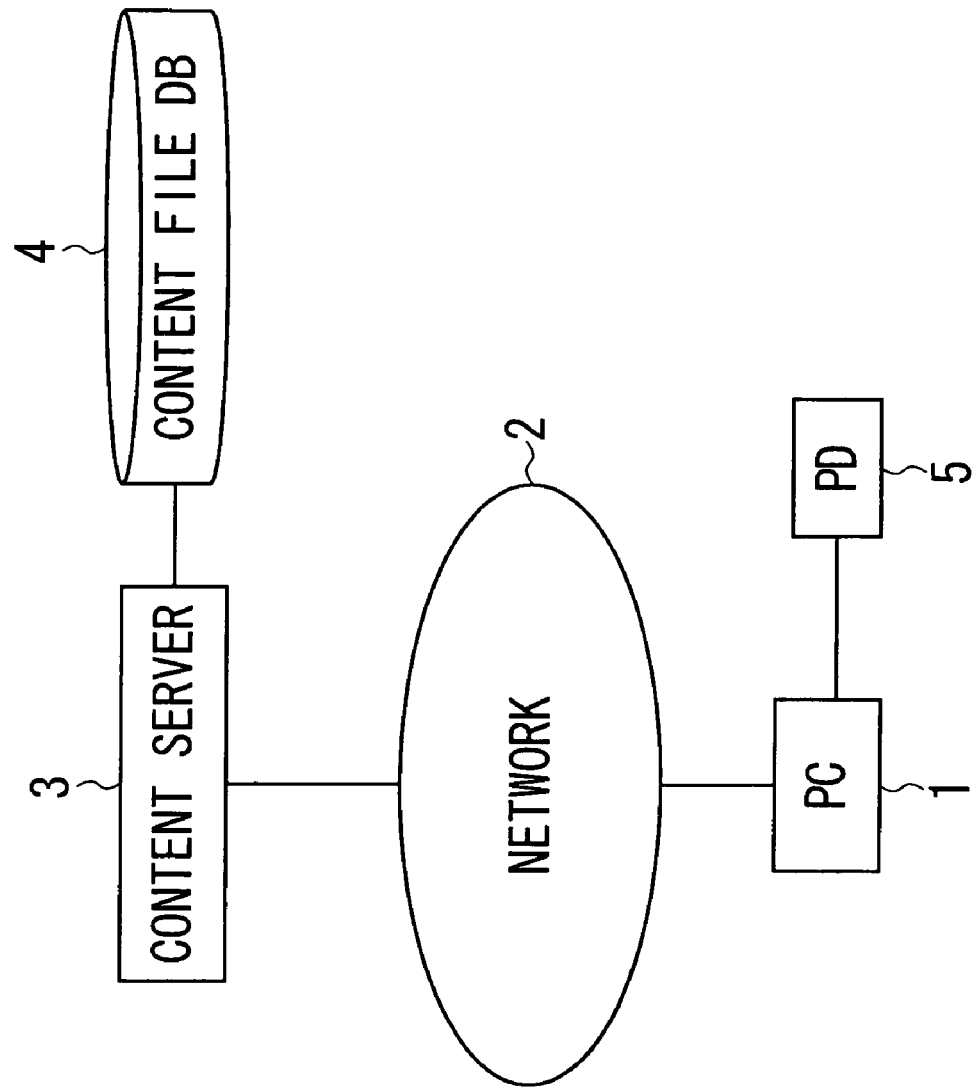
FIG. 1 is a diagram showing the configuration of a content provision system according to an embodiment of the present invention.

An embodiment of the present invention will be described. The following describes the relationship between components of claims and components of embodiments. This helps you understand that the components of claims are illustrated by the embodiments of the present invention. The following may not describe some components of the embodiments even if they correspond to the components of claims. However, this does not mean that they do not correspond to the components of claims. Even if a certain component of the embodiments is described as one corresponding to a component of claims, this component of the embodiments may be also equivalent to another component of claims.

All the components of the embodiments may be claimed or maybe not. In other words, the following just describes the relationship between the components of claims and the components of embodiments. That is to say, other components that are described by the embodiments of the present invention but are not claimed may be claimed in the future by a divisional application, amendment and the like.

A first information processing apparatus (a PD 5 in FIG. 1, for example) according to an embodiment of the present invention includes: display control means (a map display control section 216 in FIG. 9, for example) for displaying, on the display, an item associated with predetermined content; detection means (an input module 153 in FIG. 5, for example) for detecting a contact of a user with the touch panel (a touch panel 132 in FIG. 4, for example); determination means (a selection location acquisition section 211 in FIG. 9, for example) for determining whether or not the contact of the user is released, the contact being detected by the detection means; selection means (a selection history management section 213 in FIG. 9, for example) for completing, when the determination means determines that the contact of the user is released, a selection of the item displayed by the display control means on a position where the contact of the user was detected by the detection means until just before; and playback means (a content playback module 154 in FIG. 5, for example) for playing back content associated with the item whose selection is completed by the selection means, wherein the playback means plays back predetermined content during a period from when the contact of the user is detected by the detection means until the determination means determines that the contact of the user is released.

A first information processing method according to an embodiment of the present invention includes: a display control step (step S78 in FIG. 31, for example) of displaying, on the display, an item associated with predetermined content; a detection step (step S79 in FIG. 31, for example) of detecting a contact of a user with the touch panel; a determination step (step S105 in FIG. 32, for example) of determining whether or not the contact of the user is released, the contact being detected by the process of the detection step; a selection step (step S106 in FIG. 32, for example) of completing, when the process of the determination step determines that the contact of the user is released, a selection of the item displayed by the process of the display control step on a position where the contact of the user was detected by the process of the detection step until just before; and a playback step (step S108 in FIG. 32, for example) of playing back content associated with the item whose selection is completed by the process of the selection step, wherein the process of the playback step (step S103 in FIG. 32, for example) plays back predetermined content during a period from when the contact of the user is detected by the process of the detection step until the process of the determination step determines that the contact of the user is released.

A second information processing apparatus according to an embodiment of the present invention includes: display control means (a map display control section 216 in FIG. 9, for example) for displaying, on the display, an item associated with predetermined content; detection means (an input module 153 in FIG. 5, for example) for detecting a contact of a user with the touch panel (a touch panel 132 in FIG. 4, for example); determination means (a selection location acquisition section 211 in FIG. 9, for example) for determining whether or not the contact of the user is released, the contact being detected by the detection means; selection means (a selection history management section 213 in FIG. 9, for example) for completing, when the determination means determines that the contact of the user is released, a selection of the item (a cell on a location P2 in FIG. 11, for example) displayed by the display control means on a position where the contact of the user was detected by the detection means until just before, or a selection of all the items (cells in an area specified by a route 381 in FIG. 12, for example) displayed by the display control means in an area specified by positions where the contact of the user was detected by the detection means during a period from when the contact of the user is detected by the detection means until the determination means determines that the contact of the user is released; and playback means (a content playback module 154 in FIG. 5, for example) for playing back content associated with the item whose selection is completed by the selection means.

Figure 12:
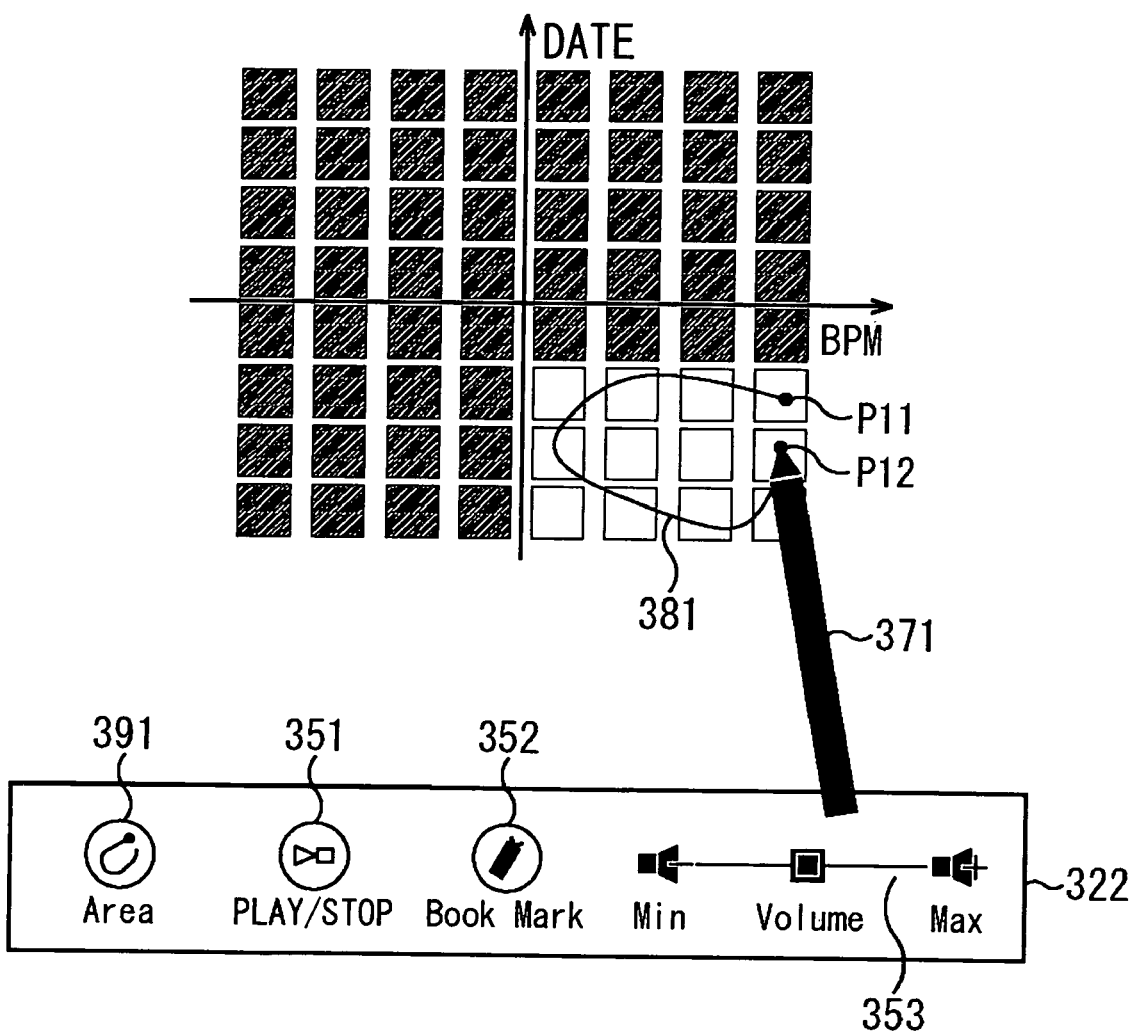
FIG. 12 is a diagram illustrating another example of the content selection method on the map display section shown in FIG. 10.

The second information processing apparatus further includes switching means (a selection location acquisition section 211 (which performs a process based on an operation signal of an area button 391) in FIG. 12, for example) for switching a target whose selection is to be completed by the selection means from the item corresponding to the position where the contact of the user was detected by the detection means until just before to the item corresponding to the area specified by positions where the contact of the user was detected by the detection means during a period from when the contact of the user is detected by the detection means until the determination means determines that the contact of the user is released.

A second information processing method according to an embodiment of the present invention includes: a display control step (step S78 in FIG. 31, for example) of displaying, on the display, an item associated with predetermined content; a detection step (step S79 in FIG. 31, for example) of detecting a contact of a user with the touch panel; a determination step (step S105 in FIG. 32, for example) of determining whether or not the contact of the user is released, the contact being detected by the process of the detection step; a selection step (step S106 in FIG. 32, for example) of completing, when the process of the determination step determines that the contact of the user is released, a selection of the item displayed by the process of the display control step on a position where the contact of the user was detected by the process of the detection step until just before, or a selection of all the items displayed by the process of the display control step in an area specified by positions where the contact of the user was detected by the process of the detection step during a period from when the contact of the user is detected by the process of the detection step until the process of the determination step determines that the contact of the user is released; and a playback step (step S108 in FIG. 32, for example) of playing back content associated with the item whose selection is completed by the process of the selection step.

A second program according to an embodiment of the present invention is the same as the second information processing method. Accordingly, the description will be omitted.

A third information processing apparatus according to an embodiment of the present invention includes: display control means (a related link display control section 215 in FIG. 9, for example) for displaying, on the display, an item associated with predetermined content; selection means (a selection location acquisition section 211 in FIG. 9, for example) for selecting the item displayed by the display control means in accordance with a user's operation; and acquisition means (a related link generation section 231 in FIG. 9, for example) for acquiring related content that has a certain relationship to the content associated with the item selected by the selection means, wherein the display control means displays the item selected by the selection means on-a center of a circle or polygon, and a first related item associated with the related content acquired by the acquisition means on a part or all of a circumference of the circle or polygon.

The third information processing apparatus further includes detection means (an input module 153 in FIG. 5, for example) for detecting a contact of a user with a touch panel (a touch panel 132 in FIG. 4, for example) on the display, wherein the selection means selects, in accordance with the contact of the user detected by the detection means, the item associated with the content, the item being displayed on the display.

Figure 23:
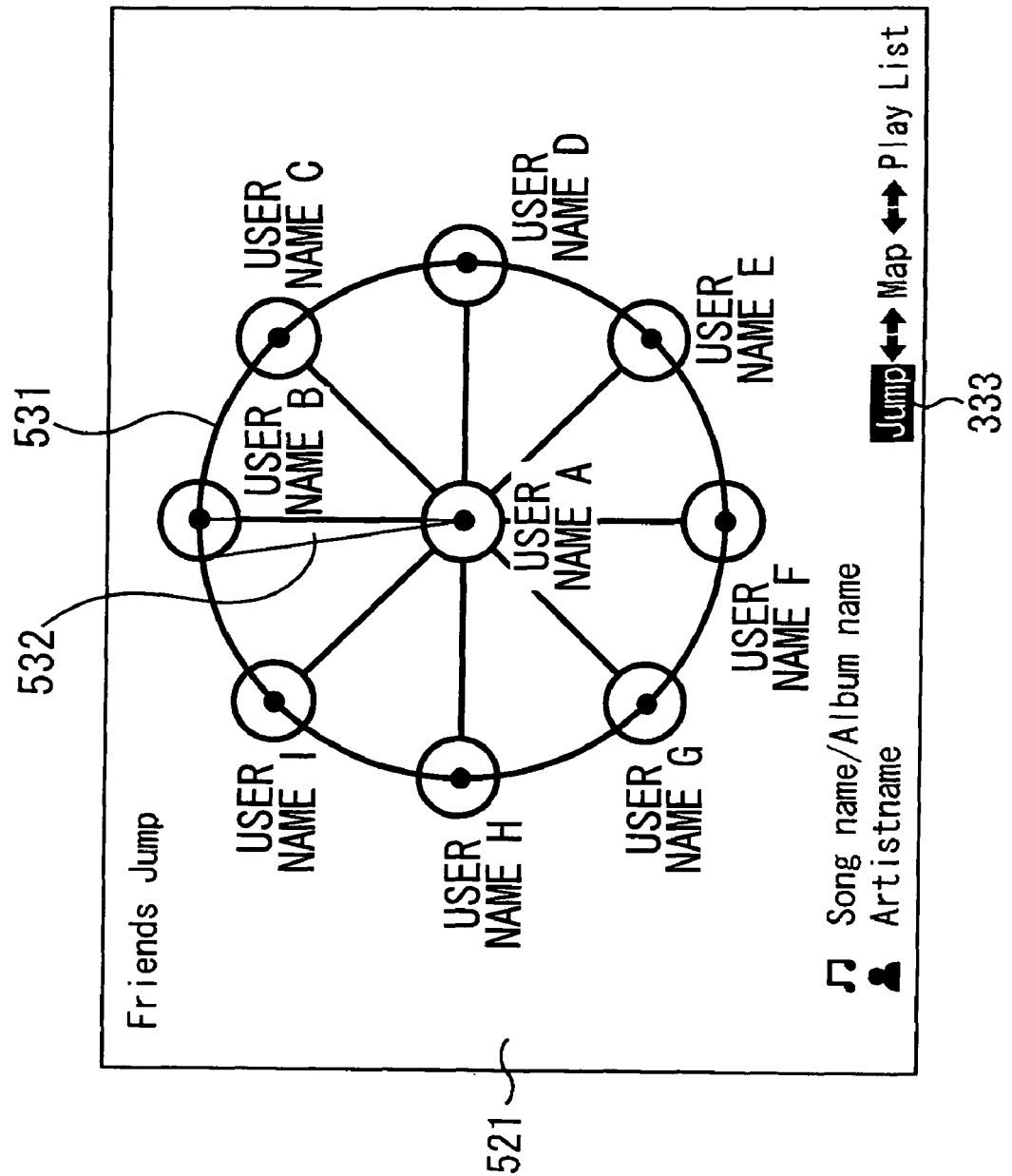
FIG. 23 is a diagram showing another example of the configuration of a link display section shown in FIG. 21.

In the third information processing apparatus, the content is playback history information (a playback history associated with a user icon of a link display section 521 in FIG. 23, for example) of other users.

A third information processing method according to an embodiment of the present invention includes: a display control step (step S194 in FIG. 36, for example) of displaying, on the display, an item associated with predetermined content; a selection step (step S196 in FIG. 36, for example) of selecting the item displayed by the process of the display control step in accordance with a user's operation; and an acquisition step (step S192 in FIG. 36, for example) of acquiring related content that has a certain relationship to the content associated with the item selected by the process of the selection step, wherein the process of the display control step displays the item selected by the process of the selection step on a center of a circle or polygon, and a first related item associated with the related content acquired by the process of the acquisition step on a part or all of a circumference of the circle or polygon.

A third program according to an embodiment of the present invention is the same as the third information processing method. Accordingly, the description will be omitted.

A fourth information processing-apparatus according to an embodiment of the present invention includes: extraction means (a grid map generation section 232 in FIG. 9, for example) for extracting content whose at least one of metadata has a value within a predetermined range; display control means (a map display control section 216 in FIG. 9 which controls a map display section 321 in FIG. 29, for example) for displaying an item associated with the content extracted by the extraction means on a predetermined position of the display based on an axis of the one of the metadata; selection means (a selection location acquisition section 211 in FIG. 9, for example) for selecting the item displayed by the display control means in accordance with a user's operation; and playback means (a content playback module 154 in FIG. 5, for example) for playing back content associated with the item selected by the selection means.

The fourth information processing apparatus further includes detection means (an input module 153 in FIG. 5, for example) for detecting a contact of a user with a touch panel (a touch panel 132 in FIG. 4, for example) on the display, wherein the selection means selects, in accordance with the contact of the user detected by the detection means, the item associated with the content, the item being displayed on the display.

In the fourth information processing apparatus, the extraction means extracts content whose at least two of metadata have a value within a predetermined range; and the display control means (a map display control section 216 in FIG. 9 which controls a map display section 321 in FIG. 10, for example) displays an item associated with the content extracted by the extraction means on a predetermined position of the display based on axes of the two of the metadata.

A fourth information processing method according to an embodiment of the present invention includes: a extraction step (step S77 in FIG. 31, for example) of extracting content whose at least one of metadata has a value within a predetermined range; a display control step (step S78 in FIG. 31, for example) of displaying an item associated with the content extracted by the extraction step on a predetermined position of the display based on an axis of the one of the metadata; a selection step (step S106 in FIG. 32, for example) of selecting the item displayed by the process of the display control step in accordance with a user's operation; and a playback step (step S108 in FIG. 32, for example) of playing back content associated with the item selected by the process of the selection step.

A fourth program according to an embodiment of the present invention is the same as the fourth information processing method. Accordingly, the description will be omitted.

A fifth information processing apparatus according to an embodiment of the present invention includes: selection means (a selection location acquisition section 211 in FIG. 9, for example) for selecting an item associated with content in accordance with a user's operation, the item being displayed on the display; acquisition means (a related link generation section 231 in FIG. 9, for example) for acquiring related content having a certain relationship to the content associated with the item selected by the selection means; first display control means (a related link display control section 215 in FIG. 9, for example) for displaying the item selected by the selection means on a center of a circle or polygon, and a related item associated with the related content acquired by the acquisition means on a part or all of circumference of the circle or polygon; extraction means (a grid map generation section 232 in FIG. 9, for example) for extracting content whose at least one of metadata has a value within a predetermined range; second display control means (a map display control section 216 in FIG. 9, for example) for displaying an item associated with the content extracted by the extraction means on a predetermined position of the display based on an axis of the one of the metadata; and display switching means (an information generation control section 214 in FIG. 9, for example) for switching what is to be displayed between a screen displayed by the first display control means and a screen displayed by the second display control means, wherein when the display switching means switches what is to be displayed from one screen to another screen, the first or second display control means displays an image showing transition from the one screen to the another screen.

The fifth information processing apparatus further includes detection means (an input module 153 in FIG. 5, for example) for detecting a contact of a user with a touch panel (a touch panel 132 in FIG. 4, for example) on the display, wherein the selection means selects, in accordance with the contact of the user detected by the detection means, the item associated with the content, the item being displayed on the display.

A fifth information processing method according to an embodiment of the present invention includes: a selection step (step S196 in FIG. 36, for example) of selecting an item associated with content in accordance with a user's operation, the item being displayed on the display; an acquisition step (step S192 in FIG. 36, for example) of acquiring related content having a certain relationship to the content associated with the item selected by the process of the selection step; a first display control step (step S194 in FIG. 36, for example) of displaying the item selected by the process of the selection step on a center of a circle or polygon, and a related item associated with the related content acquired by the process of the acquisition step on a part or all of circumference of the circle or polygon; an extraction step (step S77 in FIG. 31, for example) of extracting content whose at least one of metadata has a value within a predetermined range; a second display control step (step S78 in FIG. 31, for example) of displaying an item associated with the content extracted by the process of the extraction step on a predetermined position of the display based on an axis of the one of the metadata; and a display switching step (step S52 or S56 in FIG. 30, for example) of switching what is to be displayed between a screen displayed by the process of the first display control step and a screen displayed by the process of the second display control step, wherein when the process of the display switching step switches what is to be displayed from one screen to another screen, the process of the first or second display control step displays an image showing transition from the one screen to the another screen.

A fifth program according to an embodiment of the present invention is the same as the fifth information processing method. Accordingly, the description will be omitted.

A sixth information processing apparatus according to an embodiment of the present invention includes: extraction means (a grid map generation section 232 in FIG. 9, for example) for extracting content whose at least one of metadata has a value within a predetermined range; first display control means (a map display control section 216 in FIG. 9, for example) for displaying an item associated with the content extracted by the extraction means on a predetermined position of the display based on an axis of the one of the metadata; selection means (a selection location acquisition section 211 in FIG. 9, for example) for selecting the item displayed on the display in accordance with a user's operation; playback means (a content playback module 154 in FIG. 5, for example) for playing back content associated with the item selected by the selection means; second display control means (a list display control section 217 in FIG. 9, for example) displaying content associated with the item selected by the selection means in list format; and display switching means (an information generation control section 214 in FIG. 9, for example) for switching what is to be displayed between a first screen displayed by the first display control means and a second screen displayed by the second display control means, wherein when the display switching means switches what is to be displayed from the first screen to the second screen, the first display control means displays an image showing transition from the first screen to the second screen.

The sixth information processing apparatus further includes detection means (an input module 153 in FIG. 5, for example) for detecting a contact of a user with a touch panel (a touch panel 132 in FIG. 4, for example) on the display, wherein the selection means selects, in accordance with the contact of the user detected by the detection means, the item associated with the content, the item being displayed on the display.

A sixth information processing method according to an embodiment of the present invention includes: an extraction step (step S77 in FIG. 31, for example) of extracting content whose at least one of metadata has a value within a predetermined range; a first display control step (step S78 in FIG. 31, for example) of displaying an item associated with the content extracted by the process of the extraction step on a predetermined position of the display based on an axis of the one of the metadata; a selection step (step S106 in FIG. 32, for example) of selecting the item displayed on the display in accordance with a user's operation; a playback step (step S108 in FIG. 32, for example) of playing back content associated with the item selected by the process of the selection step; a second display control step (step S125 in FIG. 33, for example) of displaying content associated with the item selected by the process of the selection step in list format; and a display switching step (step S53 in FIG. 30, for example) of switching what is to be displayed between a first screen displayed by the process of the first display control step and a second-screen displayed by the process of the second display control step, wherein when the process of the display switching step switches what is to be displayed from the first screen to the second screen, the process of the first display control step displays an image showing transition from the first screen to the second screen.

A sixth program according to an embodiment of the present invention is the same as the sixth information processing method. Accordingly, the description will be omitted.

A seventh information processing apparatus according to an embodiment of the present invention includes: display control means (a related link display control section 215 in FIG. 9, for example) for displaying, on the display, an item associated with predetermined content; selection means (a selection location acquisition section 211 in FIG. 9, for example) for selecting the item displayed by the display control means in accordance with a user's operation; content extraction means (a PD target content extraction section 914 in FIG. 53, for example) for extracting, based on metadata of the content, content having the same attribute as the content associated with the item selected by the selection means; and list generation means (a related list generation control section 913 in FIG. 53, for example) for generating, by using the content extracted by the content extraction means, a related content list where related content having a certain relationship to the content associated with the item selected by the selection means are listed, wherein the display control means displays the item selected by the selection means on a center of a circle or polygon, and related items associated with the related content on a part or all of a circumference of the circle or polygon in order of the related content list generated by the list generation means.

A seventh information processing method according to an embodiment of the present invention includes: a display control step (step S194 in FIG. 36, for example) of displaying, on the display, an item associated with predetermined content; a selection step (step S196 in FIG. 36, for example) of selecting the item displayed by the process of the display control step in accordance with a user's operation; a content extraction step (step S314 in FIG. 54, for example) of extracting, based on metadata of the content, content having the same attribute as the content associated with the item selected by the process of the selection step; and a list generation step (step S315 in FIG. 54, for example) of generating, by using the content extracted by the process of the content extraction step, a related content list where related content having a certain relationship to the content associated with the item selected by the process of the selection step are listed, wherein the process of the display control step displays the item selected by the selection step on a center of a circle or polygon, and related items associated with the related content on a part or all of a circumference of the circle or polygon in order of the related content list generated by the process of the list generation step.

A seventh program according to an embodiment of the present invention is the same as the seventh information processing method. Accordingly, the description will be omitted.

An eighth information processing apparatus according to an embodiment of the present invention includes: display control means (a related link display control section 215 in FIG. 9, for example) for displaying, on the display, an item associated with predetermined content; selection means (a selection location acquisition section 211 in FIG. 9, for example) for selecting the item displayed by the display control means in accordance with a user's operation; content extraction means (a PD target content extraction section 933 in FIG. 57, for example) for extracting, based on analytical data generated by analyzing the content, content having an analytical data value whose degree of similarity to an analytical data value of the content associated with the item selected by the selection means is greater than a predetermined value; and list generation means (a related list generation control section 932 in FIG. 57, for example) for generating, by using the content extracted by the content extraction means, a related content list where related content having a certain relationship to the content associated with the item selected by the selection means are listed, wherein the display control means displays the item selected by the selection means on a center of a circle or polygon, and related items associated with the related content on a part or all of a circumference of the circle or polygon in order of the related content list generated by the list generation means.

An eighth information processing method according to an embodiment of the present invention includes: a display control step (step S194 in FIG. 36, for example) of displaying, on the display, an item associated with predetermined content; a selection step (step S196 in FIG. 36, for example) of selecting the item displayed by the process of the display control step in accordance with a user's operation; a content extraction step (step S334 in FIG. 56, for example) of extracting, based on analytical data generated by analyzing the content, content having an analytical data value whose degree of similarity to an analytical data value of the content associated with the item selected by the process of the selection step is greater than a predetermined value; and a list generation step (step S335 in FIG. 56, for example) of generating, by using the content extracted by the process of the content extraction step, a related content list where related content having a certain relationship to the content associated with the item selected by the process of the selection step are listed, wherein the process of the display control step displays the item selected by the process of the selection step on a center of a circle or polygon, and related items associated with the related content on a part or all of a circumference of the circle or polygon in order of the related content list generated by the process of the list generation step.

An eighth program according to an embodiment of the present invention is the same as the eighth information processing method. Accordingly, the description will be omitted.

An embodiment of the present invention will be described in detail with reference to the accompanying drawings.

FIG. 1 illustrates an example of the configuration of a content provision system according to an embodiment of the present invention.

A Personal Computer (PC) 1 is connected to a network 2 which is equivalent to the Internet and the like. In this example, there is only one PC1. However, some PCs may be connected to the network 2.

In addition, a content server 3 is connected to the network 2. The content server 3 provides content, such as moving images and music, to the PC 1. Some content servers 3 may be connected to the network 2. By the way, in an example shown in FIG. 1, music is provided as content.

The content server 3 includes a content file database (DB) 4 storing content files. The content file includes content data such as music, and corresponding metadata (also referred to as content metadata). For example, the metadata includes names of albums in which content data are stored; names of artists who play or provide content data; tunes of content data; rhythm; and a ranking number (parameter) of content in the market.

When the PC1 accesses the content server 3, the content server 3 authenticates a user who has been registered to provide hem/her with content files. The content server 3 then provides the PC1, whose user has been authenticated, with various content files, which has been stored in the content file DB 4, through the network 2. That is to say, in an example shown in FIG. 1, the content server 3 does not provide content files requested by the user but various content files recommended by content provide side.

The PC 1 accesses, by using client software such as Web browsers, the content server 3, and receives content files from the content server 3 to records the content files. In addition, the PC 1 reads out content data from Compact Disc (CD), and encodes the content data in a predetermined format ("ATRAC3Plus (Registered Trademark)", for example), and then records the content data along with the corresponding metadata as a content file.

In addition, for example, Portable Device (PD) 5, which is equivalent to a portable recording and playback device, is connected to the PC1 through Universal Serial Bus (USB) cable. The PC 1 supplies the recorded content files to the PD5 connected.

The PD 5 records various content files which were acquired from the content server 3 or CDs through the PC 1. In addition, after removable media 122 (FIG. 4) storing various content files are connected to the PD 5, the PD5 plays back the content data based on the corresponding metadata stored in the removable media 122.

By the way, an example shown in FIG. 1 describes the PD 5 acquiring content files from the content server 3 through the PC1. Alternatively, the PD 5 may directly acquire content files from the content server 3 through the network 2 or wireless communication.

Figure 4:
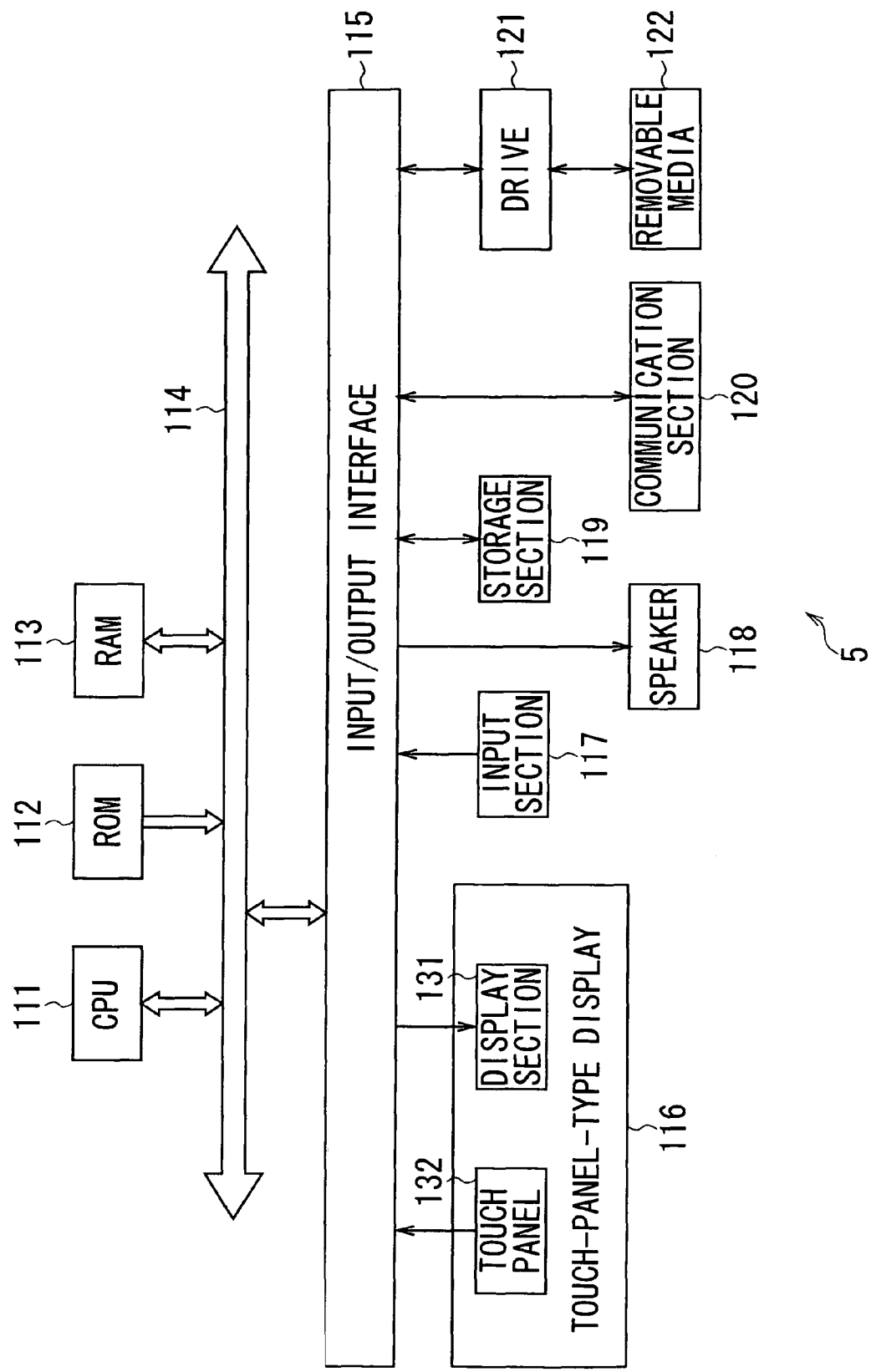
FIG. 4 is a block diagram showing an example of the configuration of Portable Device (PD) illustrated by FIG. 1.

The PD 5 includes a display section 131 on which a touch panel is disposed, as shown in FIG. 4. The display section 131 displays a content selection screen where a user selects content out of content files stored in the PD 5 to play back the content. The user uses his/her touch pen or finger to operate the touch panel 132 which is on the content selection screen displayed on the display section 131. Therefore, the user can intuitively and easily select and play back content in line with his intention or feeling.

As mentioned above, in the content provision system shown in FIG. 1, the content server 3 provides various contents (everything users like and dislike) to the PD 5 through the PC1. A user operates the PD 5 based on the content selection screen displayed on the PD 5, and this allows the user to select and play-back content in line with his/her intention out of various contents which were provided to the PD 5. On the other hand, content provider sides can provide content to many users and enhance the sales of content.

Figure 2:
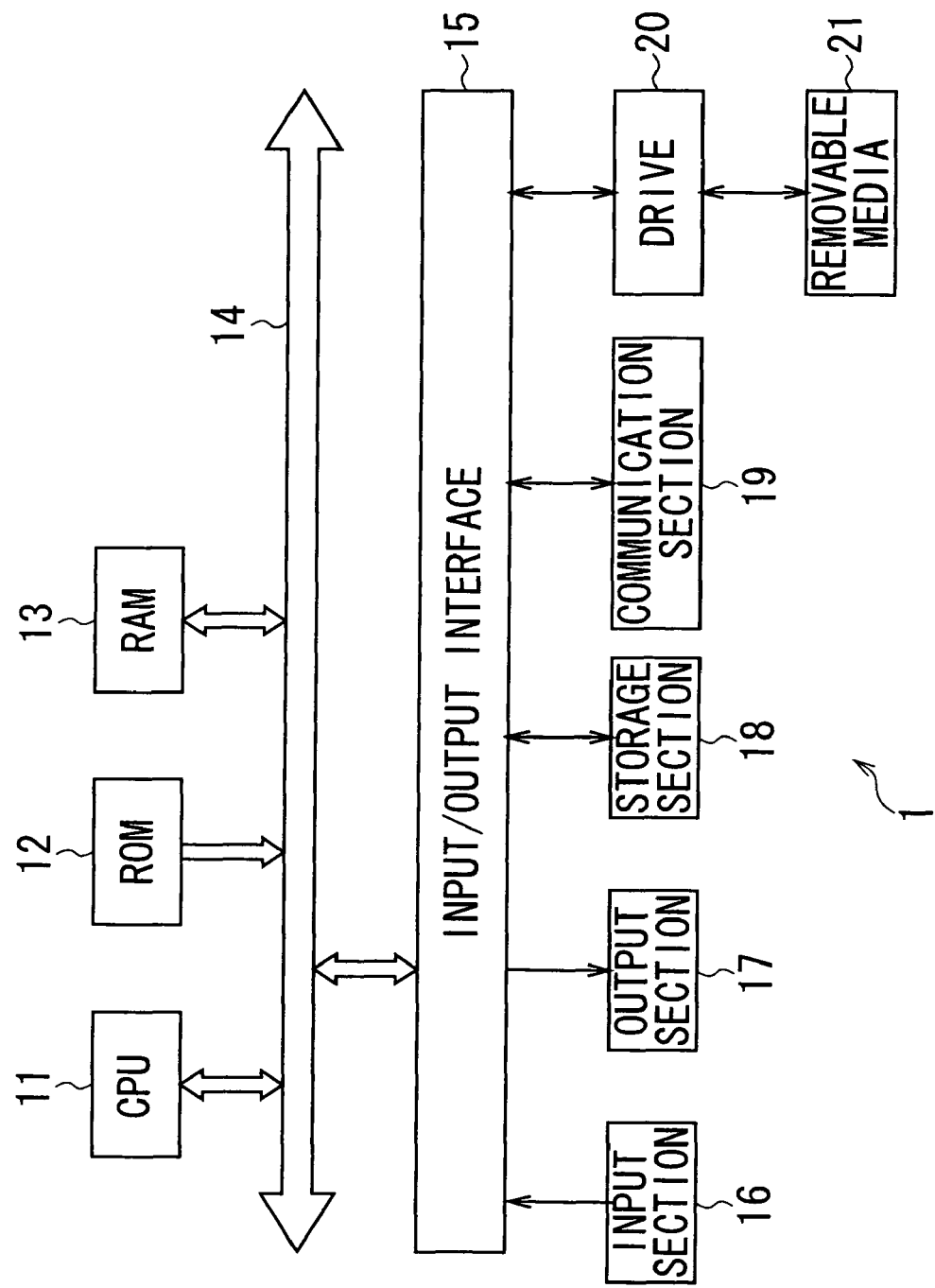
FIG. 2 is a block diagram showing an example of the configuration of Personal Computer (PC) illustrated by FIG. 1.

FIG. 2 illustrates the hardware configuration of the PC 1.

A Central Processing Unit (CPU) 11 performs various processes based on programs stored in a Read Only Memory (ROM) 12 or based on programs loaded onto a Random Access Memory (RAM) 13 from a storage section 18. The RAM 13 is also capable of storing data that the CPU 11 uses to perform various processes.

The CPU 11, the ROM 12 and the RAM 13 are connected with one another through a bus 14. An input/output interface 15 is also connected to the bus 14.

The input/output interface 15 connects with an input section 16 including keyboards and mouse; an output section 17 including a display such as Cathode Ray Tube (CRT) and Liquid Crystal Display (LCD), and speakers; a storage section 18 which is for example equivalent to a hard disk; and a communication section 19 including modems, terminal adopters, and USB interfaces. The communication section 19 communicates through the network 2 or a USB cable.

In addition, the input/output interface 15 is connected to a drive 20 when needed. Removable media 21 such as a magnetic disc, an optical disc, a magneto optical disc and a semiconductor memory are placed into the drive 20. Computer programs are read out from the removable media 21, and then installed on the storage section 18 when needed.

The configuration of the content server 3 is not shown in any figures, but basically the content server 3 has the same configuration as the PC 1 shown in FIG. 2. Accordingly, the configuration shown in FIG. 2 will be also referred to as that of the content server 3.

Because the CPU 11 executes various programs, the computer shown in FIG. 2 works as the PC 1 (FIG. 1) or the content server 3. In this case, the programs may be previously stored in the ROM 12 or the storage section 18, which are equivalent to a storage medium inside the computer shown in FIG. 2. Alternatively, the programs may be temporarily or permanently stored in the removable media 21 such as a magnetic disk, an optical disk, a magneto optical disc and a semiconductor memory to be provided as package software.

In this manner, the programs can be installed from the above removable media 21 on the computer shown in FIG. 2. Besides that, the programs may be wirelessly supplied to the computer shown in FIG. 2 from a download site through artificial satellites used for digital satellite broadcasting. The programs may be supplied to the computer shown in FIG. 2 through a Local Area Network (LAN) or the network 2.

Figure 3:
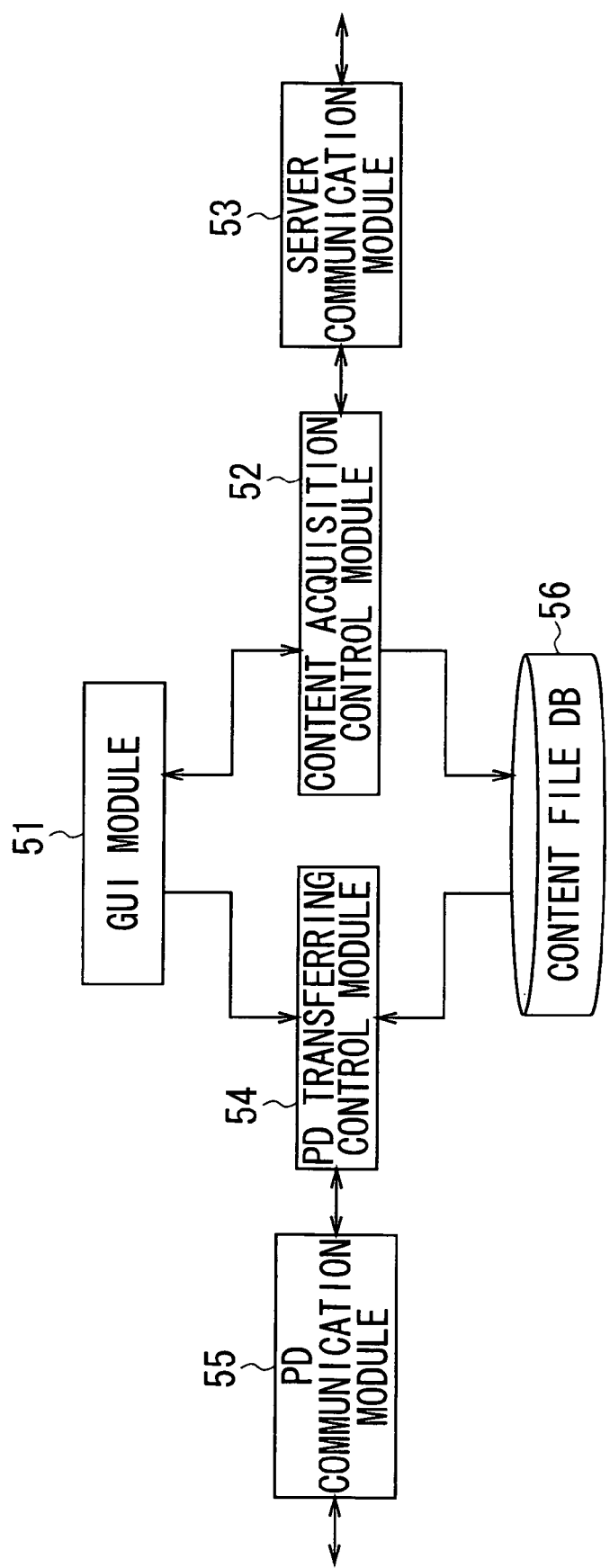
FIG. 3 is a block diagram showing an example of the functional configuration of the PC illustrated by FIG. 1.

FIG. 3 is a block diagram illustrating an example of the functional configuration of the PC 1. Executing predetermined programs by the CPU 11 of the PC 1 provides the functional blocks shown in FIG. 3.

A Graphical User Interface (GUI) module 51 input user's operation through the input section 16. The GUI module 51 supplies an operation signal corresponding to the operation to a content acquisition control module 52 or a PD transferring control module 54. In addition, the GUI module 51 displays images (which correspond to screen data supplied from the content server 3 through the content acquisition control module 52) on a monitor which is a part of the output section 17.

The content acquisition control module 52 controls a server communication module 53 in response to an operational signal from the GUI module 51. The content acquisition control module 52 allows the server communication module 53 to access the content server 3. The content acquisition control module 52 supplies image data supplied from the content server 3 to the GUI module 51, and also stores content files acquired from the content server 3 in a content file database (DB) 56.

The server communication module 53 accesses the content server 3 through the communication section 19 and the network 2. The server communication module 53 supplies image data or content files supplied from the content server 3 to the content acquisition control module 52.

A Portable Device (PD) transferring control module 54 controls, in response to an operation signal from the GUI module 51, a PD communication module 55 to transmit content files stored in the content file DB 56 to the PD 5.

The PD communication module 55 under the control of the PD transferring control module 54 transmits the content files stored in the content file DB 56 to the PD 5 through the communication section 19 and a USB cable (not shown).

The content file DB 56 stores a content file including the content data and corresponding metadata acquired from the content server 3.

FIG. 4 illustrates an example of the hardware configuration of the PD 5. By the way, the configuration of a CPU, input/output interface and other sections (111 to 115) shown in FIG. 4 is the same as those of the PC 1 (11 to 15) shown in FIG. 2. Therefore, those descriptions will be omitted.

An input/output interface 115 is connected with a touch panel type display 116 including a touch panel 132 disposed on a display section 131 (such as LCD); an input section 117 including buttons disposed on a housing of the PD 5; a storage section 119 including a hard disk and a memory; and a communication section 120, which includes a network interface, a wireless communication interface, and a USB interface, and communicates through the network 2, wireless communication or a USB cable.

The input/output interface 115 is connected to a drive 121 when needed. Removable media 122 such as a magnetic disc, an optical disc, a magneto optical disc and a semiconductor memory are placed into the drive 121. Computer programs are read out from the removable media 122, and then installed on the storage section 119 when needed.

Because the CPU 111 executes various programs, the PD 5 (FIG. 1) provides predetermined capabilities. In this case, the programs may be previously stored in the ROM 112 or the storage section 119, which are equivalent to an internal storage medium. Alternatively, the programs may be temporarily or permanently stored in the removable media 21 such as a magnetic disk, an optical disk, a magneto optical disc and a semiconductor memory to be provided as package software.

In this manner, the programs can be installed from the above removable media 121 on the PD 5. Besides that, the programs may be wirelessly supplied to the PD 5 from a download site through artificial satellites used for digital satellite broadcasting. The programs may be supplied to the PD 5 through a LAN or the network 2.

Figure 5:
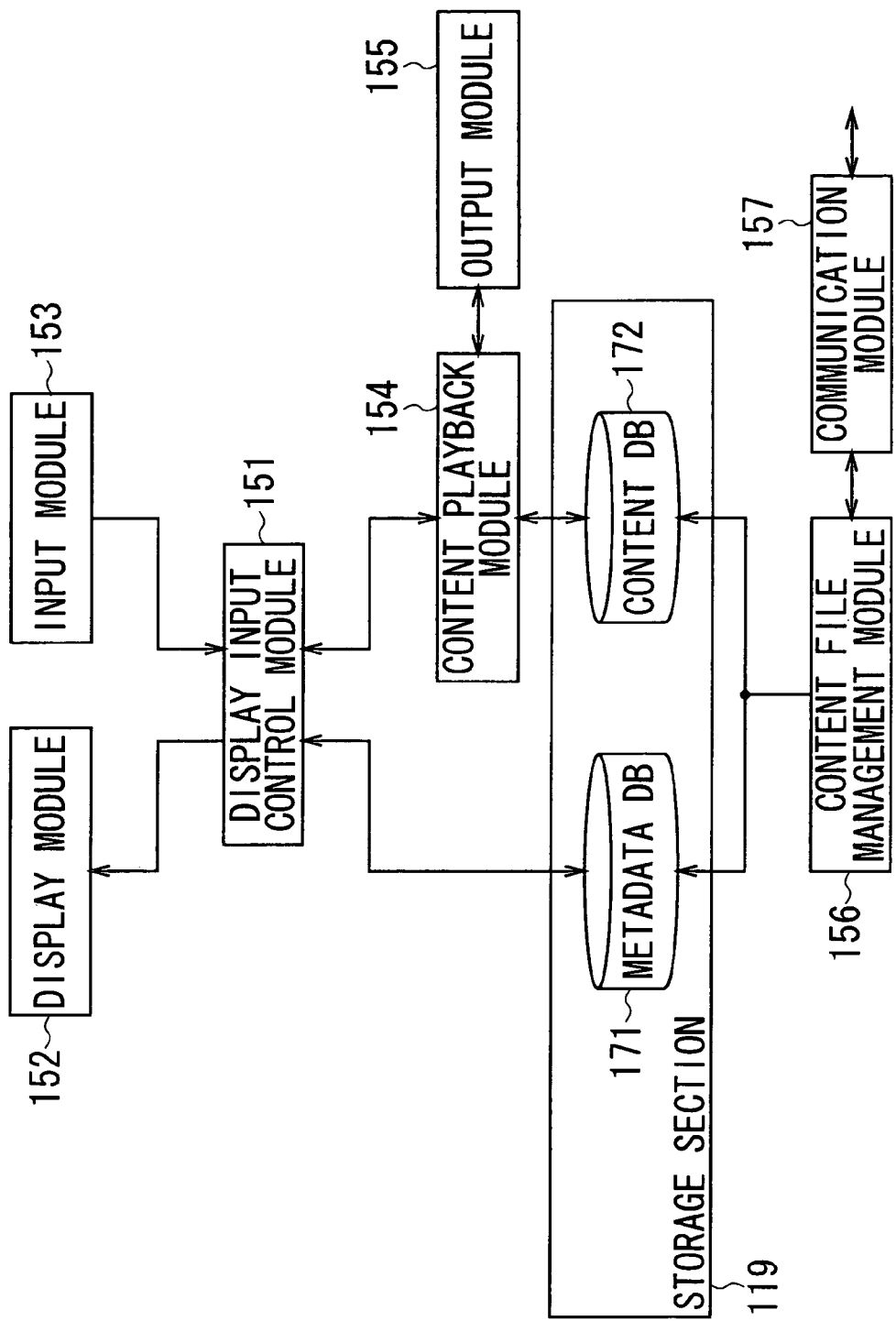
FIG. 5 is a block diagram showing an example of the functional configuration of the PD illustrated by FIG. 1.

FIG. 5 is a block diagram illustrating an example of the functional configuration of the PD 5. Executing predetermined programs by the CPU 111 of the PD 5 provides the functional blocks shown in FIG. 5. By the way, in an example shown in FIG. 5, the storage section 119 includes a metadata database (DB) 171 and a content database (DB) 172.

A display input control module 151 generates, in response to a user's operation supplied from an input module 153 and based on metadata stored in the metadata database 171, a content selection screen data to allow a user to select content from those stored in the content database 172. The display input control module 151 then controls a display module 152 to display a content selection screen based on the generated data on the display section 131. In addition, the display input control module 151 controls a content playback module 154 to play back content data based on a user's operation of the content selection screen supplied from the input module 153.

The display module 152 displays the content selection screen on the display section 131 based on the data supplied from the display input control module 151. In response to a user's operation of operating the touch panel 132 on the display section 131, the input module 153 supplies an operation signal to the display input control module 151.

The content playback module 154 under the control of the display input control module 151 plays back content data stored in the content DB 172. The content playback module 154 then controls an output module 155 to output audio corresponding to the content data. In addition, the content playback module 154 notifies the display input control module 151 of completion of playback of the content data.

If the content DB 172 does not have content data specified by the display input control module 151, the content playback module 154 may control a communication module 157 to acquire content files from the content server 3.

The output module 155 outputs audio, which corresponds to content data played by the content playback module 154, through the speaker 118. If the content data is image data, the output module 155 displays an image corresponding to the content data on the display section 131.

A content file management module 156 divides the content file supplied from the communication module 157 into content data and metadata. The content file management module 156 then stores the content data and the metadata in the content DB 172 and the metadata DB 171, respectively. In addition, the content file management module 156 controls the communication module 157 to read out the content data from the content DB 172 and the corresponding metadata from the metadata DB 171, and then transmit them to the PC 1 as a content file.

The communication module 157 interchanges content files with the PC1 through the communication section 120 and a USB cable (not shown). The communication module 157 acquires content files directly from the content server 3 through the communication section 120 and the network 2, or wireless communication.

The metadata DB 171 stores metadata corresponding to content data stored in the content DB 172. The content DB 172 stores content data such as music.

By the way, in an example of FIG. 5, the storage section 119 includes the metadata DB 171 and the content DB 172. Alternatively, the removable media 122 may include the metadata DB 171 and the content DB 172.

Figure 6:
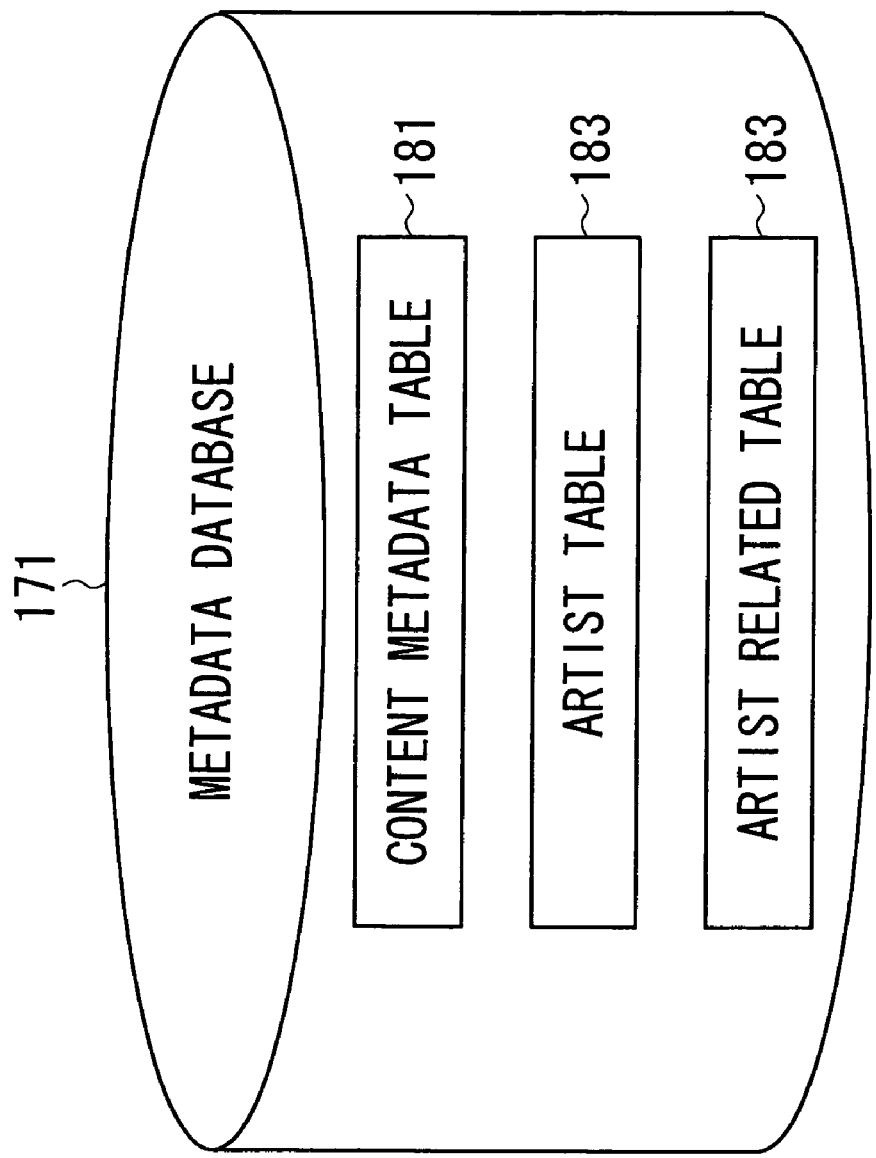
FIG. 6 is a diagram showing an example of the configuration of a metadata database illustrated by FIG. 5.

FIG. 6 illustrates an example of the configuration of the metadata DB shown in FIG. 5.

In an example shown in FIG. 6, the metadata DB 171 includes a content metadata table 181, an artist table 182, and an artist related table 183.

The content metadata table 181 includes information associated with content: a content name of content (music) stored in the content DB 172; an identification of content; a speed; a tune; a rhythm; a genre; a date (year, month and day) when content was released; an album name, ranking information, an identification of corresponding artists. The ranking information for example means the ranking of sales of content, the ranking indicating how many users of the content server 3 have listened to (or looked at) content, or the like.

In addition, if the content is video content, the content metadata table 181 may include a name of program, a title of film, and a data (released year).

Furthermore, when content is acquired from the content server 3 to be recorded on the PD 5, a date when the content data is transferred (i.e. history of transferring) may be recorded on the content metadata table 181 as content metadata. At this time, a rating value that indicates evaluation of content by a user may be recorded on the content metadata table 181 as content metadata (the evaluation is done by a user through the touch panel 132 or the input section 117). The evaluation may be done before or after viewing (or listening to) the content.

The artist table 182 includes information associated with the artist, such as a name of the artist (who plays or provides the content) corresponding to the content, and an identification of the artist. In addition, the artist table 182 includes names of composer, conductor, producer, director and the like.

The artist related table 183 shows the association between artists by using the identification of each artist. For example, the artist related table 183 indicates a fact that an artist A is currently part of an artist B (group); a fact that the artist A was part of the artist B (group); a fact that the artist A has got features of an artist C; and a fact that the artist A provides the artist D with his/her song.

FIG. 7 shows an example of the configuration of the content metadata table, artist table and artist related table shown in FIG. 6.

In an example of FIG. 7, the content metadata table 181 includes 'Content Identification (ID)', which indicates an identification of content; 'Tempo', which indicates a speed (Bpm) of content; 'Major', which indicates whether the content's tune is major or minor key; 'Rhythm Ratio', which indicates whether the content's rhythm is percussive or quiet; 'HiMid', which indicates whether the content's sound is in the high (Hi) or low (Low) frequency range; 'Genre', which indicates types of contents; 'Date', which indicates a time when the content was released; 'Ranking', which indicates audience appreciation ranking; and 'Artist ID', which indicates an identification of an artist corresponding to the content.

For example, the content metadata table 181 shows information of content A: "ID of content A" as Content ID, '115' as Tempo, '−13' as Major, '40' as Rhythm Ratio, '25' as HiMid, 'Rock' as Genre, '1983' as Date, '130' as Ranking, 'ID of artist A' as Artist ID. In addition, the content metadata table 181 shows information of content B: "ID of content B" as Content ID, '150' as Tempo, '32' as Major, '42' as Rhythm Ratio, '62' as HiMid, 'Pops' as Genre, '1999' as Date, '5' as Ranking, 'ID of artist A' as Artist ID. Furthermore, the content metadata table 181 shows information of content C: "ID of content C" as Content ID, '131' as Tempo, '36' as Major, '5' as Rhythm Ratio, '−11' as HiMid, 'Rock' as Genre, '2002' as Date, '20' as Ranking, 'ID of artist A' as Artist ID.

Furthermore, the content metadata table 181 shows information of content D: "ID of content D" as Content ID, '84' as Tempo, '25' as Major, '9' as Rhythm Ratio, '31' as HiMid, 'Rock' as Genre, '1983' as Date, '53' as Ranking, 'ID of artist B' as Artist ID. Furthermore, the content metadata table 181 shows information of content E: "ID of content E" as Content ID, '161' as Tempo, '36' as Major, '4' as Rhythm Ratio, '6' as HiMid, 'Pops' as Genre, '1994' as Date, '256' as Ranking, 'ID of artist B' as Artist ID.

Furthermore, the content metadata table 181 shows information of content F: "ID of content F" as Content ID, '178' as Tempo, '51' as Major, '16' as Rhythm Ratio, '11' as HiMid, 'Jazz' as Genre, '1935' as Date, '5' as Ranking, 'ID of artist C' as Artist ID. Furthermore, the content metadata table 181 shows information of content G: "ID of content G" as Content ID, '184' as Tempo, '32' as Major, '13' as Rhythm Ratio, '46' as HiMid, 'Pops' as Genre, '2004' as Date, '122' as Ranking, 'ID of artist C' as Artist ID.

The artist table 182 includes 'Artist ID', which indicates an identification of artist, and 'Artist Name'.

For example, the artist table 182 indicates a fact that a name of an artist whose Artist ID is 'ID of artist A' is 'Artist A'; a fact that a name of an artist whose Artist ID is 'ID of artist B' is 'Artist B'; a fact that a name of an artist whose Artist ID is 'ID of artist C' is 'Artist C'; a fact that a name of an artist whose Artist ID is 'ID of artist D' is 'Artist D'; and a fact that a name of an artist whose Artist ID is 'ID of artist E' is 'Artist E'.

The artist related table 183 includes 'Artist ID', and 'Related Artist ID' which indicates an identification of an artist related to an artist of this Artist ID.

For example, the artist related table 183 indicates a fact that Related Artist ID of an artist whose Artist ID is 'ID of artist A' is 'ID of artist B'; and a fact that Related Artist ID of an artist whose Artist ID is 'ID of artist B' is 'ID of artist C' and 'ID of artist D'.

In addition, the artist related table 183 indicates a fact that Related Artist ID of an artist whose Artist ID is 'ID of artist C' is 'ID of artist G'; a fact that Related Artist ID of an artist whose Artist ID is 'ID of artist D' is 'ID of artist A'; and a fact that Related Artist ID of an artist whose Artist ID is 'ID of artist E' is 'ID of artist C'.

By the way, the degree of association may be added to each artist.

Figure 8:
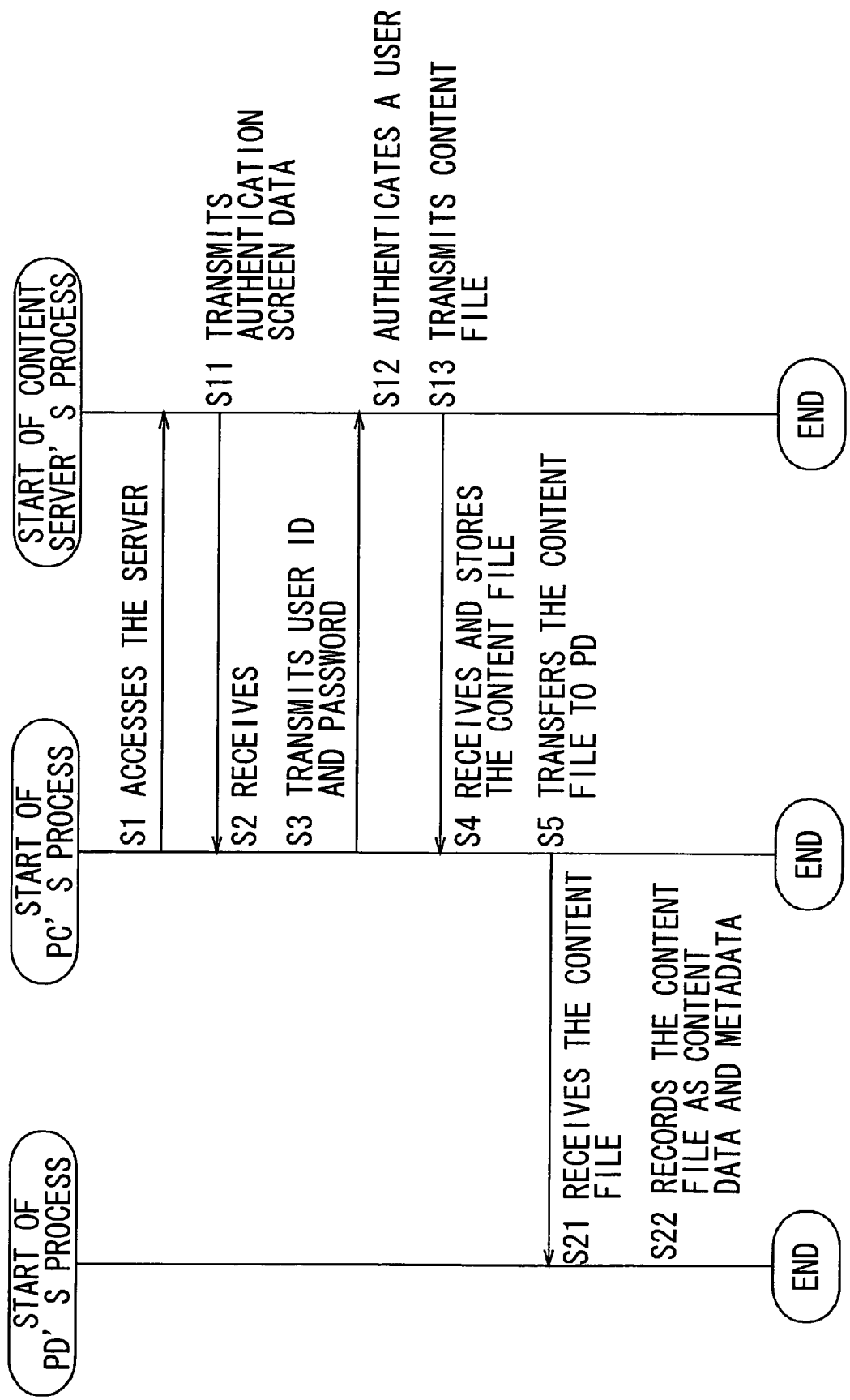
FIG. 8 is an arrow diagram showing an example of the process of the content provision system illustrated by FIG. 1.

With reference to FIG. 8, a process of the content provision system (FIG. 1) will be described. In this process, for example, the PC 1 acquires a content file from the content server, and then records the content file on the PD 5.

For example, a user of the PD 5 connects his/her PD 5 to the PC 1 through a USB cable (not shown), and then orders the PC 1 to access the content server 3 by controlling a mouse or other sections of the input section 16 of the PC 1.

The GUI module 51 of the PC 1 inputs the user's operation through the input section 16, and supplies an operation signal corresponding to the operation to the content acquisition control module 52. The content acquisition control module 52 at step S1 controls, in response to the operation signal from the GUI module 51, the server communication module 53 so that the server communication module 53 accesses the content server 3. The server communication module 53 accesses the content server 3 through the communication section 19 and the network 2.

When the communication section 19 of the content server 3 is accessed by the PC1, the communication section 19 at step S11 transmits, under the control of the CPU 11, an authentication screen data through the network 2 to request a registered user Identification (ID) and password to allow a user to utilize the content provision system.

The server communication module 53 of the PC 1 at step S2 receives the authentication screen data from the content server 3 through the communication section 19 and the network 2, and then supplies the received authentication screen data to the GUI module 51 through the content acquisition control module 52. The GUI module 51 displays on the display section 17 an authentication screen corresponding to the authentication screen data supplied from the content acquisition control module 52. The user controls a mouse or other sections of the input section 16 to input his/her user ID and password through the authentication screen on the display section 17.

The GUI module 51 inputs the user's operation through the input section 16, and then supplies the user ID and the password to the content acquisition control module 52. The content acquisition control module 52 at step S3 controls the server communication module 53 to transmit the user ID and the password, which were supplied from the GUI module 51, to the content server 3. The server communication module 53 transmits the user ID and the password to the content server 3 through the communication section 19 and the network 2.

The communication section 19 of the content server 3 receives the user ID and the password from the PC 1, and then supplies the user ID and the password to the CPU 11. The CPU 11 at step S12 authenticates, based on the user ID and password received by the communication section 19, the user of the PC 1, and then proceeds to step S13. At step S13, the CPU 11 controls the communication section 19 to transmit various content files, which have been stored in the content file DB 4, through the network 2.

The server communication module 53 of the PC 1 at step S4 receives a content file from the content server 3 through the communication section 19 and the network 2, and supplies the received content file to the content acquisition control module 52 which then records the content file on the content file DB 56.

After the content file is recorded on the content file DB 56, the user controls the mouse or other sections of the input section 16 of the PC 1 to order the PC 1 to transfer the recorded content file to the connected PD 5.

The GUI module 51 of the PC 1 inputs the user's operation through the input section 16, and supplies an operation signal corresponding to the operation to the PD transferring control module 54. The PD transferring control module 54 at step S5 reads out, in response to the operation signal from the GUI module 51, a content file from the content file DB 56, and then controls the PD communication module 55 to transfer the content file to the PD 5. The PD communication module 55 transfers the content file to the PD 5 through the communication section 19 and the USB cable.

The communication module 157 of the PD 5 at step SP21 receives the content file from the PC 1 through the USB cable and the communication section 120, and supplies the received content file to the content file management module 156, and then proceeds to step S22.

The content file management module 156 at step S22 acquires content data and metadata from the content file that was supplied from the PC 1 through the communication module 157, and then records the content data and the metadata on the content DB 172 and the metadata DB 171, respectively.

At this time, a history (i.e. history of transferring) that indicates a fact that the content data has been recorded on the content DB 172, and a rating value that indicates evaluation of content may be also recorded on the metadata DB 171.

In this manner, the content file, which was stored in the content file DB 4 of the content server 3, is recorded on the PD 5 as content data and metadata. This allows the user to select content from among the content data stored in the PD 5 and view (or listen to) the content data of the selected content.

By the way, the removable media 122 storing content files may be connected to the PD 5. This allows a user to view (or listen to) those content files.

A capability of displaying a content selection screen (which is used for selecting content from those stored in the PD 5) will be described.

The PD 5 displays a content selection screen in three types of the following format: Map Screen (MAP VIEW); Play List Screen (PLAY LIST VIEW); and Jump Screen (JUMP VIEW).

Map Screen includes a two-dimensional map with two axes of a predetermined content metadata, and play lists, each of which includes at least one piece of content, are disposed on a grid of the map. Map Screen has a plurality of display modes each of which utilizes different axes (i.e. different metadata). A user selects and sets a portion of the grid on Map Screen with his/her finger or touch pen to play back content in the play list associated with the portion of the grid.

Play List Screen displays a list of content included in a play list. Play List Screen has a plurality of display modes, such as displaying a play list selected through other screens, a play list showing the past playback history, or a play list registered by a user. A user selects a content name on a play list displayed on Play List Screen with his/her finger or touch pen to play back corresponding content data.

Jump Screen displays a link chart where an artist selected by a user is associated with relevant artists. The user selects an icon on the link chart displayed on Jump Screen with his/her finger or touch pen to check the relevant artists associated with the icon.

In response to a user's operation, the content selection screen displayed can be switched from one type to another type. In this case, the information selected on the previous content selection screen, such as play list information and artist information, will affect a next content selection screen. Map Screen, Play List Screen and Jump Screen will be described in detail later.

Figure 9:
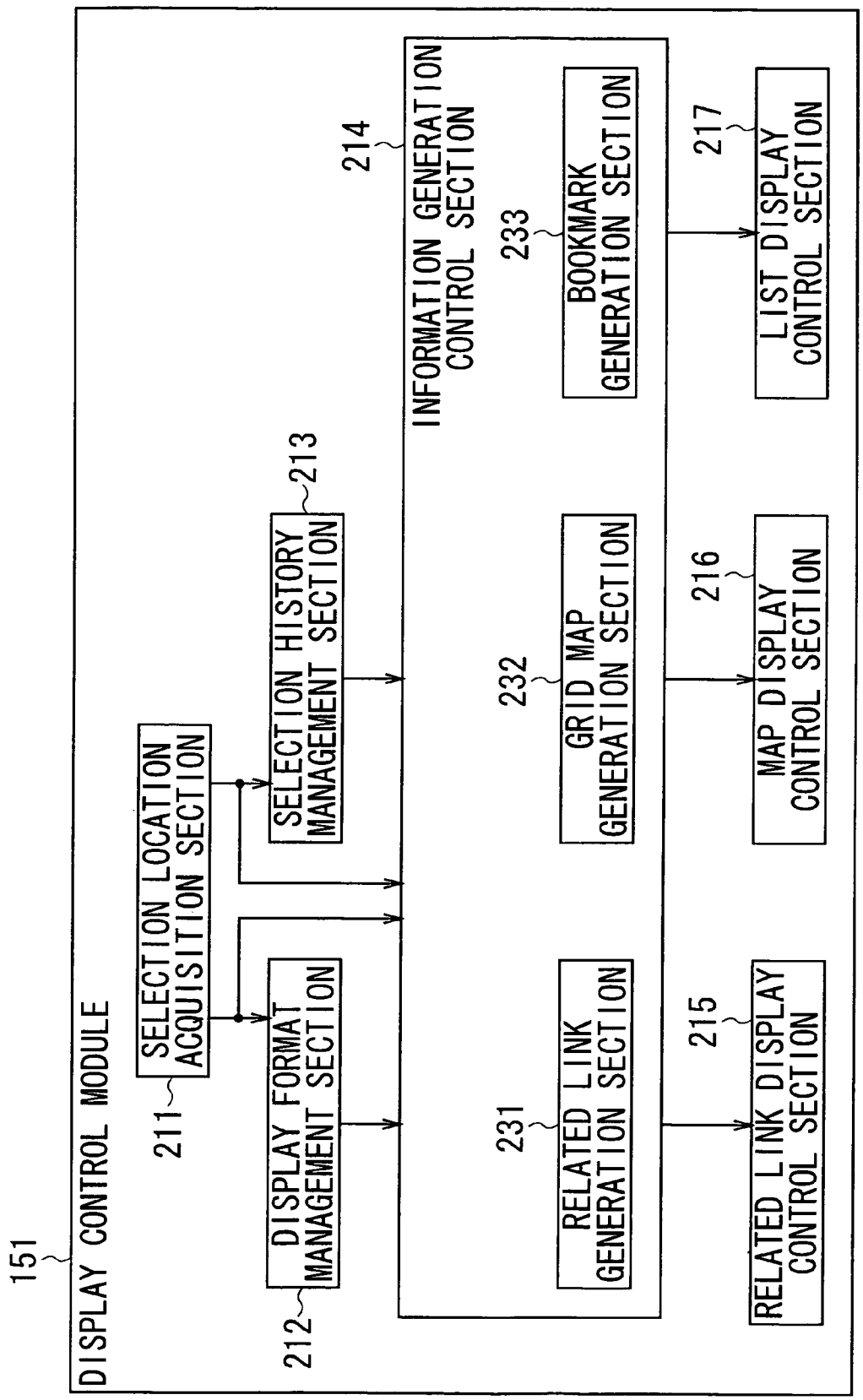
FIG. 9 is a block diagram showing an example of the configuration of a display input control module illustrated by FIG. 5.

FIG. 9 shows an example of the detailed configuration of the display input control module shown in FIG. 5.

The display input control module 151 (FIG. 9) includes a selection location acquisition section 211, a display format management section 212, a selection history management section 213, an information generation control section 214, a related link display control section 215, a map display control section 216, and a list display control section 217.

The selection location acquisition section 211 acquires selection location information from an operation signal indicative of a user's operation supplied from the input module 153. Based on the selection location information acquired, the selection location acquisition section 211 recognizes what the user instructed. Based on the recognition, the selection location acquisition section 211 stores setting (selection) information in the display format management section 212 or the selection history management section 213, and then controls the information generation control section 214 to perform a display control process corresponding to the user's instruction.

That is to say, if the user's instruction is information about display format (display screen and display mode), the selection location acquisition section 211 stores information of display format in the display format management section 212, and then controls the information generation control section 214 to perform a display control process based on the information of display format. If the user's instruction is selection information about the content selection screen, the selection location acquisition section 211 stores the selection information of each content selection screen in the selection history management section 213, and then controls the information generation control section 214 to perform a display control process based on the selection information.

The display format management section 211 under the control of the selection location acquisition section 211 sets a display format of a content selection screen (display screen and display mode), and manages it. That is to say, the display format management section 212 manages a previous display format and a current display format, and provides the information generation control section 214 with information about managed display formats.

The selection history management section 213 manages selection history information about items (icons and grids) displayed on the content selection screens. The selection history management section 213 under the control of the selection location acquisition section 211 updates the selection history information.

For example, the selection history management section 213 stores selection information about selected icons on Jump Screen; a selection move history about a dragged (selected and moved) portion of the grid on Map Screen; and a selection set history (playback history) about a released (selected and set) portion of the grid on Map Screen. By the way, in this case, the playback history of content in a play list is managed by a section producing each play list: a related link generation section 231, a grid map-generation section 232 and a bookmark generation section 233.

Inside the information generation control section 214, there are the related link generation section 231, the grid map generation section 232 and the bookmark generation section 233. The information generation control section 214 controls the related link generation section 231, the grid map generation section 232 and the bookmark generation section 233 to generate information associated with each content selection screen (i.e. play lists, related artist information or grid information).

In addition, the information generation control section 214 under the control of the selection location acquisition section 211 controls a corresponding display control section (the related link display control section 215, the map display control section 216, or the list display control section 217) to generate content selection screen data of each type. Furthermore, the information generation control section 214 controls the related link generation section 231, the grid map generation section 232 or the bookmark generation section 233 to provide the content playback module 154 with information of content in a play list corresponding to the selection location information.

The related link generation section 231 checks the artist related table 183 to generate related artist information which is related to artists. In addition, the related link generation section 231 checks the content metadata table 181 and the artist table 182 to acquire content information corresponding to selected artists and then generates a play list. Furthermore, the related link generation section 231 supplies, based on the selection location information from the information generation control section 214, content listed in a play list corresponding to the selected artist to the content playback module 154 to play back corresponding content data.

The grid map generation section 232 checks, in response to a display mode, the content metadata table 181 and the artist table 182 to generate a play list of content corresponding to a portion of the grid of the map displayed on Map Screen, and then generates, based on the generated play list, grid information. In addition, the grid map generation section 232 supplies, based on the selection location information from the information generation control section 214, content in a play list corresponding to a portion of the grid to the content playback module 154 to play back corresponding content data or content data for viewing.

The bookmark generation section 233 generates a play list of bookmark to which information of content corresponding to a user's operation is added. Based on the selection location information supplied from the information generation control section 214, the bookmark generation section 233 supplies content to the content playback module 154 to play back corresponding content data.

The related link display control section 215 generates jump screen data based on information generated by the related link generation section 231 and artists selected on Jump Screen displayed in the past. The related link display control section 215 then supplies the generated jump screen data to the display module 152. In addition, the related link display control section 215 under the control of the information generation control section 214 generates the following screen data: screen data including animation (moving pictures or frame advance) that fades out Jump Screen; and screen data including animation that shows the transition to Jump Screen of selected artists.

In response to a display mode from the information generation control section 214, the map display control section 216 generates map screen data based on the grid information generated by the grid map generation section 232, the selection move history, the playback history or the like. The map display control section 216 then supplies the generated map screen data to the display module 152. In addition, the map display control section 216 generates screen data including animation that shows the transition from Map Screen to Jump Screen or Play List Screen.

The list display control section 217 checks, in response to a previous display screen, a play list of the related link generation section 231, grid map generation section 232 or bookmark generation section 233 to generate play list screen data, and then supplies the generated play list screen data to the display module 152. In addition, the list display control section 217 under the control of the information generation control section 214 generates screen data including animation that fades out Play List Screen.

Figure 10:
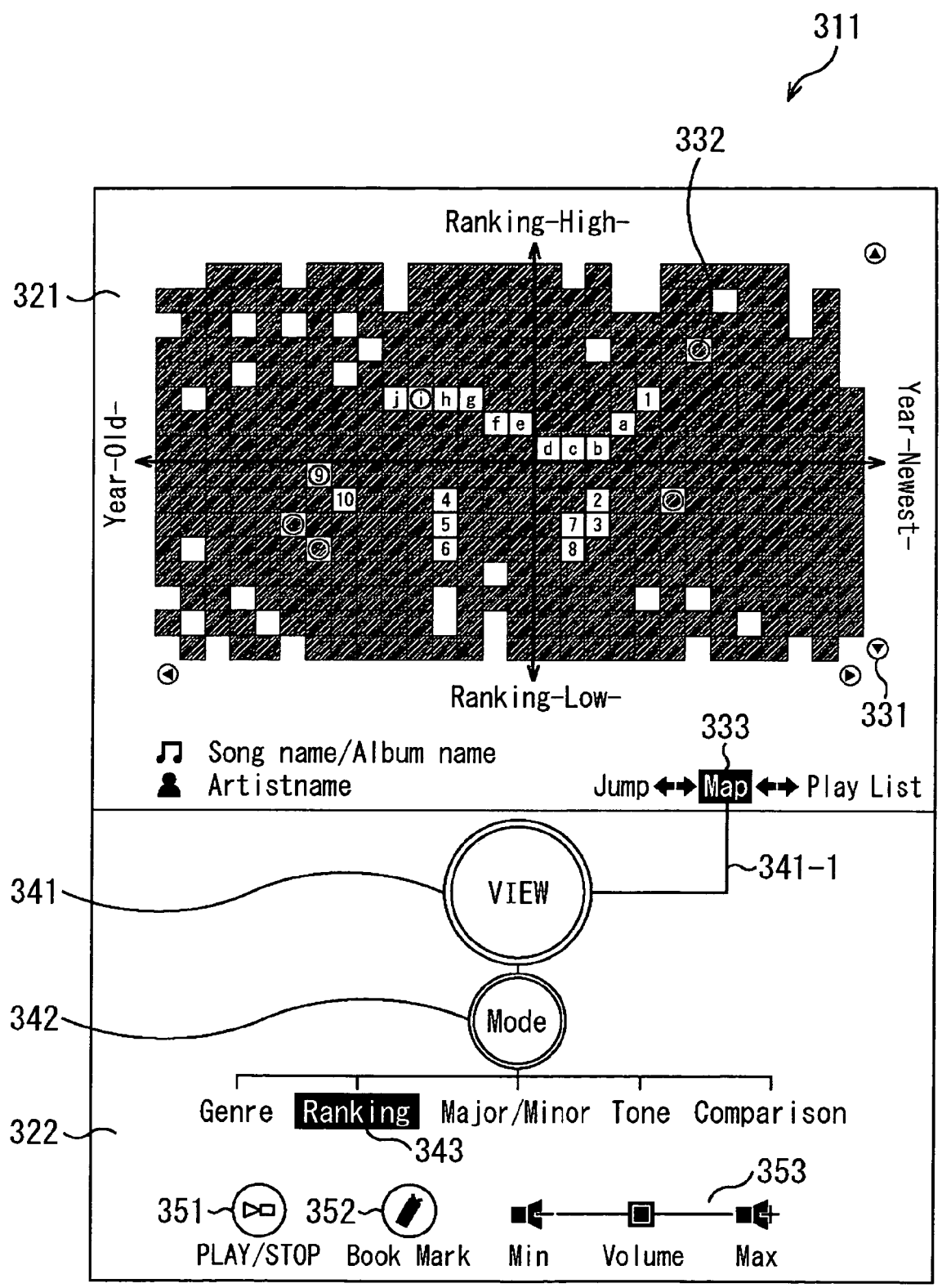
FIG. 10 is a diagram showing an example of the configuration of a map screen (one of content selection screens)

FIG. 10 shows an example of the configuration of Map Screen (equivalent to a content selection screen).

Map Screen 311 includes a map display section 321 and an operation setting display section 322. In an example of FIG. 10, the map display section 321 is the one displayed when a display mode of Map Screen 311 is set in a ranking mode. Besides the ranking mode, there are a genre mode, a major/minor mode, a tone mode, and a comparison mode. These modes will be described later.

The map display section 321 displays a two-dimensional map with two axes one of which indicates ranking of content metadata and another of which indicates Date (Year).

The bottom left side of the Map displays 'Song name/Album name', which is a name of currently-played content (or a name of an album including this content), along with a musical note icon. Below the content name, 'Artist name', which is a name of artist of the currently-played content, is displayed along with a human-shaped icon.

The bottom right side of the Map displays a character string of 'Jump', which indicates one of the content selection screens, Jump Screen (Jump); a character string of 'Map', which indicates one of the content selection screens, Map Screen (Map); and a character string of 'Play List', which indicates one of the content selection screens, Play List Screen (Play List). Since Map Screen is currently displayed, a cursor 333 is disposed on the corresponding character string of 'Map'. In a case in which a user directly pushes one of the character strings ('Jump', 'Map', or 'Play List' displayed on the map display section 321) or he/she controls a view button 341 on the operation setting display section 322, the displayed screen is switched to another one and the cursor 333 is moved onto the corresponding character string ('Jump', 'Map' or 'Play List').

The Map displayed on the map display section 321 will be described in detail with reference to FIG. 10.

A vertical axis on the Map indicates the value of ranking (which means how good the sales is, for example) of the content metadata. The upper end of the vertical axis is its highest value (High) while the lower end of the vertical axis is the lowest value (Low). A horizontal axis on the Map indicates Date (Year) of the content metadata. The right end of the horizontal axis is its newest date (New) while the left end of the horizontal axis is its oldest date (Old).

In addition, the Map includes a plurality of cells of the grid, each of which is divided by parameters at a certain interval of distance. On the Map, both hatched and numbered cells of the grid are associated with play lists each of which includes at least one piece of content with a certain range of parameter related to the vertical and horizontal axes (ranking and date). That is to say, the content data that are within a certain range of ranking and date are associated with the same cell of the grid, and then a play list is created such that this play list includes those content data. By the way, the range of the parameters is determined such that each cell of the grid has enough size to be selected by a user's touch pen or finger.

For example, if one cell of the grid is only associated with one content data, many cells might be produces. In this case, each cell becomes small because the size of the screen is limited. If the cells of the grid become very small, it is troublesome for a user to pick up his/her desired one and to select one of them with his/her finger or touch pen.

Accordingly, as mentioned above, in this case, one cell of the grid becomes associated with at least one content data having the same range of parameter. It makes sure that each cell of the grid on the map display section 321 have enough size to be picked up and selected by a user with his/her finger or touch pen. In addition, even if the display section of the PD 5 is small, the display section can display many cells of the grid at once.

By the way, the PD 5, which associates each cell of the grid with at least one content data having a certain range of parameters, may not display all cells of the grid on one screen. In this case, the PD 5 displays an arrow 331 to indicate that there are more cells to be displayed outside the screen in that direction.

Furthermore, a plurality of content data listed in a play list that is associated with one cell of the grid (i.e. the plurality of content data that is associated with the same cell of the grid) is ordered by parameters of the predetermined content metadata (i.e. they are ordered by priority). For example, the content data listed in the play list that is associated with one cell of the grid are ordered by date, ranking or alphabet. Accordingly, when a cell of the grid is selected to play back the content data of the play list associated with the cell, the content data are played back in that order. And when a cell of the grid is selected to display the play list on Play List Screen, the content data are displayed in that order.

By the way, the way of ordering content data may vary according to display modes, or the way of ordering may be the same on all the display modes.

A grid circle 332, which is in the shape of a circle on the Map, indicates that a corresponding play list includes content data of the artist that was selected on the previously-displayed Jump Screen by a user.

That means that the selection information (a selected artist icon) on the Jump Screen will affect the Map Screen. Therefore, when the user selects his/her desired artist on Jump Screen and switches the displayed content selection screen from the Jump Screen to Map Screen, he/she can understand which cell of the Map Screen the content data of his/her desired artist (which is the one selected by him/her) is displayed on.

In this case, on the play list indicated by the grid circle 332, the content data of the artist selected by the user on the Jump Screen becomes the highest in the list.

In this case, the grid circle 332 indicates a fact that there is the selection information originated from another content selection screen (Jump Screen), but other differently-shaped objects (such as a triangle and rectangular object) may indicate the fact if they stand out from other cells of the grid. Alternatively, blinking objects and other kinds of objects (which are different from other cells of the grid in terms of shape, color, and/or brightness) may indicate the fact.

By the way, the grid circles with characters of 'i' and '9' also indicate a fact that there are the content data of the artist selected by the user, in the same way as the grid circle 332. That is to say, the grid circle with a character of 'i' means that there are the content data of the selected artist and a selection-move-history order (described below), while the grid circle with a character of '9' means that there are the content data of the selected artist and a playback-history order (described below).

In this manner, the selection of a cell of the grid is determined after a user's finger or touch pen contacting with the corresponding position of the touch panel 132 is released from the position. The content data listed in the play list corresponding to the selection-determined cell of the grid are played back in an order that is indicated by information associated with the play list.

On the other hand, on the map display section 321, while a user's finger or touch pen is moving but still contacting with the touch panel 132, the PD 5 determines that a certain cell of the grid (i.e. a play list) has not been selected yet. A cell of the grid, which is detected while a touch pen is moving on the screen, will be also referred to as 'a selection move cell'. A cell of the grid, from which a touch pen is released, will be also referred to as 'a selection-determined cell'.

The cells of the grid with characters of '1' to '10' on the Map indicate a fact that the content data listed in the play lists associated with the cells were recently selected and then played back, and the color of those cells are different from the other hatched cells. The characters of '1' to '10' are associated with the cells' play lists that were already played back such that they indicate an order of reproduction. In addition, the characters of '1' to '10' indicate an order of brightness.

That is to say, a cell with a character of '1' means that corresponding content data are currently played back. In addition, this cell is displayed in the highest brightness compared to all other cells. A cell with a character of '2' means that corresponding content data were played back immediately before those listed in the play list of the character of '1'. In addition, this cell has the second highest brightness. A cell with a character of '3' means that corresponding content data were played back immediately before those listed in the play list of the character of '2'. In addition, this cell has the third highest brightness.

Because the cells with characters of '4' to '10' work on the same principal, their description will be omitted. In an example of FIG. 10, the characters of '1' to '10' are displayed as playback history of cells of the grid. However the numbers of the characters are not limited to 10.

If those cells are displayed in a different manner from other cells and a user can understand an order of playback history, the way of displaying the playback history may be different from the above method: besides color and brightness, the degree of blinking and the shapes of cells may vary. In addition, the above characters of '1' to '10' may be displayed directly on the cells without any circles. Furthermore, those cells may be connected with one another by straight lines, curved lines, or arrows in an order of reproduction. In this case, the color, shape and type of the line may not be limited.

The cells with alphabets of 'a' to 'j' on the Map indicates a fact that a user's finger or touch pen has been moved (dragged) onto corresponding positions on the touch panel 132, the positions corresponding to the cells (which is to say, the selected cells have not been determined yet, and therefore corresponding content data have not been played back yet). The color of the other hatched cells and the cells indicative of the playback history (number symbols) are different from that of the cells with the alphabets. The alphabets of 'a' to 'j' are associated with the cells that have been contacted and moved by the user's finger or touch pen such that they show an order of the selection move history of the cells. In addition, the alphabetical order of the characters ('a' to 'j') indicates an order of brightness. By the way, the brightness of the selection move history is lower than the first of the playback history (which is the one currently played back).

The alphabet 'a' means that, before the cell with '1' (i.e. currently-played cell) is processed, the user's finger or touch pen has moved inside an area on the touch panel 132, where the cell with 'a' is displayed, while contacting with this area. In addition, this cell has the second highest brightness (the highest brightness is the cell with '1'), and displayed in a different color from the cell with '1'. The alphabet 'b' means that, before the cell with 'a' is processed, the user's finger or touch pen has moved inside an area on the touch panel 132, where the cell with 'b' is displayed, while contacting with this area. In addition, this cell has the third highest brightness, and displayed in the same color as the cell with 'a'.

In the same manner, the alphabet 'c' means that, before the cell with 'b' is processed, the user's finger or touch pen has moved inside an area on the touch panel 132, where the cell with 'c' is displayed, while contacting with this area. In addition, this cell has the fourth highest brightness, and displayed in the same color as the cell with 'b'.

Because the cells with other alphabets of 'd' to 'j' works on the same principal, their description will be omitted. By the way, in an example of FIG. 10, ten selection move histories of the cells ('a' to 'j') are displayed. However, that number is not limited to ten.

If those cells are displayed in a different manner from other cells and a user can understand an order of selection move history, the way of displaying the selection move history may be different from the above method, in the same way as the playback history: besides color and brightness, the degree of blinking and the shapes of cells may vary. In addition, the numerical characters of '1' to '10' may be displayed to indicate the selection move history. Furthermore, those cells may be connected with one another by straight lines, curved lines, or allows in an order of movement. In this case, the color, shape and type of the line may not be limited.

In this manner, the map display section 321 displays the map having the plurality of cells in a grid pattern each of which is divided in accordance with a certain range of parameter related to the ranking or the Date. For example, when a user wants to view or listen to the old and high-ranked content data, he/she may select, by using his/her finger or touch pen, one of those cells displayed in and around the upper left portion of the map (the fourth quadrant) and then determine the selection. Accordingly, a user can select his/her desired content easily, in terms of the ranking and date, to view or listen to it.

The operation setting display section 322 of the Map Screen 311 includes a view button 341, a mode button 342, a play and stop button 351, a bookmark button 352, and a volume button 353.

The view button 341 is used to switch the displayed screen from Map Screen 311 to Jump or Play List Screen. When a user's finger or touch pen pushes the view button 341, the displayed screen is switched. At this time, the cursor 333, which is displayed on the corresponding characters (Jump, Map, or Play List) on the map display section 321, and a line 341-1, which connects the cursor 333 to the view button 341, move accordingly. In an example shown in FIG. 10, the displayed line 341-1 is connecting the cursor 333 on 'Map' to the view button 341.

The mode button 342 is used to switch the display mode of the Map Screen 311: the map displayed on the map display section 321 is switched to another one. When a user's finger or touch pen pushes the mode button 342, the map displayed on the map display section 321 is switched to another one. At this time, a cursor 343 moves onto a corresponding one of the character strings ('Genre', 'Ranking', 'Major/Minor', 'Tone', or 'Comparison'), which indicate display modes and are displayed below the mode button 342, accordingly. In an example of FIG. 10, the cursor 343 is displayed on the character string of 'Ranking', because the current display mode is a ranking mode.

By the way, the character strings, which indicate the display modes, may be directly pushed. In response to that, the display mode is switched. At this time, the map displayed on the map display section 321 is switched to another one and the cursor 343 moves accordingly.

The play and stop button 351 is used to play content data or stop playing content data. The bookmark button 352 is used to record information about the currently-played content data as bookmark. The volume key 353 is used to control the volume of the speaker 118 outputting audio.

By the way, in the example of FIG. 10, the two-dimensional map with axes of two content metadata is displayed. Alternatively, the map may be displayed based on one content metadata, or based on three content metadata to display a three-dimensional map with axes of three content metadata, as described later with reference to FIG. 13 and FIG. 29.

Figure 11:
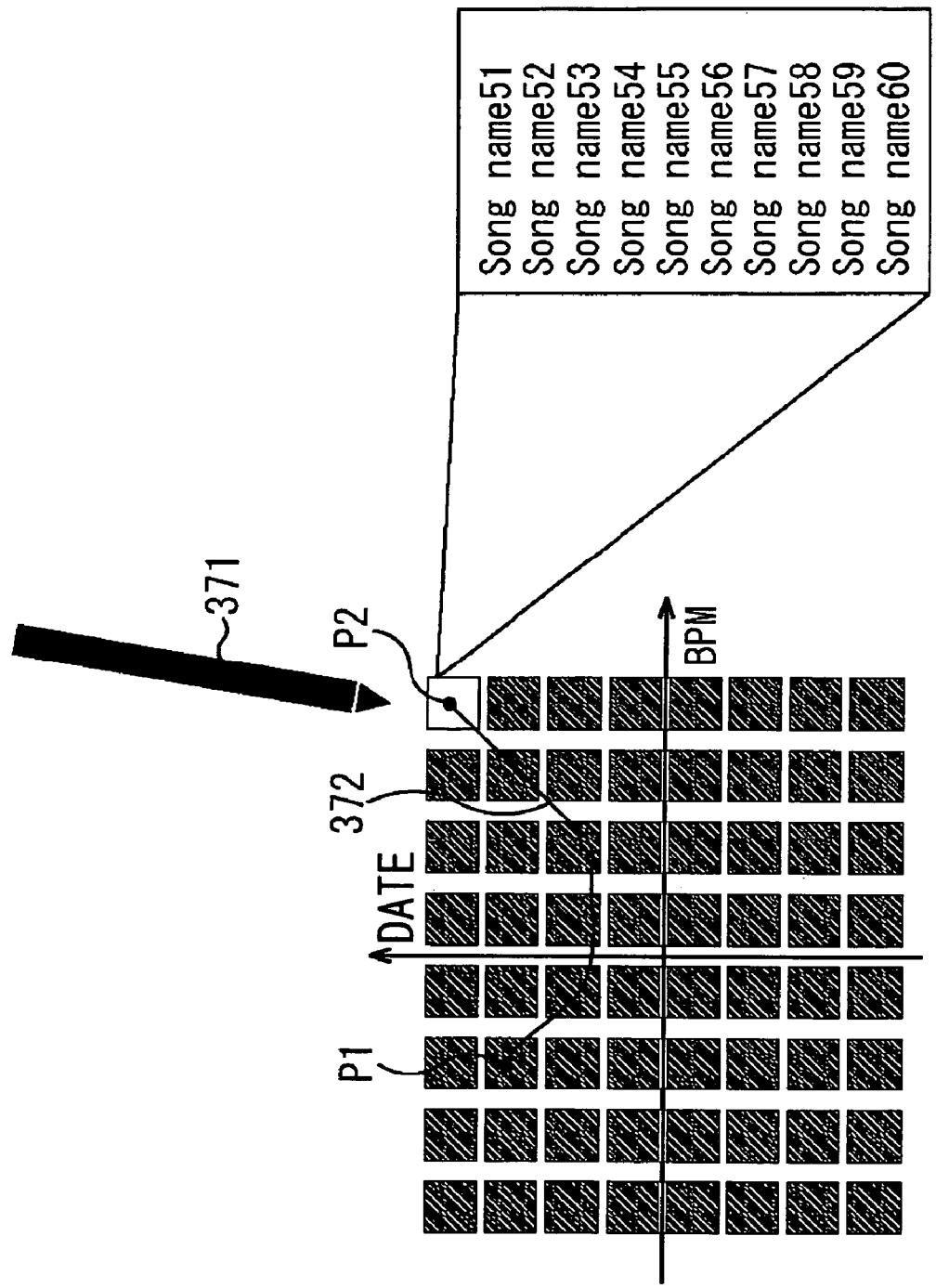
FIG. 11 is a diagram illustrating a content selection method on a map display section shown in FIG. 10.

With reference to FIG. 11, a selection method of content data on the map display section 321 will be described in detail.

Foe example, FIG. 11 shows a two-dimensional map with two axes: a vertical axis indicating the date of content metadata, and a horizontal axis indicating the tempo (equivalent to Bit per Minutes (BMP)).

For example, a user's touch pen 371 contacts with a position P1 on the touch panel 132 where there are a plurality of cells in a grid pattern, and then the touch pen 371 moves along a route 372 to a position P2 while contacting with the touch panel 132. In this case, the PD 5 determines that the selection of cells has not been determined yet. During that period, the selection location information indicative of the positions on which the touch pen 371 moved (the route 372) updates the selection move history. Based on the updated selection move history, the cells on which the touch pen 371 moved are displayed in a different manner from other cells, in the same way as the cells with 'a' to 'j' shown in FIG. 10.

At this time, the PD 5 plays back content data in accordance with the route 372 where the touch pen 371 moves: a part of the content data (a main part of a song, for example) listed in the play list associated with the cells which the touch pen 371 has contacted is played back.

In this case, instead of playing a part of the content data, the PD 5 may play back the whole content data. Alternatively, the PD 5 may play back a main part of visual content, or predetermined sound effects.

After the user's touch pen 371 on the touch panel 132 moved (was dragged) to the position P2, the touch pen 371 for example gets away (released) from the touch panel 132. At this time, the PD 5 recognizes the cell corresponding to the position P2 (which is the end point the touch pen 371 has contacted) as a selection-determined cell. This selection-determined cell updates the playback history (the selection-determined history). Based on the updated playback history, the selection-determined cell, and the cells corresponding to the previously-played play lists are displayed in a different manner from other cells, in the same way as the cells with '1' to '10' shown in FIG. 10.

Furthermore, the PD 5 starts to sequentially play back the content data listed in the play list associated with the selection-determined cell from the top of the list, and outputs audio corresponding to the content data from the speaker 118.

For example, the selection-determined cell is associated with a play list including ten content data (Song name 51 to Song name 60). If the content data are ordered by the sales ranking from the top of the play list, the PD 5 starts to play back them from the top of list, or the content data of 'Song name 51'.

By the way, for example, the user's touch pen 371 may get away from the touch panel 132 immediately after it contacts with the position P1 of the Map on the touch panel 132. In this case, the PD 5 recognizes the recently-contacted cell on the position P1 as a selection-determined cell, and then plays back the content data listed in a play list associated with the selection-determined cell.

In this manner, in the example of FIG. 11, when the touch pen 371 is removed from the touch panel 132 after the touch pen 371 contacts with the touch panel 132, the cell corresponding to the position from which the touch pen 371 was removed becomes a selection-determined cell. Alternatively, as shown in FIG. 12, the cells within an area specified by the touch pen 371 may become a selection-determined cell.

In the example of FIG. 12, for example, the touch pen 371 contacts a position P11 of the Map on the touch panel 132, and moves (is dragged) along a route 381 to a position P12, and then the touch pen 371 is removed (released) from the touch panel 132 at the position P12. In response to that, the PD 5 recognizes the cells (twelve cells with no hatchings in FIG. 12) within an area specified the route 381 as selection-determined cells. The PD 5 then plays back content data listed in the play lists associated with the selection-determined cells.

At this time, the content data may be played back in a certain order in accordance with priority values associated with each play list (which is associated with the selection-determined cells). In this case, prior to the other content data, the content data listed in the play list with the highest priority value may be played back first. Alternatively, the PD 5 may ignore the play lists. In this case, each content data is associated with a certain priority value, and the PD 5 sequentially plays back them in accordance with the priority value.

In addition, in order for a user to switch a selection determination method from the one described by FIG. 11 (this uses the idea of positions) to another described by FIG. 12 (this uses the idea of areas), the PD 5 may display an area button 391 on the operation setting display area 322, as shown in FIG. 12. When the area button 391 is pushed by a user, the method described by FIG. 12 (this uses the idea of areas) is applied.

Furthermore, the method described by FIG. 12 (this uses the idea of areas) may be used to bookmark information associated with the area, as well as selecting and determining the cells to play back content data.

Figure 13:
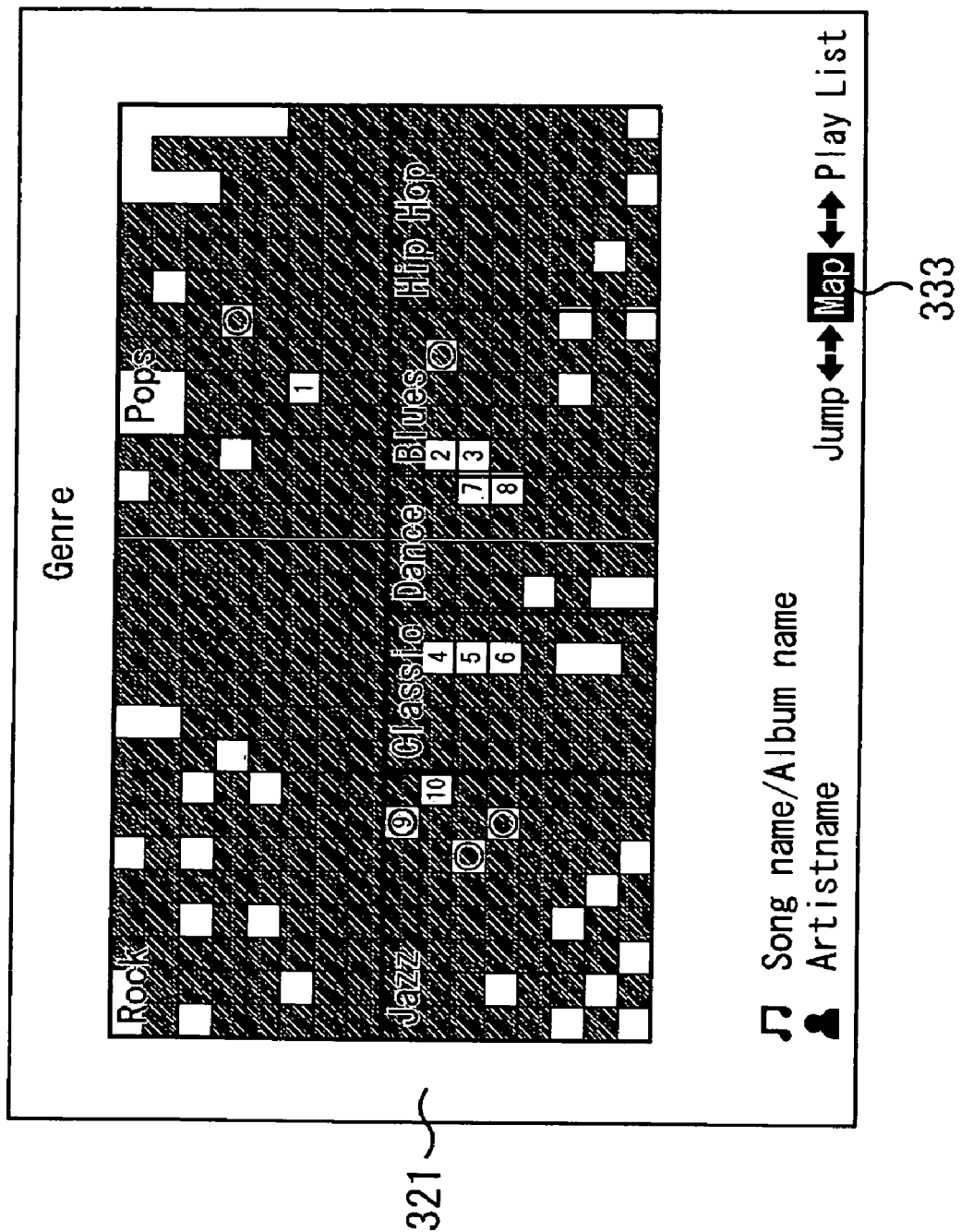
FIG. 13 is a diagram showing another example of the configuration of the map display section shown in FIG. 10.

FIG. 13 shows an example of the configuration of the map display section with a genre mode (one of the display modes). Because the configuration of the cells of the grid is the same as that of FIG. 10, their description will be omitted.

By the way, when the display mode (Map) is switched, the metadata of the axes of the Map changes accordingly. In addition, the content data associated with the cells are updated accordingly. Therefore, the cells of the grid are displayed in a different manner. At this time, the playback history ('1' to '10') continue to be displayed in accordance with the updated cells, while the selection move history is reset for each display mode.

As shown in FIG. 13, a map displayed on the map display section 321 includes seven areas which are classified by parameters, or genres of content metadata.

An area of the grid with 8 horizontal rows and 18 vertical rows at the upper left side of FIG. 13 is a Rock area. In the Rock area, a cell with hatchings or numeric characters is associated with a play list including at least one content data with parameters of Rock.

An area of the grid with 8 horizontal rows and 10 vertical rows on the right side of the Rock area is a Pops area. In the Pops area, a cell with hatchings or numeric characters is associated with a play list including at least one content data with parameters of Pops.

An area of the grid with 8 horizontal rows and 8 vertical rows at the bottom left side of FIG. 13 is a Jazz area. In the Jazz area, a cell with hatchings or numeric characters is associated with a play list including at least one content data with parameters of Jazz.

An area of the grid with 8 horizontal rows and 5 vertical rows on the right side of the Jazz area is a Classic area. In the Classic area, a cell with hatchings or numeric characters is associated with a play list including at least one content data with parameters of Classic.

An area of the grid with 8 horizontal rows and 4 vertical rows on the right side of the Classic area is a Dance area. In the Dance area, a cell with hatchings or numeric characters is associated with a play list including at least one content data with parameters of Dance.

An area of the grid with 8 horizontal rows and 5 vertical rows on the right side of the Dance area is a Blues area. In the Blues area, a cell with hatchings or numeric characters is associated with a play list including at least one content data with parameters of Blues.

An area of the grid with 8 horizontal rows and 6 vertical rows on the right side of the Blues area is a Hip Hop area. In the Hip Hop area, a cell with hatchings or numeric characters is associated with a play list including at least one content data with parameters of Hip Hop.

In this manner, a map with the areas of grid divided by the parameters of genre is displayed. A user selects, by using his/her touch pen or finger, the grid of his desired genre's area, and completes this selection. This allows the user to select his/desired genre's content data to view or listen to it easily.

Figure 14:
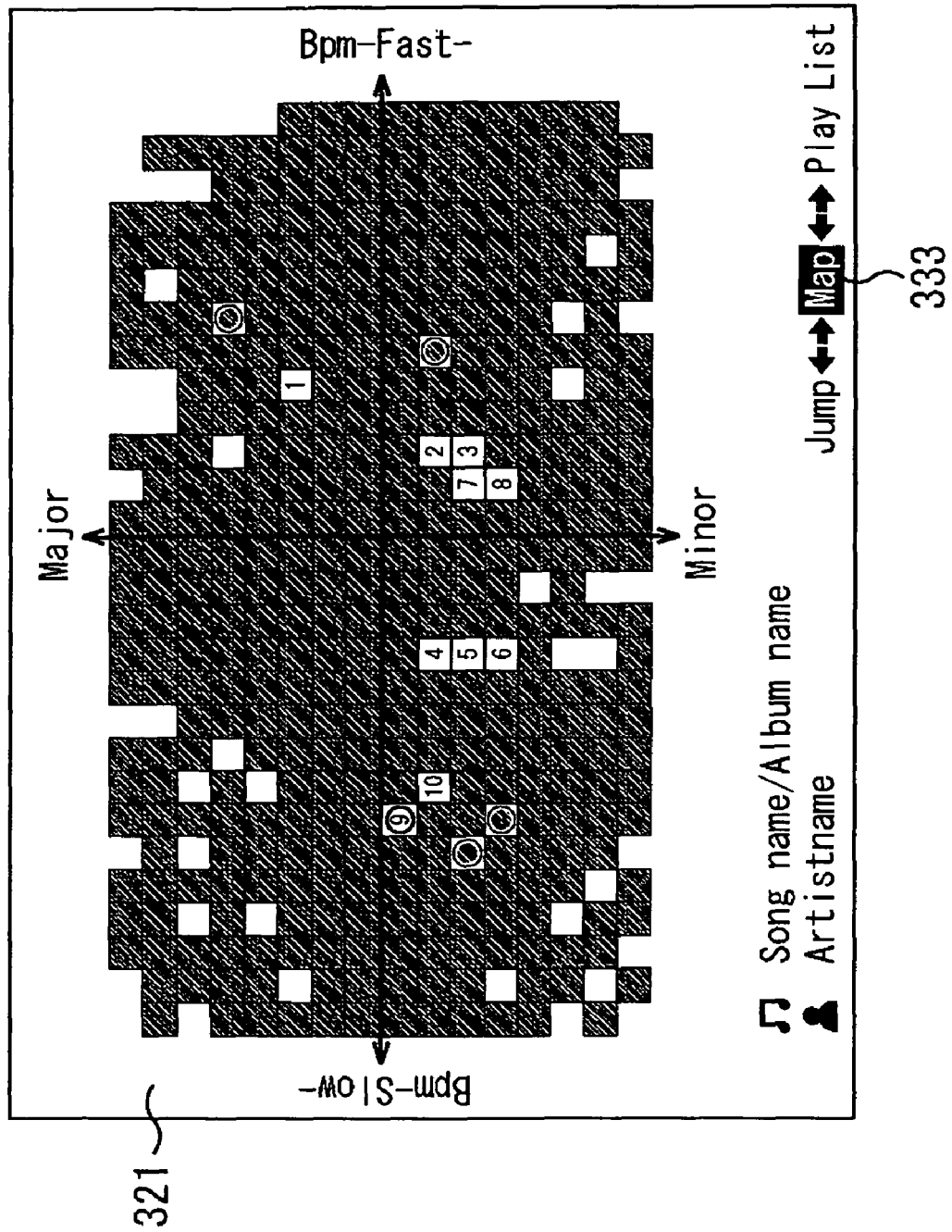
FIG. 14 is a diagram showing another example of the configuration of the map display section shown in FIG. 10.

FIG. 14 illustrates an example of the configuration of the map display section with Major/Minor mode (one of the display modes). In the same way as that of FIG. 13, the grid of the Map in an example of FIG. 14 has the same configuration as that of FIG. 10. Therefore, their description will be omitted.

As shown in FIG. 14, the Map displayed on the map display section 321 includes two axes of content metadata: Major and Tempo (BPM). The Map includes a plurality of cells in a grid format, each of which is divided by a certain range of parameter.

On the Map, the vertical axis indicates the degree of Major of content metadata (i.e. this axis indicates tune). The upper end of the vertical axis means high (i.e. major key), while the bottom end of the vertical axis means low (i.e. minor key). The horizontal axis is associated with values of tempo (BPM) of content metadata. The right end of the horizontal axis means fast tempo, while the left end of the horizontal axis means slow tempo.

That is to say, as shown in FIG. 14, on the Map displayed on the map display section 321, a cell with hatchings or numeric characters is associated with a play list including at least one content data with a certain range of parameter related to the tune and tempo of content metadata.

In this manner, the Map with the cells of grid divided by a parameter having a certain range related to tune and speed is displayed. When a user for example wants to view or listen to a bright (major key) and fast-tempo content data, he/she selects, by using his/her touch pen or finger, the cells in or around the upper right area of the Map (the first quadrant) and completes this selection. This allows a user to select the content data of his/her desired tune and speed easily to view or listen to it.

Figure 15:
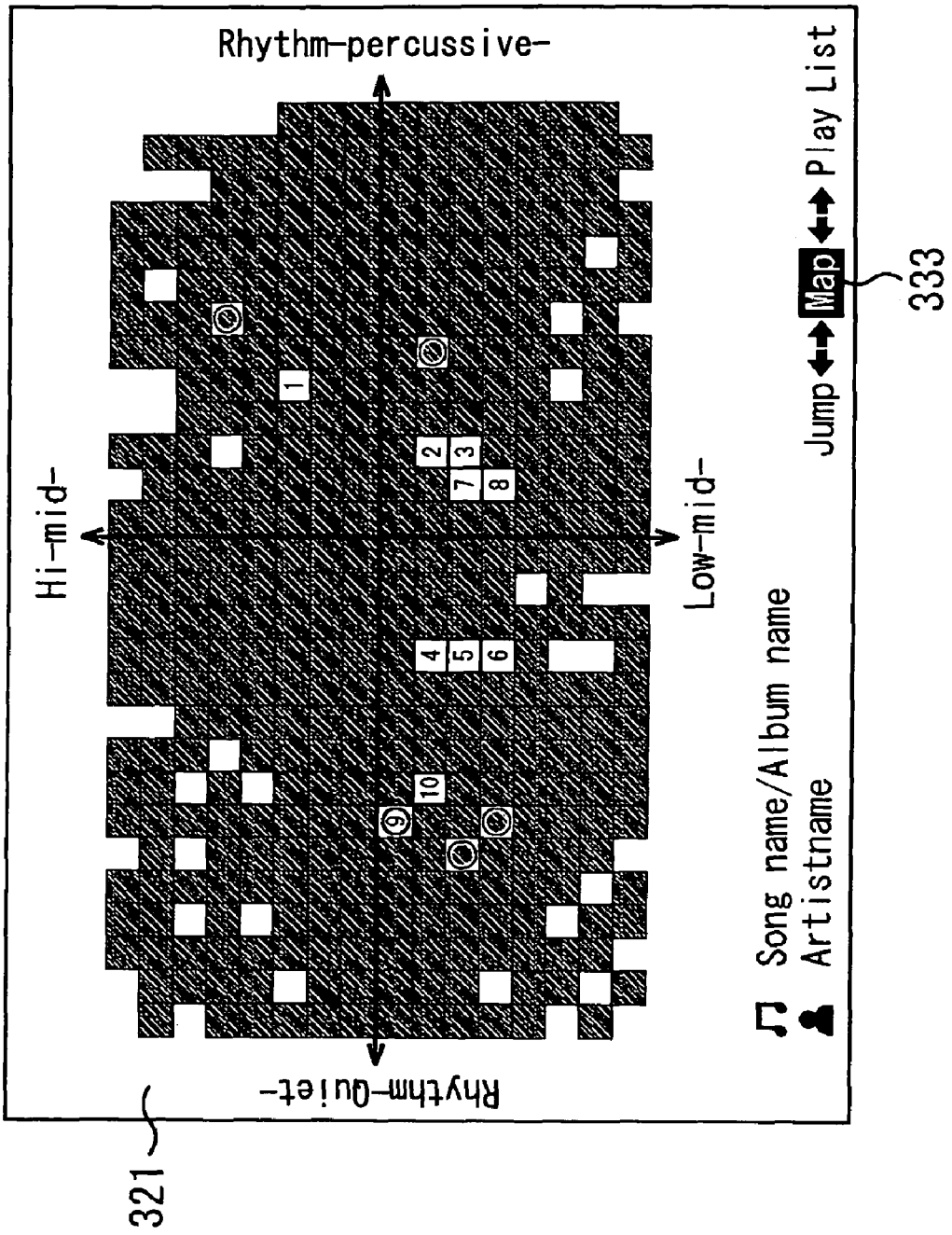
FIG. 15 is a diagram showing another example of the configuration of the map display section shown in FIG. 10.

FIG. 15 shows an example of the configuration of the map display section with sound range (tone) mode (one of the display modes). In the same way as that of FIG. 13, the grid of the Map in an example of FIG. 15 has the same configuration as that of FIG. 10. Therefore, their description will be omitted.

As shown in FIG. 15, the Map displayed on the map display section 321 includes two axes of content metadata: sound range (Hi/Low) and rhythm. The Map includes a plurality of cells in a grid format, each of which is divided by a certain range of parameter.

On the Map, the vertical axis indicates whether the sound range of content metadata is high (HiMid) or low (LowMid). The upper end of the vertical axis means high sound range, while the bottom end of the vertical axis means low sound range. The horizontal axis indicates values of rhythm of content metadata. The right end of the horizontal axis means percussive, while the left end of the horizontal axis means quiet.

That is to say, as shown in FIG. 15, on the Map displayed on the map display section 321, a cell with hatchings or numeric characters is associated with a play list including at least one content data with a certain range of parameter related to the sound range and rhythm of content metadata.

In this manner, the Map with the cells of grid divided by parameters related to sound range and rhythm is displayed. When a user for example wants to view or listen to the content data with high sound range and rhythm (i.e. percussive content data), he/she selects, by using his/her touch pen or finger, the cells in or around the upper right area of the Map (the first quadrant) and completes this selection. This allows a user to select the content data of his/her desired sound range and rhythm easily to view or listen to it.

Figure 16:
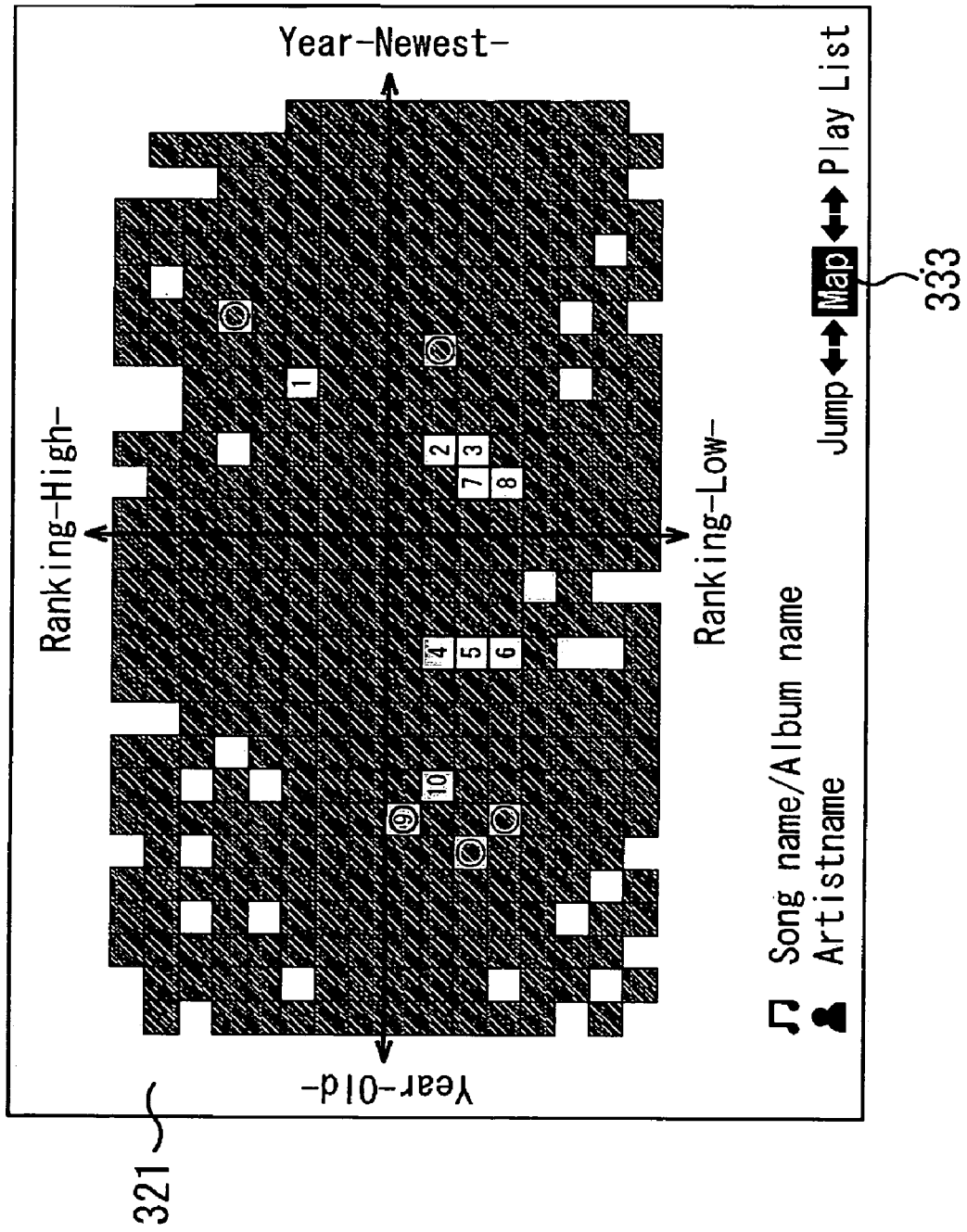
FIG. 16 is a diagram showing another example of the configuration of the map display section shown in FIG. 10.

FIG. 16 shows an example of the configuration of the map display section with Comparison mode (one of the display modes). In the same way as that of FIG. 13, the grid of the Map in an example of FIG. 16 has the same configuration as that of FIG. 10. Therefore, their description will be omitted.

As shown in FIG. 16, the Map displayed on the map display section 321 includes two axes of content metadata: Ranking and Date (Year). The Map includes a plurality of cells in a grid format, each of which is divided by a certain range of parameter.

On the Map, the vertical axis indicates ranking of content metadata. The upper end of the vertical axis means high in the ranking, while the bottom end of the vertical axis means low in the ranking. The horizontal axis indicates date (year) of content metadata. The right end of the horizontal axis means new (newest), while the left end of the horizontal axis means old.

By the way, these axes of the Map is the same as those on the Map displayed on the map display section 321 with Ranking mode (FIG. 10). The ranking in FIG. 10 for example indicates how good the sales of content data are. Whereas the ranking of the comparison mode for example is user ranking information calculated from the user's playback history. This means that the content data the user has listened many times is ranked high. By the way, besides the comparison mode, the user ranking information is used independently a shown in FIG. 47 (described later).

Another example of the Map with comparison mode is that the horizontal axis indicates ranking by a user A of the PD 5 and the vertical axis indicates ranking by other users (a user B, for example). By the way, the information of the user B may be selected and set through a user related link (friends jump) of the Jump Screen in FIG. 23 (described below).

This kind of Map displayed and set allows the user A to intuitively understand which content data (music data) both user A and user B (who is related to the user A) like and which content data the user B like. In addition, the user A can play back them immediately.

By the way, the user ranking information may be recorded on the content server 3 and the like after counting the playback history (Played Order List).

Figure 20:
FIG. 20 is a diagram showing another example of the configuration of a play list display section shown in FIG. 17.

That is to say, the playback history of the user B may be recorded on the PD 5 of the user B, as illustrated by FIG. 20 below. The playback history of the user B, which is recorded on the PD 5 of the user B, is supplied from the PD 5 of the user B to the content server 3 through wireless communication, for example. The content server 3 counts the playback history of the user B to produce the ranking information of the user B.

The content server 3 wirelessly transmits the ranking information of the user B to the PD 5 of the user A related to the user B. In response to a user A's operation, the PD 5 of the user A selects a user icon from among user related links (illustrated below by FIG. 23) on a link display section displayed on the display section 131 to choose the user B. After that, when the user A pushes the view button 341, the PD 5 of the user A switches the displayed screen to the Map screen 311 of the comparison mode.

In this manner, the Map of the comparison mode where the user A's preference is compared with the user B's preference is displayed on the map display section 321 of the Map screen 311.

That is to say, as shown in FIG. 16, on the Map displayed on the map display section 321, a cell with hatchings or numeric characters is associated with a play list including at least one content data with a certain range of parameter (value) related to the user and his/her friends.

In this manner, the Map with the cells of grid divided by parameters related to private information is displayed. Therefore, the user for example easily finds out the content data his/her friends like. This helps the user listen to content data in the field he/she was not interested in. Accordingly, the user can be interested in various content data. In addition, the content provision sides can enhance the marketing of content data.

Besides the above ranking mode, genre mode, major/minor mode, tone mode and comparison mode, there may be other display modes where the combination of metadata to be used for the vertical and horizontal axes on the Map is different from the above modes, or where other metadata are used for the vertical and horizontal axes.

Figure 17:
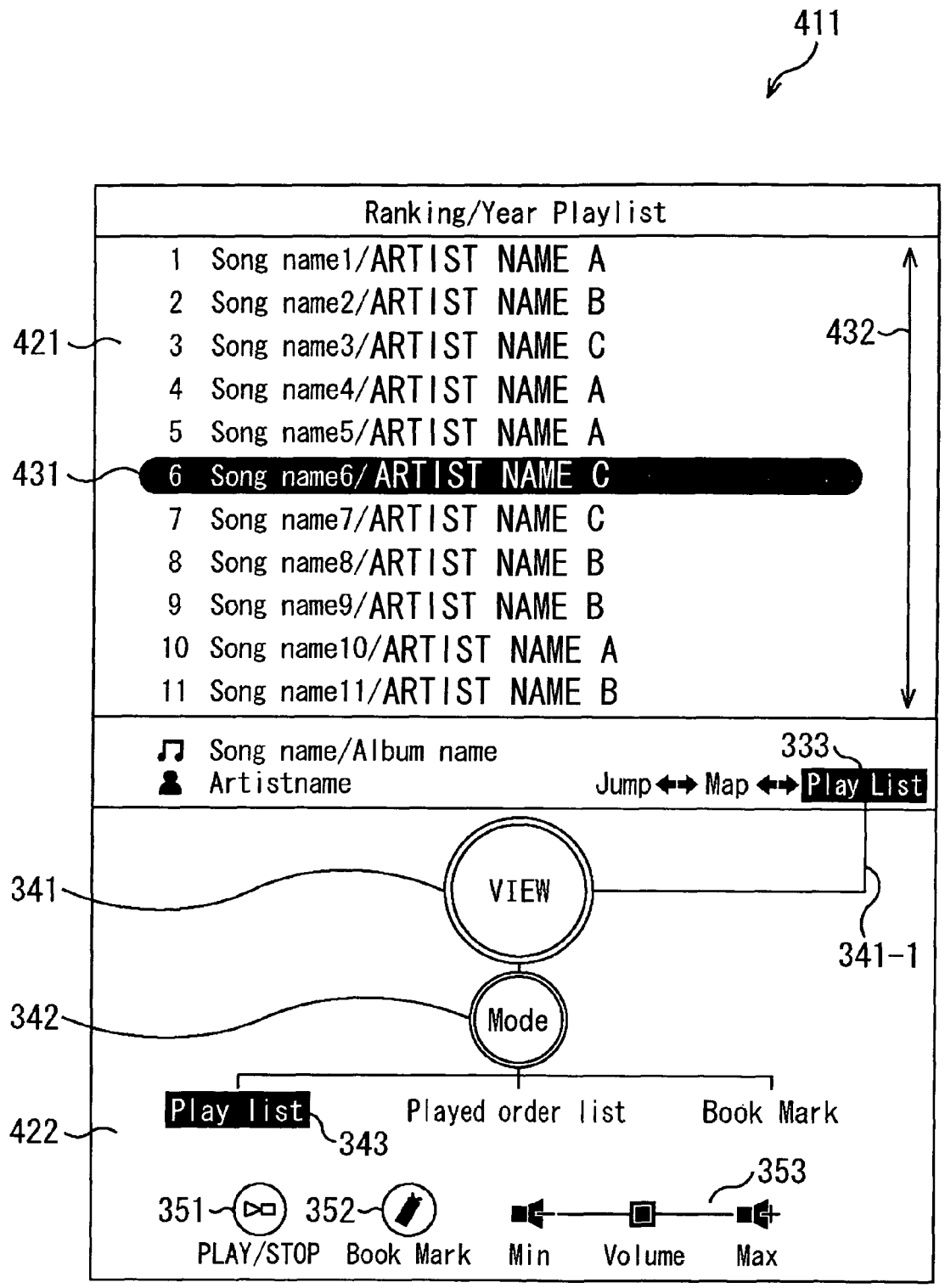
FIG. 17 is a diagram showing an example of the configuration of a play list screen (one of the content selection screens)

FIG. 17 illustrates an example of the configuration of the play list screen (one of the content selection screens). The parts of FIG. 17 have been designated by the same marks and symbols as the corresponding parts of FIG. 10. Therefore, their description will be omitted.

The play list screen 411 includes a play list display section 421 and an operation setting display section 422.

FIG. 17 shows an example of the play list display section 421 which is displayed when the play list screen 411 is in the play list mode. By the way, the display modes for the play list screen 411 include a playback history (played order list) mode and bookmark mode, besides the play list mode.

The play list mode displays a play list corresponding to the item (a cell of grid or an icon) selected on the map screen or the jump screen. The playback history mode displays a play list listing the content data played back in the past. The bookmark mode displays a play list listing the content data registered by a user as bookmark.

The character string of 'Ranking/Year Playlist' is displayed on the top are of the play list display section 421. This means that the play list display section 421 displays a play list of the ranking mode of the map screen. The play list display section 421 displays the play list which is associated with a cell with '1' in FIG. 10. This cell is the one selected and determined on the map screen 311 of the ranking mode.

As illustrated by FIG. 10, on the map screen 311, the content data listed in the play lists that are associated with the same cell (i.e. the content data associated with the same cell) are ordered by parameters of predetermined content metadata and the like (i.e. they are associated with values of priority). Accordingly, the play list display section 421 lists the content data in accordance with the values of priority associated with the selected and determined play lists, as illustrated by numeric characters of '1' to '11'.

That is to say, the play list display section 421 lists the information of each content data in accordance with the associated priority values from the top in the following order: a content name of 'Song name 1' and artist name of 'Artist Name A' of the content data with the priority value of '1'; a content name of 'Song name 2' and artist name of 'Artist Name B' of the content data with the priority value of '2'; a content name of 'Song name 3' and artist name of 'Artist Name C' of the content data with the priority value of '3'; a content name of 'Song name 4' and artist name of 'Artist Name A' of the content data with the priority value of '4'; a content name of 'Song name 5' and artist name of 'Artist Name A' of the content data with the priority value of '5'; a content name of 'Song name 6' and artist name of 'Artist Name C' of the content data with the priority value of '6'; a content name of 'Song name 7' and artist name of 'Artist Name C' of the content data with the priority value of '7'; a content name of 'Song name 8' and artist name of 'Artist Name B' of the content data with the priority value of '8'; a content name of 'Song name 9' and artist name of 'Artist Name B' of the content data with the priority value of '9'; a content name of 'Song name 10' and artist name of 'Artist Name A' of the content data with the priority value of '10'; and a content name of 'Song name 11' and artist name of 'Artist Name B' of the content data with the priority value of '11'.

In this manner, the information displayed on the play list display section 421 (FIG. 17) may be affected by the priority (ranking) information about cells selected on the map screen 311. The numeric characters '1' to '11' on the left side of the content names may not be displayed.

A cursor 431, which is displayed on the content and artist name of the content data with priority value of '6', indicates a currently-played content data. That is to say, the play list sequentially plays back the content data in accordance with the priority values: the content data with the highest priority value may be played first. The name of currently-played content data is indicated by the cursor 431. After the playback of the content data indicated by the cursor 431 ends, the cursor 431 moves to the next content name and artist name (whose content data is ranked second), and then corresponding content data is played back.

By the way, when a user directly selects one of the content data on the play list display section 421, the cursor 431 moves onto the name of the content selected by the user and the corresponding content data is played back.

In the right area of the play list display section 421, a scroll bar 432 is displayed. Operating scroll bar 432 scrolls the list on the play list display section 421, and it shows those that had not been displayed on the play list display section 421, such as the content and artist names of the content data with the priority value of '12'.

On the operation setting display section 422 of the play list screen 411, the cursor 333 on 'Play List' is connected to the view button 341 by the line 341-1.

The mode button 342 of the operation setting display section 422 is used to switch the display mode of the play list screen 411: the play list displayed on the play list display section 421 is switched to another one. When a user's finger or touch pen pushes the mode button 342, the play list displayed on the play list display section 421 is switched to another one. At this time, a cursor 343 moves onto a corresponding one of the character strings ('Play List', 'Played Order List', or 'Bookmark'), which indicate display modes and are displayed below the mode button 342, accordingly. In an example of FIG. 17, the cursor 343 is displayed on the character string of 'Play List', because the current display mode is a play list mode.

By the way, the character strings, which indicate the display modes, may be directly pushed. In response to that, the display mode is switched. At this time, the play list displayed on the play list display section 421 is switched to another one and the cursor 343 moves accordingly.

Figure 18:
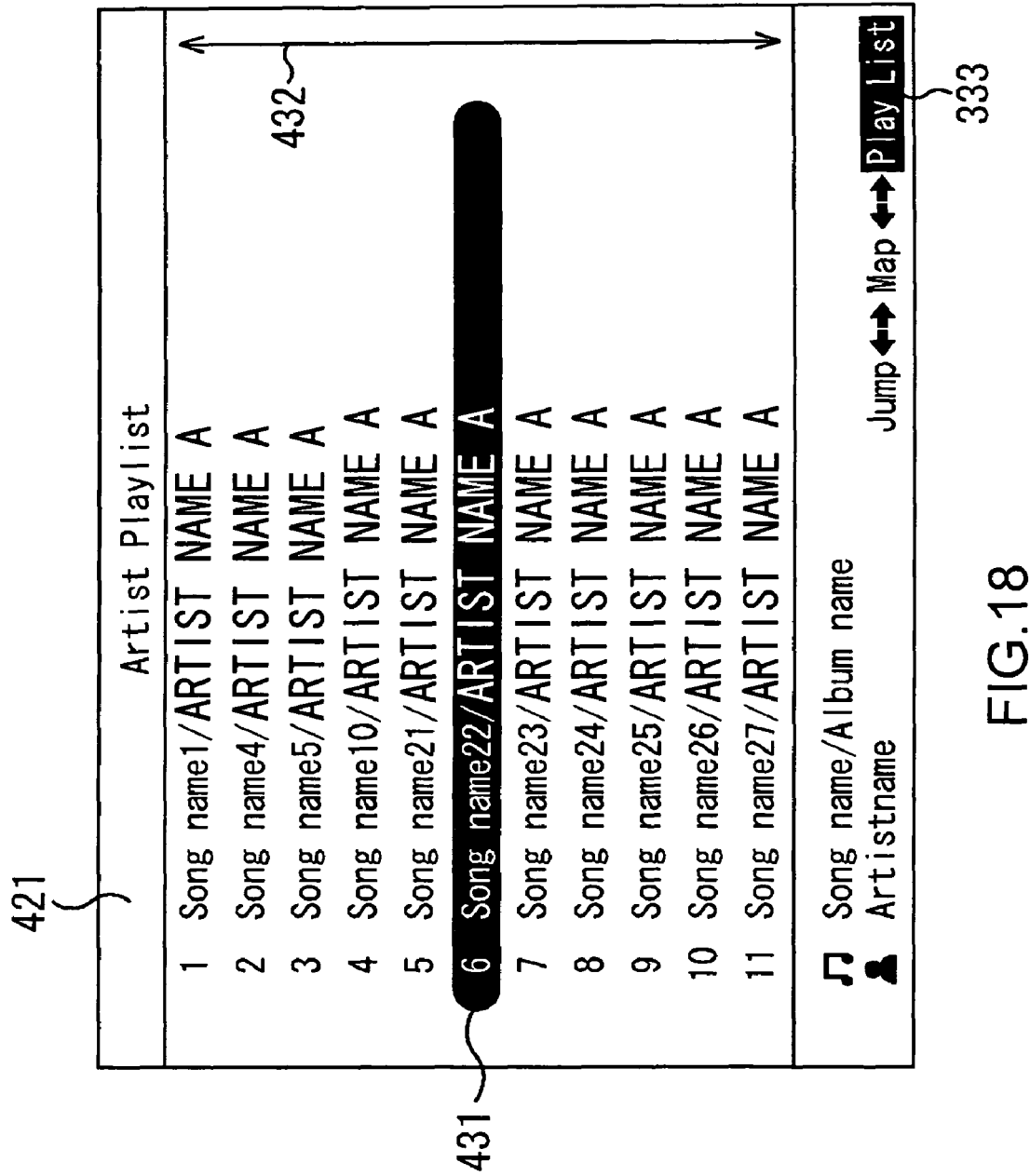
FIG. 18 is a diagram showing another example of the configuration of a play list display section shown in FIG. 17.

FIG. 18 shows another example of the configuration of the play list display section with play list mode.

The character string of 'Artist Playlist' is displayed on the top area of the play list display section 421 as shown in FIG. 18. This means that the play list display section 421 displays a play list corresponding to an artist in the jump screen. The play list display section 421 displays a play list corresponding to an artist (i.e. selected artist) associated with an icon selected on the jump screen.

That is to say, the play list display section 421 shown in FIG. 18 is displayed when an artist name A is selected on the jump screen and then the displayed screen is switched to the play list screen.

That is to say, the play list display section 421 (the play list of selected artist) lists the information of each content data in accordance with the associated priority values from the top in the following order: a content name of 'Song name 1' and artist name of 'Artist Name A' of the content data with the priority value of '1'; a content name of 'Song name 4' and artist name of 'Artist Name A' of the content data with the priority value of '2'; a content name of 'Song name 5' and artist name of 'Artist Name A' of the content data with the priority value of '3'; a content name of 'Song name 10' and artist name of 'Artist Name A' of the content data with the priority value of '4'; a content name of 'Song name 21' and artist name of 'Artist Name A' of the content data with the priority value of '5'; a content name of 'Song name 22' and artist name of 'Artist Name A' of the content data with the priority value of '6'; a content name of 'Song name 23' and artist name of 'Artist Name A' of the content data with the priority value of '7'; a content name of 'Song name 24' and artist name of 'Artist Name A' of the content data with the priority value of '8'; a content name of 'Song name 25' and artist name of 'Artist Name A' of the content data with the priority value of '9'; a content name of 'Song name 26' and artist name of 'Artist Name A' of the content data with the priority value of '10'; and a content name of 'Song name 27' and artist name of 'Artist Name A' of the content data with the priority value of '11'.

In this manner, for example, in a case in which the artist name A is selected on the jump screen, the information displayed on the play list display section 421 (FIG. 18) may be affected by the information selected through the jump screen, and a play list of an artist whose name is A is displayed.

Figure 19:
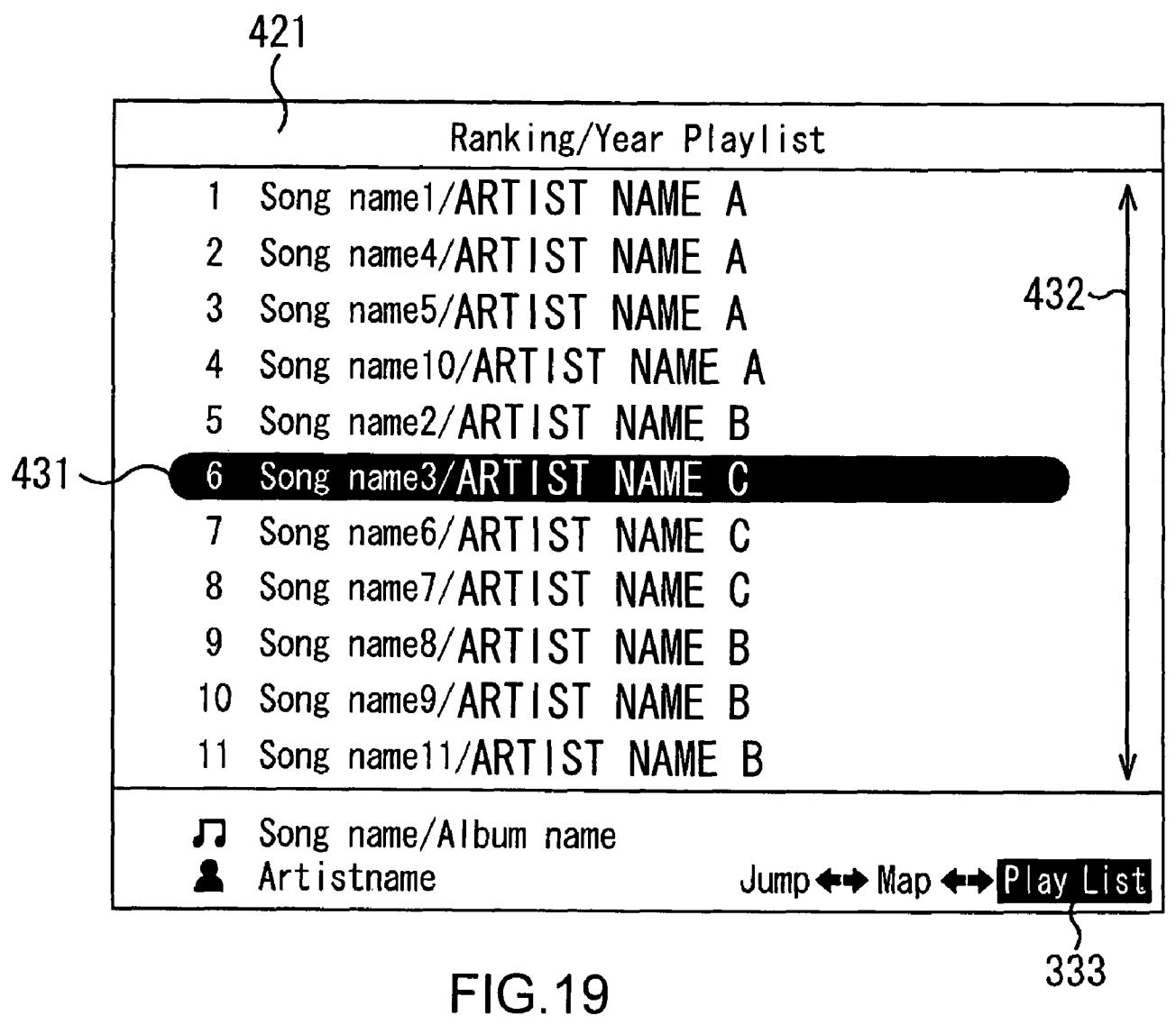

FIG. 19 shows another example of the configuration of the play list display section with play list mode.

The character string of 'Ranking/Year Playlist' is displayed on the top area of the play list display section 421 as shown in FIG. 19. This means that the play list display section 421 displays a play list of ranking mode of the map screen. The play list display section 421 displays a play list which is associated with the grid circle 332 selected and determined on the map screen 311 shown in FIG. 10.

That is to say, as illustrated by FIG. 10, the grid circle 332 indicates a fact that the play list corresponding to the grid circle 332 includes the content data of artist selected by a user through the jump screen displayed in the past. An order of the content data listed in the play list corresponding to the grid circle 332 is determined based on the priority values of the content data of artists selected on the jump screen. Accordingly, in a case in which the selection of the grid circle 332 is determined on the map screen and then the displayed screen is switched to the play list screen, the play list display section 421 shown in FIG. 19 lists the content data in accordance with the priority values of the play list corresponding to the grid circle 332, as illustrated by numeric characters of '1' to '11'.

That is to say, the play list display section 421 (the play list of the grid circle 332) lists the information of each content data in accordance with the associated priority values from the top in the following order: a content name of 'Song name 1' and artist name of 'Artist Name A' of the content data with the priority value of '1'; a content name of 'Song name 4' and artist name of 'Artist Name A' of the content data with the priority value of '2'; a content name of 'Song name 5' and artist name of 'Artist Name A' of the content data with the priority value of '3'; a content name of 'Song name 10' and artist name of 'Artist Name A' of the content data with the priority value of '4'; a content name of 'Song name 21' and artist name of 'Artist Name A' of the content data with the priority value of '5'; a content name of 'Song name 2' and artist name of 'Artist Name B' of the content data with the priority value of '6'; a content name of 'Song name 6' and artist name of 'Artist Name C' of the content data with the priority value of '7'; a content name of 'Song name 7' and artist name of 'Artist Name C' of the content data with the priority value of '8'; a content name of 'Song name 8' and artist name of 'Artist Name B' of the content data with the priority value of '9'; a content name of 'Song name 9' and artist name of 'Artist Name B' of the content data with the priority value of '10'; and a content name of 'Song name 11' and artist name of 'Artist Name B' of the content data with the priority value of '11'.

In this manner, for example, when the grid circle that has been affected by the information selected through the jump screen is chosen and determined on the map screen, the information displayed on the play list display section 421 (FIG. 19) is affected by the priority information of the grid circle, which is the information selected through the map screen 311.

FIG. 20 shows an example of the configuration of the play list display section with playback history mode.

As shown in FIG. 20, the top area of the play list display section 421 displays the character string of 'Played order list', which indicates that the play list display section 421 displays a play list of playback history mode. The play list display section 421 displays a play list where the played content data are listed. The play list of playback history mode lists the content data in order of playback date and time: the recently played content data is listed at the top.

That is to say, the play list display section 421 lists the content data from its top to bottom in the following order: a content name of 'Song name 1', artist name of 'Artist name A' and playback date and time of the content data with the newest playback date and time (the recently played content data); a content name of 'Song name 2', artist name of 'Artist name B' and playback date and time of the content data with the second newest playback date and time; a content name of 'Song name 3', artist name of 'Artist name C' and playback date and time of the content data with the third newest playback date and time; a content name of 'Song name 4', artist name of 'Artist name A' and playback date and time of the content data with the fourth newest playback date and time; a content name of 'Song name 5', artist name of 'Artist name A' and playback date and time of the content data with the fifth newest playback date and time; a content name of 'Song name 6', artist name of 'Artist name C' and playback date and time of the content data with the sixth newest playback date and time; a content name of 'Song name 7', artist name of 'Artist name C' and playback date and time of the content data with the seventh newest playback date and time; a content name of 'Song name 8', artist name of 'Artist name B' and playback date and time of the content data with the eighth newest playback date and time; a content name of 'Song name 9', artist name of 'Artist name B' and playback date and time of the content data with the ninth newest playback date and time; a content name of 'Song name 10', artist name of 'Artist name A' and playback date and time of the content data with the tenth newest playback date and time; and a content name of 'Song name 11', artist name of 'Artist name B' and playback date and time of the content data with the eleventh newest playback date and time.

In this manner, the information of the playback history of the content data, which is stored in the PD 5, is displayed as a play list. This allows a user to select his/her desired content data out of the playback history to play back it. By the way, the play list display section 421 can display not only the play list of the user of the PD 5, but also the play lists of other users, as described later by FIG. 29.

Figure 21:
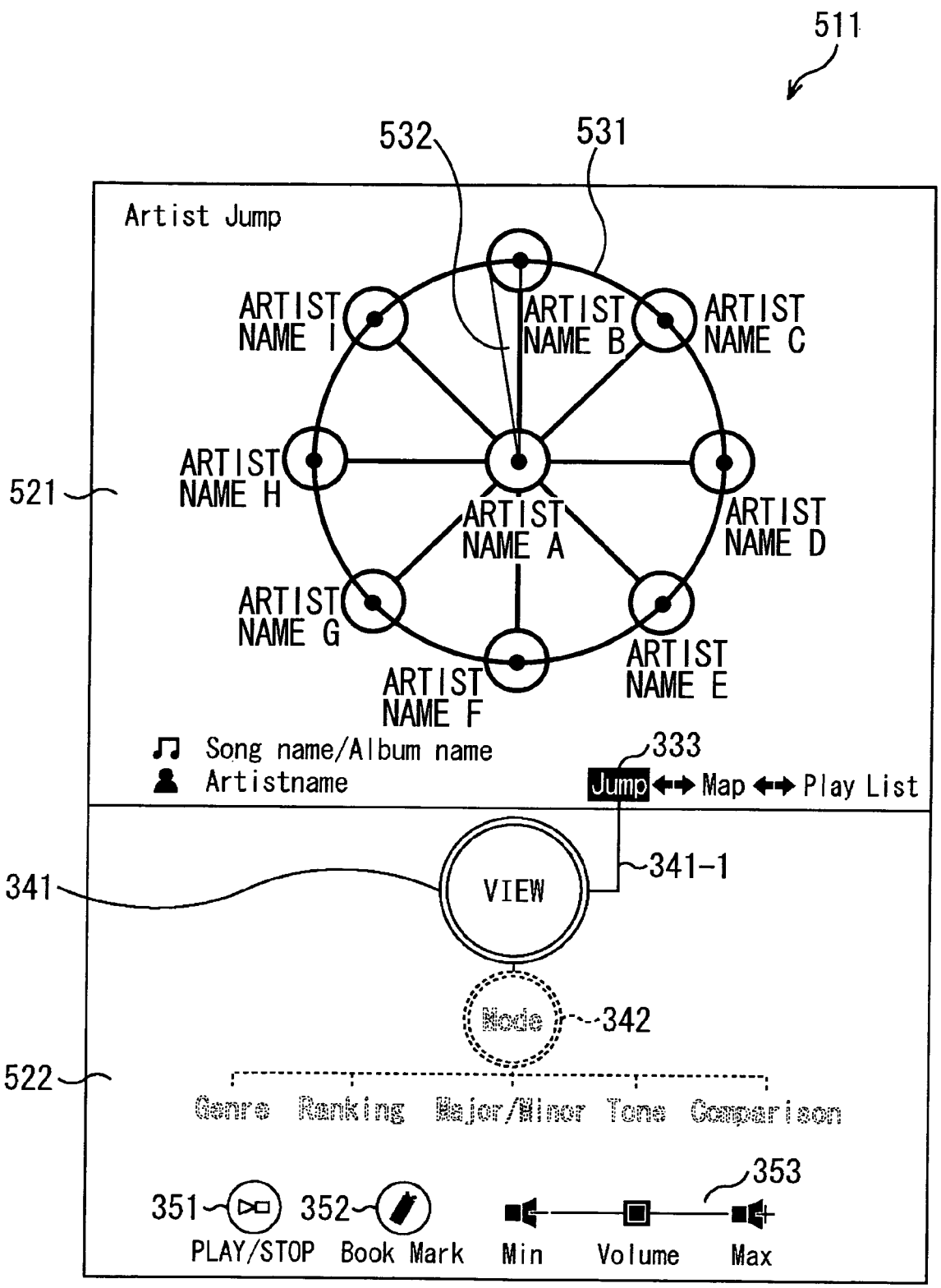
FIG. 21 is a diagram showing an example of the configuration of a jump screen (one of the content selection screens)

FIG. 21 shows an example of the configuration of the jump screen (one of the content selection screens). By the way, the parts of the FIG. 21 have been designated by the same marks and symbols as the corresponding parts of FIG. 10. Therefore, their description will be omitted.

The jump screen 511 includes a link display section 521 and an operation setting display section 522. In FIG. 21, the link display section 521 displays artists of the content data played back, or an artist jump where artists associated with the selected artist are shown.

The associated artists for example include artists who belong (or belonged) to the same group; artists who belongs to the same production company; artists who often appear on the same stage; and artists whose songs are similar to those of the selected artist.

The link display section 521 displays a circle 531. An icon of 'Artist name A' (also referred to as an artist icon A') is on the center of the circle 531. The artists associated with the artist of 'Artist name A' include artists of 'Artist name B', 'Artist name C', 'Artist name D', 'Artist name E', 'Artist name F', 'Artist name G', 'Artist name H' and 'Artist name I'. These associated artists' icons (also referred to as artist icons B, C, D, E, F, G, H and I) are on the circumference of the circle 531.

Lines connect the artist icons on the circumference with the artist icon A on the center, indicating they are associated with one another. There is a sector-shaped mark 532 inside the circle 531 such that it connects the center with the circumference. The mark 532 rotates on the center of the circle 531 as if the artist icon A emits light to each artist icon on the circumference like radar.

When a user selects one of the artist icons (the artist icon B, for example) on the circumference of the circle 531 on the link display section 521, the selected associated artist icon B is displayed on the center of the circle 531 and the artist icons of artists who are associated with the artist of 'Artist name B' are displayed on the circumference. At this time, the transition of icons is displayed in animation.

In this manner, the link display section 521 only displays, on the circumference of the circle 531, the artist icons of artists who are associated with the artist of the artist icon displayed on the center of the circle 531. There may be other method that displays the first content data, the second content data associated with the first content data, and the third content data: associated with the second content data.

By contrast, the jump screen 511 according to an embodiment of the present invention only displays the information associated with the currently-played or desired artist. Therefore, compared to the above method (which displays the first content data, the second content data associated with the first content data, and the third content data associated with the second content data), the jump screen displays information in a simple manner. Therefore, a user can easily understand the association between artists, and easily select associated icons.

On the operation setting display section 522 of the jump screen 511, the line 341-1 connects the cursor 333 on 'Jump' with the view button 341.

The mode button 342 of the operation setting display section 422 is used to switch the display mode of the map screen 311 and play list screen 411. Since there is not any display mode on the jump screen 511, the mode button 342 is displayed translucently to be disabled.

With the above link display section 521 of the jump screen 511 on which the artist icon A is selected, when the displayed screen is switched to the map screen 311, the map of the map display section 321 of the map screen 311 (FIG. 10) displays the grid circle 332 on the cell that is associated with the content data of the artist of the artist icon A.

In addition, when the displayed screen, the jump screen 511 whose link display section 521 has the artist icon A selected, is switched to the play list screen 411, the play list display section 421 of the play list screen 411 (FIG. 18) displays a play list including content data of the artist of the artist icon A.

By the way, in FIG. 21, the jump screen 511 displays the association between artists. Alternatively, the jump screen 511 may display the association between content data. In addition, the jump screen 511 may display the association between users, as illustrated later by FIG. 23. If the jump screen 511 is capable of displaying not only the association with artists but also the association with users, the mode button 342 may be used to switch what the jump screen 511 displays.

Figure 22:
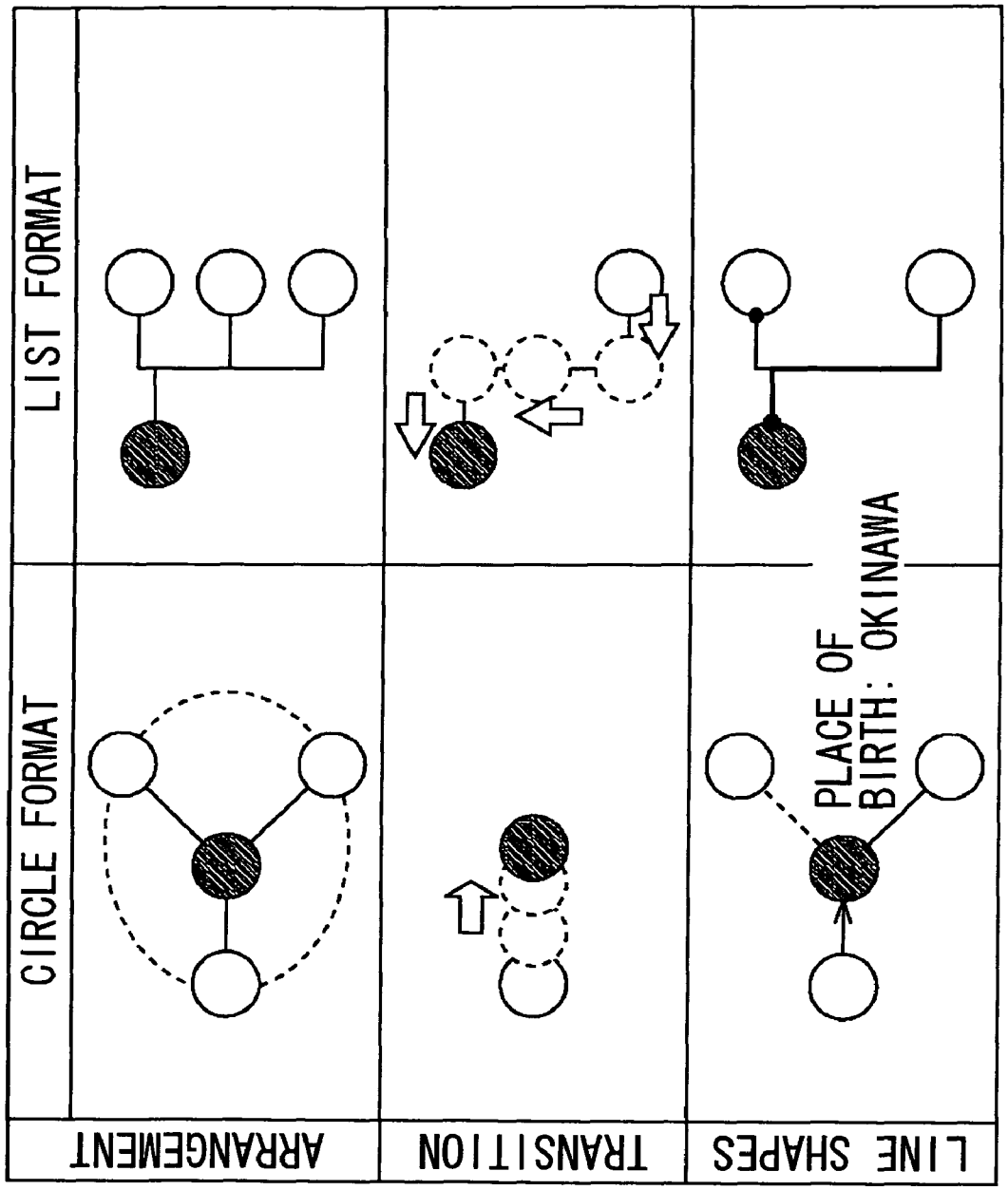
FIG. 22 is a diagram illustrating an icon display method on the jump screen illustrated by FIG. 21.

With reference to FIG. 22, a method of displaying icons on the jump screen will be described.

FIG. 22 shows the arrangement of icons on the jump screen, the transition of icons and line shapes, in that order. The hatched circles in FIG. 22 mean the selected artist icon corresponding to the selected artist, while white circles mean the associated artist icon corresponding to the artist associated with the selected artist. Foe ease of explanation, the icon is in the shape of a circle. However, the icon could be in another shape.

An example of the arrangement in a circle format will be described. As described above by FIG. 21, on the jump screen, the selected artist icon and the associated artist icons are arranged in a circle: the selected icon is on the center of the circle and the associated artist icons are on its circumference.

As shown in FIGS. 21 and 22, the circle is drawn by continuous or dotted lines, or may not be displayed. The circle can be an ellipse or a polygon. Some parts of the circumference may not be displayed instead of displaying the selected icons or characters on them. For example, as illustrated later by FIG. 39, some parts of a polygon may not be displayed instead of displaying the selected icons and characters on the periphery of the polygon. In this case, the icon on the center of the polygon (or the circle) may be connected with the selected icons or characters on the periphery of the polygon (or on the circumference of the circle) by continuous or dotted lines.

The associated artist icons may move on the circumference, while the selected artist icon remains at the same place.

That is to say, if the associated artist icon on the circumference is selected to become the selected artist icon, the associated artist icon on the circumference moves to the center of the circle in accordance with arrows. As a result, the center of the circle displays the associated icon, which was disposed on the circumference, as the updated selected artist icon. In this case, the transition of the icon moving from the circumference to the center is displayed on the jump screen, as illustrated by circles with dotted lines.

Therefore, a user can easily understand the selected icon moving to the place where the selected icon should be displayed.

In addition, lines are displayed between the selected artist icon and the associated artist icons, indicating the relationship between them. The association between the selected artist icon and the associated artist icons may be indicated by various lines, such as arrows, dotted lines, bold lines and various color lines. The description (characters) may be displayed to indicate the relationship between the selected artist icon and the associated artist icons, such as 'Place of Birth: Okinawa' which-means both the selected artist and the associated artist come from Okinawa.

Another way of arranging icons is list format (tree format) where the selected artist icon and the associated artist icons are displayed in parent-child relationship: the selected artist icon is displayed as a parent and the associated artist icons are displayed as children. In the same way as the circle format, the associated artist icons on the children positions may move, while the selected artist icon on the parent position remains there.

In addition, if the associated artist icon on the children position is selected to become the selected artist icon, the associated artist icon on the children position moves to the parent position in accordance with arrows. As a result, the parent position displays the associated icon, which was disposed on the children position, as the updated selected artist icon. In the same way as the circle format, the transition of the icon moving from the children position to the parent position is displayed on the jump screen, as illustrated by circles with dotted lines.

In this line format, lines are also displayed between the selected artist icon and the associated artist icons, indicating the relationship between them. The association between the selected artist icon and the associated artist icons may be indicated by various lines, such as a line whose ends (the parts of the line where the line connects with the icon) are formed in not arrows but circles.

FIG. 23 shows another example of the configuration of the link display section. The parts of FIG. 23 have been designated by the same symbols and marks as the corresponding parts of FIG. 21. Therefore, their description will be omitted.

FIG. 23 shows the link display section 521 displaying a user related link (also referred to as Friends Jump), which indicates other users associated with the user.

The associated users for example include users authenticated between them through a server and the like; and users who belong to the same group set through a server and the like.

The link display section 521 displays an icon of 'User name A' (also referred to as a user icon A) on the center of the circle 531. The users associated with the user of 'User name A' include users of 'User name B', 'User name C', 'User name D', 'User name E', 'User name F', 'User name G', 'User name H' 'User name I'. These users' icons (also referred to as user icons B, C, D, E, F, G, H and I) are displayed on the circumference of the circle 531.

With the above link display section 521 of the jump screen 511 on which the user icon A is selected, when the displayed screen is switched to the map screen 311, the map of the map display section 321 of the map screen 311 displays the grid circle 332 on the cell associated with the content data that is listed in the playback history (Played order list) of the user of the user icon A as illustrated by FIG. 20.

In addition, when the displayed screen, the jump screen 511 whose link display section 521 has the user icon A selected, is switched to the play list screen 411, the play list display section 421 of the play list screen 411 displays, as shown in FIG. 20, a play list including the content data listed in the playback history of the user of the user icon A.

For example, the following describes a case in which the playback history of a user B who is associated with the user A of the PD 5 is displayed. The playback history of the user B (FIG. 20 described below stored in the PD 5 of the user B is transmitted from the PD 5 of the user B to the content server 3 through wireless communication or the like.

The content server 3 wirelessly transmits the playback history of the user B to the PD 5 of the user A who is associated with the user B. In accordance with the user A's operation, the PD 5 of the user A selects the user icon B out of the user related link displayed on the link display section 521 of the display section 131 to select the playback history of the user B. After that, when the user A pushes the view button 341, the PD 5 of the user A switches the displayed screen to the play list screen 411.

As a result, the play list display section 421 of the play list screen 411 displays the play list including the content data listed in the playback history of the user B, as shown in FIG. 20.

In this manner, when another user icon is selected out of the user related link on the link display section 521 and then the displayed screen is switched to the play list screen, a play list is displayed based on another user's playback history. This allows a user to easily view or listen to the content data his/her friends like. Therefore, the user can view or listen to the content data in the field that he/she was not interested in.

Figure 24:
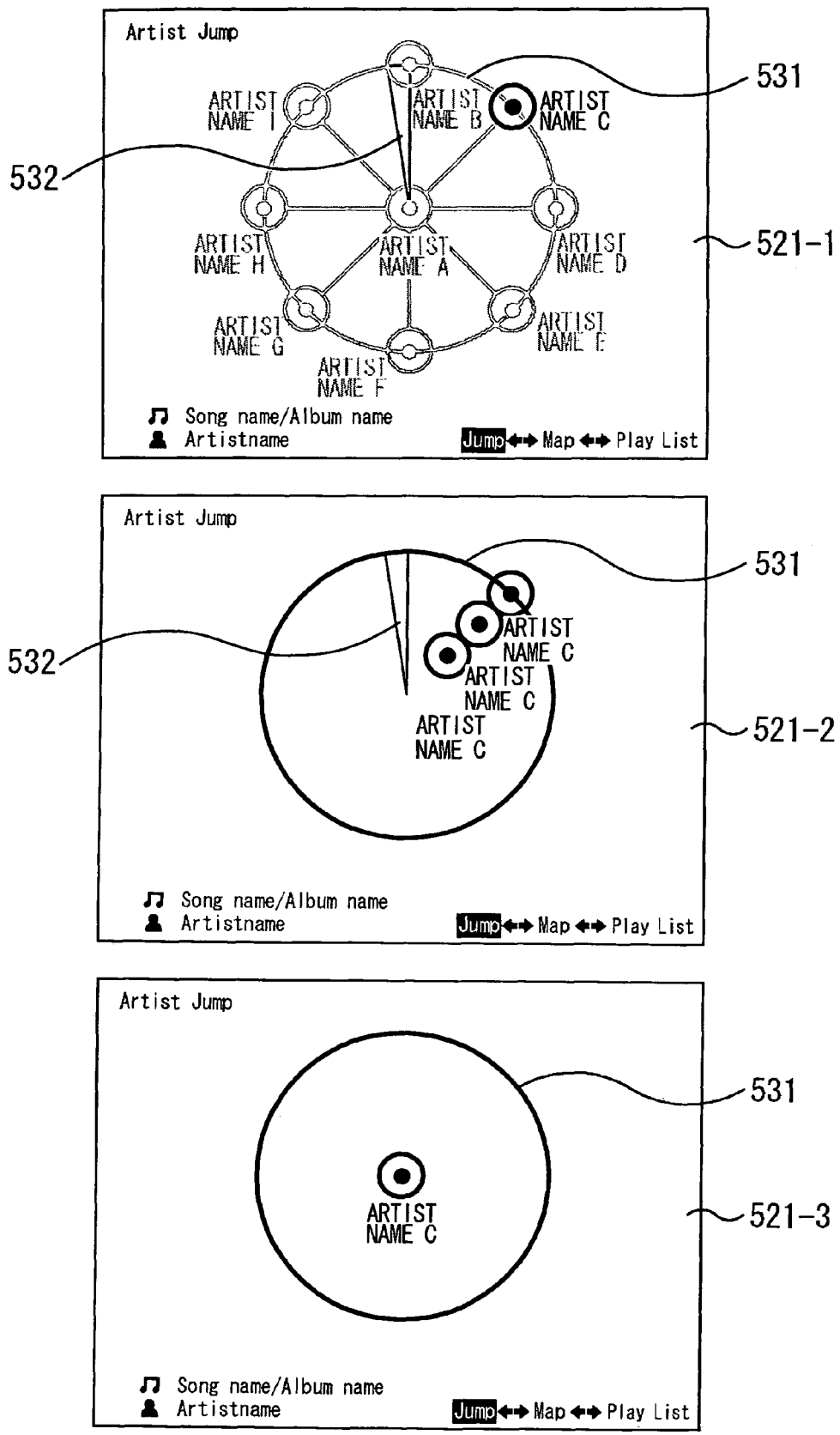
FIG. 24 is a diagram illustrating the transition on the jump screen illustrated by FIG. 21.
Figure 25:
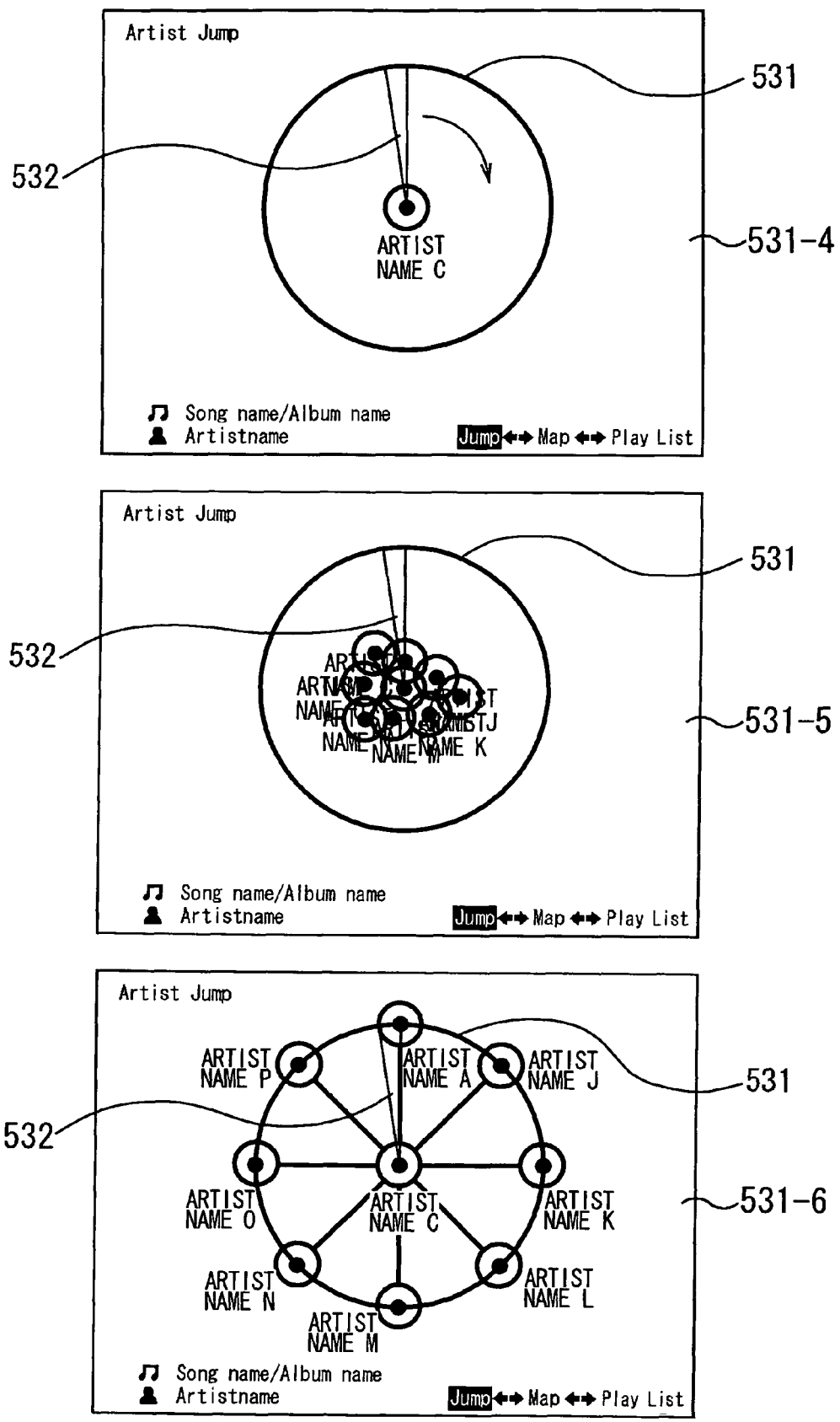
FIG. 25 is a diagram illustrating the transition on the jump screen illustrated by FIG. 21.

With reference to FIGS. 24 and 25, the transition of the jump screen will be described.

For example, while the display section 131 displays the link display section 521 shown in FIG. 21, a user's finger or touch pen pushes a position on the touch panel 132 which corresponds to the artist icon C. In response to that, the PD 5 selects the artist icon C on the circumference of the circle 531, and then displays the link display section 521-1 (FIG. 24) where only the artist icon C remains at the same place while other artist icons on the center and circumference of the circle 531 fade out by animation.

The PD 5 then displays the link display section 521-2 where the artist icon C moves from the position on the circumference of the circle 531, where the artist icon C was placed, to the position (i.e. the center of the circle 531), where the artist icon A was placed (see the link display section 521 in FIG. 21), by animation. After that, the PD 5 displays the link display section 521-3 where the artist icon C, which was selected by the user, is displayed at the center of the circle 531.

After the artist icon C is displayed at the center of the circle 531, the PD 5 displays the link display section 521-4 (FIG.

25) where the sector-shaped mark 532 rotates on the center of the circle 531 by animation, as if it searches artists associated with the artist of the artist icon C.

After that, the PD 5 displays the link display section 521-5 which starts displaying artist icons of the artists associated with the artist of the artist icon C as if they originated from the artist icon C, or the center of the circle 531. The link display section 521-5 then moves the originated artist icons to predetermined positions on the circumference of the circle 531 by animation. The PD 5 subsequently displays the link display section 521-6 which displays the artist icons of the artists associated with the artist of the artist icon C (i.e. an artist icon A, an artist icon J, an artist icon K, an artist icon L, an artist icon M, an artist icon N, an artist icon O and an artist icon P) on predetermined positions on the circumference of the circle 531.

In this manner, the PD 5 displays the selected artist icon C at the center of the circle 531 by animation. In addition, the PD 5 displays the artist icons of the artists associated with the artist of the selected artist icon C on the circumference of the circle 531 by animation. This allows a user to easily understand that the artist icon C is selected, and that the artist icons on the circumference of the circle are associated with the selected artist icon C.

By the way, in the above description, the touch panel 132 (the touch panel type display 116) is applied. Alternatively, other devices, such as a display and an operation input section with a mouse, can be applied to provide the same capability of displaying the screens.

Figure 26:
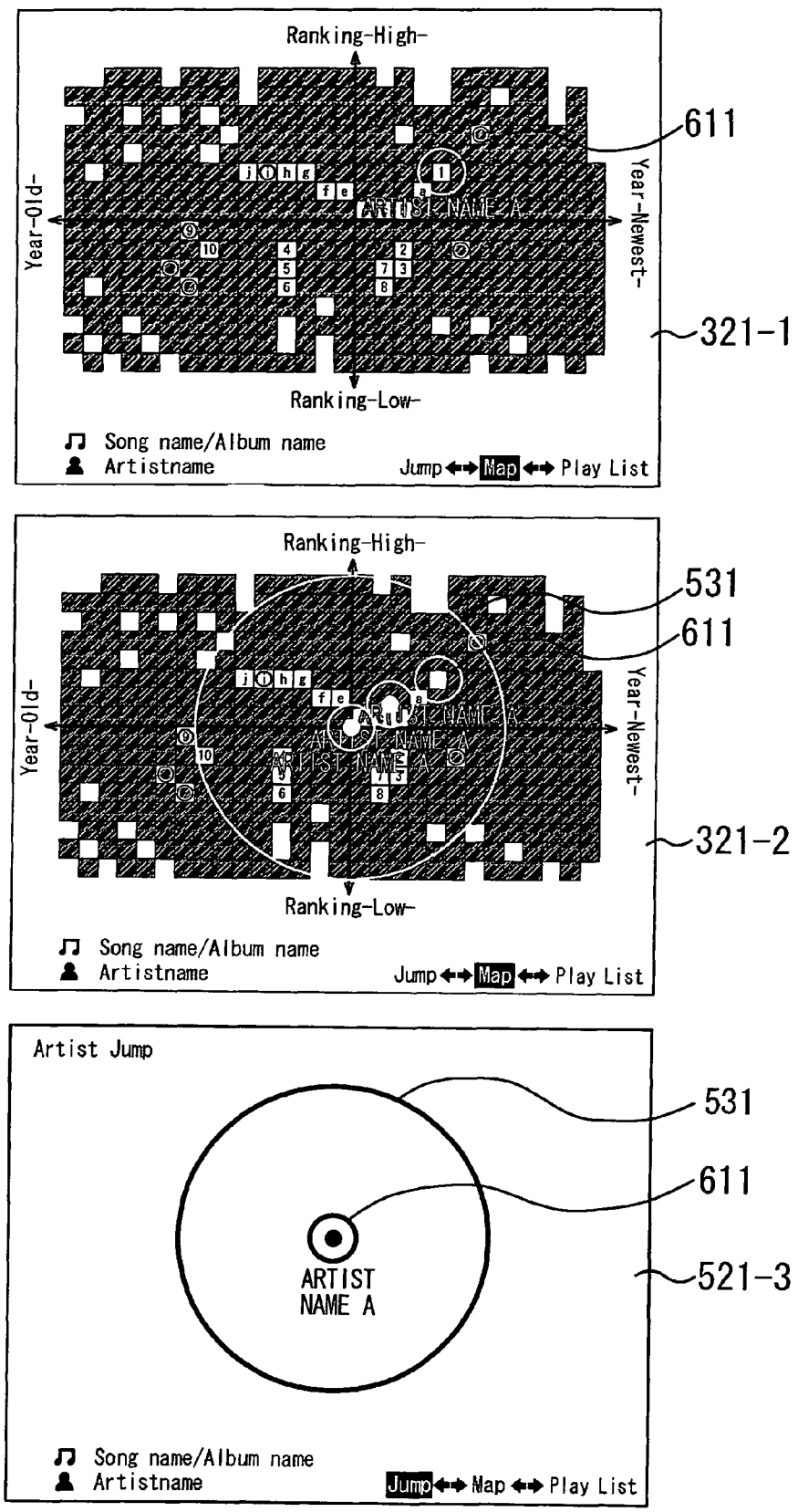
FIG. 26 is a diagram illustrating the transition from the map screen (FIG. 10) to the jump screen (FIG. 21)

With reference to FIG. 26, the transition from the map screen to the jump screen will be described.

For example, when the display section 131 is displaying the map display section 321 shown in FIG. 10 where the cell of '1' has been selected and determined while playing back the content data listed in the play list associated with the cell of '1', the user's finger or touch pen pushes the view button 341 to switch to the jump screen. In response to that, the PD 5 displays the transition from the map screen to the jump screen by animation.

That is to say, the PD 5 acquires an artist ID of the currently-played content data from the content metadata table 181, and then displays the map display section 321-1 shown in FIG. 26 where an artist icon 611 of the artist of the acquired artist ID is displayed on the cell of '1'.

After displaying the artist icon 611, the PD 5 displays the map display section 321-2 shown in FIG. 26 where the circle 531 (equivalent to the one displayed on the link display section 521) is displayed. The map display section 321-2 then moves the artist icon 611, which was displayed at the cell of '1', to the center of the circle 531 by animation. In addition, the displayed map of the map display section 321 fades out.

After that, the PD 5 displays the link display section 521-3 shown in FIG. 26 where the artist icon 611 corresponding to the currently-played content data is placed at the center of the circle 531.

After the artist icon 611 is displayed at the center of the circle 531, the PD 5 performs the same process as the one described by FIG. 25. Therefore, their description will be omitted. That is to say, after displaying the artist icon 611 at the center of the circle 531, the PD 5 displays the animation of the link display section 521-4 and link display section 521-5 (FIG. 25), and then the link display section 521 where the artist icon A (the artist icon 611) is placed at the center of the circle 531.

For example, even if the currently-displayed screen is related to next screen, a general device usually just switches the currently-displayed screen to the next one. Therefore, it is hard for a user to recognize their relationship.

However, in the present embodiment, to switch the map screen to the jump screen, the device displays the animation where the artist icon used for the jump screen is generated from the currently-played cell (i.e. the selection-determined cell) and then the generated artist icon is placed at the center of the circle 531 on the jump screen. This allows a user to easily understand the transition from the map screen to the jump screen.

Figure 27:
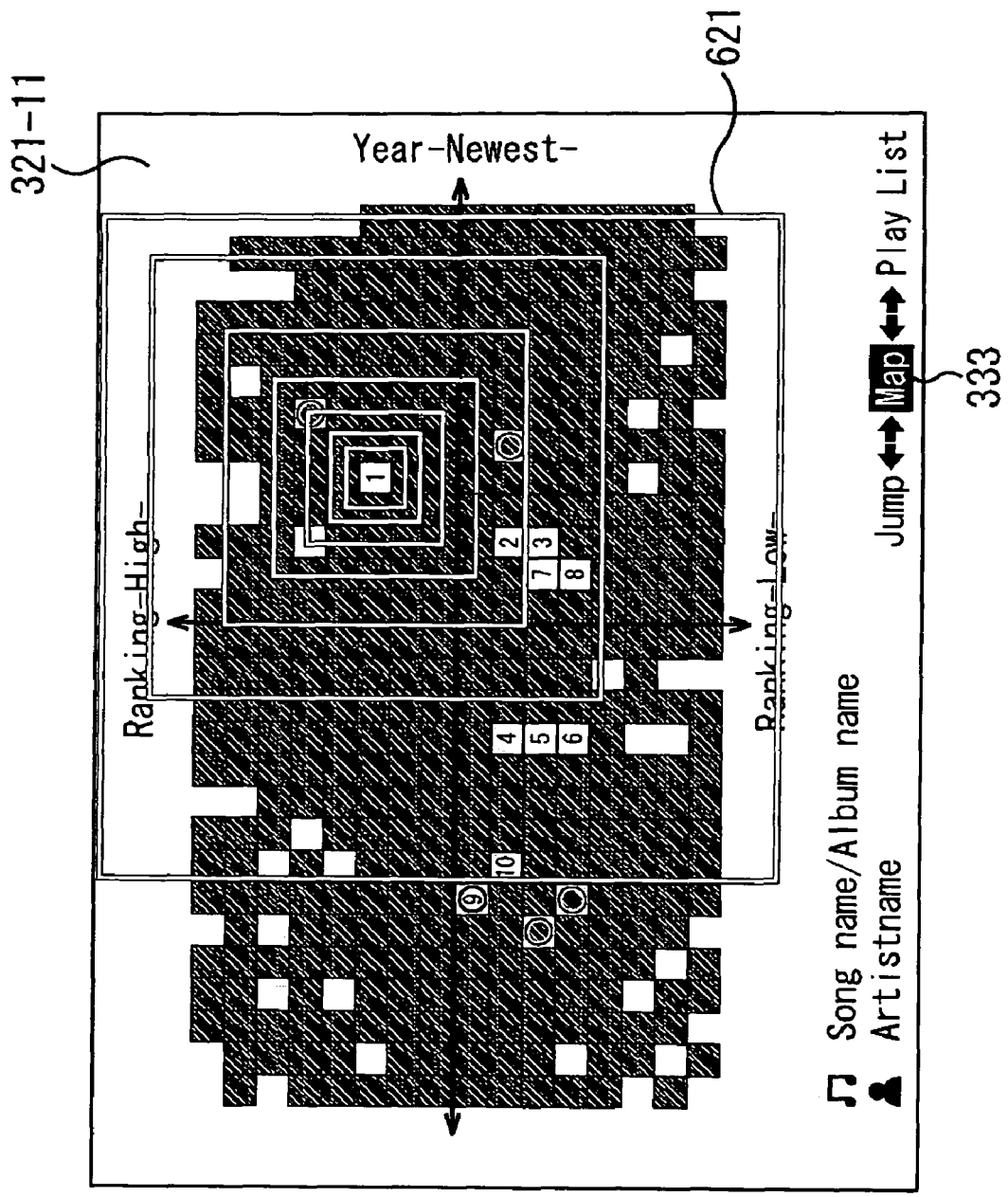
FIG. 27 is a diagram illustrating the transition from the map screen (FIG. 10) to the play list screen (FIG. 17)

With reference to FIG. 27, the transition from the map screen to the play list screen will be described.

For example, when the display section 131 displays the map display section 321 shown in FIG. 10 where the selection of the cell of '1' is completed and at the same time the content data listed in the play list associated with the cell of '1' are played back, a user's finger or touch pen pushes the view button 341 to switch to the play list screen. In response to that, the PD 5 displays, for example, the animation of the transition where the screen displayed is switched from the map screen to the play list screen.

That is to say, the PD 5 displays the animation on the map display section 321-11 (FIG. 27) where the cell of '1' produces a plurality of rectangular objects (seven pieces, in this case as shown in FIG. 27) such that they gradually increase in size as if the play list zooms up from the cell of '1'. As a result, the PD 5 displays the play list screen 411 where the play list display section 421 (FIG. 17) is displayed.

This allows the PD 5 to switch the map screen to the list screen in an easy-to-understand manner, compared to the general method. Therefore, a user can easily recognize that the PD 5 starts to display the play list corresponding to the cell of '1'.

In the above description, the touch panel 132 (the touch panel type display 116) is applied. Alternatively, devices, such as a display with an operation input section like a mouse, can be applied to display the same screens and animation.

Figure 28:
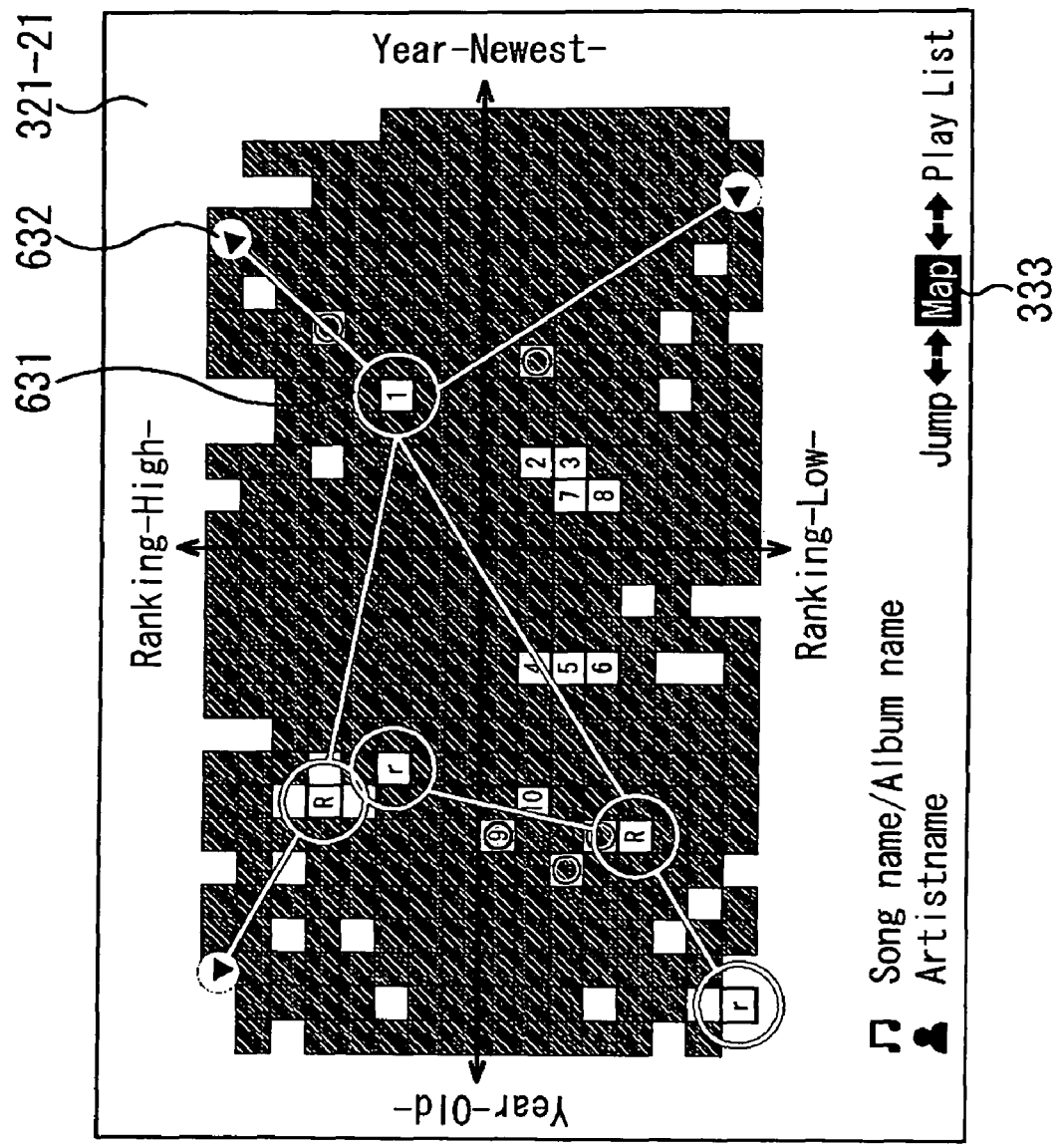
FIG. 28 is a diagram showing another example of the map display section shown in FIG. 10.

FIG. 28 shows another example of the map display section.

As shown in FIG. 28, the map display section 321-21 highlights the cell of '1', which is associated with the currently-played content data, with a small circle 631. The cell of 'R' is associated with the content data of artists related to the artist of the currently-played content data, and is highlighted by a small circle 631. The cell with 'r' is associated with the content data of artists related to the artists of the content data associated with the cell of 'R', and is highlighted by a small circle 631.

Lines connect the small circles 631 with one another according to their relationship. Arrow marks 632, which are connected with the small circles 631 through the lines, indicates that there are cells outside the map display section 321-21 which are associated with the content data of artists who are related to the artists of the content data associated with the cells highlighted by the small circles 631 connected to another end of the lines.

In this manner, the map display section 321-21 shows the relationship of the artists of the content data on the map. This highlights the content data of the related artists on the jump screen 511 as well as those of the selected artists, while the grid circles 332 (FIG. 10) only highlights the content data of the selected artists on the jump screen 511.

That is to say, the grid circles 332 are displayed based on the information selected through the jump screen, while characters of 'R' and 'r' are displayed based on the associated information of the jump screen. Accordingly, to highlight those relevant cells among others (to indicate the associated information originated from the jump screen), other methods can be applied instead of 'R' and 'r' in the same way as the grid circles 332: they can be differently-shaped cells (triangle or rectangular), blinking cells, cells with different shape, color and/or brightness. In addition, the lines connecting the small circles 631 with one another can be other shapes, colors and/or types.

In other words, the map display section 321-21 displays both the map screen 311 and the jump screen 511.

Figure 29:
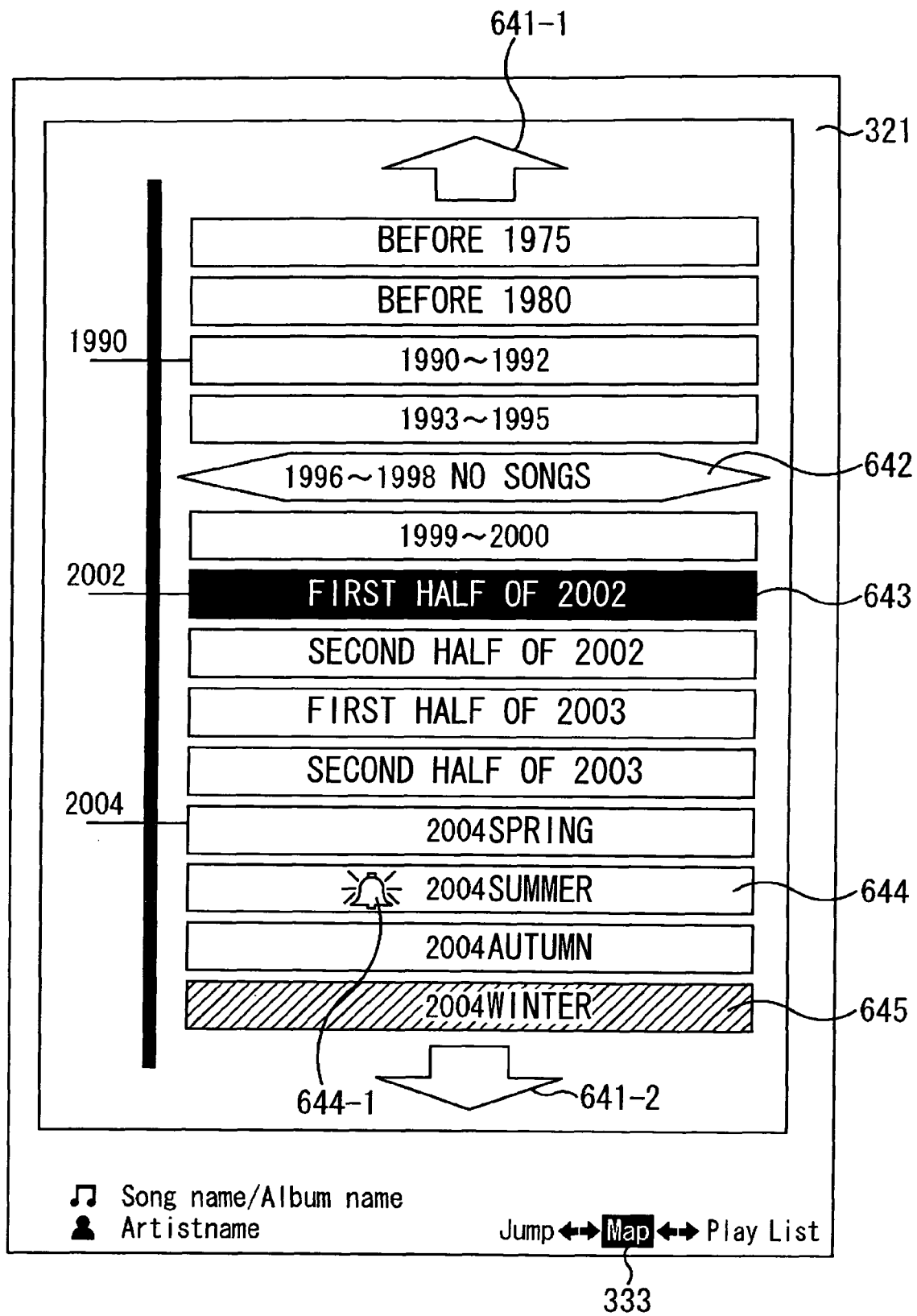
FIG. 29 is a diagram showing another example of the map display section shown in FIG. 10.

FIG. 29 is a diagram illustrating another example of the map display section.

The map on the map display section 321 shown in FIG. 29 includes an axis of Date (Year) of the content metadata. A plurality of cells, each of which is divided by a certain range of parameter, is disposed on the map.

The characters indicating years (1990, 2002, and 2004) are listed from the upper side of the vertical axis to the under side in order of time. The upper side of the vertical axis means old, while the under side of the vertical axis means new. The scales of the axis may not be constant.

The map places a plurality of items (also referred to as cells), each of which is divided by a certain range of parameter on the vertical axis, in a vertical direction. As for the date of the content metadata, each cell is associated with a play list including at least one content data with date (a certain range of parameter) displayed on each cell.

Arrow marks 641-1 and 641-2 on the top and bottom areas of the map indicate that there are other cells outside the map display section 321. When a user pushes the arrow marks 641-1 and 641-2, the map display section 321 scrolls the cells to display the other cells existed in that direction.

Each cell on the map displays numeric characters indicating date of the content data included in that cell.

That is to say, the map displays cells from its top in the following order: a cell with 'Before 1975', which is associated with a play list including at least one content data released before 1975; a cell with 'Before 1980', which is associated with a play list including at least one content data released after 1976 and before 1980; a cell with '1990-1992', which is associated with a play list including at least one content data released during 1990 to 1992; a cell with '1993-1995', which is associated with a play list including at least one content data released during 1993 to 1995; a cell 642 with '1996-1998 No Songs', which is not associated with any content data released during 1996 to 1998 and is in a different shape (hexagon) compared to other cells (rectangular); a cell with '1999-2000', which is associated with a play list including at least one content data released during 1999 to 2000; a cell 643 with 'First Half of 2002', which is associated with a play list including at least one content data released during the first half of 2002, and is black, which is a different color from that of other cells, because corresponding content data are currently played back in response to a user's operation; a cell with 'Second Half of 2002', which is associated with a play list including at least one content data released during the second half of 2002; a cell with 'First Half of 2003', which is associated with a play list including at least one content data released during the first half of 2003; a cell with 'Second Half of 2003', which is associated with a play list including at least one content data released during the second half of 2003; a cell with '2004 Spring', which is associated with a play list including at least one content data released during the spring of 2004; a cell 644 with '2004 Summer', which is associated with a play list including at least one content data released during the summer of 2004, and is highlighted by an icon 644-1 indicating that this cell includes the content data related to a user; a cell with '2004 Autumn', which is associated with a play list including at least one content data released during the autumn of 2004; and a cell 645 with '2004 Winter', which is associated with a play list including at least one content data released during the winter of 2004, and is displayed in different color (hatching in FIG. 29) from the selection-determined cell and other cells to indicate the current date.

The cells bookmarked by the user (not shown) may be displayed in different color, shape and/or pattern from the others.

In this manner, the map on the map display section 321 displays the cells each of which is divided by a certain range of parameter related to date. Therefore, a user can easily choose and view (or listen to) the content data of his/her desired date by selecting the cells on the map by his/her touch pen or finger.

In the above description, for ease of explanation, the background color of the content selection screen is all white. However, the background color is black actually. Alternatively, the background may be displayed in different color.

Figure 30:
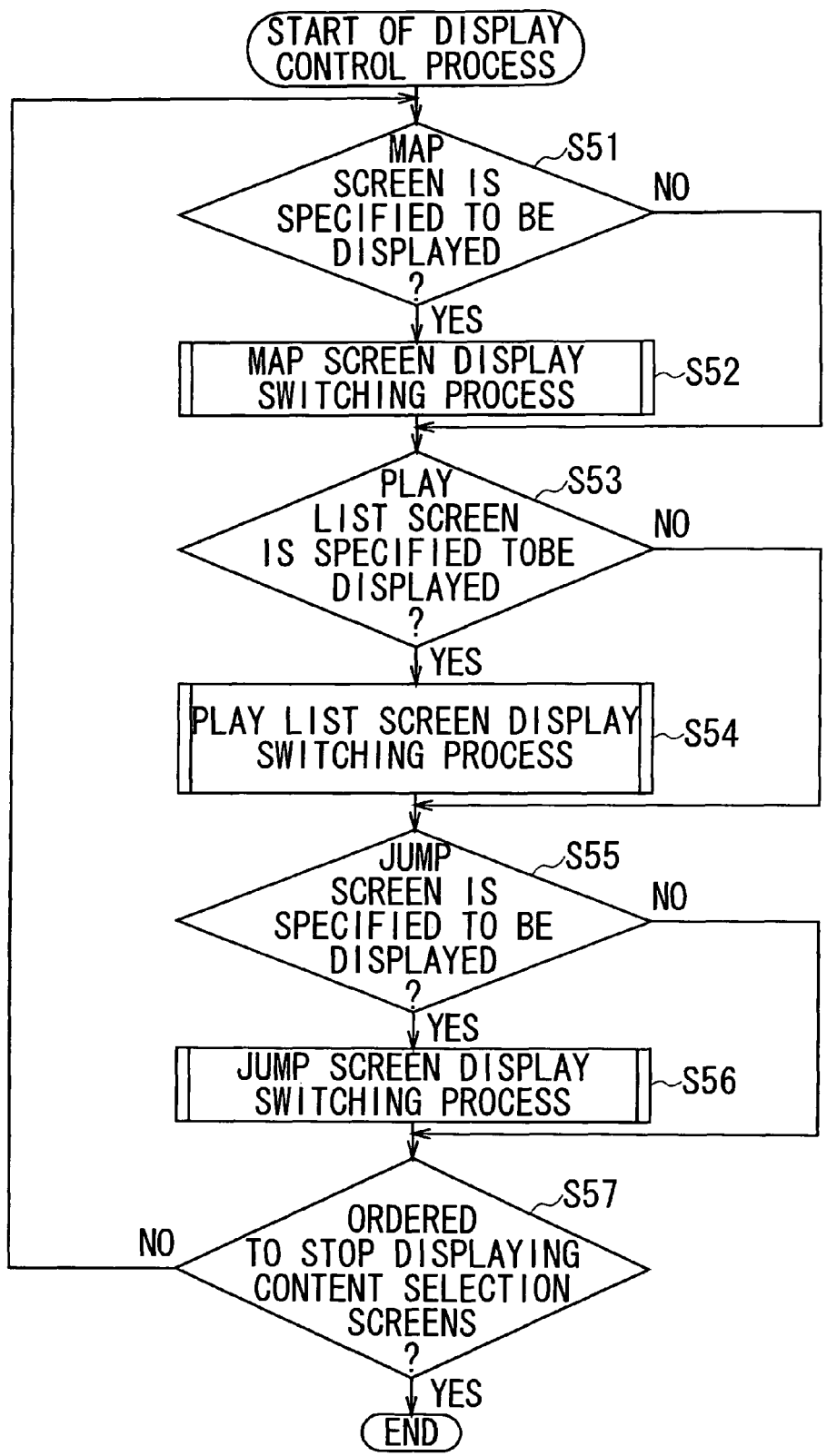
FIG. 30 is a flowchart illustrating a display control process of the content selection screen of the PD shown in FIG. 1.

With reference to a flowchart in FIG. 30, a display control process of the content selection screen on the PD 5 will be described.

For example, to view or listen to the content data recorded on the PD 5, a user operates the touch panel 132 on the display section 131 of the PD 5 by using his/her finger or touch pen and directs the PD 5 to display the content selection screen.

The input module 153 inputs an operation signal, which corresponds to the user's operation of touch panel 132 on the display section 131, into the selection location acquisition section 211. The selection location acquisition section 211 acquires, from the operation signal from the input module 153, selection location information that directs the PD 5 to display the content selection screen, and then starts the display control process shown in FIG. 30.

The selection location acquisition section 211 at step S51 checks whether or not the map screen is specified to be displayed. As for the content selection screen, the initial setting of the PD 5 is to display the map screen, for example.

Accordingly, the selection location acquisition section 211 at step S51 determines that the map screen is specified. In this case, the selection location acquisition section 211 controls the display format management section 212 to define the map screen as the one to be displayed, and then proceeds to step S52. At step S52, the selection location acquisition section 211 controls the information generation control section 214 to perform a map screen display switching-process. That is to say, the information generation control section 214 performs a process (also referred to as a map screen initial display process) of displaying the map screen when starting displaying the content selection screens. Whereas when another screen is displayed, the information generation control section 214 performs a process of switching the displayed screen to the map screen.

Figure 31:
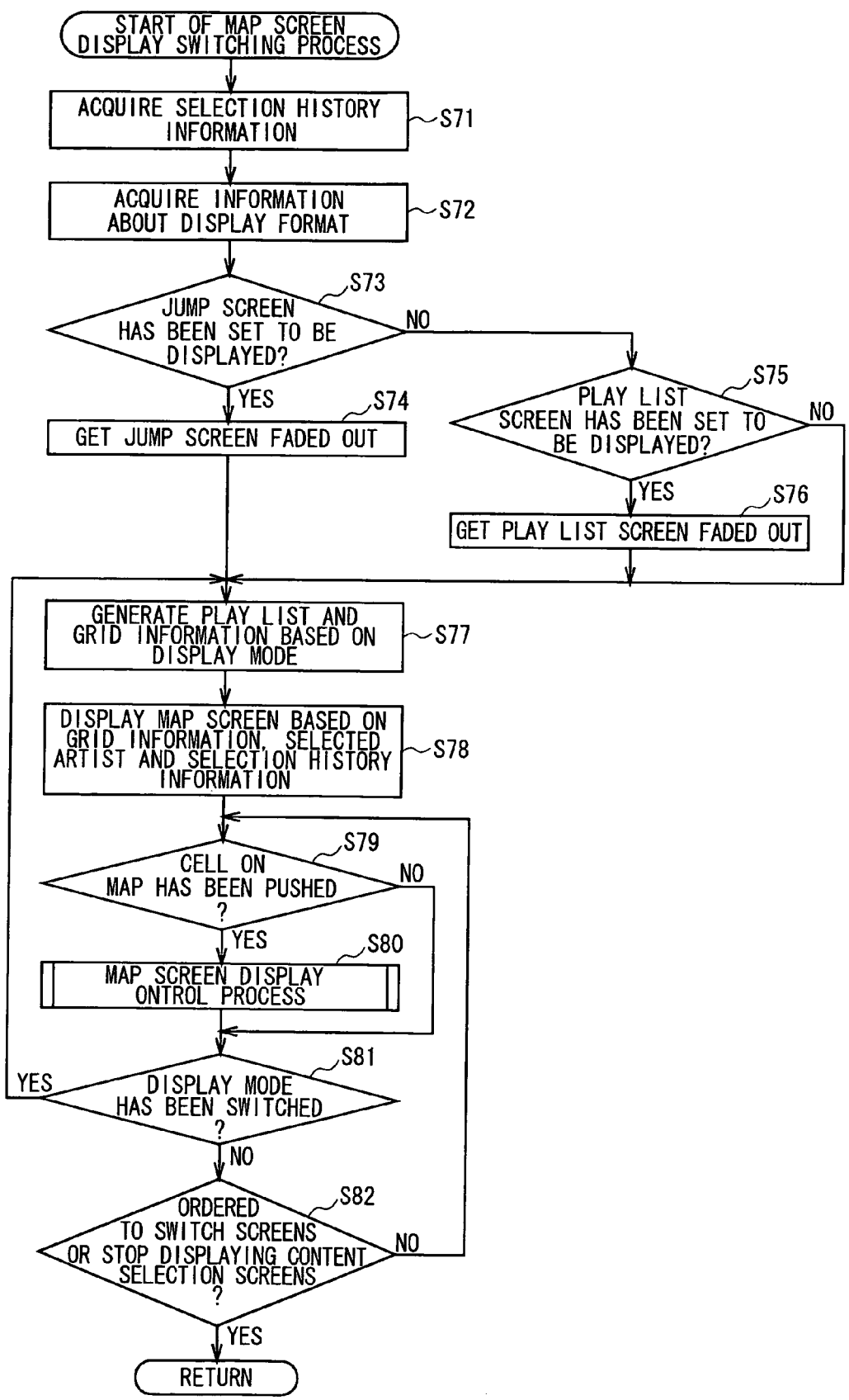
FIG. 31 is a flowchart illustrating a map screen display switching process at step S52 in FIG. 30.

The map screen display switching process at step S52 displays, based on the selection history information, the map screen where the play list is selected to play back the content data listed in the play list (the map screen display switching process will be described in detail later by FIG. 31). In an example shown in FIG. 30, after the playback of the content data on the map screen is completed, the next content data listed in the play list is played back, and then subsequent content data alike until the user shut down it.

The map screen display switching process at step S52 is repeated until the user operates the touch panel 132 to direct the PD 5 to switch the screens or stop displaying the content selection screens. When the user operates the touch panel 132 to direct the PD 5 to switch the screens or stop displaying the content selection screens, the process proceeds to step S53.

That is to say, when the user operates the touch panel 132 to direct the PD 5 to switch the content selection screens or stop displaying the content selection screens, the input module 153 inputs an operation signal, which corresponds to the user's operation of the touch panel, into the selection location acquisition section 211. In response to that, the selection location acquisition section 211 acquires the selection location information from the input operation signal. The selection location acquisition section 211 then determines, based on the acquired selection location information, that the user has directed the PD 5 to switch the screens or stop displaying the content selection screens, and then proceed to step S53.

On the other hand, when the selection location acquisition section 211 at step S51 determines that the map screen has not been specified, the selection location acquisition section 211 proceeds to step S53 without performing the process of step S52.

At step S53, the selection location acquisition section 211 checks, based on the selection location information acquired from the operation signal supplied from the input module 153, whether or not the play list screen is specified to be displayed. When the selection location acquisition section 211 determines that the play list screen has been specified, the selection location acquisition section 211 controls the display format management section 212 to define the play list screen as the one to be displayed, and then proceeds to step S54. At step 54, the selection location acquisition section 211 controls the information generation control section 214 to perform a play list screen display switching process, which is to say the information generation control section 214 switches the displayed screen to the play list screen.

Figure 33:
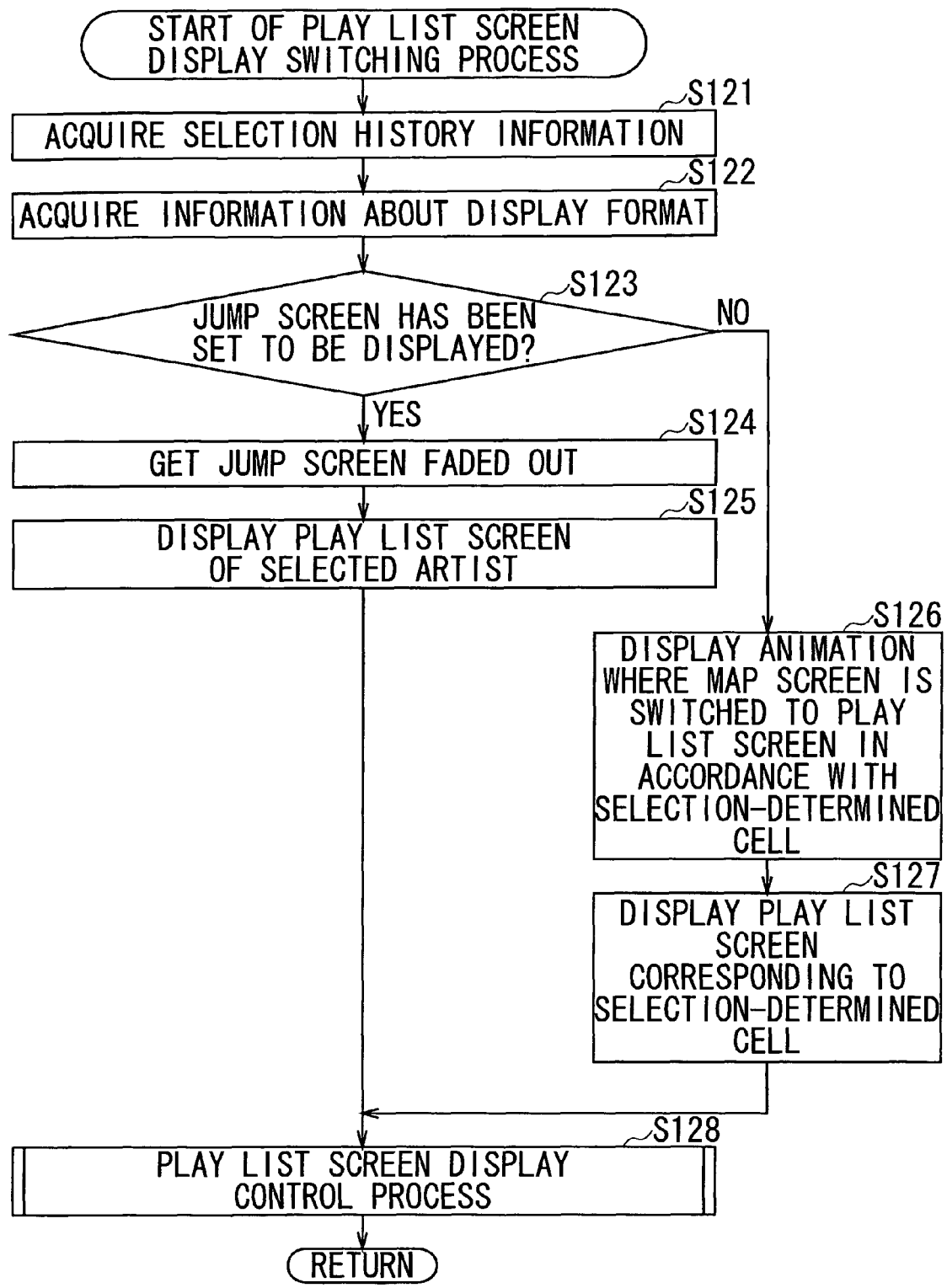
FIG. 33 is a flowchart illustrating a play list screen display switching process at step S54 in FIG. 30.

The play list screen display switching process at step S54 displays, based on the selection history information, the play list screen where the content data is selected by the user to play back it (this play list screen display switching process will be described in detail with reference to FIG. 33).

The play list screen display switching process at step S54 is repeated until the user operates the touch panel 132 to direct the PD 5 to switch the screens or stop displaying the content selection screens. When the user operates the touch panel 132 to direct the PD 5 to switch the screens or stop displaying the content selection screens, the process proceeds to step S55.

At step S53, when the play list screen has not been defined as the one to be displayed, the process proceeds to step S55 without performing the process of step S54.

At step S55, the selection location acquisition section 211 checks, based on the selection location information acquired from the operation signal supplied form the input module 153, whether or not the jump screen is specified to be displayed. When the selection location acquisition section 211 determines that the jump screen has been specified, the selection location acquisition section 211 controls the display format management section 212 to define the jump screen as the one to be displayed, and then proceeds to step S56. At step S56, the selection location acquisition section 211 controls the information generation control section 214 to perform a jump screen display switching process, which is to say the information generation control section 214 switches the displayed screen to the jump screen.

Figure 35:
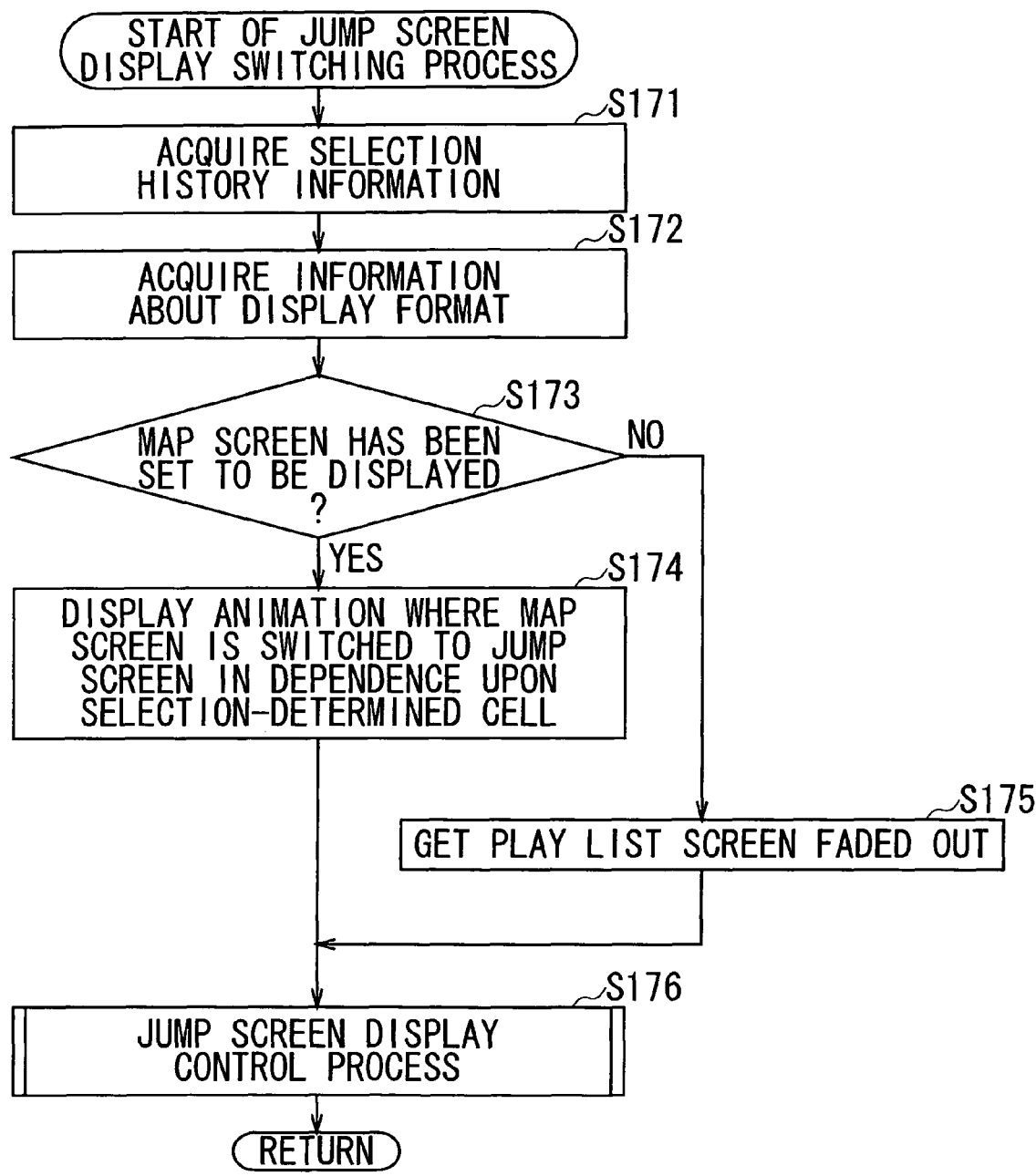
FIG. 35 is a flowchart illustrating a jump screen display switching process at step S56 in FIG. 30.

The jump screen display switching process at step S55 displays, based on the selection history information, the jump screen where the artist is selected by the user to display the information associated with selected artist (this jump screen display switching process will be described in detail with reference to FIG. 35).

The jump screen display switching process at step S56 is repeated until the user operates the touch panel 132 to direct the PD 5 to switch the screens or stop displaying the content selection screens. When the user operates the touch panel 132 to direct the PD 5 to switch the screens or stop displaying the content selection screens, the process proceeds to step S57.

At step S55, when the jump screen has not been defined as the one to be displayed, the process proceeds to step S57 without performing the process of step S56.

The selection location acquisition section 211 at step S57 checks, based on the information from the selection location acquisition section 211, whether or not the PD 5 is ordered to stop displaying the content selection screens. If the selection location acquisition section 211 determines that the PD 5 has not been ordered to stop displaying the content selection screens, the selection location acquisition section 211 returns to step S51 to repeat the subsequent process.

When the selection location acquisition section 211 at step S57 determines, based on the selection location information acquired from the operation signal supplied from the input module 153, that the PD 5 has been ordered to stop displaying the content selection screens, the selection location acquisition section 211 controls the display module 152 to stop displaying the content selection screens, and then end the display control process.

In this way, the PD 5 provides the user with three types of the content selection screens: the map screen where the user can intuitively choose the play list listing his/her desired content data based on the metadata of the content data; the jump screen where the user can select (retrieve) the content data associated with certain content data; and the play list screen where the user can choose the content data out of the play list selected through the map or jump screen.

Therefore, the user can select the content selection screen in accordance with his/her intention. In addition, out of various content data all of which the user does not recognize, he/she can intuitively select and play back the content data in accordance with his/her intention or feeling.

With reference to a flowchart in FIG. 31, the map screen display switching process (at step S52 in FIG. 30) will be described.

When the selection location acquisition section 211 orders the information generation control section 214 to perform the map screen display switching process, the information generation control section 214 at step S71 acquires the selection history information, which is managed by the selection history management section 213, and supplies the acquired selection history information to the map display control section 216, and then proceeds to step S72.

The information generation control section 214 at step S72 acquires the information about display formats (equivalent to display screen information of the previously-displayed screen and display mode information that has been set) from the display format management section 212, and supplies the display mode information to the map display control section 216, and then proceeds to step S73.

The information generation control section 214 at step S73 checks, based on the display screen information of the previously-displayed screen which was acquired form the display format management section 212, whether or not the jump screen has been set to be displayed. When the information generation control section 214 determines that the jump screen has been set to be displayed, the information generation control section 214 proceeds to step S74 to perform a process of switching the jump screen to the map screen, where the information generation control section 214 controls the related link display control section 215 to get the jump screen faded out. The information generation control section 214 then proceeds to step S77.

That is to say, at step S74, the related link display control section 215 generates the screen data or the animation (moving picture or screen frames) where the jump screen fades out, and then supplies the generated screen data to the display module 152. The display module 152 displays, based on the screen data from the related link display control section 215, the screen on the display section 131.

When the background of the displayed screen is black, the jump screen fades out or becomes totally black. When the background of the displayed screen is white, the jump screen fades out or becomes totally white.

When the information generation control section 214 at step S73 determines, based on the display screen information of the previously-displayed screen which was acquired form the display format management section 212, that the jump screen has not been set to be displayed, the information generation control section 214 proceeds to step S75.

The information generation control section 214 at step S75 checks, based on the display screen information of the previously-displayed screen which was acquired form the display format management section 212, whether or not the play list screen has been set to be displayed. When the information generation control section 214 determines that the play list screen has been set to be displayed, the information generation control section 214 proceeds to step S76 to perform a process of switching the play list screen to the map screen, where the information generation control section 214 controls the list display control section 217 to get the play list screen faded out. The information generation control section 214 then proceeds to step S77.

That is to say, at step S76, the list display control section 217 generates the screen data or the animation (moving picture or screen frames) where the play list screen fades out, and then supplies the generated screen data to the display module 152. The display module 152 displays, based on the screen data from the list display control section 217, the screen on the display section 131.

When the information generation control section 214 at step S75 determines, based on the display screen information of the previously-displayed screen which was acquired form the display format management section 212, that the play list screen has not been set to be displayed, the information generation control section 214 proceeds to step S77 as a map screen initial display process.

The information generation control section 214 at step S77 controls the grid map generation section 232, and checks, in response to the set display mode, the content metadata table 181, and generates a play list of content data corresponding a cell of the grid on the map displayed on the map screen, and generates the grid information about the cell associated with the generated play list, and supplies the grid information to the map display control section 216, and then proceeds to step S78.

The information generation control section 214 at step S78 controls the map display control section 216 to display the map screen based on the grid information generated by the grid map generation section 232, the selection history information and the like.

At this time, if the screen is switched from the jump screen, the information generation control section 214 controls the related link generation section 231 when needed to acquire content data of an artist whose artist icon has been selected. In addition, the information generation control section 214 controls the grid map generation section 232 to supply, to the map display control section 216, the grid information of a play list including the content data acquired by the related link generation section 231.

That is to say, the map display control section 216 at step S78 generates map screen data, based on the currently-set display mode, the grid information generated by the grid map generation section 232 and the playback history of the selection history information. The map display control section 216 then supplies the generated map screen data to the display module 152. At this time, if the screen displayed or the display mode is switched to another one, the selection move history is reset.

The display module 152 displays, based on the map screen data from the map display control section 216, the map screen on the display section 131. At this time, the map screen may fade in.

To retrieve content data, a user checks the map screen on the display section 131, and pushes and moves the cells on the map screen by using his/her finger or touch pen. The user then release the cell pushed (stop pushing the cell) to determine the content data to be viewed. Alternatively, the user may pushes the mode button 342 on the map screen by his/her finger or touch pen to switch the display mode.

The input module 153 input an operation signal, which corresponds to the user's operation for the touch panel 132 on the display section 131, into the selection location acquisition section 211. The selection location acquisition section 211 acquires the selection location information from the operation signal supplied from the input module 153. The selection location acquisition section 211 then at step S79 checks, based on the acquired selection location information, whether or not the cell on the map has been pushed. When the selection location acquisition section 211 determines that the cell on the map has been pushed, the selection location acquisition section 211 at step S80 controls the information generation control section 214 to perform a map screen display control process, and then proceeds to step S81. The map screen display control process will be described in detail with reference to FIG. 32.

That is to say, at step S80, when the user pushes the cell on the map, the selection move history of content and the displayed map are updated accordingly. In addition, when the user pushes the cell and releases the cell pushed, the playback history of the play list corresponding to that cell (so-called selection-determined cell) is updated accordingly, and then the displayed map screen is updated based on the playback history while the content data of the play list corresponding to the cell is played back.

At step S79, when the selection location acquisition section 211 determines that the cell on the grid has not been pushed, the selection location acquisition section 211 proceeds to step S81 without performing the process of step S80.

Based on the acquired selection location information, the selection location acquisition section 211 at step S81 checks whether or not the display mode has been switched. When the selection location acquisition section 211 determines that the display mode has been switched, the selection location acquisition section 211 returns to step S77 and then repeats the subsequent process.

At step S81, when the selection location acquisition section 211 determines that the display mode has not been switched based on the acquired selection location information, the selection location acquisition section 211 proceeds to step S82. Based on the acquired selection location information, the selection location acquisition section 211 at step S82 checks whether or not it has been ordered to switch the screens or stop displaying the content selection screens. When the selection location acquisition section 211 determines that it has been ordered to switch the screens or stop displaying the content selection screens, the selection location acquisition section 211 ends the map screen display switching process, and returns to step S52 (FIG. 30), and then proceeds to step S53.

At step S82, when the selection location acquisition section 211 determines that it has not been ordered to switch the screens or stop displaying the content selection screens, the selection location acquisition section 211 returns to step S79 to repeat the subsequent process.

In this manner, based on the selection history information (the selected artist icon, the selection move history or the playback history), this device produces the map screen data to display the map screen. Therefore, the user can recognize, by only checking the map screen, the artist icon selected by him/her, the cells selected and moved, or the cells currently played or played in the past.

In the above description, the touch panel 132 (the touch panel type display 116) is applied. Alternatively, other devices, such as a display with an operation input section like a mouse, can be applied to provide the same capability.

Figure 32:
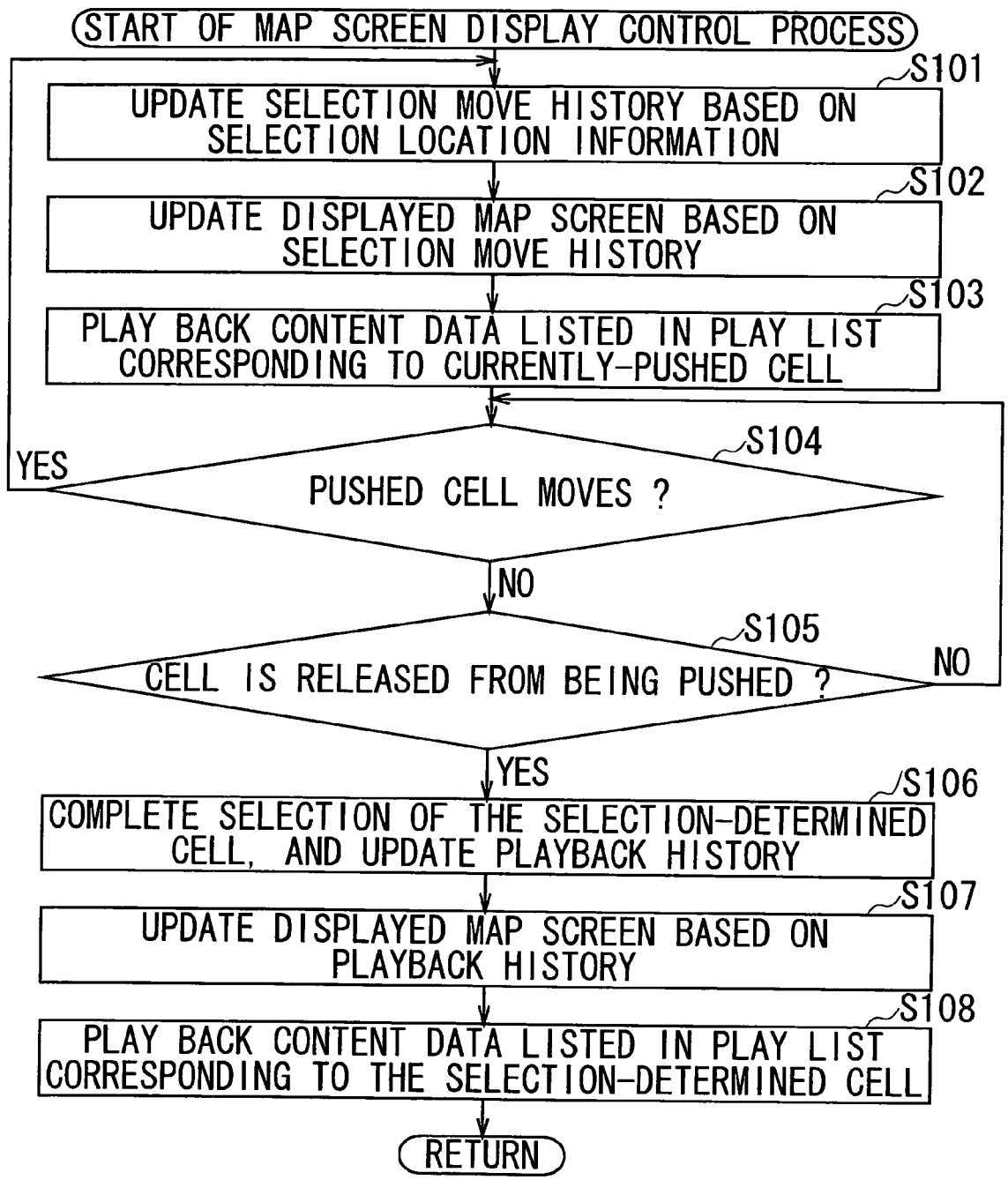
FIG. 32 is a flowchart illustrating a map screen display control process at step S80 in FIG. 31.

With reference to FIG. 32, the map screen display control process (at step S80 of FIG. 31) will be described.

Based on the selection location information acquired from the operation signal supplied from the input module 153, the selection location acquisition section 211 at step S101 updates the selection move history that has been under the control of the selection history management section 213, and then proceeds to step S102. At step S102, the selection location acquisition section 211 controls the information generation control section 214 to update the displayed map screen in accordance with the updated selection move history, and then proceeds to step S103.

That is to say, the selection location acquisition section 211 acquires, out of the selection location information, information about a cell of grid currently being pushed (i.e. a selection move cell), and controls the selection history management section 213 to update the selection move history based on the currently-pushed cell. The information generation control section 214 acquires the selection history information from the selection history management section 213, and then controls the map display control section 216 to update the map screen displayed.

Based on the play list and grid information (including the grid information of the content data of the selected artist) generated by the grid map generation section 232, the play back history and the updated selection move history, the map display control section 216 generates map screen data, and then supplies the generated map screen data to the display module 152. The display module 152 displays the map screen on the display section 131 in accordance with the map screen data supplied from the map display control section 216.

The information generation control section 214 at step S103 supplies the selection location information (about the cell currently being pushed) to the grid map generation section 232, and plays back the content data (for viewing or listening) listed in the play list corresponding the currently-pushed cell, and then proceeds to step S104.

That is to say, based on the play list and the grid information, the grid map generation section 232 acquires the play list corresponding to the currently-pushed cell, and controls the content playback module 154 to play back the content data (for viewing or listening) corresponding to the acquired play list.

The content playback module 154 reads out the content data (for viewing or listening), which corresponds to the play list supplied from the grid map generation section 232, from the content database 172, and plays back the content data to supply it to the output module 155. The output module 155 outputs audio from the speaker 118 in accordance with the data supplied from the content playback module 154.

The selection location acquisition section 211 at step S104 checks, based on the operation signal from the input module 153, whether or not the location of the pushed cell has moved. The selection location acquisition section 211 returns to step S101 to repeat the subsequent process when the selection location acquisition section 211 determines that the location of the pushed cell has moved.

The selection location acquisition section 211 proceeds to step S105 when the selection location acquisition section 211 at step 104 determines that the location of the pushed cell has not moved. At step S105, the selection location acquisition section 211 checks whether or not the cell of the grid on the map is released from being pushed, based on the operation signal from the input module 153. If the selection location acquisition section 211 determines that the cell of the grid on the map is released from being pushed, the selection location acquisition section 211 proceeds to step S106 and controls the selection history management section 213 to set the recently-selected cell as a selection-determined cell. The selection location acquisition section 211 then controls the selection history management section 213 to update the playback history, and then proceeds step S107.

That is to say, the selection history management section 213 under the control of the selection location acquisition section 211 completes the selection of the selection-determined cell, based on the latest selection location information obtained from the selection move history managed, and then updates the playback history.

The selection location acquisition section 211 controls the information generation control section 214, and then at step S107 updates the displayed map screen based on the updated playback history, and then at step S108 plays back the content data listed in the play list corresponding to the selection-determined cell.

That is to say, the information generation control section 214 at step S107 acquires the playback history information from the selection history management section 213, and then controls the map display control section 216 to update the displayed map screen.

Based on the play list and grid information (including the grid information of the content data of the selected artist) generated by the grid map generation section 232, the selection move history and the updated playback history, the map display control section 216 generates map screen data, and then supplies the generated map screen data to the display module 152. The display module 152 displays the map screen on the display section 131 in accordance with the map screen data supplied from the map display control section 216.

The information generation control section 214 at step S108 supplies location information of the determined cell to the grid map generation section 232, and then plays back the content data listed in the play list corresponding to that cell.

That is to say, the grid map generation section 232 acquires the play list corresponding to the selection-determined cell based on the play list and the grid information, and then supplies the acquired play list to the content playback module 154 to play back the content data corresponding to the acquired play list.

The content playback module 154 reads out, from the content database 172, the content data corresponding to the play list supplied from the grid map generation section 232. The content playback module 154 then plays back the content data, and then supplies it to the output module 155. The output module 155 outputs audio from the speaker 118 in accordance with the data supplied from the content playback module 154.

After the process of step S108, the map screen display control process ends. The process returns to step S79 (FIG. 31), and then proceeds to step S80.

In this manner, the content data is played back while the user is selecting a cell. Therefore, the user can select the cell without getting bored, because he/she can enjoy music. In addition, the content data corresponding to that cell is played back while the user is selecting it. Therefore, the user can enjoy it as a trial listening while finding where his/her favorite content data exists on the map. This allows the user to choose his/her favorite content data easily.

With reference to a flow chart in FIG. 33, the play list screen display switching process (at step S54 of FIG. 30) will be described. In this case, for example, the map screen display switching process (at step S52 of FIG. 30) has displayed the map screen where the user then selects a play list on the map screen to play back the content data listed in this play list.

When the selection location acquisition section 211 orders the information generation control section 214 to perform the play list screen display switching process, the information generation control section 214 at step S121 acquires the selection history information that has been managed by the selection history management section 213, and supplies the acquired selection history information to the map display control section 216, and then proceeds to step S122. The initial setting of display mode on the play list screen is a play list mode in this case.

The information generation control section 214 at step S122 acquires information about the display format (i.e. the display screen information about the previous screen) from the display format management section 212, and then proceeds to step S123.

The information generation control section 214 at step S123 checks whether or not the jump screen has been set to be displayed, based on the display screen information (about the previous screen) acquired from the display format management section 212. When the information generation control section 214 determines that the jump screen has been set to be displayed, the information generation control section 214 proceeds to step S124, and controls the related link display control section 215 to perform a process of switching the jump screen to the play list screen where the jump screen fades out, and then proceeds to step S215.

That is to say, at step S124, the related link display control section 215 generates the screen data or the animation (moving pictures or movie frames) where the jump screen fades out, and then supplies the screen data to the display module 152. The display module 152 displays the screen on the display section 131 in accordance with the screen data from the related link display control section 215.

At step S125, the information generation control section 214 controls the related link generation section 231 and the list display control section 217 to display the play list screen of the selected artist in accordance with the playback information of the content data or the selected artist indicated by the selection history information.

That is to say, the related link generation section 231 checks the content metadata table 181 and the artist table 182 to acquire the content data of the artist of the selected artist icon to produce a play list. The list display control section 217 generates play list screen data of the selected artist in accordance with the play list generated by the related link generation section 231 and the currently-played content data, and then supplies the generated screen data to the display module 152.

The display module 152 displays a play list screen of the selected artist on the display section 131 in accordance with the screen data from the map display control section 216.

On the other hand, when the information generation control section 214 at step S123 determines, based on the display screen information (about the previous screen) acquired from the display format management section 212, that the jump screen has not been set to be displayed, the information generation control section 214 proceeds to step S126 as a process of switching the map screen to the play list screen. That is to say, in this case, the previously-displayed screen is the map screen if not the jump screen, because the initial setting on screens to be displayed is the map screen.

By the way, if the initial setting is the play list screen, the play list screen, which corresponds to the selection-determined cell memorized by the selection history management section 213, is displayed, and then the content data listed at the top of the play list is played back.

The information generation control section 214 at step S126 controls the map display control section 216 to display, in accordance with the selection-determined cell, the animation where the map screen is being switched to the play list screen, and then proceeds to step S127.

That is to say, at step S126, the map display control section 216 generates the screen data or the animation (moving pictures or movie frames) where the map screen is being switched to the play list screen as shown in FIG. 27, and then supplies the screen data to the display module 152. The display module 152 displays the screen on the display section 131 in accordance with the screen data form the map display control section 216.

At step S127, the information generation control section 214 controls the grid map generation section 232 and the list display control section 217 to display, in accordance with the selection-determined cell and the like, the play list screen corresponding to the selection-determined cell, and then proceeds to step S128.

That is to say, the grid map generation section 232 at step 77 or S78 (FIG. 32) checks the content metadata table 181 and the play list information of the related link generation section 231, and generates a play list of content data corresponding to a cell on the map displayed on the map screen, and then stores it. The list display control section 217 generates the play list screen data corresponding to the selection-determined cell based on the play list generated by the grid map generation section 232 and the content data to be played, and then supplies the generated screen data to the display module 152.

The display module 152 displays the play list screen on the display section 131 in accordance with the screen data from the map display control section 216.

Figure 34:
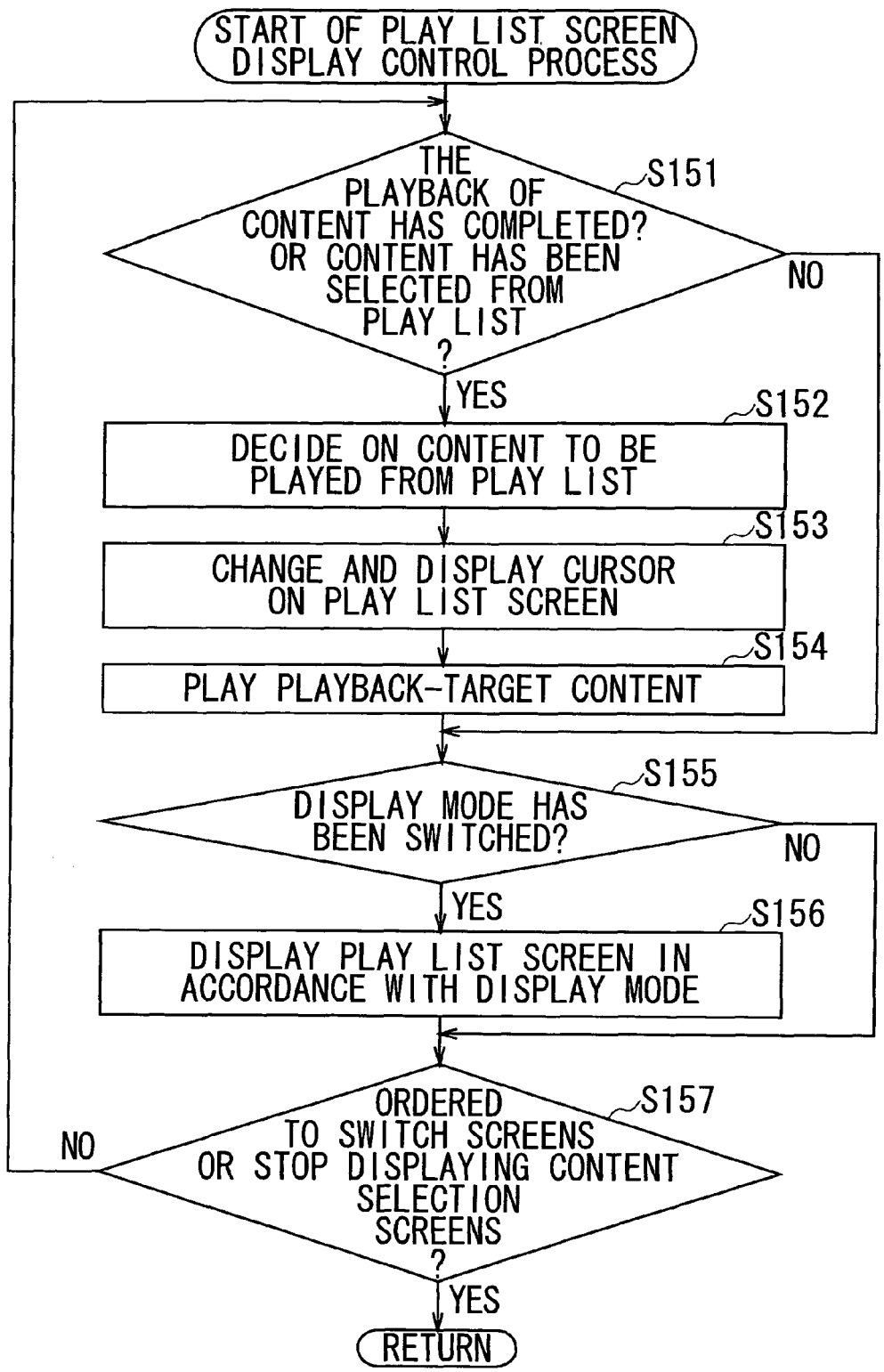
FIG. 34 is a flowchart illustrating a play list screen display control process at step S128 in FIG. 33.

After the play list screen is displayed, the selection location acquisition section 211 at step S128 performs a play list screen display control process. The play list screen display control process at step S128 will be described with reference to FIG. 34.

While the play list screen is being displayed, the content data listed in the play list specified through the map screen continues to be played unless the user orders to stop it. When the playback of the content data ends, the content playback module 154 notifies the selection location acquisition section 211 of the fact that the playback of the content data has completed.

While the play list screen is being displayed, for example, a user checks the play list screen on the display section 131 and utilizes his/her finger or touch pen to select one of the content names on the play list screen, to switch the display mode, to push the view button 341 or the mode button 342

(which then switch the displayed screen), or to order to stop displaying the content selection screen (not shown). When the user performs some operation, the input module 153 inputs an operation signal, which corresponds to the user's operation of the touch panel 132 on the display section 131, into the selection location acquisition section 211.

The selection location acquisition section 211 at step S151 checks whether or not the playback of the content data has completed, or whether or not content data has been selected from the play list. When the selection location acquisition section 211 is notified by the content playback module 154 of the fact that the playback of the content data has completed, the selection location acquisition section 211 at step S151 determines that the playback of the content data has completed, and then proceeds to step S152.

If, based on the selection location information obtained from the operation signal input from the input module 153, the selection location acquisition section 211 at step S151 determines that content data has been selected from the play list, the selection location acquisition section 211 proceeds to step S152.

The selection location acquisition section 211 at step S152 controls the information generation control section 214 to set the content data to be played from the play list, and then proceeds to step S153. That is to say, the information generation control section 214 controls the related link generation section 231 storing corresponding play list, the grid map generation section 232 or the bookmark generation section 233. If the playback of the content data has completed, the information generation control section 214 controls one of those sections to set the content data to be played from the play list. If the selection location information is input from the selection location acquisition section 211, the information generation control section 214 controls one of those sections to set the content data selected by the user as content data to be played (the content data to be played is also referred to as playback-target content data).

The information generation control section 214 at step S153 controls the list display control section 217 to move the cursor on the play list screen in accordance with the playback-target content, and then proceeds to step S154.

The information generation control section 214 at step S154 controls one of the following sections storing corresponding play list: the related link generation section 231, the grid map generation section 232 and the bookmark generation section 233. In this manner, the information generation control section 214 controls one of those sections to playback the playback-target content data through the content playback module 154, and then proceeds to step S155.

The content playback module 154 reads out the content data which corresponds to the play list supplied from the related link generation section 231, the grid map generation section 232 or the bookmark generation section 233, and plays back the content data, and then supplies it to the output module 155. The output module 155 outputs audio from the speaker 118 in accordance with the data supplied from the content playback module 154.

At step S151, when the selection location acquisition section 211 determines that the playback of the content data has not completed, and that any content data has not been selected from the play list, the selection location acquisition section 211 proceeds to step S155 to check whether or not the display mode has been switched.

If, based on the selection location information acquired from the operation signal input from the input module 153, the selection location acquisition section 211 determines that the display mode has been switched, the selection location acquisition section 211 proceeds to step S156. At step S156, the selection location acquisition section 211 controls the display format management section 212 to change the setting of the display mode, and also controls the information generation control section 214 to display the play list screen in accordance with the display mode, and then proceeds to step S157.

That is to say, the information generation control section 214 controls the list display control section 217, and generates the play list screen data corresponding to the selection-determined cell in accordance with the play list and playback-target content which were generated by the related link generation section 231, the grid map generation section 232 and the bookmark-generation section 233 in dependence upon the display mode, and then supplies the generated play list screen data to the display module 152.

The display module 152 displays the play list screen-on the display section 131 in accordance with the screen data from the map display control section 216.

When the selection location acquisition section 211 at step S155 determines that the display mode has not been switched, the selection location acquisition section 211 proceeds to step S157 without performing the process of step S156.

The selection location acquisition section 211 at step S157 checks, based on the selection location information obtained from the operation signal input from the input module 153, whether or not it has been ordered to switch screens or stop displaying the content selection screens. When the selection location acquisition section 211 determines that it has been ordered to switch screens or stop displaying the content selection screens, the selection location acquisition section 211 ends the map screen display switching process, and then returns to step S128 of FIG. 33. After that, the selection location acquisition section 211 stops the play list screen display switching process, and then returns to step S54 of FIG. 30 to proceed to step S55.

At step S157, when the selection location acquisition section 211 determines that it has not been ordered to switch screens or stop displaying the content selection screens, the selection location acquisition section 211 returns to step S151, and then repeats the subsequent process.

In this manner, tie play list screen is displayed according to the artist icon selected on the previously-displayed jump screen, or the information about items such as the selection-determined cell on the map screen. Therefore, a user can easily and clearly understand the detailed information of the items selected.

The above describes an example of the artist jump. The friends jump (the user related link) also performs the same procedure. Therefore, the description of the friends jump will be omitted.

With reference to a flowchart in FIG. 35, the jump screen display switching process at step S56 of FIG. 30 will be described.

When the selection location acquisition section 211 orders the information generation control section 214 to perform the jump screen display switching process, the information generation control section 214 at step S171 acquires the latest selection history information from the selection history management section 213, and supplies the selection history information to the related link display control section 215, and then proceeds to step S172.

The information generation control section 214 at step S172 acquires information about display formats (i.e. the display screen information about the previous screen) from the display format management section 212, and then proceeds to step S173.

The information generation control section 214 at step S173 checks, based on the display screen information (about the previous screen) acquired from the display format management section 212, whether or not the map screen has been set to be displayed. When the information generation control section 214 determines that the map screen has been set to be displayed, the information generation control section 214 proceeds to step S174, and then performs a process of switching the map screen to the jump screen in which the information generation control section 214 controls the map display control section 216 to display the animation where the map screen is switched to the jump screen, and then proceeds to step S176.

That is to say, at step S174, the map display control section 216 generates the screen data or the animation (moving pictures or movie frames) where the map screen is switched to the jump screen as shown in FIG. 26, and then supplies the screen data to the display module 152. The display module 152 displays the screen on the display section 131 in accordance with the screen data from the map display control section 216.

On the other hand, if the information generation control section 214 at step S173 determines, based on the display screen information (about the previous screen) acquired from the display format management section 212, that the map screen has not been set to be displayed, the information generation control section 214 proceeds to step S175 as a process of switching the play list screen to the jump screen. That is to say, in this case, the previously-displayed screen is the play list screen if not the map screen, because the initial setting of displayed screen is the map screen.

The initial setting of displayed screen can be the jump screen. In this case, the jump screen corresponding to the selected artist icon, which has been stored in the selection history management section 213, may be displayed.

The information generation control section 214 at step S175 controls the list display control section 217 to get the play list screen faded out, and then proceeds to step S176.

That is to say, at step S176, the list display control section 217 generates the screen data or the animation (moving picture or movie frames) where the play list screen fades out, and then supplies the screen data to the display module 152. The display module 152 displays the screen on the display section 131 in accordance with the screen data from the related link display control section 215.

At step S176, the information generation control section 214 performs a jump screen display control process. The jump screen display control process will be described with reference to a flowchart shown in FIG. 36.

The information generation control section 214 at step S191 controls the related link display control section 215 to display the jump screen (equivalent to the link display section 521-3 (FIG. 24), for example) where the selected artist icon is placed at the center, and then proceeds to step S 192.

The information generation control section 214 at step S192 controls the related link generation section 231 to generate the related link information of the selected artist, and then proceeds to step S193. The information generation control section 214 then controls the related link display control section 215 to display the animation with the related artists being arranged, and then proceeds to step S194. The information generation control section 214 then controls the related link display control section 215 to display the jump screen where the related artist icons are placed at predetermined positions on the circumference.

That is to say, the related link generation section 231 at step S192 checks the artist table 182 in the metadata database 171 and the artist related table 183, and then generates the related link information, which is the information of artist related to the selected artist.

Based on the related link information generated by the related link generation section 231, the related link display control section 215 at step S193 generates the screen data or the animation (moving picture or movie frames) where the related artist icons generated from the center are moving to the predetermined positions on the circumference, and then supplies the screen data to the display module 152. The display module 152 displays the screen on the display section 131 in accordance with the screen data from the related link display control section 215.

In addition, the related link display control section 215 at step S194 generates the screen data of the jump screen where the related artist icons are placed at the predetermined positions on the circumference, and then supplies the screen data to the display module 152. The display module 152 displays the screen on the display section 131 in accordance with the screen data from the related link display control section 215.

When the jump screen is displayed, for example, a user checks the jump screen on the display section 131, and utilizes his/her finger or touch pen to select one of the related artist icons on the jump screen, to operate the view button 341 to switch the screen displayed, or to stop displaying the content selection screen (not shown). In response to the user's operation, the input module 153 inputs an operation signal, which corresponds to the user's operation of the touch panel 132 on the display section 131, into the selection location acquisition section 211.

When the selection-location acquisition section 211 receives the operation signal from the input module 153, the selection location acquisition section 211 at step S195 checks, based on the selection location information obtained from the operation signal, whether or not the related artist icon has been selected from the jump screen. When the selection location acquisition section 211 determines that the related artist icon has been selected from the jump screen, the selection location acquisition section 211 proceeds to step S196, and sets (stores) the selected related artist icon in the selection history management section 213 as the selected artist icon, and then proceeds to step S197.

The selection location acquisition section 211 at step S197 controls the information generation control section 214 in dependence upon the selected artist icon to display the animation with the selected artist being switched, and then returns to step S191 to repeat the subsequent process.

That is to say, the information generation control section 214 at step S197 controls the list display control section 217 to generate the screen data or the animation (moving picture or movie frames) where the selected related artist icon moves from where it was displayed to the center, and then supplies the screen data to the display module 152. The display module 152 displays the screen on the display section 131 in accordance with the screen data from the related link display control section 215.

After that, the process of step S191 displays the jump screen (the link display section 521-3 shown in FIG. 24, for example) where the selected artist icon is placed at the center, and then the subsequent process may be repeated.

If the selection location acquisition section 211 at step S195 determines that the related artist icon has not been selected from the jump screen, the selection location acquisition section 211 proceeds to step S198. The selection location acquisition section 211 then checks whether or not it has been ordered to switch the screens or stop displaying the content selection screen, based on the selection location information obtained from the operation signal input from the input module 153. If the selection location acquisition section 211 determines that it has been ordered to switch the screens or stop displaying the content selection screen, the selection location acquisition section 211 ends the jump screen display control process, and then returns to step S176 of FIG. 35. After that selection location acquisition section 211 stops the jump screen display switching process, and then returns to step S56 of FIG. 30 to proceed to step S57.

If the selection location acquisition section 211 at step S198 determines that it has not been ordered to switch the screens or stop displaying the content selection screen, the selection location acquisition section 211 returns to step S195 to repeat the subsequent process.

In this manner, the jump screen displays the selected item (icon) at the predetermine position (the center of circle), and locates the related items, which correspond to artists (content) related to the artist (content) associated with the selected item, at the predetermined positions on the circumference along with the lines indicating the relationship between them. Therefore, a user can easily understand content data related to certain content data.

In addition, only the items directly related to the selected item are displayed (which is to say, items related to the related items (the items indirectly related to the selected item) are not displayed). This provides a user with an easy-to-understand screen.

Furthermore, when the related item on the circumference is selected as the selected item, the animation where the newly-selected item moves is displayed. This allows a user to check his/her selected item easily.

Figure 37:
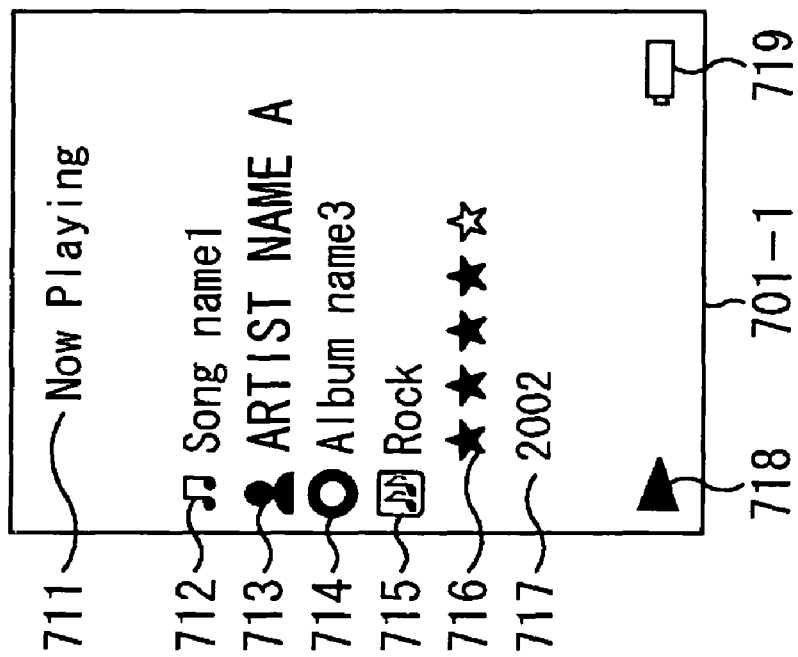
FIG. 37 is a diagram showing another example of the configuration of the map screen (one of the content selection screens)
Figure 38:
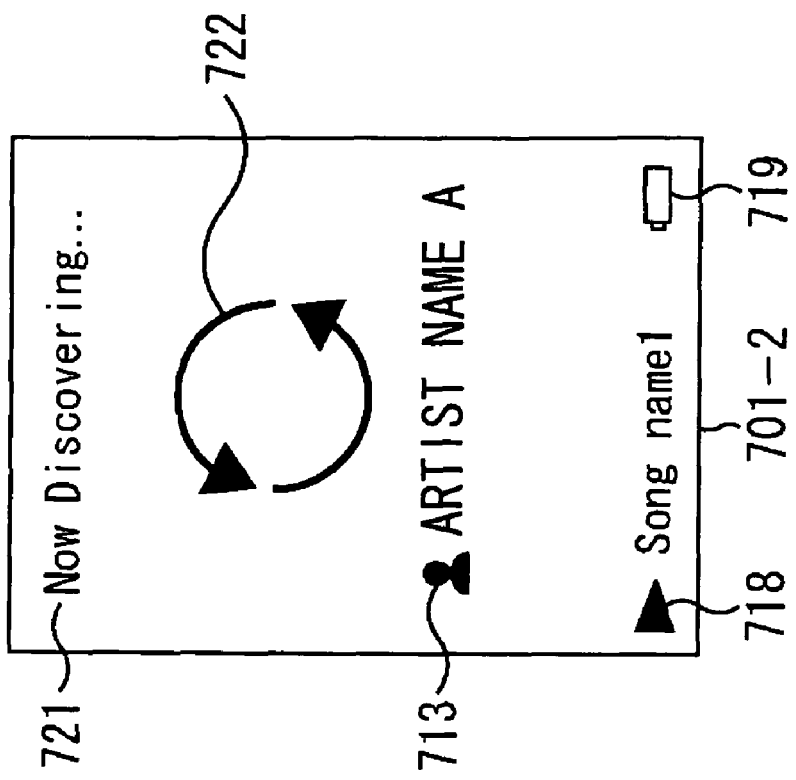
FIG. 38 is a diagram showing another example of the configuration of the map screen shown in FIG. 37.
Figure 39:
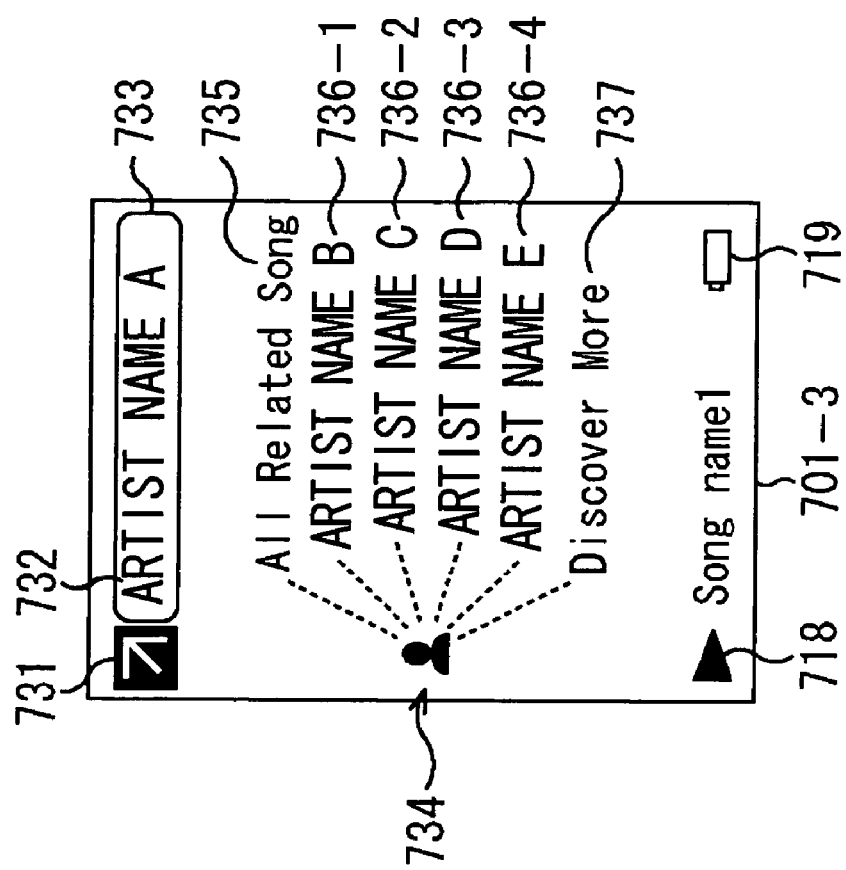
FIG. 39 is a diagram showing another example of the configuration of the map screen shown in FIG. 37.

The following describes another example of the jump screen with related items. FIGS. 37 to 39 show another example of the jump screen of Artist Jump illustrated by FIG. 21.

FIGS. 37 to 39 only show the part equivalent to the link display section 521 shown in FIG. 21. That is to say, those shown in FIGS. 37 to 39 may have the same operation setting display section 522 as that of FIG. 21, or maybe not.

The jump screen shown in FIGS. 37 to 39 includes a currently played screen 701-1, which is displayed while the content data is played back; a currently discovering screen 701-2, which is displayed while the artists related to the artist whose content data is currently played back are being retrieved; and a related artist screen 701-3, which is displayed after the related artists have been retrieved.

FIG. 37 is a diagram showing an example of the configuration of the currently played screen 701-1. The currently played screen 701-1 is displayed on the display section 131 while the selected artist's content data is being played back.

The top area of the currently played screen 701-1 (FIG. 37) displays a screen title 711 of 'Now Playing', indicating that the currently played screen 701-1 is currently displayed, which is to say the content data whose name is displayed on this screen is played back.

Under the screen title 711, information about the currently-played content data is displayed. That is to say, the area under the screen title 711 displays, along with a musical notation icon 712, the character string of 'Song name 1', indicating that the currently-played content data is 'Song name 1'. The area under the musical notation icon 712 displays, along with a human-shaped icon 713 indicative of an artist, the character string of 'Artist name A', indicating the artist of the currently-played content data is 'Artist name A'.

The area under the human-shaped icon 713 displays, along with a disc icon 714 indicative of an album, the character string of 'Album name 3', indicating that the album storing the currently-played content data is 'Album name 3'. The area under the disc icon 714 displays, along with a music icon 715 indicative of genre, the character string of 'Rock', indicating the genre of the currently-played content data is rock.

In addition, the area under the music icon 715 displays an evaluated value 716 with four black stars and one white star, indicating the currently-played content data is rated with four stars. The area under the evaluated value 716 displays a release date 717 (the numeric characters of '2002'), indicating that the currently-played content data was released in 2002. By the way, the evaluation value (the raging of the content data) is generated by a user, and then stored in the content metadata table 181 shown in FIG. 6.

In addition, the bottom left area of the currently played screen 701-1 displays an arrow icon 718 pointing right, indicating that the content data is currently played back, while the bottom right area displays a battery icon 719, indicating the remaining charge of battery.

When the currently played screen 701-1 is displayed, for example, a user may operate buttons on the operation setting display section 522 (FIG. 21) or buttons on the surface of the PD 5 to select functions of Artist Jump. In response to that, the PD 5 starts to retrieve artists related to the artist (whose name is 'Artist name A' in this case) of the currently-played content data, while display section 131 displays the currently discovering screen 701-2 shown in FIG. 38.

FIG. 38 is a diagram showing an example of the configuration of the currently discovering screen 701-2. The currently discovering screen 701-2 is displayed during the period from the time when the PD 5 starts to retrieve the artists related to the artist displayed on the currently-played screen 701-1 (FIG. 37) until this retrieval has completed (i.e. while retrieving the related artists). That is to say, the currently discovering screen 701-2 displays the transition from the currently played screen 701-1 to the related artist screen 701-3.

The top are of the currently discovering screen 701-2 (FIG. 38) displays a screen title 721 of 'Now discovering . . . ', indicating that the currently discovering screen 701-2 is currently displayed, which is to say the PD 5 is currently retrieving the artists related to the artist displayed on this screen.

The area under the screen title 721 displays an animation image 722 where arrow marks are rotating, indicating that the PD 5 is retrieving the related artists. The area under the animation image 722 displays, along with a human-shaped icon 713, the character string of 'Artist name A', indicating that the artist of the currently-played content data is 'Artist name A', and that the PD 5 is retrieving artists related to this artist.

The bottom left area of the currently discovering screen 701-2 displays, along with an arrow icon 718 pointing right (which is the same as that of FIG. 37), the character string of 'Song name 1', indicating that the currently-played content data is 'Song name 1'. The bottom right area of the currently discovering screen 701-2 displays a buttery icon 719 in the same way as that of FIG. 37.

When the currently discovering screen 701-2 is displayed, the PD 5 may finish retrieving the related artists. In this case, the display section 131 then displays the related artist screen 701-3 shown in FIG. 39.

FIG. 39 is a diagram illustrating an example of the configuration of the related artist screen 701-3. The related artist screen 701-3 shows the result of retrieving the related artists.

The top area of the related artist screen 701-3 (FIG. 39) displays, along with a retrieval result icon 731, a screen title 732 of 'Artist name A', indicating that the related artist screen 701-3 is currently displayed, which is to say the related artist screen 701-3 shows the result of retrieving the artists related to 'Artist name A'.

Therefore, a user can understand the fact that the artist of the currently-played content data is 'Artist name A' and that the artists related to the artist of 'Artist name A' has been retrieved. In this case (FIG. 39), a cursor 733 is displayed on the screen title 732.

The area under the screen title 733 displays a human-shaped icon 734 indicating that the artists related to the artist of 'Artist name A' has been retrieved. Six dotted lines are displayed as if they radiate out from start points on a circumference of an ellipse (not shown) in which the human-shaped icon 734 is displayed. The end points of the dotted lines (i.e. the points on a circumference of a lager ellipse in which the human-shaped icon 734 is displayed) are associated with the following character strings in this order: a character string 735 of 'All Related Song', which is used to select all the related artist's content data; related artist names 736-1 to 736-4, which means that the artists of 'Artist name B', 'Artist name C', 'Artist name D' and 'Artist name E' have been retrieved as the related artists; and a character string 737 of 'Discover more', which is used to retrieve more information.

That is to say, in this case (FIG. 39), the selected artist's human-shaped icon 734 is placed at the center of the ellipse (or a polygon). Icons or character strings of the artist related to the artist at the center are displayed on the circumference of the ellipse (or the periphery of the polygon).

A user may operate the buttons on the operation setting display section 522 or the buttons on the surface of the PD 5 to move the cursor 733, which was displayed on the screen title 732, onto the character string 735. In response to that, content data of all the related artists are sequentially played back, and the display section 13 displays the currently played screen 701-1 where information about the currently-played content data is displayed accordingly.

When the user moves the cursor 733, which was displayed on the screen title 732, onto one of the related artist names 736-1 to 736-4, the content data of the related artists specified by the cursor 733 are sequentially played back, and the display section 13 displays the currently played screen 701-1 (FIG. 37) where information about the currently-played content data is displayed accordingly.

When the user moves the cursor 733, which was displayed on the screen title 732, onto the character string 737, the PD 5 again starts retrieving artists related to the artist whose content data is currently played, and the display section 13 displays the currently discovering screen 701-2 (FIG. 38).

In this case, when the user operates the buttons on the operation setting display section 522 or the buttons on the surface of the PD5 after moving the cursor 733 onto the character string 737, the PD 5 may start retrieving artists related to the artist whose content data is currently played. This retrieval deals with much more information compared to the previous one. As a result of that, information about the related artists who are relatively less related to the artist is displayed on the related artist screen 701-3.

On the other hand, the bottom left area of the related artist screen 701-3 displays, along with an arrow icon 718 pointing right (which is the same as that of FIG. 37), the character string of 'Song name 1', indicating that the currently-played content data is 'Song name 1'. The bottom right area of the related artist screen 701-3 displays a buttery icon 719 in the same way as that of FIG. 37.

In this manner, the related artist screen 701-3 is displayed. When the user operates the PD 5 to retrieve again the artists related to the artist whose content data is currently played, the display section 131 displays the currently discovering screen 701-2 (FIG. 38). When the user orders the PD 5 to play back the content data of the related artists, the display section 13 displays the currently played screen 701-1 (FIG. 37) where the information about the currently-played content data is displayed.

That is to say, as for the jump screen (FIG. 37 to FIG. 39), the currently played screen 701-1, the currently discovering screen 701-2 or the related artist screen 701-3 is displayed in accordance with the user's operation.

In this manner, as an example of the way to display the related items on the jump screen, with the human-shaped icon 734 of the selected artist being displayed at the center of the circle (or the center of the polygon), the icons or character strings of the related artists may be displayed at not all parts but some parts of the circumference of the circle (or the periphery of the polygon).

This can utilize the space of the screen in an effective way, especially in a case in which the screen does not have much space or there are not so much related artists to be displayed.

In this manner, the PD 5 provides a user with three types of content selection screens: the map screen by which the user can select his/her desired content's play list from the metadata of the content; the jump screen by which he/she can select (retrieve) content data related to certain content data; and the play list screen by which he/she can select content data from the play list selected through the map screen or the jump screen.

Accordingly, the user can intuitively select and play back content data out of various unknown content data in accordance with his/her intention or feeling through one of the content selection screens.

In addition, information used (selected) at one of the content selection screens is also used at another content selection screen when the content selection screen is switched to it. Therefore, switching the content selection screen from one to another is one way to search his/her desired content data in an effective way.

By the way, the above describes only three types of content selection screens. Other types of content selection screens may also be applied.

Figure 40:
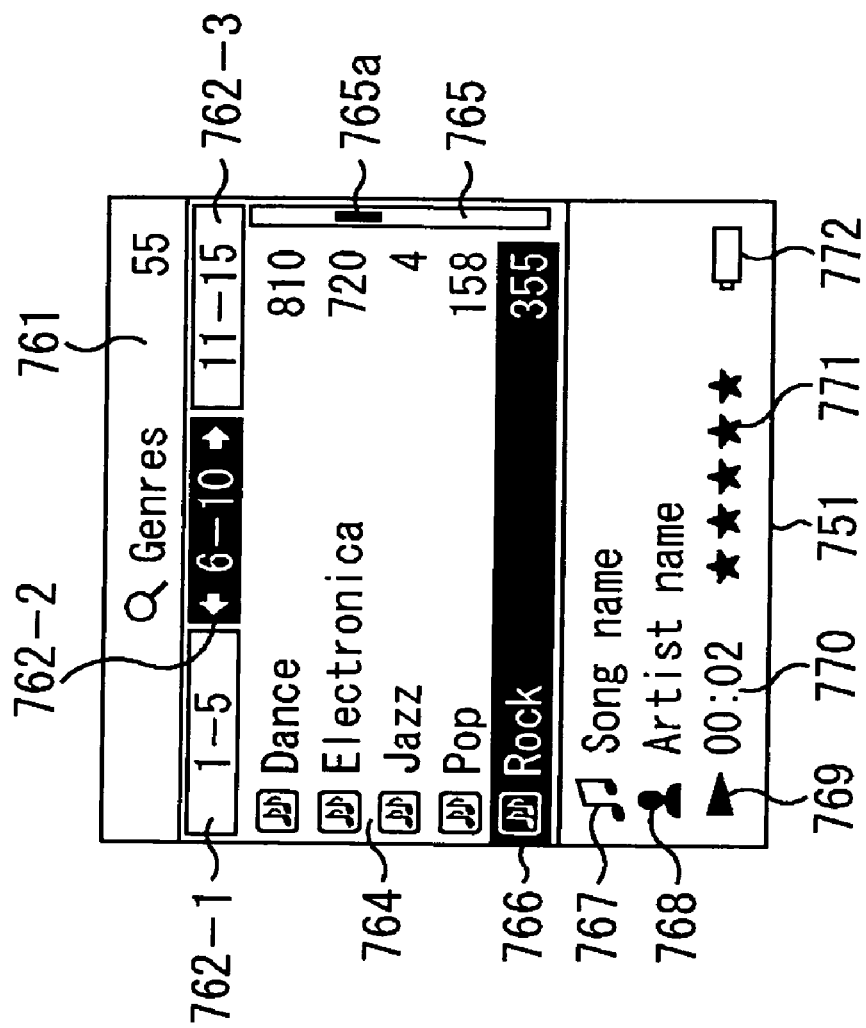
FIG. 40 is a diagram showing an example of the configuration of a filter screen (one of the content selection screens)

FIG. 40 shows an example of the configuration of a filter screen as one of the content selection screens. FIG. 40 shows only a part of the screen: this part is for example equivalent to the map display section 321 (FIG. 10). That is to say, the filter screen may be equipped with the operation setting display section 322 in the same way as that of FIG. 10, or may be not.

The filter screen 751 (FIG. 40) filters content data stored in the PD 5 by using predetermined content metadata to make a short list of content data. The filter screen 751 then displays the result classified by metadata. Therefore, a user can select, by checking the metadata on the filter screen 751, the content data.

By the way, the above-noted map screen 311 (FIG. 10) include the cells of grid arranged along with one axis of predetermined metadata, and each cell is associated with a play list listing at least one content data. On the other hand, the PD 5 produces the filter screen 751 by filtering content data stored in the PD 5 with the predetermined content metadata and putting the result of filtering on the filter screen 751 in a map format. Therefore, it can be said that the map screen 311 displays the information on the filter screen 751 in a map format.

The above-noted play list screen 411 displays a list of content data. Therefore, it can be said that the filter screen 751 displays the result of filtering all the list of content data displayed on the play list screen 411. That is to say, the filter screen 751 behaves between the play list screen 411 and the map screen 311. Therefore, it is easy to display the filter screen 751 before the play list screen 411 is switched to the map screen 311. It is also easy to display the filter screen 751 before the map screen 311 is switched to the play list screen 411.

The following describes the filter screen 751 in detail.

FIG. 40 shows an example of the filter screen 751 which is in a genre mode (one of the display modes). That is to say, the filter screen 751 (FIG. 40) is generated by filtering content data in the PD 5 by genre. The filter screen 751 therefore displays the result of filtering by genre, where a user chooses a type of genre displayed to select the content data to be played. The information about content's genre on the content metadata table 181 of FIG. 6 helps generating the filter screen 751 (FIG. 40).

For example, if the user selects a filtering function of genre (a list search function by a genre filter) through the buttons on the operation setting display section 522 (FIG. 22) and the buttons on the surface of the PD 5, the filter screen 751 (FIG. 40) is displayed in genre mode. By the way, the filter screen 751 of the genre mode spreads over the map screen, and the map display section 321 of the genre mode (FIG. 13) is displayed. In this case, the transitional screens may be displayed in the same way as the other examples of the content selection screens.

The top area of the filter screen 751 of the genre mode displays a screen title 761. The screen title 761 includes a magnifying glass icon, indicating that this is the filter function; a character string of 'Genres', indicating that this is in the genre mode; and numeric characters of '55', indicating the number of types of genre on the PD 5.

The area under the screen title 761 displays tags 762 to swiftly switch pages on the filter result display area 764, each of which includes information about five items per page: a left tag 762-1; a center tag 762-1; and a right tag 762-3.

The center tag 762-2 displays tag information (serial numbers, acronyms or the like) indicating the type of information currently displayed on the filter result display area 764. By the way, the center tag 762-2 is highlighted.

The left tag 762-1 displays tag information indicating earlier numbers, compared to the tag information on the center tag 762-2. The right tag 762-3 displays tag information indicating later numbers, compared to the tag information on the center tag 762-2.

When a use selects the left tag 762-1, the filter result display area 764 displays information corresponding to the tag information that was displayed on the left tag 762-1, and the tag information that was displayed on the left tag 762-1 is displayed on the center tag-762-2, and the tag information that was displayed on the center tag 762-2 is displayed on the right tag 762-3, and the left tag 762-1 displays earlier tag information compared to the one that was displayed on the left tag 762-1.

If the left tag 762-1 displayed the earliest tag information, then the left tag 762-1 displays the last tag information.

On the other hand, when a use selects the right tag 762-3, the filter result display area 764 displays information corresponding to the tag information that was displayed on the right tag 762-3, and the tag information that was displayed on the right tag 762-3 is displayed on the center tag 762-2, and the tag information that was displayed on the center tag 762-2 is displayed on the left tag 762-1, and the right tag 762-3 displays later tag information compared to the one that was displayed on the right tag 762-3.

In FIG. 40, the center tag 762-2 displays the tag information (numerical characters) of '6-10' indicating that the genres displayed on the filter result display area 764 are sixth to tenth genres among all genres. The center tag 762-2 also includes a left arrow mark, indicating that the left tag 762-1 is the previous one; and a right arrow mark, indicating that the right tag 762-3 is the later one. In addition, the center tag 762-2 is highlighted.

The left tag 762-1 displays the tag information (numeric characters) of '1-5' indicating the first to fifth genres which are earlier than those displayed on the center tag 762-2. The right tag 762-3 displays the tag information (numeric characters) of '11-15' indicating the eleventh to fifteenth genres which are later than those displayed on the center tag 762-2.

When a use selects the left tag 762-1, the filter result display area 764 displays information about items (genres) corresponding to '1-5' (the first to fifth genres) that was displayed on the left tag 762-1, and the tag information of '1-5' that was displayed on the left tag 762-1 is displayed on the center tag 762-2, and the tag information of '6-10' that was displayed on the center tag 762-2 is displayed on the right tag 762-3, and the left tag 762-1 displays earlier tag information compared to the one ('1-5') that was displayed on the left tag 762-1 (in this case, the left tag 762-1 displays the last tag information of '50-55' because there is not anything before '1-5').

On the other hand, when a use selects the right tag 762-3, the filter result display area 764 displays information about items (genres) corresponding to '11-15' (the eleventh to fifteenth genres) that was displayed on the right tag 762-3, and the tag information of '11-15' that was displayed on the right tag 762-3 is displayed on the center tag 762-2, and the tag information of '6-10' that was displayed on the center tag 762-2 is displayed on the left tag 762-1, and the right tag 762-3 displays later tag information ('16-20') compared to the one ('11-15') that was displayed on the right tag 762-3.

In this manner, in this example shown in FIG. 40, selecting tags 762 changes information about items on the filter result display area 764 which then displays new one page or five items.

The filter result display area 764 displays a page including five items. Selecting tags 762 or controlling a scroll bar 765 by a cursor 765a changes pages and information displayed on the filter result display area 764.

First item of the information displayed on the filter result display area 764 (FIG. 40) includes an icon indicative of genre; a character string of 'Dance' indicating that its genre name is Dance; numeric characters of '810' indicating the number of content data belonging to the field of Dance and stored in the PD 5. Second item of the information includes an icon indicative of genre; a character string of 'Electronica' indicating that its genre name is Electronica; numeric characters of '720' indicating the number of content data belonging to the field of Electronica and stored in the PD 5. Third item of the information includes an icon indicative of genre; a character string of 'Jazz' indicating that its genre name is Jazz; numeric characters of '4' indicating the number of content data belonging to the field of Jazz and stored in the PD 5.

Fourth item of the information includes an icon indicative of genre; a character string of 'Pops' indicating that its genre name is Pops; numeric characters of '158' indicating the number of content data belonging to the field of Pops and stored in the PD 5. Fifth item of the information includes an icon indicative of genre; a character string of 'Rock' indicating that its genre name is Rock; numeric characters of '335' indicating the number of content data belonging to the field of Rock and stored in the PD 5.

In the example shown in FIG. 40, the fifth item has been selected by a cursor 766, and then highlighted in a reverse display manner. This means that the PD 5 is playing back the content data of Rock. A user selects his/her desired genre by moving the cursor 766 on the filter result display area 764. The genre selected by the cursor 766 is highlighted in a reverse display manner, and the content data corresponding to the highlighted genre is played back accordingly.

The content data corresponding to the selected genre are sequentially played in accordance with a predetermined order which has been determined based on the parameter of the predetermined content metadata in the same way as that of the map screen 311 illustrated by FIG. 10. This method is also applied to the filter screen 751 with other display modes, as described later. That order may be determined for each display mode or all display modes.

The right side of the filter result display area 764 displays the scroll bar 765. Controlling the scroll cursor 765*a* on the scroll bar 765 upward or downward changes items displayed on the filter result display area 764 one by one. Selecting the tags 762 changes the place where the scroll cursor 765*a* on the scroll bar 765 is located. Controlling the scroll cursor 765*a* changes the way of displaying the tags 762.

The area under the filter result display area 764 displays, along with a musical notation icon 767, the character string of 'Song name 1', indicating that the currently-played content data is 'Song name 1'. The area under the musical notation icon 767 displays, along with a human-shaped icon 768, the character string of 'Artist name', indicating that the artist of the currently-played content data is 'Artist name'.

The bottom left area of the filter screen 751 (FIG. 40) displays, along with an arrow icon 769 pointing right which is indicating that the content data is currently played, an elapsed time 770 indicating the time elapsed since the start of playback, and an evaluated value 771. The elapsed time 770, in this case, indicates two seconds '00:02' since the start of playback of the currently-played content data, and the evaluated value 771 about the currently-played content data is five stars. The bottom right area of the filter screen 751 displays a battery icon 772 which is the same as the buttery icon 719 in FIG. 37.

In this manner, the filter screen 751 (FIG. 40) displays a short list of the content data stored in the PD 5. Therefore, a user can display a short list of his/her desired genre to play back them.

Figure 41:
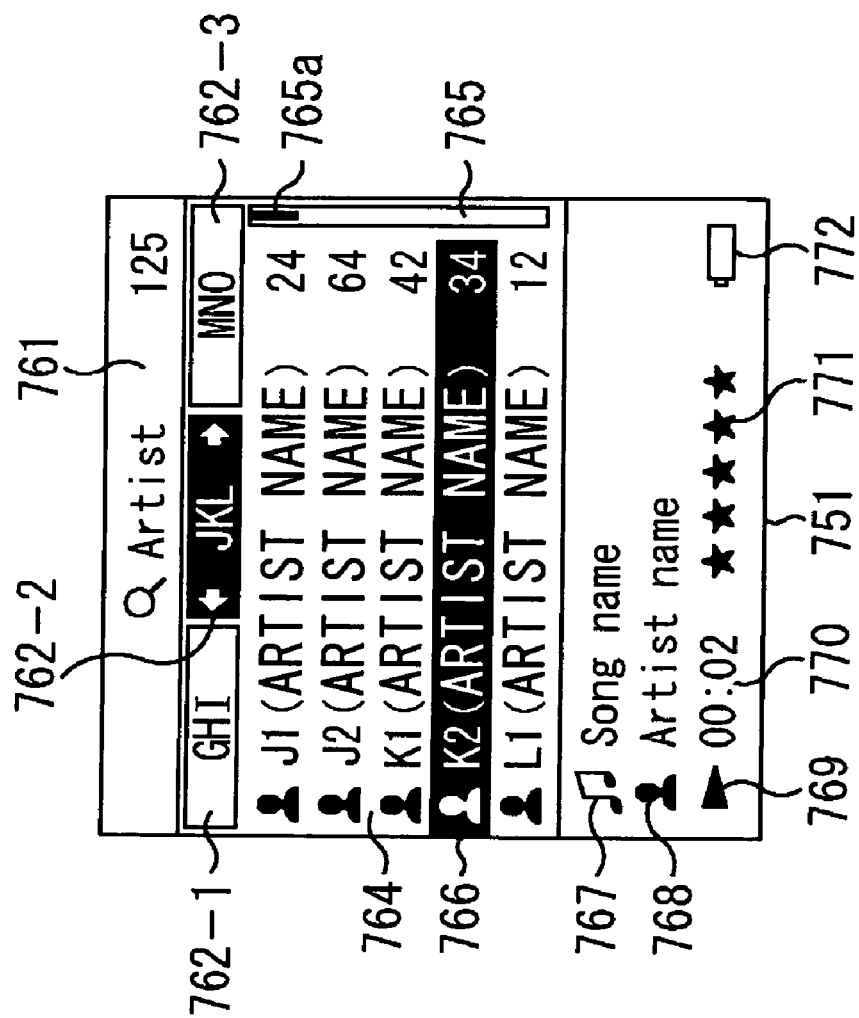
FIG. 41 is a diagram showing another example of the configuration of the filter screen shown in FIG. 40.

FIG. 41 shows an example of the configuration of the filter screen with an artist mode (one of the display modes). It can be said that the difference between examples of FIG. 41 and FIG. 40 (the filter screen with the genre mode) is their display mode, and their configurations are almost same. Therefore, only the difference between them will be described in detail.

The filter screen 751 of FIG. 41 filters the content data stored in the PD 5 by artist names to make a short list of content data. The filter screen 751 then displays the result of filtering by artist names, where a user selects an artist name to play back content data. Identification of artists of content data on the content metadata table 181 of FIG. 6 and artist names on the artist table 182 helps generating the filter screen 751 of FIG. 41.

The top area of the filter screen 751 of the artist mode displays a screen title 761. The screen title 761 includes a magnifying glass icon, indicating that this is the filter function; a character string of 'Artist', indicating that this is in the artist mode; and numeric characters of '125', indicating the number of artists on the PD 5.

In the example of FIG. 41, a left tag 762-1, a center tag 762-2, and a right tag 762-3 displays tag information by initials of items (artists) that are displayed on the filter result display area 764. Selecting the tags 762 swiftly changes items displayed on the filter result display area 764 in accordance with the tag information of the selected tag 762.

For example, the center tag 762-2 displays the tag information of 'JKL' indicating that the initials of artist names displayed on the filter result display area 764 are 'J', 'K' and 'L'. The center tag 762-2 also includes a left arrow mark indicating that the left tag 762-1 is the previous one; and a right arrow mark indicating that the right tag 762-3 is the later one. The center tag 762-2 is highlighted in a reverse display manner.

The left tag 762-1 displays the tag information of 'GHI' indicating that 'G', 'H' and 'I' are alphabets placed before those displayed on the center tag 762-2. The right tag 762-3 displays the tag information of 'MNO' indicating that 'M', 'N' and 'O' are alphabets placed after those displayed on the center tag 762-2.

When a use selects the left tag 762-1, the filter result display area 764 displays information about items (artist names) corresponding to the tag information ('G, H and I') that was displayed on the left tag 762-1, and the tag information of 'GHI' that was displayed on the left tag 762-1 is displayed on the center tag 762-2, and the tag information of 'JKL' that was displayed on the center tag 762-2 is displayed on the right tag 762-3, and the left tag 762-1 displays the tag information of the previous page.

On the other hand, when a use selects the right tag 762-3, the filter result display area 764 displays information about items (artist names) corresponding to the tag information ('M, N and O') that was displayed on the right tag 762-3, and the tag information of 'MNO' that was displayed on the right tag 762-3 is displayed on the center tag 762-2, and the tag information of 'JKL' that was displayed on the center tag 762-2 is displayed on the left tag 762-1, and the right tag 762-3 displays the tag information of the previous page.

That is to say, in the example of FIG. 41, controlling the tags 762 changes information (items) displayed on the filter result display area 764 by alphabets.

First item of the information displayed on the filter result display area 764 (FIG. 41) includes a human-shaped icon indicative of an artist; an artist name of 'J1 (Artist name)' that starts with 'J'; and numeric characters of '24' indicating the number of the artist's albums stored in the PD 5. Second item of the information includes a human-shaped icon indicative of an artist; an artist name of 'J2 (Artist name)' that starts with 'J'; and numeric characters of '64' indicating the number of the artist's albums stored in the PD 5. Third item of the information includes a human-shaped icon indicative of an artist; an artist name of 'K1 (Artist name)' that starts with 'K'; and numeric characters of '42' indicating the number of the artist's albums stored in the PD 5.

Fourth item of the information includes a human-shaped icon indicative of an artist; an artist name of 'K2 (Artist name)' that starts with 'K'; and numeric characters of '34' indicating the number of the artist's albums stored in the PD 5. Fifth item of the information includes a human-shaped icon indicative of an artist; an artist name of 'L1 (Artist name)' that starts with 'L'; and numeric characters of '12' indicating the number of the artist's albums stored in the PD 5.

In the example shown in FIG. 41, the fourth item has been selected by a cursor 766, and then highlighted in a reverse display manner. This means that the PD 5 is playing back the content data of the artist whose name is 'K2 (Artist name)'. A user selects his/her desired artist name by moving the cursor 766 on the filter result display area 764. The artist name selected by the cursor 766 is highlighted in a reverse display manner, and the content data corresponding to the highlighted artist name is played back accordingly.

In this manner, the filter screen 751 of FIG. 41 displays a short list of the content data stored in the PD 5 based on artists. Therefore, a user can make a short list of his/her desired artists to play back them.

Figure 42:
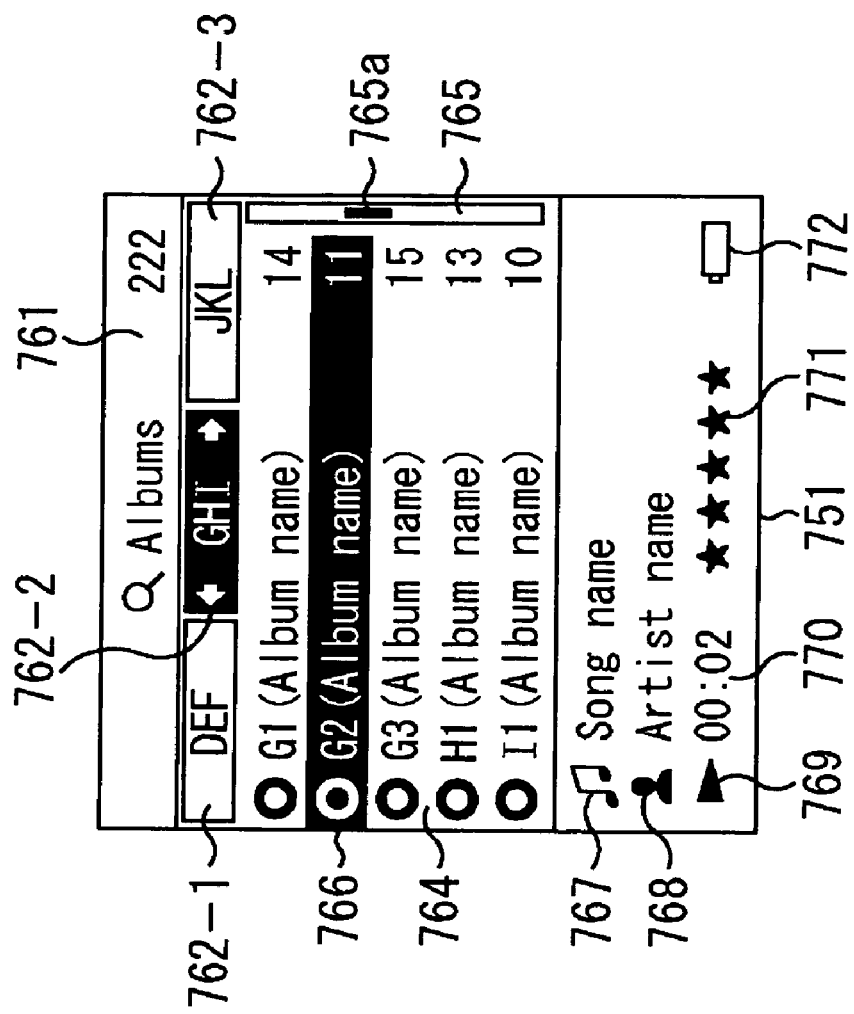
FIG. 42 is a diagram showing another example of the configuration of the filter screen shown in FIG. 40.

FIG. 42 shows an example of the configuration of the filter screen with an album mode (one of the display modes). It can be said that the difference between examples of FIG. 42 and FIG. 41 (the filter screen with the artist mode) is their display mode, and their configurations are almost same. Therefore, only the difference between them will be described in detail.

The filter screen 751 of FIG. 42 filters the content data stored in the PD 5 by album names to make a short list of content data. The filter screen 751 then displays the result of filtering by album names, where a user selects an album name to play back content data. Album names stored in the content metadata table 181 of FIG. 6 helps generating the filter screen 751 of FIG. 42.

The top area of the filter screen 751 of the album mode displays a screen title 761. The screen title 761 includes a magnifying glass icon, indicating that this is the filter function; a character string of 'Albums', indicating that this is in the album mode; and numeric characters of '222', indicating the number of albums on the PD 5.

In the example of FIG. 42, the center tag 762-2 displays the tag information of 'GHI' indicating that the initials of album names displayed on the filter result display area 764 are 'G', 'H' and 'I'. The center tag 762-2 also includes a left arrow mark indicating that the left tag 762-1 is the previous one; and a right arrow mark indicating that the right tag 762-3 is the later one. The center tag 762-2 is highlighted in a reverse display manner.

The left tag 762-1 displays the tag information of 'DEF' indicating that 'D', 'E' and 'F' are alphabets placed before those displayed on the center tag 762-2 in alphabetical order. The right tag 762-3 displays the tag information of 'JKL' indicating that 'J', 'K' and 'L' are alphabets placed after those displayed on the center tag 762-2 in alphabetical order.

First item of the information displayed on the filter result display area 764 (FIG. 42) includes a disc icon indicative of an album; an album name of "G1 (Album name)" that starts with 'G'; and numeric characters of '14' indicating that the number of content data on the album. Second item includes a disc icon indicative of an album; an album name of "G2 (Album name)" that starts with 'G'; and numeric characters of '11' indicating that the number of content data on the album. Third item includes a disc icon indicative of an album; an album name of "G3 (Album name)" that starts with 'G'; and numeric characters of '15' indicating that the number of content data on the album.

Fourth item includes a disc icon indicative of an album; an album name of "H1 (Album name)" that starts with 'H'; and numeric characters of '13' indicating that the number of content data on the album. Fifth item includes a disc icon indicative of an album; an album name of "I1 (Album name)" that starts with 'I'; and numeric characters of '14' indicating that the number of content data on the album.

In the example shown in FIG. 42, the fourth item has been selected by a cursor 766, and then highlighted in a reverse display manner. This means that the PD 5 is playing back the content data whose album name is 'G2 (Album name)'. A user selects his/her desired item (album name) by moving the cursor 766 on the filter result display area 764. The album name selected by the cursor 766 is highlighted in a reverse display manner, and the content data corresponding to the highlighted album name is played back accordingly.

In this manner, the filter screen 751 of FIG. 42 displays a short list of the content data stored in the PD 5 based on the albums. Therefore, a user can make a short list of his/her desired albums to play back them.

Figure 43:
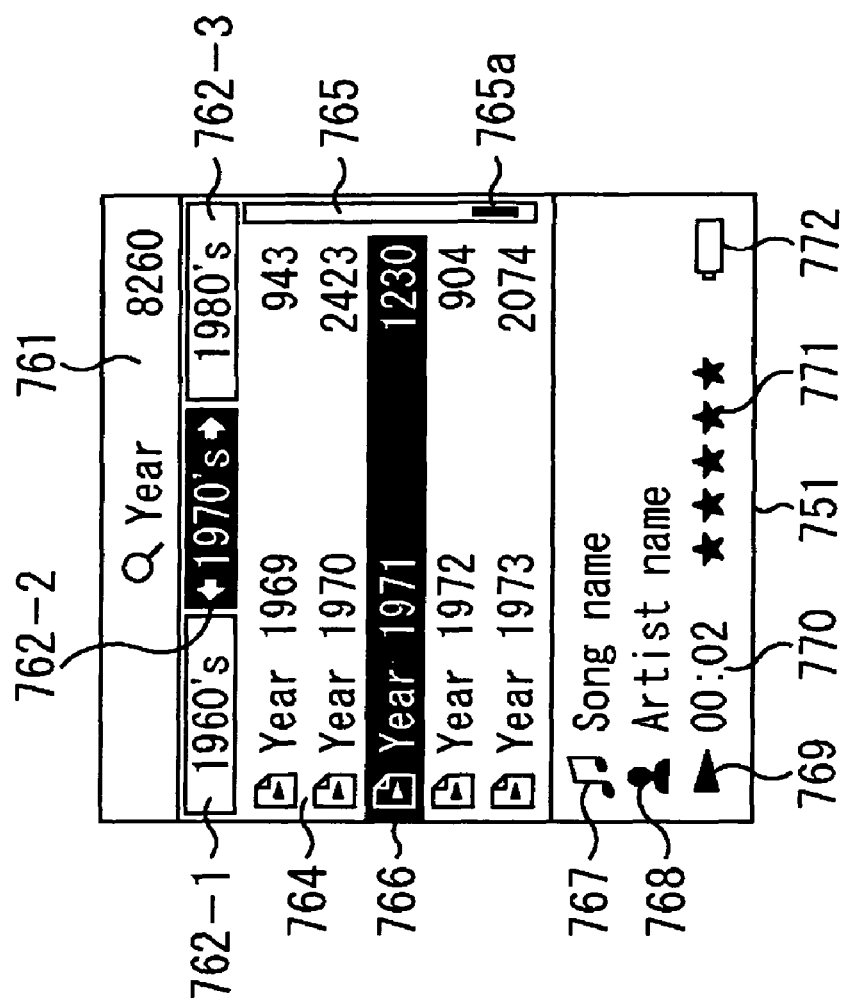
FIG. 43 is a diagram showing another example of the configuration of the filter screen shown in FIG. 40.

FIG. 43 shows an example of the configuration of the filter screen with a release date (year) mode (one of the display modes). It can be said that the difference between examples of FIG. 43 and FIG. 41 (the filter screen with the artist mode) is their display mode, and their configurations are almost same. Therefore, only the difference between them will be described in detail.

The filter screen 751 of FIG. 43 filters the content data stored in the PD 5 by their release dates to make a short list of content data. The filter screen 751 then displays the result of filtering by release dates, where a user selects a release date to play back content data. Information about dates of content data (release dates) memorized in the content metadata table 181 of FIG. 6 helps generating the filter screen 751 of FIG. 43.

The top area of the filter screen 751 of the release date mode displays a screen title 761. The screen title 761 includes a magnifying glass icon, indicating that this is the filter function; a character string of 'Year', indicating that this is in the release date mode; and numeric characters of '8260', indicating the number of content data on the PD 5.

In the example of FIG. 43, the center tag 762-2 displays the tag information of '1970s' indicating that the information displayed on the filter result display area 764 is the one in 1970s. The center tag 762-2 also includes a left arrow mark indicating that the left tag 762-1 is the previous one; and a right arrow mark indicating that the right tag 762-3 is the later one. The center tag 762-2 is highlighted in a reverse display manner.

The left tag 762-1 displays the tag information of '1960s' indicating that the 1960s are before that displayed on the center tag 762-2. The right tag 762-3 displays the tag information of '1980s' indicating that the 1980s are after that displayed on the center tag 762-2.

That is to say, in FIG. 43, controlling tag 762 changes information displayed on the filter result display area 764 in accordance with their release data.

First item of the information displayed on the filter result display area 764 of FIG. 43 includes an icon indicative of release dates; a character string of 'Year 1969' indicating that its release date is 1969; and numeric characters of '943' indicating that the number of content data released in 1969. Second item includes an icon indicative of release dates; a character string of 'Year 1970' indicating that its release date is 1970; and numeric characters of '2423' indicating that the number of content data released in 1970. Third item includes an icon indicative of release dates; a character string of 'Year 1971' indicating that its release date is 1971; and numeric characters of '1230' indicating that the number of content data released in 1230.

Fourth item includes an icon indicative of release dates; a character string of 'Year 1972' indicating that its release date is 1972; and numeric characters of '904' indicating that the number of content data released in 1972. Fifth item includes an icon indicative of release dates; a character string of 'Year 1973' indicating that its release date is 1973; and numeric characters of '2074' indicating that the number of content data released in 1973.

By the way, in the example shown in FIG. 43, a user has selected '1960s' by controlling the tags 762 and then has scrolled the screen one item downwards by controlling the scroll cursor 765a. Therefore, the filter result display area 764 is displaying the information about the content data released in 1960s as its first item.

In the example shown in FIG. 43, the third item has been selected by a cursor 766, and then highlighted in a reverse display manner. This means that the PD 5 is playing back the content data whose release data is '1971'. A user selects his/her desired item (release date) by moving the cursor 766 on the filter result display area 764. The release date information selected by the cursor 766 is highlighted in a reverse display manner, and the content data corresponding to the highlighted release date is played back accordingly.

In this manner, the filter screen 751 of FIG. 43 displays a short list of the content data stored in the PD 5 based on the release dates (year). Therefore, a user can make a short list of his/her desired release dates to play back them.

Figure 44:
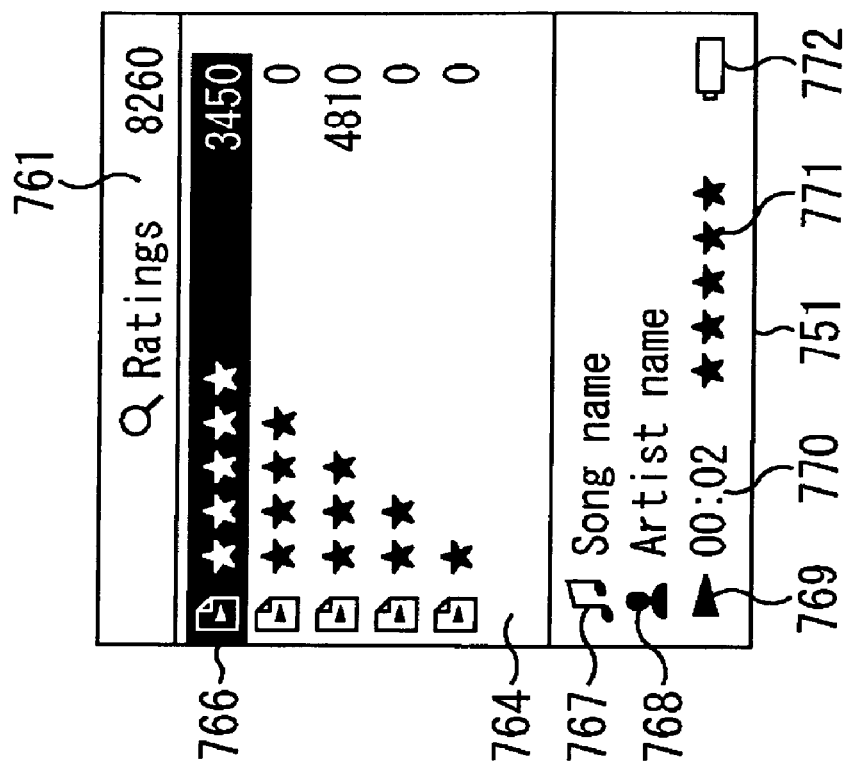
FIG. 44 is a diagram showing another example of the configuration of the filter screen shown in FIG. 40.

FIG. 44 shows an example of the configuration of the filter screen with a rating mode (one of the display modes). It can be said that the difference between examples of FIG. 44 and FIG. 40 (the filter screen with the genre mode) is their display mode, and their configurations are almost same. Therefore, only the difference between them will be described in detail.

The filter screen 751 of FIG. 44 filters the content data stored in the PD 5 by their ratings (evaluated values by users) to make a short list of content data. The filter screen 751 then displays the result of filtering by evaluated values, where a user selects an evaluated value to play back content data. Information about the evaluated values (which were generated by users) memorized in the content-metadata table 181 of FIG. 6 helps generating the filter screen 751 of FIG. 44.

The top area of the filter screen 751 of the rating mode displays a screen title 761. The screen title 761 includes a magnifying glass icon, indicating that this is the filter function; a character string of 'Ratings', indicating that this is in the rating mode; and numeric characters of '8260', indicating the number of content data on the PD 5.

The filter screen 751 shown in FIG. 44 does not have any tags 762. The area below the screen title 761 is the filter result display area 764.

First item of the information displayed on the filter result display area 764 (FIG. 44) includes an icon indicative of evaluation; five starts indicating that this content data is ranked five stars (the top out of five); and numeric characters of '3450' indicating the number of content data with five stars on the PD 5. Second item includes an icon indicative of evaluation; four stars indicating that this content data is ranked four stars (the second out of five); and numeric characters of '0' indicating the number of content data with four stars on the PD 5. Third item includes an icon indicative of evaluation; three starts indicating that this content data is ranked three stars (the third out of five); and numeric characters of '4810' indicating the number of content data with three stars on the PD 5.

Fourth item includes an icon indicative of evaluation; two starts indicating that this content data is ranked two stars (the fourth out of five); and numeric characters of '0' indicating the number of content data with two stars on the PD 5. Fifth item includes an icon indicative of evaluation; one star indicating that this content data is ranked one star (the worst out of five); and numeric characters of '0' indicating the number of content data with one star on the PD 5.

In the example shown in FIG. 44, the first item has been selected by a cursor 766, and then highlighted in a reverse display manner. This means that the PD 5 is playing back the content data whose evaluation value is five stars. A user selects his/her desired item (evaluation value) by moving the cursor 766 on the filter result display area 764. The evaluation value information selected by the cursor 766 is highlighted in a reverse display manner, and the content data corresponding to the highlighted evaluation value is played back accordingly.

In this manner, the filter screen 751 of FIG. 44 displays a short list of the content data stored in the PD 5 based on the evaluation values (ratings). Therefore, a user can make a short list of his/her-desired evaluation values to play back them. That is to say, the user can only play back the content data whose evaluation is greater than his/her desired level.

Figure 45:
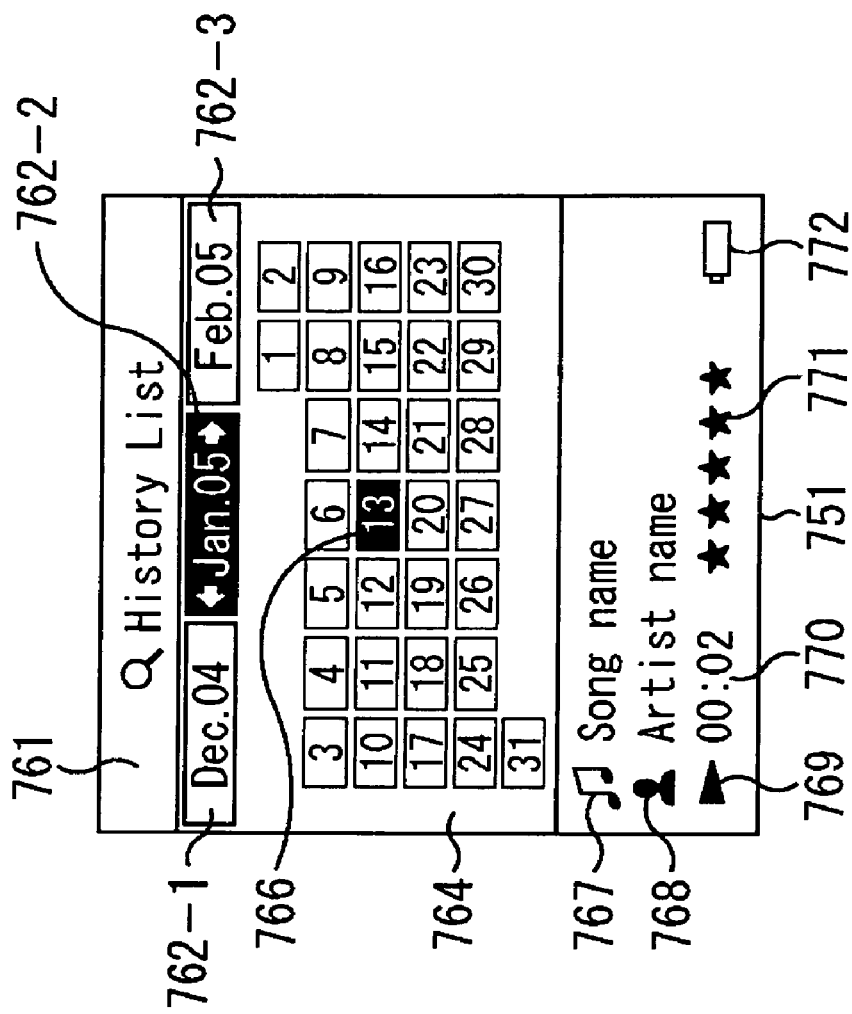
FIG. 45 is a diagram showing another example of the configuration of the filter screen shown in FIG. 40.

FIG. 45 shows an example of the configuration of the filter screen with a playback history mode (one of the display modes). It can be said that the difference between examples of FIG. 45 and FIG. 40 (the filter screen with the genre mode) is their display mode, and their configurations are almost same. Therefore, only the difference between them will be described in detail.

The filter screen 751 of FIG. 45 filters the content data stored in the PD 5 by dates of the playback history to make a short list of content data. The filter screen 751 then displays the result of filtering by dates of the playback history, where a user selects a date of the playback history to play back content data. The playback history of content data stored in the selection history management section 213 (FIG. 9) helps generating the filter screen 751 of FIG. 45.

The top area of the filter screen 751 of the playback history mode displays a screen title 761. The screen title 761 includes a magnifying glass icon, indicating that this is the filter function; and a character string of 'History', indicating that this is in the playback history mode.

In the example of FIG. 45, a left tag 762-1, a center tag 762-2, and a right tag 762-3 displays tag information (the dates of the playback history (year and month)) whose items are to be displayed on the filter result display area 764. Selecting the tags 762 swiftly changes items (calendar) displayed on the filter result display area 764 in accordance with the tag information of the selected tag 762.

For example, the center tag 762-2 displays the tag information of 'January 05' indicating that the calendar (as the playback history) displayed on the filter result display area 764 is that of January 2005. The center tag 762-2 also includes a left arrow mark indicating that the left tag 762-1 is the previous one; and a right arrow mark indicating that the right tag 762-3 is the later one. The center tag 762-2 is highlighted in a reverse display manner.

The left tag 762-1 displays the tag information of 'December 04' indicating that 'December 2004' which is before that of the center tag 762-2. The right tag 762-3 displays the tag information of 'February 05' indicating that 'February 2005' which is after that of the center tag 762-2.

When a use selects the left tag 762-1, the filter result display area 764 displays a calendar corresponding to the tag information ('December 2004') that was displayed on the left tag 762-1, and the tag information of 'December 04' that was displayed on the left tag 762-1 is displayed on the center tag 762-2, and the tag information of 'January 05' that was displayed on the center tag 762-2 is displayed on the right tag 762-3, and the left tag 762-1 displays the tag information of the previous year and month of 'November 04 (November 2004)'.

On the other hand, when a use selects the right tag 762-3, the filter result display area 764 displays a calendar corresponding to the tag information ('February 2005') that was displayed on the right tag 762-3, and the tag information of 'February 05' that was displayed on the right tag 762-3 is displayed on the center tag 762-2, and the tag information of 'January 05' that was displayed on the center tag 762-2 is displayed on the left tag 762-1, and the right tag 762-3 displays the tag information of the next month and year of 'March 05 (March 2005)'.

That is to say, in the example of FIG. 45, controlling the tags 762 changes information (items) displayed on the filter result display area 764 by months.

The filter result display area 764 shown in FIG. 45 displays a calendar with 31 days which corresponds to the tag information of 'January 05' displayed on the center tag 762-2.

In the example of FIG. 45, '13th' is selected by the cursor 766 from the calendar. This means that the PD 5 is playing back the content data with the playback history of 'Jan. 13, 2005'. The user moves the cursor 766 on the filter result display area 764 to select his/her desired date. The date selected by the cursor 766 is highlighted in a reverse display manner, and the content data corresponding to the selected date are played back. The content data corresponding to the selected date are played back in a predetermined order.

In this manner, the filter screen 751 of FIG. 45 displays a short list of the content data stored in the PD 5 based on playback histories. Therefore, a user can make a short list of his/her desired playback history to play back them.

Figure 46:
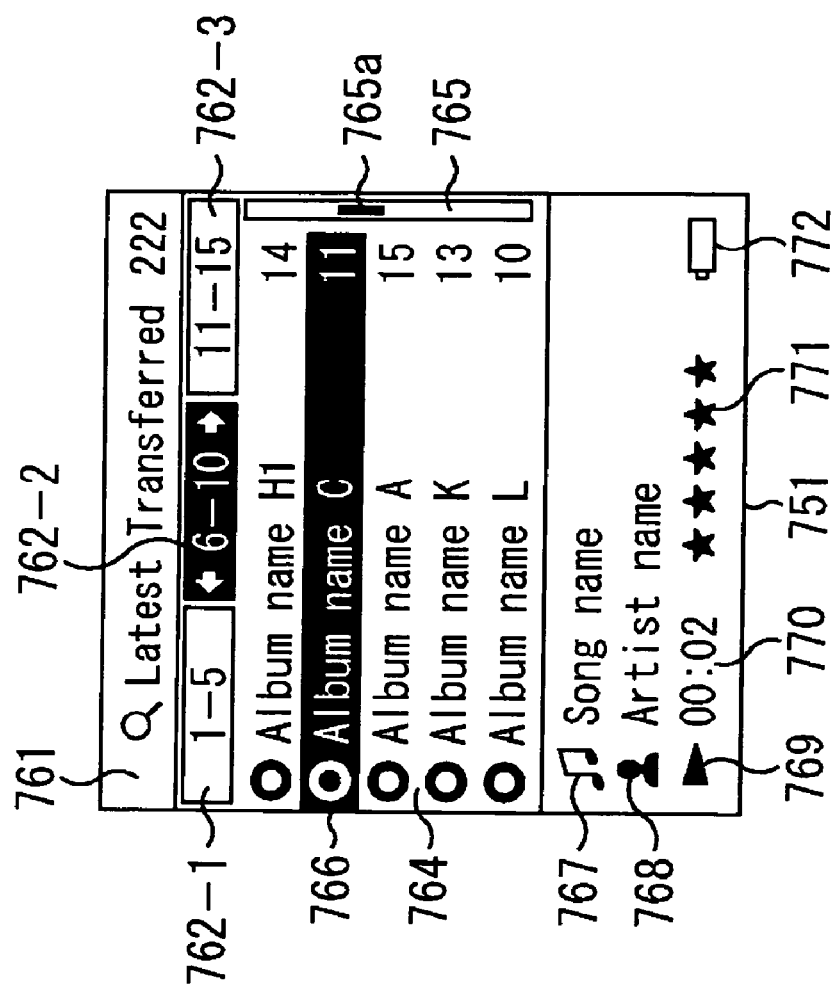
FIG. 46 is a diagram showing another example of the configuration of the filter screen shown in FIG. 40.

FIG. 46 shows an example of the configuration of the filter screen with a latest transferred mode (which is a mode for latest transferred albums, one of the display modes). It can be said that the difference between examples of FIG. 46 and FIG. 40 (the filter screen with the genre mode) is their display mode, and their configurations are almost same. Therefore, only the difference between them will be described in detail.

The filter screen 751 of FIG. 46 filters the content data stored in the PD 5 by latest transferred albums to make a short list of content data. The filter screen 751 then displays the result of filtering by albums names in order of transfer, where a user selects an album name to play back content data. The transfer history, which was stored in the content metadata table 181 of FIG. 6 when the content data was transferred to the PD 5, helps generating the filter screen 751 of FIG. 46.

The top area of the filter screen 751 of the album mode displays a screen title 761. The screen title 761 includes a magnifying glass icon, indicating that this is the filter function; a character string of 'Latest Transferred', indicating that this is in the latest transferred album mode; and numeric characters of '222', indicating the number of albums on the PD 5.

In the example of FIG. 46, a left tag 762-1, a center tag 762-2, and a right tag 762-3 displays tag information of numbers ordered by transfer dates. Each tag 762 includes five numbers that correspond to the items (recently transferred albums) displayed on the filter result display area 764. Selecting the tags 762 swiftly changes five items displayed on the filter result display area 764 in accordance with the tag information of the selected tag 762.

For example, the center tag 762-2 displays the tag information of '16-10', indicating that the albums displayed on the filter result display area 764 are the sixth to tenth albums out of the recently transferred albums. The center tag 762-2 also includes a left arrow mark indicating that the left tag 762-1 is the previous one; and a right arrow mark indicating that the right tag 762-3 is the later one. The center tag 762-2 is highlighted in a reverse display manner.

The left tag 762-1 displays the tag information of '1-5' indicating that they are earlier than those displayed on the center tag 762-2. The right tag 762-3 displays the tag information of '11-15' indicating that '11-15' are later than those displayed on the center tag 762-2.

When a use selects the left tag 762-1, the filter result display area 764 displays information about five items (album names) corresponding to the tag information ('1-5', i.e. the first to fifth out of the recently transferred albums) that was displayed on the left tag 762-1, and the tag information of '1-5' that was displayed on the left tag 762-1 is displayed on the center tag 762-2, and the tag information of '6-10' that was displayed on the center tag 762-2 is displayed on the right tag 762-3, and the left tag 762-1 displays the previous tag information of '50-55'.

On the other hand, when a use selects the right tag 762-3, the filter result display area 764 displays information about five items (album names) corresponding to the tag information ('11-15', i.e. the eleventh to fifteenth out of the recently transferred albums) that was displayed on the right tag 762-3, and the tag information of '11-15' that was displayed on the right tag 762-3 is displayed on the center tag 762-2, and the tag information of '16-10' that was displayed on the center tag 762-2 is displayed on the left tag 762-1, and the right tag 762-3 displays the later tag information of '16-20'.

That is to say, in the example of FIG. 46, controlling the tags 762 changes information (items on a page) displayed on the filter result display area 764 in the same way as that of FIG. 40.

First item of the information displayed on the filter result display area 764 of FIG. 46 includes a disc icon indicative of an album; a character string of 'Album name H' indicating the sixth one out of the recently transferred albums; and numeric characters of '14' indicating the number of content data stored in this album. Second item includes a disc icon indicative of an album; a character string of 'Album name C' indicating the seventh one out of the recently transferred albums; and numeric characters of '11' indicating the number of content data stored in this album. Third item includes a disc icon indicative of an album; a character string of 'Album name A' indicating the eighth one out of the recently transferred albums; and numeric characters of '15' indicating the number of content data stored in this album.

Fourth item includes a disc icon indicative of an album; a character string of 'Album name K' indicating the ninth one out of the recently transferred albums; and numeric characters of '13' indicating the number of content data stored in this album. Fifth item includes a disc icon indicative of an album; a character string of 'Album name L' indicating the tenth one out of the recently transferred albums; and numeric characters of '10' indicating the number of content data stored in this album.

In the example shown in FIG. 46, the second item has been selected by a cursor 766, and then highlighted in a reverse display manner. This means that the PD 5 is playing back the content data stored in the seventh album of 'Album name C'. A user selects his/her desired album name by moving the cursor 766 on the filter result display area 764. The album name selected by the cursor 766 is highlighted in, a reverse display manner, and the content data corresponding to the highlighted album name is played back accordingly.

In this manner, the filter screen 751 of FIG. 46 displays a short list of the content data stored in the PD 5 in accordance with the information about the latest transferred albums. Therefore, a user can make a short list of his/her desired recently-transferred albums to play back them.

Figure 47:
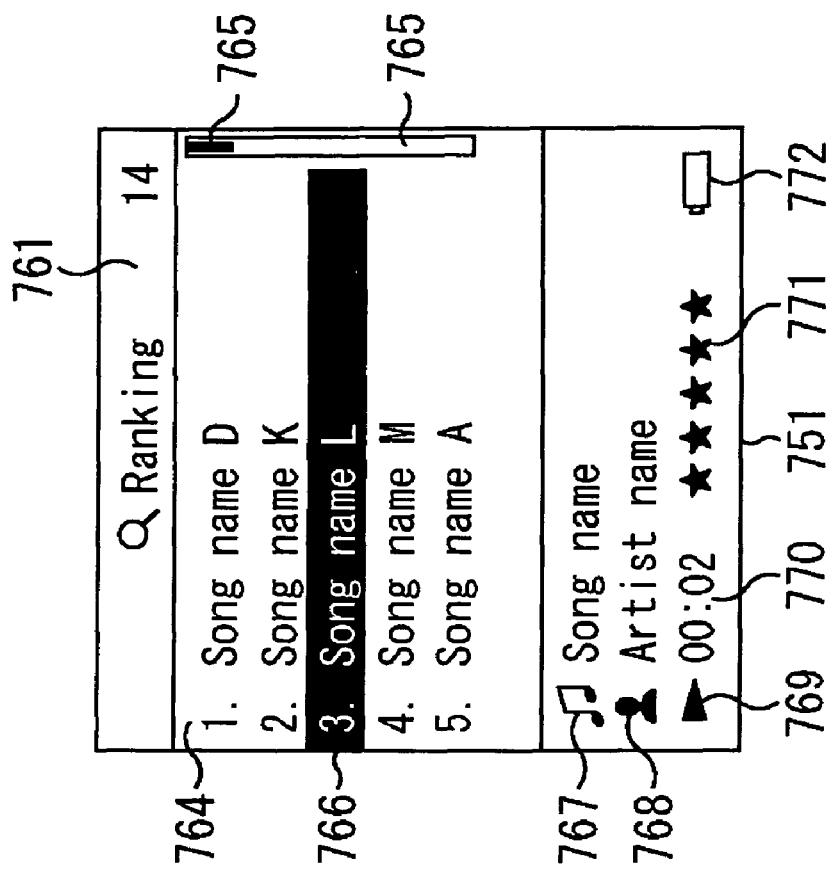
FIG. 47 is a diagram showing another example of the configuration of the filter screen shown in FIG. 40.

FIG. 47 shows an example of the configuration of the filter screen with a user ranking mode (one of the display modes). It can be said that the difference between examples of FIG. 47 and FIG. 40 (the filter screen with the genre mode) is their display mode, and their configurations are almost same. Therefore, only the difference between them will be described in detail.

The filter screen 751 of FIG. 47 filters the content data stored in the PD 5 in accordance with a user's ranking to make a short list of content data. The filter screen 751 then displays the result of filtering in an order of ranking, where a user selects a content name to play back content data. The user ranking shows the content data that the user recently often viewed or listened to for the past predetermined period (which is to say, it is determined based on the number of times the user viewed or listened to them). User ranking information calculated from the playback history that has been stored in the selection history management section 213 (FIG. 9) helps generating the filter screen 751 of FIG. 47.

Accordingly, the user ranking mode of FIG. 47 is different from the above ranking mode illustrated by FIGS. 16 and 17. That is to say, the user ranking information is different from both the sales ranking and the viewer ranking (utilizing the content server 3), which have been recorded on the content metadata table 181. The user ranking information is for example generated from the user's playback history illustrated above by FIG. 20. The content data which the user most frequently viewed or listened to is ranked top. The user ranking information is used independently in the example of FIG. 47, while the user ranking is used to compare the user's preference with that of others in the example of FIG. 16.

By the way, the past predetermined period could be a latest period, or a user may choose that period.

The top area of the filter screen 751 of the user ranking mode displays a screen title 761. The screen title 761 includes a magnifying glass icon, indicating that this is the filter function; a character string of 'Ranking', indicating that this is in the ranking mode; and numeric characters of '14', indicating the number of rankings of the content data. This number can be previously set by users. In this case (FIG. 47), first to fourteenth content data are displayed.

The filter screen 751 of FIG. 47 does not include the tags 762. The area below the screen title 761 is the filter result display area 764.

First item of the information displayed on the filter result display area 764 (FIG. 47) includes a numeric character of '1' indicating the first on the ranking; and a content name of 'Song name D' which has been ranked top (the most frequently viewed content data). Second item includes a numeric character of '2' indicating the second on the ranking; and a content name of 'Song name K' which has been ranked second (the second most frequently viewed content data). Third item includes a numeric character of '3' indicating the third on the ranking; and a content name of 'Song name L' which has been ranked third (the third most frequently viewed content data).

Fourth item includes a numeric character of '4' indicating the fourth on the ranking; and a content name of 'Song name M' which has been ranked fourth (the fourth most frequently viewed content data). Fifth item includes a numeric character of '5' indicating the fifth on the ranking; and a content name of 'Song name A' which has been ranked fifth (the fifth most frequently viewed content data).

In the example shown in FIG. 47, the third item has been selected by a cursor 766, and then highlighted in a reverse display manner. This means that the PD 5 is playing back the content data ranked third whose name is 'Song name L'. A user selects his/her desired content name by moving the cursor 766 on the filter result display area 764. The content name selected by the cursor 766 is highlighted in a reverse display manner, and the content data corresponding to the highlighted content name is played back accordingly.

In this manner, the filter screen 751 of FIG. 47 displays a short list of the frequently-viewed (or listened-to) content data in order of frequency, which have been stored in the PD 5. Therefore, a user can make a short list of the content data he/she has often viewed or listened to for the past predetermined period to play back them.

The above describes the four filter screens as the content selection screens. Other types of filter screens may be applied to the content selection screens.

In this manner, the PD 5 provides a user with the filter screens (one of the content selection screens), besides the map screen by which he/she can intuitively select a play list of his/her desired content data from the content metadata, the jump screen by which he/she can select (retrieve) content data associated with certain content data, and the play list screen by which a user can select content data from the play list selected through the map screen or the jump screen.

In addition, the selected information on one of the screens is shared between the filter screen, the map screen, the jump screen and the play list screen. Therefore, a user can select the content data in line with his/her intention or feeling by switching the content selection screens.

By using one of the content selection screens, a user can select the content data out of various unknown content data in line with his/her intention or feeling to play back them.

Figure 36:
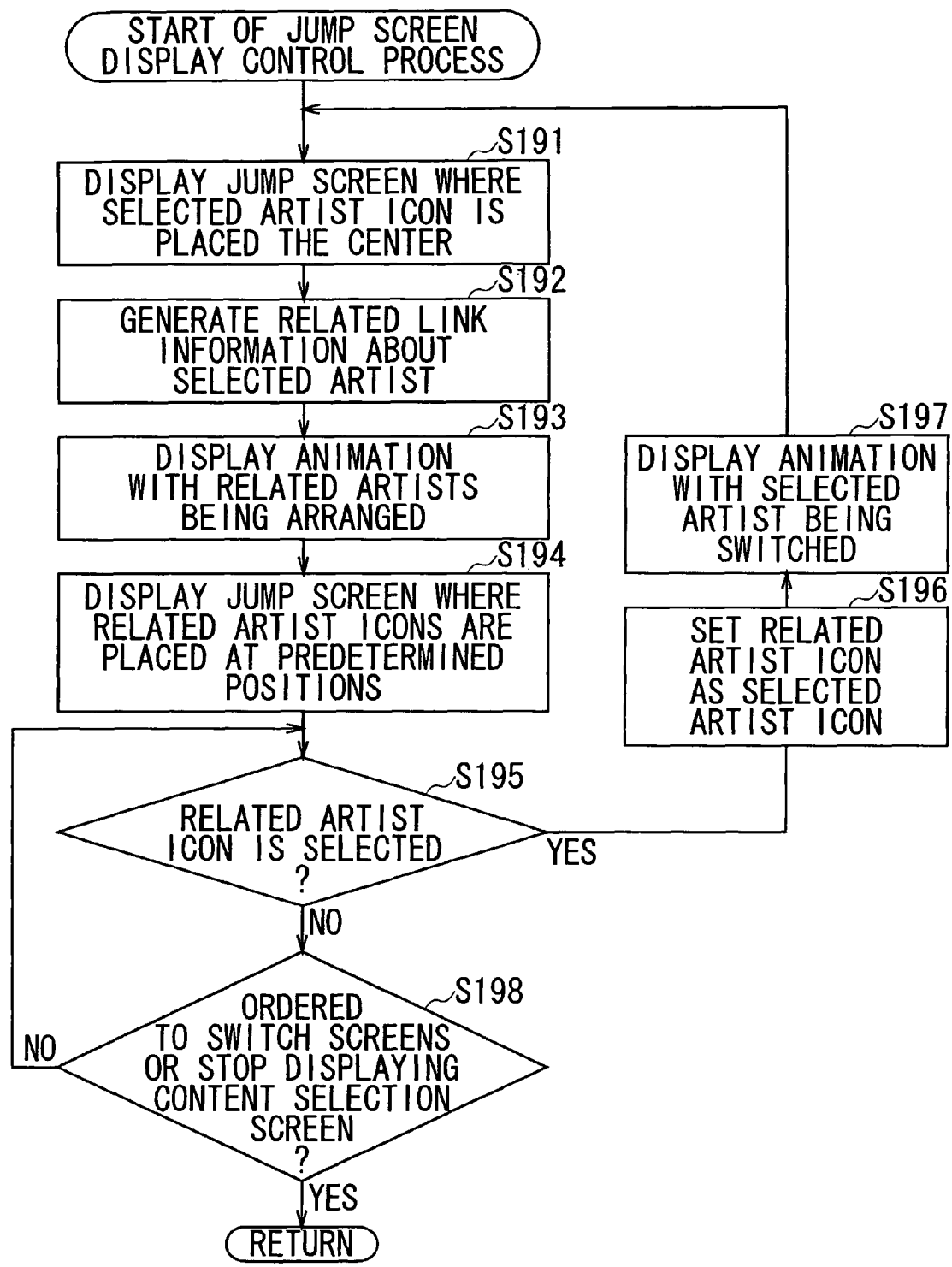
FIG. 36 is a flowchart illustrating a jump screen display control process at step S176 in FIG. 35.

The above described that, in the display control process of the jump screen illustrated by FIG. 36, the related link information of the selected artist (the related artist information) was generated by checking the artist table 182 and artist related table 183 in the metadata database 171.

This means that the artist related table 183 including the information of artist related to a certain artist has been generated and registered. The related link information therefore is generated by acquiring artists related to the selected certain artist from the previously-registered artist related table 183.

The following describes a process which, by using tables including the detailed metadata of a plurality of content data which can be acquired from servers, acquires content data related to the content data of the selected artist, and then generates a list of artists associated with the acquired content data as the related link information of the selected artist (this information will be referred to as a related artist list), without generating the artist related table 183.

Figure 48:
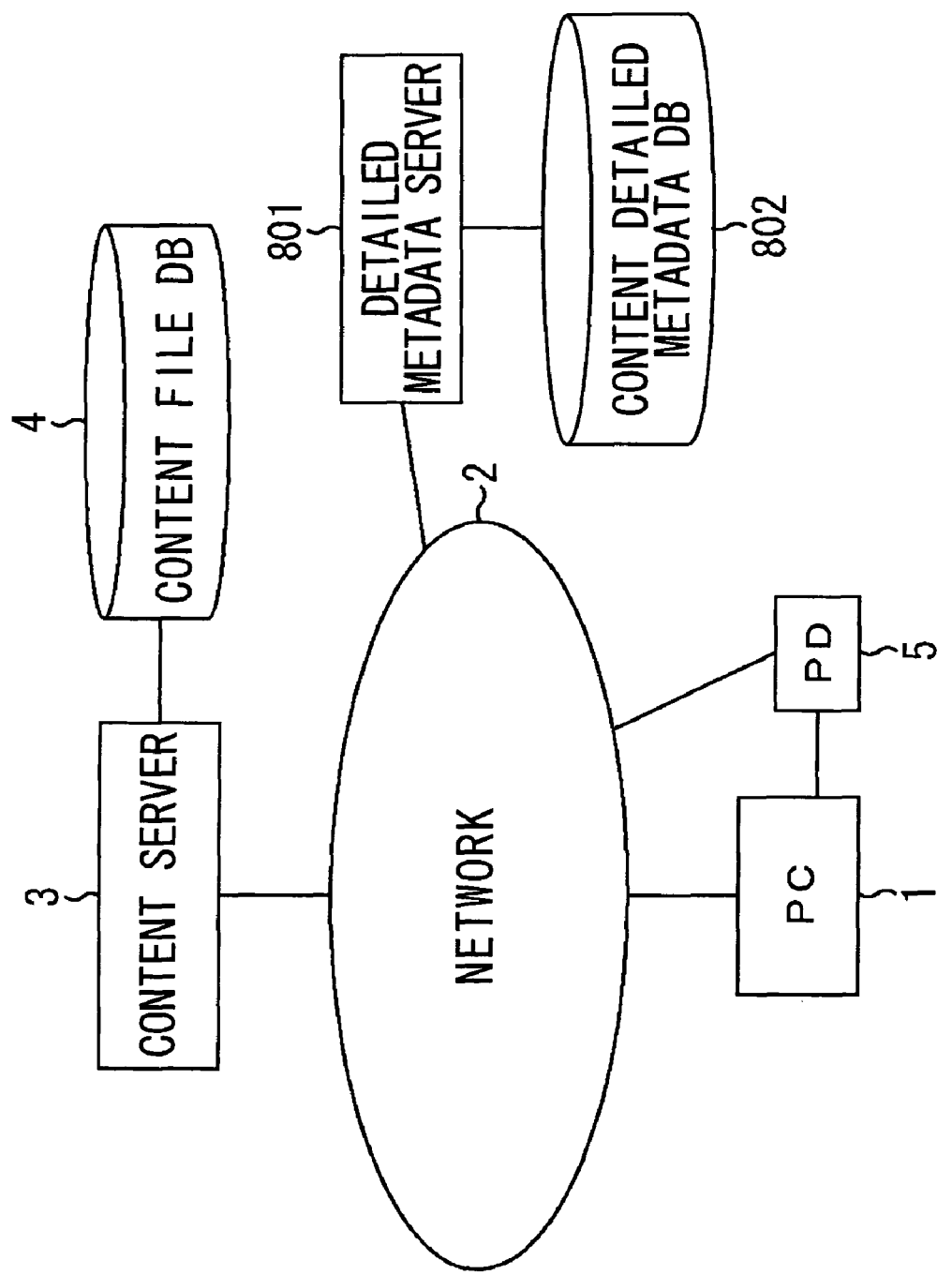
FIG. 48 is a diagram showing another example of the configuration of the content provision system according to an embodiment of the present invention.

FIG. 48 is another example of a content provision system according to an embodiment of the present invention.

The content provision system shown in FIG. 48 includes the PC 1, the network 2, the content server 3 having the content file DB 4, and the PD 5. In that regard, this content provision system is the same as that of FIG. 1. The difference between them is that the content provision system shown in FIG. 48, in addition to that, includes a detailed metadata server 801 having a content detailed metadata database (DB) 802.

The detailed metadata server 801 that provides a user with a detailed metadata table is connected to the network 2 (FIG. 48), to which the content server 3 that provides the user with the content file including content data and corresponding metadata is also connected. Some other detailed metadata servers 801 may be also connected to the network 2.

The detailed metadata server 801 includes the content detailed metadata DB 802 storing the content detailed metadata table. The content detailed metadata table includes the content detailed metadata of various content data that users can purchase in the market. The content detailed metadata includes detailed information, such as metadata which has much more detailed information than the metadata included in the content file with the content data.

In the same way as the content server 3, the detailed metadata server 801 authenticates, when the PC 1 or the PD 5 accesses the detailed metadata server 801, a user who has been registered to be provided with the content detailed metadata table. After authenticating the PC 1 or the PD 5, the detailed metadata server 801 transmits the content detailed metadata table, which has been stored in the content detailed metadata DB 802, to the user's PC 1 or PD 5 through the network 2.

The detailed metadata server 801 has almost the same configuration as the PC 1 illustrated by FIG. 2. Therefore, the configuration shown in FIG. 2 will be also referred to as the configuration of the detailed metadata server 801.

In the same way as that of FIG. 1, the PC 1 accesses the content server 3, records content files received from the content server 3, and transfers the content files to the PD 5 connected. In addition to that, the PC 1 accesses, by using client software such as web browser, the detailed metadata server 801 to acquire the content detailed metadata table. The PC 1 then records the content detailed metadata table and transfers it to the PD 5.

In the same way as that of FIG. 1, the PD 5 records various content files acquired from the content server 3 and CDs through the PC 1. The PD 5 also plays back various content files on the removable media 122 by using the metadata of the content files on the removable media 122. In addition to that, the PD 5 connects with the network 2 directly or through the PC 1, and then acquires the content detailed metadata table from the detailed metadata server 801 to record it.

When a user directs the PD 5 to display the jump screen (FIG. 21), the PD 5 acquires information about the content data and artists related to the selected artist's content data by checking the content detailed metadata table recorded. The PD 5 then generates, based on the acquired information, the related artist list to display the jump screen of Artist Jump on the display section 131.

By the way, FIG. 48 describes the example where the PD 5 acquires the content detailed metadata table from the detailed metadata server 801 to record it. The PD 5 may access the content detailed metadata DB 802 to check the content detailed metadata table each time when it creates the related artist list. This means that the content detailed metadata table could remain in the PD 5 or on the network 2.

In addition, FIG. 48 describes the detailed metadata server 801 including the content detailed metadata DB 802. Alternatively, the content server 3 may include the content detailed metadata DB 802 to offer the content detailed metadata table.

Figure 49:
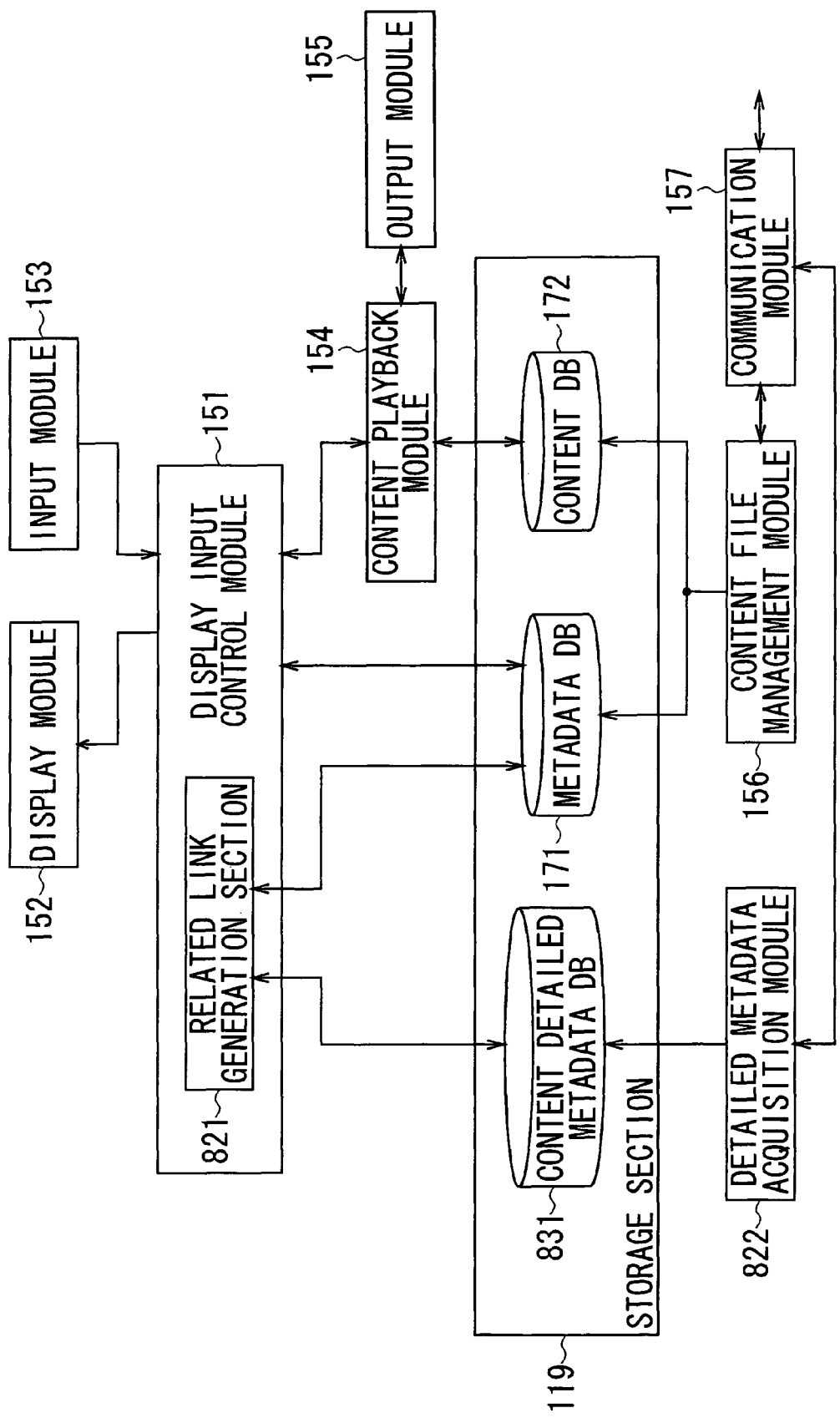
FIG. 49 is a block diagram showing an example of the functional configuration of a PD illustrated by FIG. 48.

FIG. 49 is a block diagram showing an example of the functional configuration of the PD 5 of FIG. 48.

The functional blocks of FIG. 49 are the same as those of FIG. 5: the functional blocks of FIG. 49 include the display input control module 151, the display module 152, the input module 153, the content playback module 154, the output module 155, the content file management module 156, the communication module 157 and the storage section 119 with the metadata DB 171 and the content DB 172. The functional blocks of FIG. 49 further includes a detailed metadata acquisition module 822, and the content detailed metadata DB 831 which is in the storage section 119.

The display input control module 151 shown in FIG. 49 includes a related link generation section 821, which is equivalent to the related link generation section 231 of FIG. 9. This means that the display input control module 151 of FIG. 49 is the same as that of FIG. 9 except that the related link generation section 231 has been switched to the related link generation section 821: other sections (such as the selection location acquisition section 211, the display format management section 212, the selection history management section 213, the related link display control section 215, the map display control section 216, the list display control section 217, the grid map generation section 232 and the bookmark generation section 233) are the same. Therefore, these sections are not shown in FIG. 49 except the related link generation section 821.

In the same way as the related link generation section 231 of FIG. 9, the related link generation section 821 of the display input control module 151 of FIG. 49 checks the content metadata table 181 and the artist table 182 to acquire the content information corresponding to the selected artist to generate a play list. To direct the content playback module 154 to play back the content data, the related link generation section 821 supplies, based on the selection location information from the information generation control section 214, the content data listed in the play list of the selected artist to the content playback module 154.

In addition, the related link generation section 821 checks the content detailed metadata DB 831 and the metadata DB 171 (the content metadata table 181 and the artist table 182) to extract the content data that are to a certain extent related to the content data of the artist specified by the information generation control section 214, which is to say the related link generation section 821 extracts the content data having the same attribute, or the content data having the similar attribute. Based on that, the related link generation section 821 generates the related artist list including artists of the extracted content data.

That is to say, the related link generation section 821 checks the content detailed metadata DB 831, the content metadata table 181 and/or the artist table 182, and then extracts the specified artist's content data and the content data having the same attribute (the same genre, for example).

In addition, for example, the related link generation section 821 checks the content detailed metadata DB 831, the content metadata table 181 and/or the artist table 182, and then extracts the specified artist's content data and the content data having the similar attribute which is equivalent to analytical data obtained by analyzing the specified content data. The analytical data includes speed (tempo) of the content data, tune of the whole content data (major or minor), rhythm of the content data (frequency of use of the percussion), and the like.

The related link generation section 821 then generates the related artist list which lists artists in order of the number of the content data extracted. The related link generation section 821 subsequently supplies the generated related artist list to the related link display control section 215, or records the generated related artist list on the artist related table 183 of the metadata DB 171.

In response to that, the related link display control section 215 generates screen data based on the related artist list. Accordingly, the display module 152 displays the screen on the display section 131 in accordance with the screen data from the related display control section 217.

By the way, because the related artist list is recorded on the artist related table 183, the metadata DB 171 and the content detailed metadata DB 831 are not updated for a while. During that period, the related link generation section 821 can generate, in the same way as the related link generation section 231 shown in FIG. 9, the related artist information about the selected artist by checking the artist related table 183.

The detailed metadata acquisition module 822 controls the communication module 157 to acquire the content detailed metadata table from the detailed metadata server 801 and register the content detailed metadata table in the content detailed metadata DB 831.

The content detailed metadata DB831 includes the content detailed metadata table and a table of data generated by analyzing the content data.

The operation of the PD 5 acquiring the content detailed metadata table will be described.

For example, the detailed metadata acquisition module 822 has stored a user ID and password to acquire information from the content detailed metadata server 801, and times with an internal clock. When a predetermined period has passed, the detailed metadata acquisition module 822 supplies the user ID and password to the communication module 157, as well as requesting the content detailed metadata table. The communication module 157 for example accesses the detailed metadata server 801 through the communication section 120 and the network 2 to transmit the user ID and the password.

When the communication section 19 of the detailed metadata server 801 receives the user ID and the password from the PD 5, the communication section 19 supplies them to the CPU 11. Based on the user ID and password received by the communication section 19, the CPU 11 authenticates a user of the PD 5, and then controls the communication section 19 to transmit the content detailed metadata table about various content data stored in the content detailed metadata DB 802 through the network 2.

When the communication module 157 receives the content detailed metadata table through the communication section 120, the communication module 157 supplies it to the detailed metadata acquisition module 822. The detailed metadata acquisition module 822 registers the content detailed metadata table received from the communication module 157 on the content detailed metadata DB 831.

In this manner, the PD 5 can always keep the latest content detailed metadata table.

The above describes the PD 5 having the content detailed metadata DB 831, and that the content detailed metadata table is acquired at a certain interval of time. Alternatively, the content detailed metadata table can be acquired along with the content file, for example.

If the PD 5 does not have the content detailed metadata DB 831, the related link generation section 821 asks the detailed metadata acquire module 822 to check the content detailed metadata DB. Accordingly, the detailed metadata acquisition module 822 can retrieve desired information from the content detailed metadata DB 802 of an external section (equivalent to the detailed metadata server 801) by controlling the communication module 157 each time it generates the related list.

Figure 50:
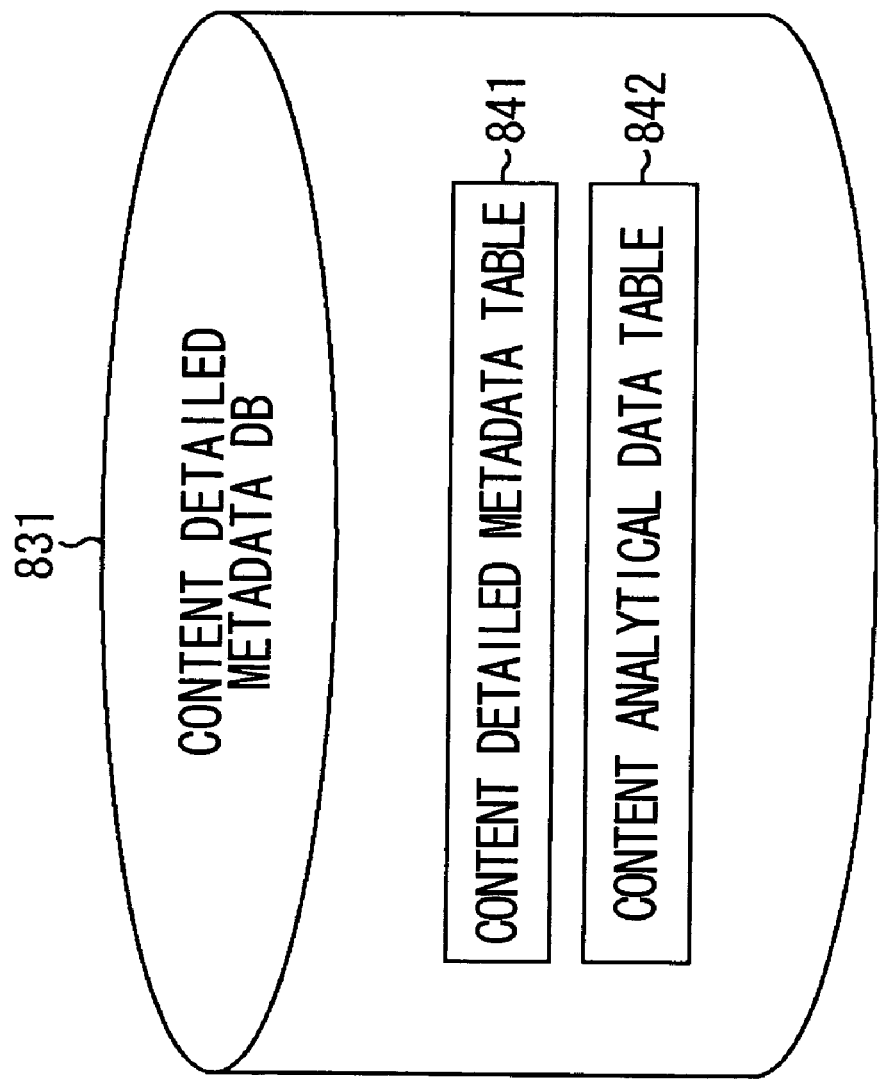
FIG. 50 is a diagram showing an example of the configuration of a content detailed metadata database shown in FIG. 49.

FIG. 50 shows an example of the configuration of the content detailed metadata DB of FIG. 49.

In the example of FIG. 50, the content detailed metadata DB 831 includes the content detailed metadata table 841 and the content analytical data table 842.

The content detailed metadata table 841 includes the content detailed metadata about various content data in the market, as well as the metadata about the content data on the content DB 172. The content detailed metadata includes detailed genre information compared to that of the metadata of the content metadata table 181, for example, which is to say the content detailed metadata includes sub genres belonging to main genres.

The content analytical data table 842 includes not only the content data on the content DB 172 but also the analytical data. The analytical data are generated by analyzing the various content data in the market, corresponding metadata and the content detailed metadata, including tune, rhythm and speed of the content data.

In the same way as the content detailed metadata table 841, the content analytical data table 842 is stored in the content detailed metadata DB 802 of the detailed metadata server 801. The content analytical data table 842 can be acquired from the detailed metadata server 801 at the same time as the content detailed metadata table 841. Alternatively, the PD 5 may produce the content analytical data table 842 based on the content detailed metadata table 841.

FIG. 51 shows an example of the configuration of the content detailed metadata table shown in FIG. 50.

In the example of FIG. 51, the content detailed metadata table 841 includes 'Content ID' indicating the identification of the content data; 'Genre ID' indicating a type of its content data (music data), which is to say this is the identification of attribute; 'Sub Genre ID' indicating the identification of the attribute which is most similar to that of its content data out of various attributes except that of the genre ID (i.e. except the attribute of the content data); 'Artist Name' indicating an artist name of its content data; and 'Music Name' indicating a name of its content data.

By the way, the sub genre IDs have been classified well more than the genre IDs. The genre IDs are attributes the content data belong to. The sub genre IDs are attributes the genres of the content data are associated with. Therefore, the sub genre ID has a wider range than the genre ID.

For example, the content detailed metadata table 841 shown in FIG. 15 shows the fact that the content data whose content data ID is '1' has the genre ID of '1', the sub genre ID of '11', its artist name of 'Artist A' and its music name of 'Music Name 1'; the content data whose content data ID is '2' has the genre ID of '1', the sub genre ID of '11', its artist name of 'Artist A' and its music name of 'Music Name 2'; the content data whose content data ID is '3' has the genre ID of '1', the sub genre ID of '11', its artist name of 'Artist B' and its music name of 'Music Name 3'; and the content data whose content data ID is '4' has the genre ID of '1', the sub genre ID of '11', its artist name of 'Artist B' and its music name of 'Music Name 4'.

In addition, the content detailed metadata table 841 shows the fact that the content data whose content data ID is '5' has the genre ID of '1', the sub genre ID of '12', its artist name of 'Artist C' and its music name of 'Music Name 5'; the content data whose content data ID is '6' has the genre ID of '1', the sub genre ID of '12', its artist name of 'Artist C' and its music name of 'Music Name 6'; the content data whose content data ID is '7' has the genre ID of '1', the sub genre ID of '12', its artist name of 'Artist D' and its music name of 'Music Name 7'; and the content data whose content data ID is '8' has the genre ID of '1', the sub genre ID of '13', its artist name of 'Artist D' and its music name of 'Music Name 8'.

In addition, the content detailed metadata table 841 shows the fact that the content data whose content data ID is '9' has the genre ID of '1', the sub genre ID of '13', its artist name of 'Artist E' and its music name of 'Music Name 9'; the content data whose content data ID is '10' has the genre ID of '12', the sub genre ID of '14', its artist name of 'Artist B' and its music name of 'Music Name 10'; the content data whose content data ID is '11' has the genre ID of '2', the sub genre ID of '21', its artist name of 'Artist F' and its music name of 'Music Name 11'; the content data whose content data ID is '12' has the genre ID of '2', the sub genre ID of '21', its artist name of 'Artist F' and its music name of 'Music Name 12'; and the content data whose content data ID is '13' has the genre ID of '2', the sub genre ID of '21', its artist name of 'Artist F' and its music name of 'Music Name 13'.

Furthermore, the content detailed metadata table 841 shows the fact that the content data whose content data ID is '14' has the genre ID of '2', the sub genre ID of '21', its artist name of 'Artist G' and its music name of 'Music Name 14'; the content data whose content data ID is '15' has the genre ID of '2', the sub genre ID of '21', its artist name of 'Artist G' and its music name of 'Music Name 15'; the content data whose content data ID is '16' has the genre ID of '2', the sub genre ID of '21', its artist name of 'Artist G' and its music name of 'Music Name 16'; the content data whose content data ID is '17' has the genre ID of '3', the sub genre ID of '31', its artist name of 'Artist H' and its music name of 'Music Name 17'; and the content data whose content data ID is '18' has the genre ID of '3', the sub genre ID of '31', its artist name of 'Artist H' and its music name of 'Music Name 18'.

The content detailed metadata table 841 may have another configuration instead of that of FIG. 51. The content detailed metadata table 841 may further include the following metadata and detailed metadata: 'Tempo', which indicates speed (Bpm) of the content data; 'Major', which indicates whether the tune of the content data is a major or minor key, 'Rhythm Ratio', which indicates whether the content data is percussive or quiet; 'HiMid', which indicates whether the sound range of the content data is high or low; 'Date', which indicates a date when the content data was released; and 'Ranking', which indicates how often a user viewed or listened to the content data.

The content detailed metadata table 841 may include another kind of genre ID which is less associated with the content data than the sub genre ID.

If the content data is video, the content detailed metadata table 841 may include the following metadata: a program name, a title of a film and a release date (year).

FIG. 52 shows an example of the configuration of the content analytical data table.

The content analytical data table 842 shown in FIG. 52 includes 'Content ID', which indicates the identification of the content data; 'Tempo', which indicates values calculated by analyzing the speed (Bpm) of the content data; 'Usage Rate of Percussion', which indicates values calculated by analyzing the rhythm of the content data and shows whether the content data is percussive or quiet; and 'Usage Rate of Major Code', which indicates values calculated from analyzing whether or not the tune of the content data is a major or minor key.

By the way, in the example of FIG. 52, the faster the content data is the more its 'Tempo' will increase. The more percussive the content data is the more its 'Usage Rate of Percussion' will increase. The more the content data tends to be in a major key the more its 'Usage Rate of Major Code' will increase.

For example, the content analytical data table 842 indicates the fact that the content data with the content data ID of '1' has the tempo of '118', the usage rate of percussion of '32' and the usage rate of major code of '15'; the content data with the content data ID of '2' has the tempo of '129', the usage rate of percussion of '5' and the usage rate of major code of '58'; the content data with the content data ID of '3' has the tempo of '55', the usage rate of percussion of '55' and the usage rate of major code of '63'; and the content data with the content data ID of '4' has the tempo of '124', the usage rate of percussion of '62' and the usage rate of major code of '38'.

In addition, the content analytical data table 842 indicates the fact that the content data with the content data ID of '5' has the tempo of '156', the usage rate of percussion of '56' and the usage rate of major code of '93'; the content data with the content data ID of '6' has the tempo of '160', the usage rate of percussion of '67' and the usage rate of major code of '97'; the content data with the content data ID of '7' has the tempo of '64', the usage rate of percussion of '11' and the usage rate of major code of '31'; and the content data with the content data ID of '8' has the tempo of '42', the usage rate of percussion of '18' and the usage rate of major code of '94'.

Furthermore, the content analytical data table 842 indicates the fact that the content data with the content data ID of '9' has the tempo of '115', the usage rate of percussion of '44' and the usage rate of major code of '57'; the content data with the content data ID of '10' has the tempo of '158', the usage rate of percussion of '58' and the usage rate of major code of '39'; the content data with the content data ID of '11' has the tempo of '101', the usage rate of percussion of '53' and the usage rate of major code of '18'; the content data with the content data ID of '12' has the tempo of '126', the usage rate of percussion of '67' and the usage rate of major code of '97'; and the content data with the content data ID of '13' has the tempo of '128', the usage rate of percussion of '15' and the usage rate of major code of '64'.

Furthermore, the content analytical data table 842 indicates the fact that the content data with the content data ID of '14' has the tempo of '133', the usage rate of percussion of '82' and the usage rate of major code of '99'; the content data with the content data ID of '15' has the tempo of '41', the usage rate of percussion of '27' and the usage rate of major code of '71'; the content data with the content data ID of '16' has the tempo of '157', the usage rate of percussion of '5' and the usage rate of major code of '7'; the content data with the content data ID of '17' has the tempo of '53', the usage rate of percussion of '81' and the usage rate of major code of '97'; and the content data with the content data ID of '18' has the tempo of '109', the usage rate of percussion of '17' and the usage rate of major code of '10'.

The content analytical data table 842 may have another configuration instead of that of FIG. 52. The content analytical data table 842 may further include other analytical data, such as data indicating whether the sound range of the content data is high or low, and data indicating the image of the content data (jazz-like images, groove-like images, uplifting images and the like).

Figure 53:
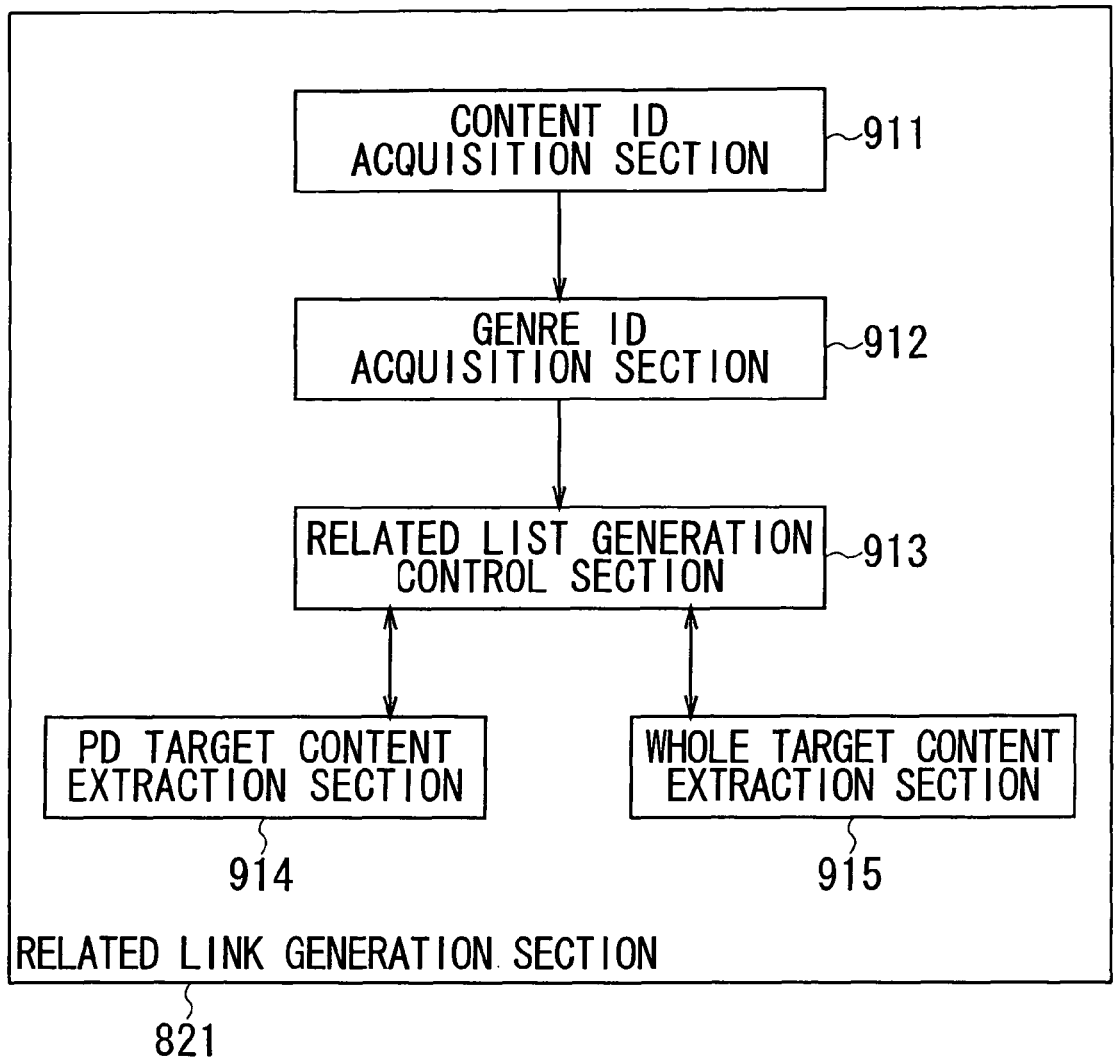
FIG. 53 is a diagram showing an example of the configuration of a related link generation section shown in FIG. 49.

FIG. 53 is a diagram showing an example of the configuration of the related link generation section (FIG. 49) generating the related artist list.

In the example of FIG. 53, the related link generation section 821 includes a content ID acquisition section 911, a genre ID acquisition section 912, a related list generation control section 913, a PD target content extraction section 914, and a whole target list extraction section 915.

When the content ID acquisition section 911 receives, in response to the operation signal from the input module 153, the selected content data set by the selection history management section 213 or the selected artist from the information generation control section 214, the content ID acquisition section 911 retrieves, from the metadata DB 171, the content ID of the selected content data or the content ID of the content data of the selected artist, and then supplies the content ID to the genre ID acquisition section 912.

If there is a plurality of content data of the selected artist, the content ID acquisition 911 may choose one of them (the top of them in order of names, for example).

The genre ID acquisition section 912 acquires, from the content detailed metadata table 841, the genre ID corresponding to the content ID acquired by the content ID acquisition section 911, and then supplies the genre ID to the related list generation control section 913.

The related list generation control section 913 sets an area of retrieval. In this case, the area of retrieval may be limited to the content data stored in the PD5, or maybe not. This setting can be changed.

In response to the area of retrieval, the related list generation control section 913 controls the PD target content extraction section 914 or the whole target content extraction section 915 to extract content data whose genre ID is the same as the one acquired by the genre ID acquisition section 912, and corresponding artists. The related list generation control section 913 generates, based on the acquired content data, the related artist list such that the artists are listed in order of the number of the content data of the same genre ID. The related list generation control section 913 then supplies the related artist list to the related link display control section 215, and also records the related artist list on the artist related table 183.

The PD target content extraction section 914 retrieves the content data whose genre ID is the same as the one acquired by the genre ID acquisition section 912 from those stored in the PD 5.

That is to say, the PD target content extraction section 914 under the control of the related list generation control section 913 retrieves, out of the content IDs on the content detailed metadata table 841, from the content data of the content IDs stored in the content metadata table 181, the content data whose genre IDs are the same as the one acquired by the genre ID acquisition section 912 and corresponding artists. The PD target content extraction section 914 supplies, to the related list generation control section 913, a list listing the content data with the same genre ID and the corresponding artists.

The whole target content extraction section 915 retrieves the content data whose genre IDs are the same as the one acquired by the genre ID acquisition section 912 not only from the content data stored in the PD 5 but from all the content data stored in the content detailed metadata table 841.

That is to say, the whole target content extraction section 915 under the control of the related list generation control section 913 retrieves, out of the content data on the content detailed metadata table 841, the content data whose genre IDs are the same as the one acquired by the genre ID acquisition section 912 and corresponding artists. The whole target content extraction section 915 supplies, to the related list generation control section 913, a list listing the content data with the same genre ID and the corresponding artists.

Those acquired by the whole target content extraction section 915 may include the content data not stored in the PD 5. Therefore, in a case in which the related list generation control section 913 generates the related artist list in accordance with the list of content data from the whole target content extraction section 915, the related list generation control section 913 may sort the related artists on the related artist list in order of the number of the content data on the content metadata table 181. The related list generation control section 913 may display the content data and artists which are not stored in the content metadata table 181 in gray by associating them with flags and the like.

With reference to a flowchart shown in FIG. 54, a related artist list generation process by the related link generation section 821 (FIG. 53) will be described. By the way, the related artist list generation process is another example of the related link information generation process at step S192 of FIG. 36. The following describes a case in which the information generation control section 214 supplies the selected artist. Even if the content data of the selected artists are replaced with the selected content data, the same process may be performed.

When the content ID acquisition section 911 receives, in response to the operation signal from the input module 153, the selected artist set by the selection history management section 213 from the information generation control section 214, the content ID acquisition section 911 at step S311 acquires the content IDs of the content data of the selected artist from the metadata DB 171 and then supplies the content IDs to the genre ID acquisition section 912.

Generally, the content IDs are included in the metadata associated with the content data. The metadata are usually not associated with the content data stored in a MD for a personal purpose. In this case, the content IDS can not be obtained. Therefore, the PD 5 may transmit finger-print data of the content data to the content server 3 through the network 2 to acquire the corresponding content IDS from the content server 3.

The genre ID acquisition section 912 at step S312 acquires, from the content detailed metadata table 841, the genre ID corresponding to the content ID acquired by the content ID acquisition section 911, and then supplies it to the related list generation control section 913.

The related list generation control section 913 at step S313 determines whether or not it limits the area of retrieval, from which the content data are retrieved, to the content data stored in the PD 5.

When the related list generation control section 913 determines to limit the area of retrieval to the content data stored in the PD 5 at step S313, the PD target content extraction section 914 at step S314 under the control of the related list generation control section 913 extracts, out of the content IDS on the content detailed metadata table 841, from the content data of the content IDS stored in the content metadata table 181, the content data whose genre IDS are the same as the one acquired by the genre ID acquisition section 912 and the corresponding artist. The PD target content extraction section 914 then supplies, to the related list generation control section 913, a list listing the content data with the same genre ID and the corresponding artists.

At step S315, the related list generation control section 913 generates, based on the list of content data from the PD target content extraction section 914, the related artist list where artists are listed in order of the number of the content data with the same genre ID. The related list generation control section 913 then supplies the related artist list to the related link display control section 215, and also records the related artist list on the artist related table 183.

On the other hand, when the related list generation control section 913 determines not to limit the area of retrieval to the content data stored in the PD 5 at step S313, the whole target content extraction section 915 under the control of the related list generation control section 913 retrieves, out of the content data on the content detailed metadata table 841, the content data whose genre IDs are the same as the one acquired by the genre ID acquisition section 912 and corresponding artists. The whole target content extraction section 915 supplies, to the related list generation control section 913, a list listing the content data with the same genre ID and the corresponding artists.

At step 317, the related list generation control section 913 generates, based on the list of content data from the whole target content extraction section 915, the related artist list where artists are listed in order of the number of the content data with the same genre ID.

At step S318, the related list generation control section 913 again sorts the artists on the generated related artist list in order of the number of the content data having the content IDs stored in the content metadata table 181. The related list generation control section 913 then supplies the related artist list to the related link display control section 215, and also records the related artist list on the artist related table 183.

The process returns to step S192 (FIG. 36) after completing the process of step S315 or S318. At step S193 or S194 (FIG. 36), the related link display control section 215 produces the screen data based on the related artist list generated at step S315 and S318, and therefore the display module 152 displays the screen on the display section 131 in accordance with the screen data from the related link display control section 215.

Figure 54:
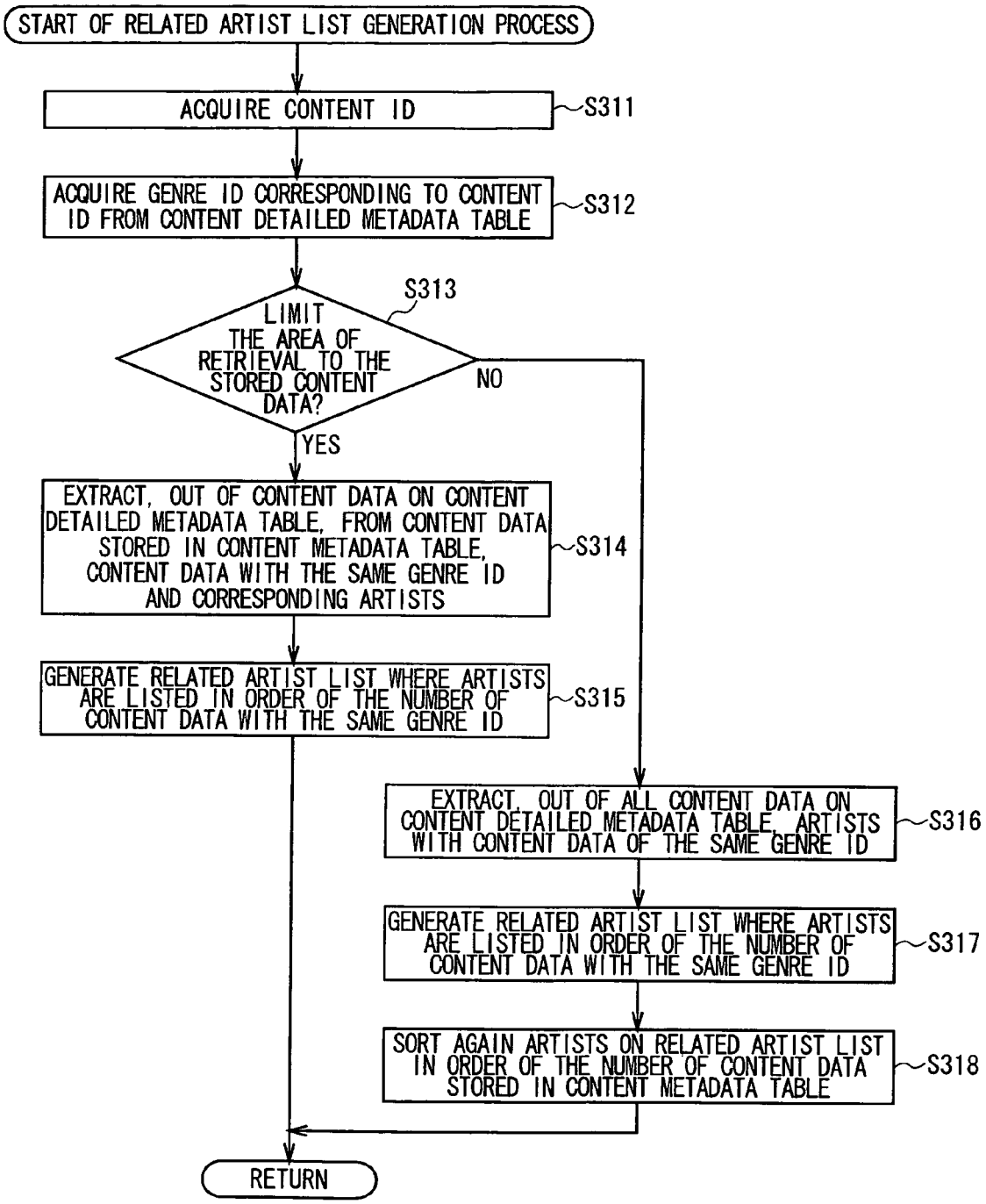
FIG. 54 is a flowchart illustrating an example of a related link information generation process at step S192 in FIG. 36 by the related link generation section illustrated by FIG. 53.

In this case, FIG. 54 includes a determination process at step S313. However, the related artist list generation process may not include the determination process. In this case, the related artist list generation process directly proceeds to step S314 or S316.

In addition, the related artist list generation process may not perform the process of step S318. In this case, as mentioned above, to display the content data and artists not recorded on the content metadata table 181 in gray, the corresponding content IDs on the related artist list may be associated with flags and like.

In this manner, the above method generates the related artist list listing artists with a lot of content data with the same genre ID as that of the target artist's content data (or the target content data). That is to say, this produces the related artist list including the related artists whose content data are associated with the target artist's content data in terms of genre IDs.

In the example of FIG. 54, the related artist list is generated based on the genre IDs. Alternatively, the related artist list may be generated based on the sub genre IDs illustrated by FIG. 51. In this case, the area of retrieval becomes wider because the sub genre IDs are more associated with the content data. Accordingly, this method can retrieve more content data than using the genre IDS.

Figure 55:
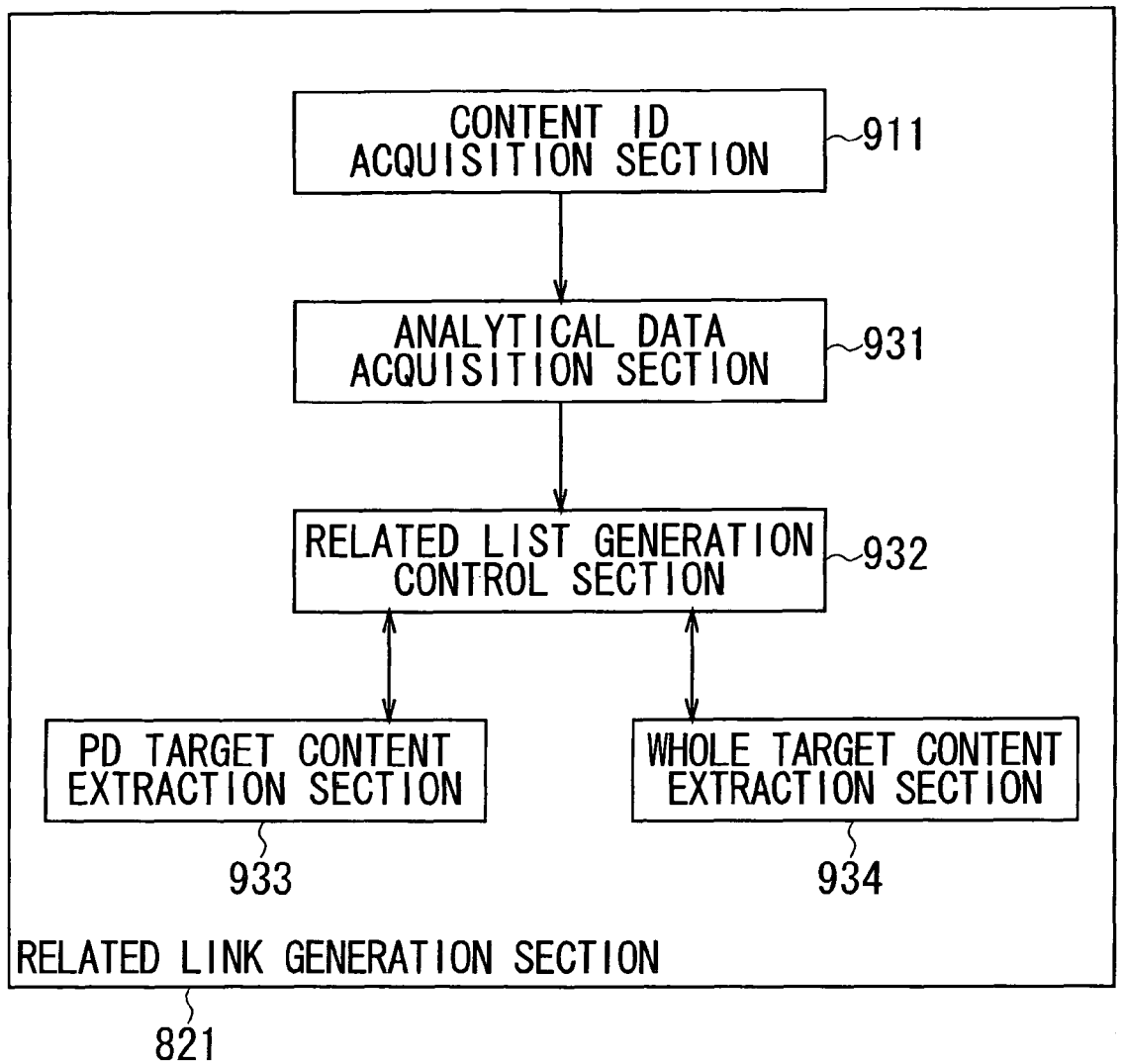
FIG. 55 is a diagram showing another example of the configuration of the related link generation section shown in FIG. 49.

FIG. 55 is a diagram showing another example of the configuration of the related link generation section (FIG. 49) generating the related artist list.

The related link generation section 821 (FIG. 55) includes the content ID acquisition section 911 in the same way as that of FIG. 53. Instead of the genre ID acquisition section 912, the related list generation control section 913, the PD target content extraction section 914 and the whole target list extraction section 915, the related link generation section 821 (FIG. 55) includes an analytical data acquisition section 931, a related list generation control section 932, a PD target content extraction section 933 and a whole target content extraction section 934.

In the example of FIG. 55, when the content ID acquisition section 911 acquires, from the metadata DB 171, the content ID of the selected content data or the content ID of the selected artist's content data, the content ID acquisition section 911 supplies the content ID to the analytical data acquisition section 931.

The analytical data acquisition section 931 acquires, from the content analytical data table 842, the value of the analytical data corresponding to the content ID acquired by the content ID acquisition section 911 (this value will also be referred to as an analytical data value), and then supplies the analytical data value to the related list generation control section 932.

In the same way as the related list generation control section 913, the related list generation control section 932 sets an area of retrieval. In this case, the area of retrieval may be limited to the content data stored in the PD5, or maybe not. This setting can be changed.

In response to the area of retrieval, the related list generation control section 932 controls the PD target content extraction section 933 or the whole target content extraction section 934 to extract content data whose analytical data value is more similar to the one acquired by the analytical data acquisition section 931, and corresponding artists. The related list generation control section 932 generates the related artist list such that the artists are listed in order of the number of the content data with the similar analytical data value. The related list generation control section 932 then supplies the related artist list to the related link display control section 215, and also records the related artist list on the artist related table 183.

By the way, in the same way as the related list generation control section 913, in a case in which the related list generation control section 932 generates the related artist list in accordance with the list of content data from the whole target content extraction section 934, the related list generation control section 932 may sort again the related artists on the related artist list in order of the number of the content data on the content metadata table 181. The related list generation control section 932 may display the content data and artists which are not stored in the content metadata table 181 in gray by associating them with flags and the like.

The PD target content extraction section 933 retrieves content data whose analytical data value are similar to (close to) the analytical data value acquired by the analytical data acquisition section 931 from among those stored in the PD 5.

That is to say, the PD target content extraction section 933 under the control of the related list generation control section 932 extracts, out of the content IDs on the content analytical data table 842, from the content data of the content IDs stored in the content metadata table 181, content data whose analytical data value are similar to the analytical data value acquired by the analytical data acquisition section 931, and corresponding artists. The PD target content extraction section 933 then supplies, to the related list generation control section 932, a list of content data listing the content data having the similar analytical data value and the corresponding artists.

The whole target content extraction section 934 retrieves content data whose analytical data value are similar to the analytical data value acquired by the analytical data acquisition section 931 from among not only those stored in the PD 5 but those stored in the content analytical data table 842.

That is to say, the whole target content extraction section 934 under the control of the related list generation control section 932 extracts, out of the content data on the content analytical data table 842, content data whose analytical data value are similar to the analytical data value acquired by the analytical data acquisition section 931, and corresponding artists. The whole target content extraction section 934 then supplies, to the related list generation control section 932, a list of content data listing the content data having the similar analytical data value and the corresponding artists.

By the way, a predetermined threshold value has been set to the PD target content extraction section 933 and the whole target content extraction section 934. The PD target content extraction section 933 and the whole target content extraction section 934 compares the difference between the analytical data value of the content data and the analytical data value acquired by the analytical data acquisition section 931 with the threshold value to obtain the analytical data value of the content data whose difference is less than the threshold value. The PD target content extraction section 933 and the whole target content extraction section 934 then determines that this content data has the similar analytical data value.

With reference to a flowchart in FIG. 56, a related artist list generation process by the related link generation section 821 (FIG. 55) will be described. In the same way as that of FIG. 54, the related artist list generation process (FIG. 56) is another example of the related link information generation process (at step S192 in FIG. 36). The following describes a case in which the information generation control section 214 supplies the selected artist. Even if, instead of the selected artist, the information generation control section 214 supplies the selected content data, then the same process will be performed.

When the content ID acquisition section 911 receives, in response to the operation signal from the input module 153, the selected artist set by the selection history management section 213 from the information generation control section 214, the content ID acquisition section 911 at step S331 acquires the content IDs of the content data of the selected artist from the metadata DB 171 and then supplies the content IDs to the analytical data acquisition section 931.

The analytical data acquisition section 931 at step S332 acquires, from the content analytical data table 842, the analytical data value (a tempo value of '55', for example) corresponding to the content ID acquired by the content ID acquisition section 911, and then supplies the analytical data value to the related list generation control section 932.

The related list generation control section 932 at step S333 determines whether it limits the area of retrieval to the content data stored in the PD 5.

When the related list generation control section 932 determines to limit the area of retrieval to the content data stored in the PD 5 at step 333, the PD target content extraction section 933 at step S334 under the control of the related list generation control section 932 extracts, out of the content IDs on the content analytical data table 842, from the content data of the content IDs stored in the content analytical data table 842, content data whose analytical data value are similar to the analytical data value acquired by the analytical data acquisition section 931, and corresponding artists.

For example, the content data with the analytical data value whose difference (absolute value) with the analytical data value acquired by the analytical data acquisition section 931 (the tempo value of '55', for example) is less than the threshold value ('10', for example) include the content data of the content ID of '7' with the tempo value of '64', the content data of the content ID of '17' with the tempo value of '53' and the like on the content analytical data table (FIG. 52).

In this case, only one type of analytical data value (tempo value) is used. This method may use various types of analytical data value to acquire content data with the similar analytical data value.

The PD target content extraction section 933 then supplies, to the related list generation control section 932, a list of content data listing the content data with the similar analytical data value and the corresponding artists.

At step S335, the related list generation control section 932 generates, based on the list of content data from the PD target content extraction section 934, the related artist list where artists are listed in order of the number of the content data with the similar analytical data value. The related list generation control section 932 then supplies the related artist list to the related link display control section 215, and also records the related artist list on the artist related table 183.

On the other hand, when the related list generation control section 932 determines not to limit the area of retrieval to the content data stored in the PD 5 at step S333, the whole target content extraction section 934 at step S336 under the control of the related list generation control section 932 extracts, out of the content data on the content analytical data table 842, content data whose analytical data value are similar to the analytical data value acquired by the analytical data acquisition section 931, and corresponding artists. The whole target content extraction section 934 then supplies, to the related list generation control section 932, a list of content data listing the content data having the similar analytical data value and the corresponding artists.

At step S337, the related list generation control section 932 generates, based on the list of content data from the whole target content extraction section 934, the related artist list where artists are listed in order of the number of the content data with the similar analytical data value. The related list generation control section 932 then supplies the related artist list to the related link display control section 215, and also records the related artist list on the artist related table 183.

The process returns to step S192 (FIG. 36) after completing the process of step S335 or S337. At step SP193 or S194 (FIG. 36), the related link display control section 215 produces the screen data based on the related artist list generated at step S335 and S337, and therefore the display module 152 displays the screen on the display section 131 in accordance with the screen data from the related link display control section 215.

Figure 56:
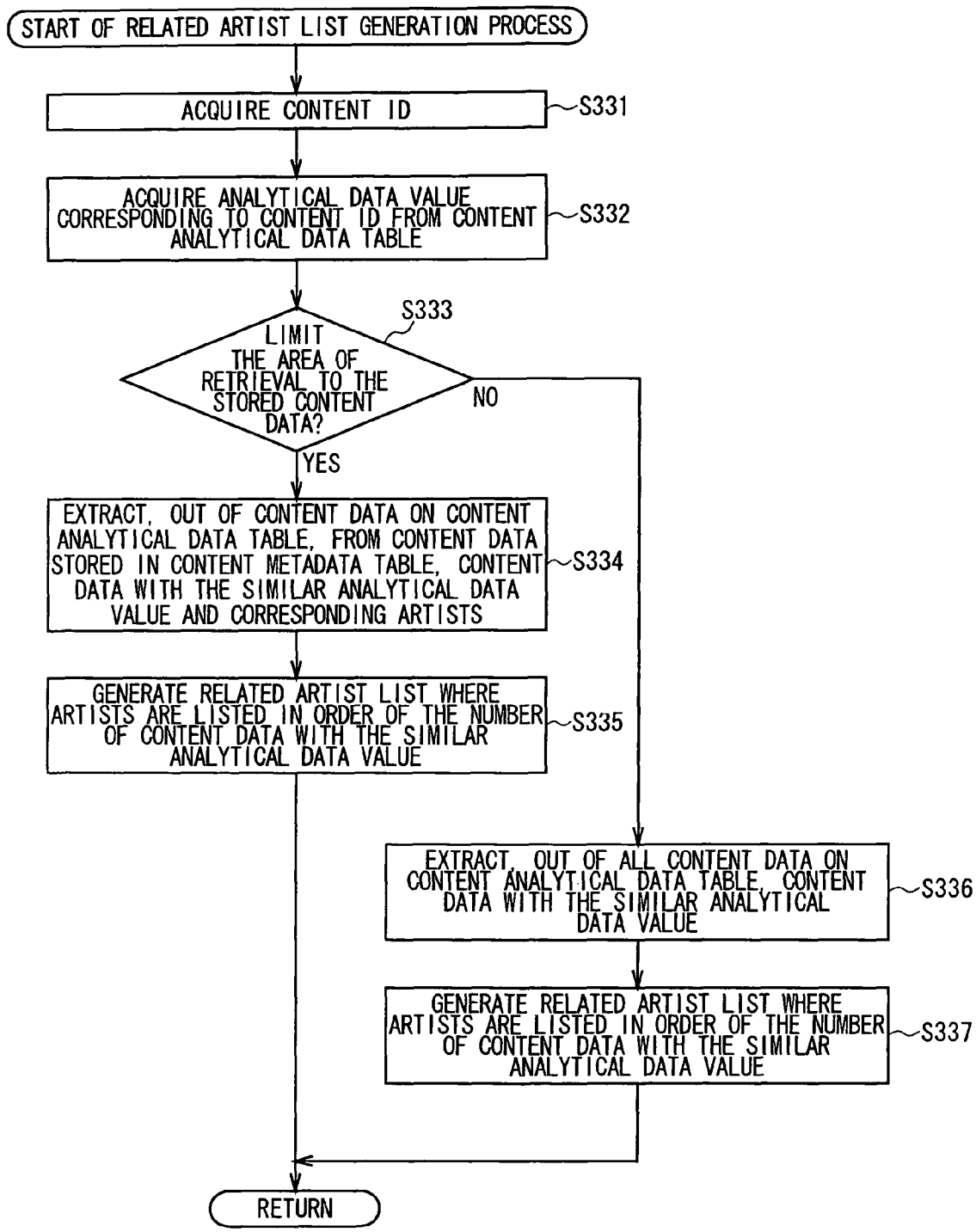
FIG. 56 is a flowchart illustrating an example of the related link information generation process at step S192 in FIG. 36 by the related link generation section shown in FIG. 55.

In this case, FIG. 56 includes a determination process at step S333. However, the related artist list generation process may not include the determination process. In this case, the related artist list generation process directly proceeds to step S334 or S336.

In addition, in the example of FIG. 56, the process of step S318 (FIG. 54) may be performed after the process of step S337.

That creates the related artist list including many artists with the analytical data value similar to the analytical data value of the content data of the target artist (or, similar to the analytical data value of the target content data). That is to say, this creates the related artist list including the artists of the content data whose analytical data value is related to the analytical data value of the content data of the target artist.

Figure 57:
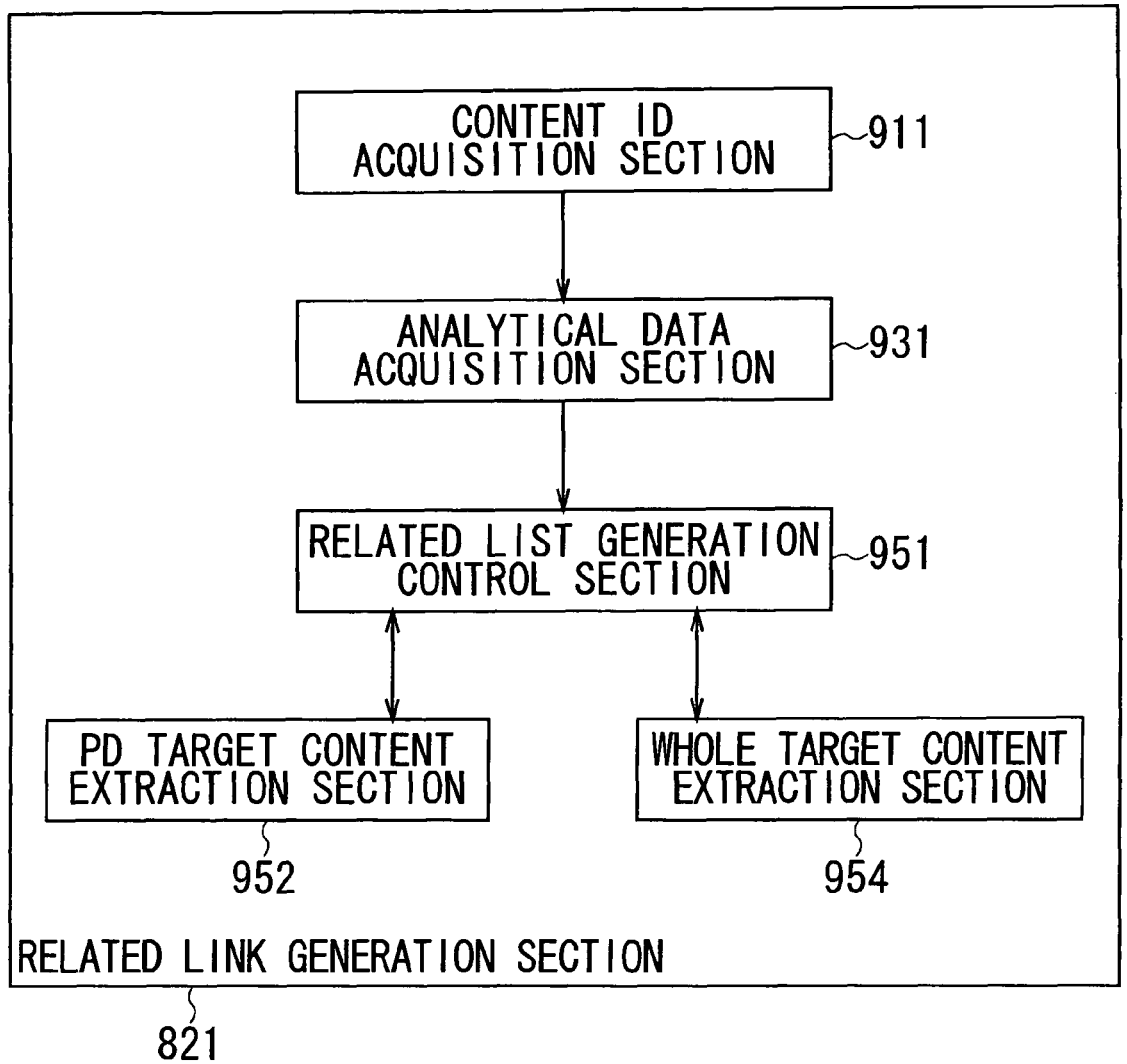
FIG. 57 is a diagram showing another example of the configuration of the related link generation section shown in FIG. 49.

FIG. 57 is a diagram showing another example of the configuration of the related link generation section (FIG. 49) generating the related artist list.

The related link generation section 821 (FIG. 57) includes the content ID acquisition section 911 and the analytical data acquisition section 931 in the same way as that of FIG. 55. Instead of the related list generation control section 932, the PD target content extraction section 933 and the whole target list extraction section 934, the related link generation section 821 (FIG. 57) includes a related list generation control section 951, a PD target content extraction section 952 and a whole target list extraction section 953.

In the example of FIG. 57, when the content ID acquisition section 911 acquires, from the metadata DB 171, the content ID of the selected content data or the content ID of the selected artist's content data, the content ID acquisition section 911 supplies the content ID to the analytical data acquisition section 931. In the process of FIG. 57, the content ID acquisition section 911 acquires the content IDs of all the content data of the artist corresponding to the selected content data, or the content IDs of all the content data of the selected artist.

The analytical data acquisition section 931 acquires, from the content analytical data table 842, the values of the analytical data corresponding to the content IDs acquired by the content ID acquisition section 911 (this value will also be referred to as an analytical data value), and calculates an average value of all the analytical data value of content data corresponding to all the content IDs, and then supplies the average value to the related list generation control section 951.

In the same way as the related list generation control section 913, the related list generation control section 951 sets an area of retrieval. In this case, the area of retrieval may be limited to the content data stored in the PD5, or maybe not. This setting can be changed.

In response to the area of retrieval, the related list generation control section 951 controls the PD target content extraction section 952 or the whole target content extraction section 953 to extract artists whose all content data are similar to all the content data of the selected artist. The related list generation control section 951 generates the related artist list such that the artists are listed in order of similarity. The related list generation control section 951 then supplies the related artist list to the related link display control section 215, and also records the related artist list on the artist related table 183.

That is to say, to acquire similar one, the method shown in FIG. 55 compares one content data with one content data of an artist, while the method shown in FIG. 57 compares all the content data of an artist with all the content data of another artist.

By the way, in the same way as the related list generation control section 913, in a case in which the related list generation control section 951 generates the related artist list in accordance with the list of content data from the whole target content extraction section 953, the related list generation control section 951 may sort again the related artists on the related artist list in order of the number of the content data on the content metadata table 181. The related list generation control section 951 may display the content data and artists which are not stored in the content metadata table 181 in gray by associating them with flags and the like.

The PD target content extraction section 952 extracts, from among the content data stored in the PD 5, artists who have many content data with the analytical data values close to (similar to) the average value calculated by the analytical data acquisition section 931 and have a few content data not close to the average value.

That is to say, the PD target content extraction section 952 under the control of the related list generation control section 951 calculates differences between the average value of the analytical data values acquired by the analytical data acquisition section 931 and each analytical data value of all the content data of the artists and then sums up the differences. The PD target content extraction section 952 under the control of the related list generation control section 951 then extracts, out of the content IDs on the content analytical data table 842, from the content data of the content IDs stored in the content metadata table 181, artists whose sum is less or equal to a predetermined value. The PD target content extraction section 952 then supplies the artists to the related list generation control section 951.

The whole target content extraction section 953 extracts, not only from among the content data stored in the PD 5 but also from all the content data on the content analytical data table 842, artists who have many content data with the analytical data values close to (similar to) the average value calculated by the analytical data acquisition section 931 and have a few content data not close to the average value.

That is to say, the whole target content extraction section 953 under the control of the related list generation control section 951 calculates differences between the average value of the analytical data values acquired by the analytical data acquisition section 931 and each analytical data value of all the content data of the artists and then sums up the differences. The whole target content extraction section 953 under the control of the related list generation control section 951 then extracts, from among the content data on the content analytical data table 842, artists whose sum is less or equal to a predetermined value. The whole target content extraction section 953 then supplies the artists to the related list generation control section 951.

By the way, to extract artists, the PD target content extraction section 952 and the whole target content extraction section 953 compares the predetermined value with the sum of the differences of the average value of the above analytical data. However, if the analytical data is constant, the PD target content extraction section 952 and the whole target content extraction section 953 may multiply the difference of the analytical data by a coefficient corresponding to the difference to enhance important factors. Alternatively, the PD target content extraction section 952 and the whole target content extraction section 953 may multiply the difference of the analytical data value by itself before summing up, or multiply it by a coefficient after squaring the difference.

In a case in which a coefficient of temp is '1'; a coefficient of date is '5'; an average value of tempo calculated by the analytical data acquisition section 931 is '50'; an average value of date is '1979'; an analytical data value of temp of the target content data is '40'; and the analytical data value of date is '1989', the value to be compared with the predetermined value may be 100 (=1×(50−40)^2) for tempo and 1805 (=5× (1970−1989)^2) for date.

If the analytical data value of content data (like an image of content data) is qualitative, differences each of which is set for different analytical data value may be used. If the analytical data shows an image of the content data, a predetermined value of '0' may be used as the difference of the analytical data value when the analytical data value is an uplifting and groove-like image, or a predetermined value of '50' may be used as the difference of the analytical data value when the analytical data value is an jazz-like and groove-like image.

With reference to a flowchart shown in FIG. 58, a related artist list generation process by the related link generation section 821 (FIG. 57) will be described. By the way, the related artist list generation process is another example of the related link information generation process at step S192 of FIG. 36 in the same way as that of FIG. 54. The following describes a case in which the information generation control section 214 supplies the selected artist. Even if the content data of the selected artists are replaced with the selected content data, the same process may be performed.

When the content ID acquisition section 911 receives, in response to the operation signal from the input module 153, the selected artist set by the selection history management section 213 from the information generation control section 214, the content ID acquisition section 911 at step S351 acquires the content IDs of all the content data of the selected artist from the metadata DB 171 and then supplies the content IDs of all the content data to the analytical data acquisition section 931.

The analytical data acquisition section 931 at step S352 acquires, from the content analytical data table 842, the analytical data values corresponding to the content IDs of all the content data acquired by the content ID acquisition section 911, and at step S353 calculates an average value of the analytical data values, and then supplies the average value to the related list generation control section 951.

The related list generation control section 951 at step S354 determines whether it limits the area of retrieval to the content data stored in the PD 5.

Figure 59:
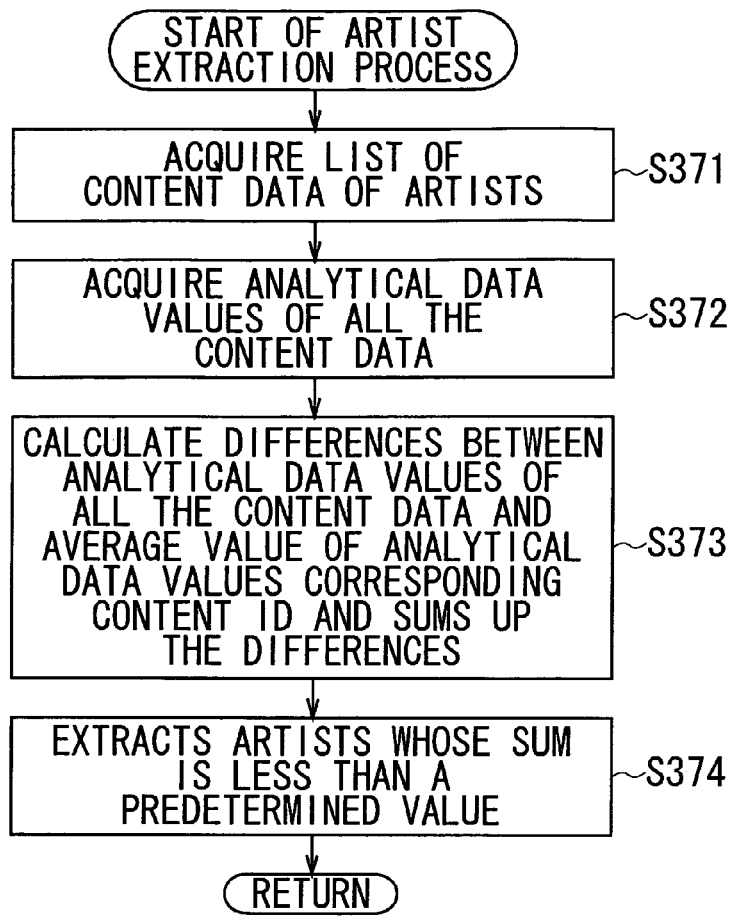
FIG. 59 is a flowchart illustrating an example of an artist extraction process at step S355 in FIG. 58.

When the related list generation control section 951 determines to limit the area of retrieval to the content data stored in the PD 5 at step 354, the PD target content extraction section 952 at step S355 under the control of the related list generation control section 951 performs an artist extraction process for PD-target content data. This artist extraction process will be described with reference to a flowchart in FIG. 59.

At step S371, the PD target content extraction section 952 extracts, out of the content IDs on the content analytical data table 842, from the content data of the content IDs stored in the content metadata table 182, a list of content data of one artist.

The PD target content extraction section 952 at step S372 acquires, from the content analytical data table 842, the analytical data values of all the content data in the acquired list. And then, the PD target content extraction section 952 at step S373 calculates differences between the acquired analytical data values of all the content data and the average value of the analytical data values acquired by the analytical data acquisition section 931 and then sums up the differences.

The process of step S371 to S373 is performed to all the artists corresponding to the content data on the content metadata table 182. Accordingly, the sums of the differences of content data of all the artists corresponding to the content data on the content metadata table 182 will be obtained.

At step S374, the PD target content extraction section 952 compares the sums of the differences of all the artists with a predetermined value, and then extracts artists whose sums are less than the predetermined value. The PD target content extraction section 952 then supplies, to the related list generation control section 951, a list listing the extracted artists and corresponding sums of differences. This ends the artist extraction process, and then the process returns to step S355 (FIG. 58) to proceed to step S356.

The related list generation control section 951 at step S356 generates, based on the artists extracted by the PD target content extraction section 952, the related artist list where artists are listed in descending order of the sums calculated by the PD target content extraction section 952. The related list generation control section 951 then supplies the related artist list to the related link display control section 215, and also records the related artist list on the artist related table 183.

When the related list generation control section 951 determines to not limit the area of retrieval to the content data stored in the PD 5 at step 354, the whole target content extraction section 953 at step S357 under the control of the related list generation control section 951 performs an artist extraction process for whole-target content data. This artist extraction process is the same as that of FIG. 59 except that content data are retrieved from a different area. Therefore, the description will be omitted.

The process of step S357 acquires the analytical data values of all the content data of all the artists corresponding to the content data on the content analytical data table 842. The process then calculates differences between the acquired analytical data values of all the content data and the average value of the analytical data values acquired by the analytical data acquisition section 931 and then sums up the differences. The process subsequently extracts artists whose sums are less than the predetermined value. The process then supplies, to the related list generation control section 951, the extracted artists and corresponding sums of differences.

In response to that, the related list generation control section 951 at step S358 generates, based on the artists extracted by the whole target content extraction section 953, the related artist list where artists are listed in descending order of the sums calculated by the whole target content extraction section 953. The related list generation control section 951 then supplies the related artist list to the related link display control section 215, and also records the related artist list on the artist related table 183.

The process returns to step S192 (FIG. 36) after completing the process of step S356 or S358. At step SP193 or S194 (FIG. 36), the related link display control section 215 produces the screen data based on the related artist list generated at step S356 or S358, and therefore the display module 152 displays the screen on the display section 131 in accordance with the screen data from the related link display control section 215.

Figure 58:
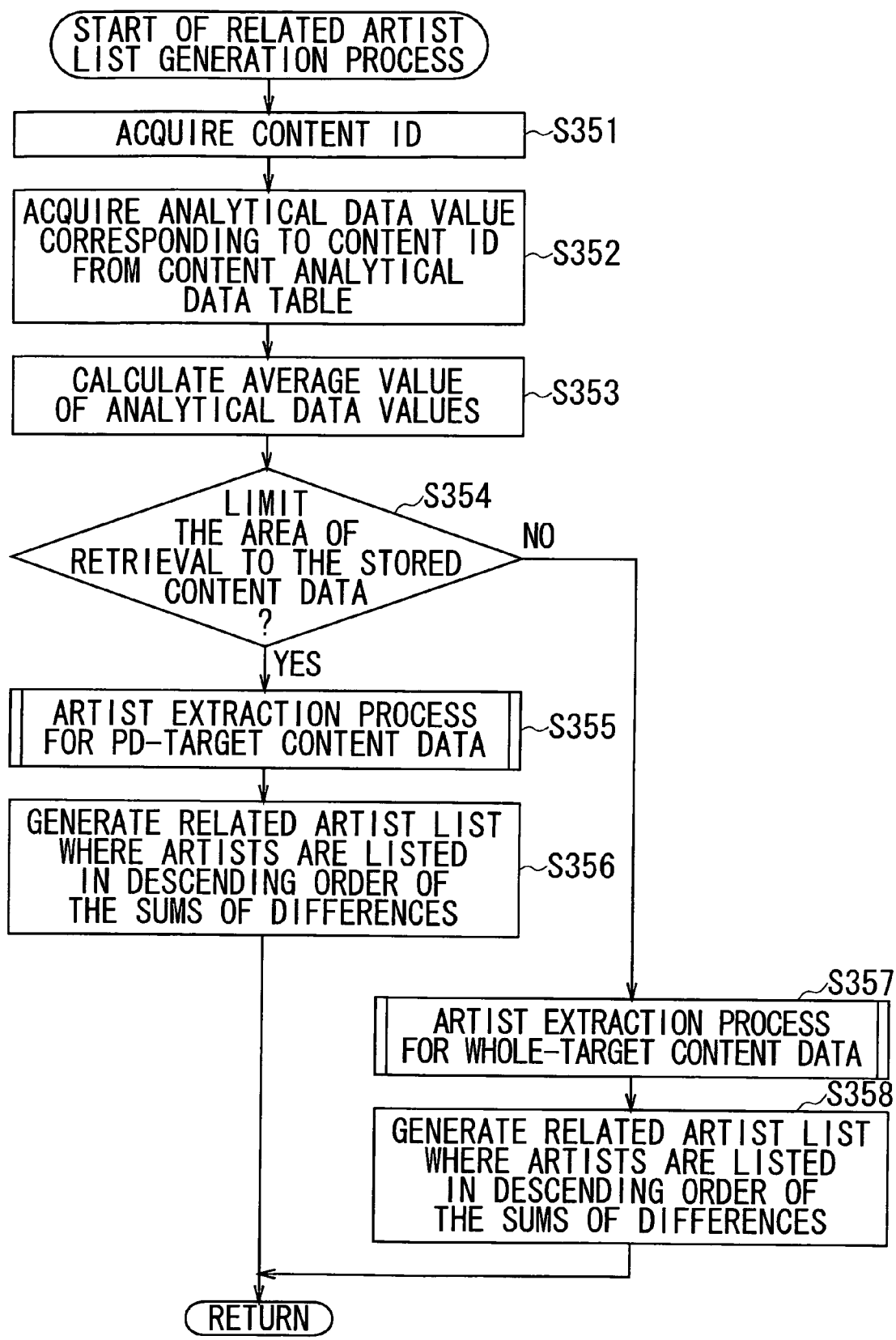
FIG. 58 is a flowchart illustrating an example of the related link information generation process at step S192 in FIG. 36 by the related link generation section shown in FIG. 57.

In this case, FIG. 58 includes a determination process at step S354. However, the related artist list generation process may not include the determination process. In this case, the related artist list generation process directly proceeds to step S355 or S357.

In addition, in the example of FIG. 58, the process of step S318 (FIG. 54) may be performed after the process of step S358.

That creates the related artist list including artists who have many content data with the analytical data values close to the average value of the analytical data values of all the content data of the target artist and have a few content data with the analytical data values not close to the average value of the analytical data values of all the content data of the target artist. That is to say, this produces the related artist list listing artists whose content data are all related to all the content data of the target artist.

In this manner, it is easy to create the related artist list from information of predetermined association between the content data extracted by using the metadata of the content data. Therefore, a user does not have to previously produce a list of the artists related to a certain artist (such as the artist related table 183 shown in FIG. 7) to store it in the PD 5.

In addition, when the content detailed metadata table and like (which are used to create the related artist list) are updated as needed, the related artist list are updated accordingly. This helps a user stay up-to-date.

The above describes moving pictures or music data as content data. Alternatively, other things such as software may be applied as content data.

In addition, the above describes the PD 5 (which is a portable recording and playback device) as information processing apparatus. Alternatively, personal computers such as the PC 1 (FIG. 2) may be applied as the information processing apparatus. Devices such as portable phone and Personal Digital Assistant (PDA), Playback devices such as Audiovisual (AV) device, and Consumer Electronics (CE) devices such as recording and playback device can also be applies as the information processing apparatus.

The above-noted processes can be performed not only by hardware but by software.

For example, a computer may be equipped with hardware components incorporating programs to perform the above-noted processes. The program may be installed on a computer (such as general-purpose personal computer) through a network or storage media to perform the above-noted processes.

As shown in FIG. 2 or FIG. 4, the storage media storing the program include the following media to provide uses with the program: magnetic disks (including flexible disks); optical discs (such as Compact Disk Read Only Memory (CD-ROM) and Digital Versatile Disk (DVD)); magnetic optical discs (such as "Mini Disc (MD) (Registered Trademark)"); and semiconductor memories (such as the removable media 21 and 122). The storage media storing the program may also include the following media inside the device: the ROMs 12 and 112 and the hard disks in the storage sections 18 and 119.

With each process, the above steps are performed in order of time in accordance with the flowcharts. However, some of the above steps may not follow the flowcharts. That it to say, some of the above steps may be performed at the same time or independently.

By the way, in the above description, a system may include all the devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus performing a predetermined process in accordance with an operation of a touch panel on a display, comprising:
    display control means for displaying, on said display, an item associated with predetermined content;
    detection means for detecting a contact of a user with said touch panel;
    determination means for determining whether or not said contact of the user is released, said contact being detected by said detection means;
    selection means for completing, when said determination means determines that said contact of the user is released, a selection of the item displayed by said display control means on a position where said contact of the user was detected by said detection means until just before;
    acquisition means for acquiring related content that has a certain relationship to the content associated with the item selected by the selection means,
    wherein the selection means selects, in accordance with the contact of the user detected by the detection means the item associated with the content, and
    wherein the display control means displays a first item on a center of a circle or polygon, and displays a first plurality of items related to the first item on a circumference of the circle or polygon, and
    wherein when the selection means selects a second item from the first plurality of items displayed on the circumference of the circle or polygon, the display control means displays the second item selected from the circumference on the center of the circle or polygon, and displays a second plurality of items related to the selected second item on the circumference of the circle or polygon; and
    playback means for playing back content associated with the item whose selection is completed by said selection means, wherein
    said playback means plays back predetermined content during a period from when said contact of the user is detected by said detection means until said determination means determines that said contact of the user is released.

2. The information processing apparatus according to claim 1, wherein
    said predetermined content is part or all of the content associated with the item, said item being displayed, during the period from when said contact of the user is detected by said detection means until said determination means determines that said contact of the user is released, by said display control means on the position where said contact of the user was detected by said detection means.

3. The information processing apparatus according to claim 1, wherein
    said predetermined content is sound effects.

4. An information processing method of an information processing apparatus performing a predetermined process in accordance with an operation of a touch panel on a display, comprising:
    a display control step of displaying, on said display, an item associated with predetermined content;
    a detection step of detecting a contact of a user with said touch panel;
    a determination step of determining whether or not said contact of the user is released, said contact being detected by the process of said detection step;
    a selection step of completing, when the process of said determination step determines that said contact of the user is released, a selection of the item displayed by the process of said display control step on a position where said contact of the user was detected by the process of said detection step until just before;
    an acquisition step for acquiring related content that has a certain relationship to the content associated with the item selected by the selection step,
    wherein the selection step selects, in accordance with the contact of the user detected by the detection step, the item associated with the content, and
    wherein the display control step comprises displaying a first item on a center of circle or polygon, and displaying a first plurality of items related to the first item on a circumference of the circle or polygon, and
    wherein when the selection step completes selection of a second item from the first plurality of items displayed on the circumference of the circle or polygon, the display control step further comprises displaying the second item selected from the circumference on the center of the circle or polygon, and displaying a second plurality of items related to the selected second item on the circumference of the circle or polygon;
    a playback step of playing back content associated with the item whose selection is completed by the process of said selection step, wherein
    the process of said playback step plays back predetermined content during a period from when said contact of the user is detected by the process of said detection step until the process of said determination step determines that said contact of the user is released.

5. A program for causing a computer to execute a predetermined process in accordance with an operation of a touch panel on a display, said program comprising:
    a display control step of displaying, on said display, an item associated with predetermined content;
    a detection step of detecting a contact of a user with said touch panel;
    a determination step of determining whether or not said contact of the user is released, said contact being detected by the process of said detection step;
    a selection step of completing, when the process of said determination step determines that said contact of the user is released, a selection of the item displayed by the process of said display control step on a position where said contact of the user was detected by the process of said detection step until just before;
    an acquisition step for acquiring related content that has a certain relationship to the content associated with the item selected by the selection step,
    wherein the selection step selects, in accordance with the contact of the user detected by the detection step, the item associated with the content, and
    wherein the display control step displays comprises displaying a first item on a center of circle or polygon, and displaying a first plurality of items related to the first item on a circumference of the circle or polygon, and
    wherein when the selection step completes selection of a second item from the first plurality of items displayed on the circumference of the circle or polygon, the display control step further comprises displaying the second item selected from the circumference on the center of the circle or polygon, and displaying a second plurality of items related to the selected second item on the circumference of the circle or polygon; and a playback step of playing back content associated with the item whose selection is completed by the process of said selection step, wherein the process of said playback step plays back predetermined content during a period from when said contact of the user is detected by the process of said detection step until the process of said determination step determines that said contact of the user is released.

6. An information processing apparatus performing a predetermined process in accordance with an operation of a touch panel on a display, comprising:

a display control section that displays, on said display, an item associated with predetermined content;

a detection section that detects a contact of a user with said touch panel;

a determination section that determines whether or not said contact of the user is released, said contact being detected by said detection section;

a selection section that completes, when said determination section determines that said contact of the user is released, a selection of the item displayed by said display control section on a position where said contact of the user was detected by said detection section until just before;

an acquisition section for acquiring related content that has a certain relationship to the content associated with the item selected by the selection section, wherein the selection section selects, in accordance with the contact of the user detected by the detection section the item associated with the content, and wherein the display control section displays a first item on a center of circle or polygon, and displays a first plurality of items related to the first item on a circumference of the circle or polygon, and wherein when the selection means selects a second item from the first plurality of items displayed on the circumference of the circle or polygon, the display control means displays the second item selected from the circumference on the center of the circle or polygon, and displays a second plurality of items related to the selected second item on the circumference of the circle or polygon; and a playback section that plays back content associated with the item whose selection is completed by said selection section, wherein said playback section plays back predetermined content during a period from when said contact of the user is detected by said detection section until said determination section determines that said contact of the user is released.

* * * * *